(12) United States Patent
Fiske

(10) Patent No.: US 9,032,537 B2
(45) Date of Patent: May 12, 2015

(54) SECURE ACTIVE ELEMENT MACHINE

(75) Inventor: Michael Stephen Fiske, San Francisco, CA (US)

(73) Assignee: Aemea Inc., Las Vegas, NV (US)

( * ) Notice: Subject to any disclaimer, the term of this patent is extended or adjusted under 35 U.S.C. 154(b) by 0 days.

(21) Appl. No.: 13/373,948

(22) Filed: Dec. 6, 2011

(65) Prior Publication Data

US 2012/0198560 A1   Aug. 2, 2012

Related U.S. Application Data

(60) Provisional application No. 61/462,260, filed on Jan. 31, 2011, provisional application No. 61/465,084, filed on Mar. 14, 2011, provisional application No. 61/571,822, filed on Jul. 6, 2011, provisional application No. 61/572,607, filed on Jul. 18, 2011, provisional application No. 61/572,996, filed on Jul. 26, 2011, provisional application No. 61/626,703, filed on Sep. 30, 2011, provisional application No. 61/628,332, filed on Oct. 28, 2011, provisional application No. 61/628,826, filed on Nov. 7, 2011.

(51) Int. Cl.
*G06F 21/00* (2013.01)
*G06F 21/75* (2013.01)

(52) U.S. Cl.
CPC ..................................... *G06F 21/75* (2013.01)

(58) Field of Classification Search
None
See application file for complete search history.

(56) References Cited

U.S. PATENT DOCUMENTS

| | | | |
|---|---|---|---|
| 2003/0093416 A1* | 5/2003 | Akaboshi et al. | 707/3 |
| 2003/0131031 A1* | 7/2003 | Klass | 708/250 |
| 2004/0010720 A1* | 1/2004 | Singh et al. | 713/201 |
| 2005/0005157 A1* | 1/2005 | Folmsbee | 713/200 |
| 2006/0277533 A1* | 12/2006 | Fiske | 717/137 |
| 2007/0240160 A1* | 10/2007 | Paterson-Jones et al. | 718/104 |
| 2008/0106605 A1* | 5/2008 | Schrijen et al. | 348/207.99 |

* cited by examiner

*Primary Examiner* — David Le
(74) *Attorney, Agent, or Firm* — David Lewis

(57) ABSTRACT

Based upon the principle of Turing incomputability, and novel properties of the Active Element Machine, a malware-resistant computing machine is constructed. This new computing machine is a non-Turing, non-register machine (non von-Neumann), called an Active Element Machine (AEM). AEM programs are designed so that the purpose of the computation is difficult to apprehend by an adversary and hijack with malware. These methods can help hinder reverse engineering of proprietary algorithms and hardware design.

Using quantum randomness, the AEM can deterministically execute a universal digital computer program with active element firing patterns that are Turing incomputable. In some embodiments, a more powerful computational procedure is demonstrated than Turing's computational procedure (digital computer procedure). Current digital computer algorithms can be derived or designed with a Turing machine computational procedure. A novel class of computing machines is built where the purpose of the program's execution is difficult to apprehend (Turing incomputable).

56 Claims, 14 Drawing Sheets

Fire Pattern 0000

Elements   $X_0$   $X_1$   $X_2$   $X_3$

Elements $X_0, X_1, X_2$ and $X_3$ don't fire during window $\mathfrak{W}$.

FIGURE 1. Fire Pattern 0000

Elements     $X_0$   $X_1$   $X_2$   $X_3$

---

Elements $X_0, X_1, X_2$ and $X_3$ don't fire during window $\mathfrak{W}$.

FIGURE 2. Fire Pattern 0001

Elements     $X_0$   $X_1$   $X_2$   $X_3$

Only element $X_3$ fires during window $\mathfrak{W}$.

FIGURE 3. Fire Pattern 0010

Elements     $X_0$   $X_1$   $X_2$   $X_3$

Only element $X_2$ fires during window $\mathfrak{W}$.

FIGURE 4. Fire Pattern 0011

Elements     $X_0$   $X_1$   $X_2$   $X_3$

Only elements $X_2$ and $X_3$ fire during window $\mathfrak{W}$.

FIGURE 5. Fire Pattern 0100
Elements   $X_0$   $X_1$   $X_2$   $X_3$
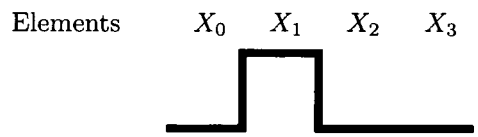
Only element $X_1$ fires during window $\mathfrak{W}$.
FIGURE 6. Fire Pattern 0010 for $1 \oplus 0$
Elements   $X_0$   $X_1$   $X_2$   $X_3$
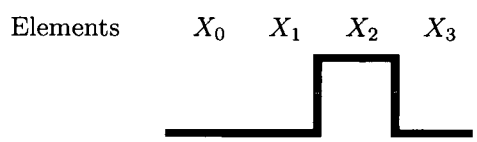
FIGURE 7. Fire Pattern 0010 for $0 \oplus 1$
Elements   $X_0$   $X_1$   $X_2$   $X_3$
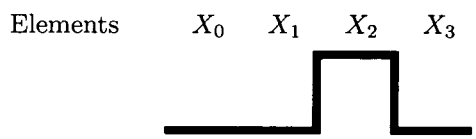
FIGURE 8. Fire Pattern 1011 for $1 \oplus 1$
Elements   $X_0$   $X_1$   $X_2$   $X_3$
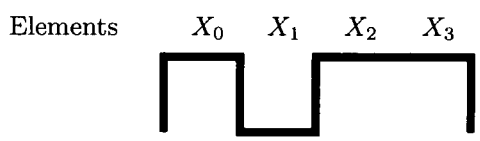
FIGURE 9. Fire Pattern 0100 for $0 \oplus 0$
Elements   $X_0$   $X_1$   $X_2$   $X_3$
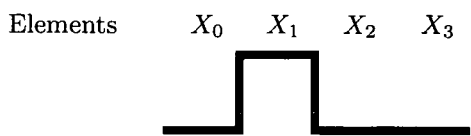

FIGURE 10. Fire Pattern 0101 for $\neg(0 \wedge 0)$.
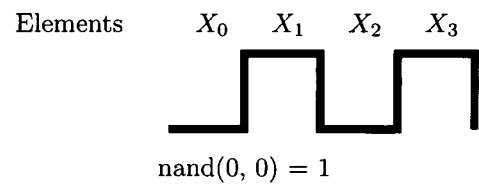
nand(0, 0) = 1
FIGURE 11. Fire Pattern 0101 for $\neg(1 \wedge 0)$.
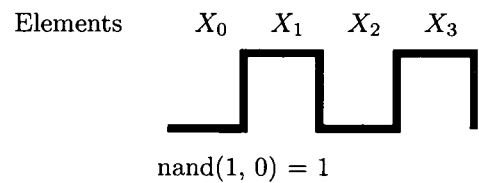
nand(1, 0) = 1
FIGURE 12. Fire Pattern 0101 for $\neg(0 \wedge 1)$.
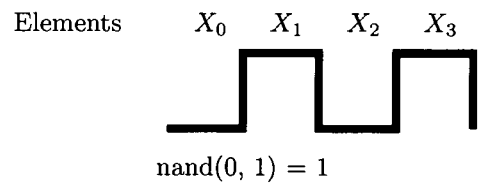
nand(0, 1) = 1
FIGURE 13. Fire Pattern 1010 for $\neg(1 \wedge 1)$.
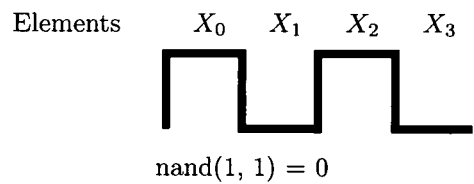
nand(1, 1) = 0

GEOMETRY OF A VERTICAL COVER

GEOMETRY OF A HORIZONTAL COVER

FIGURE 19
Turing Machine Configuration (*q*, *k*, *T*)
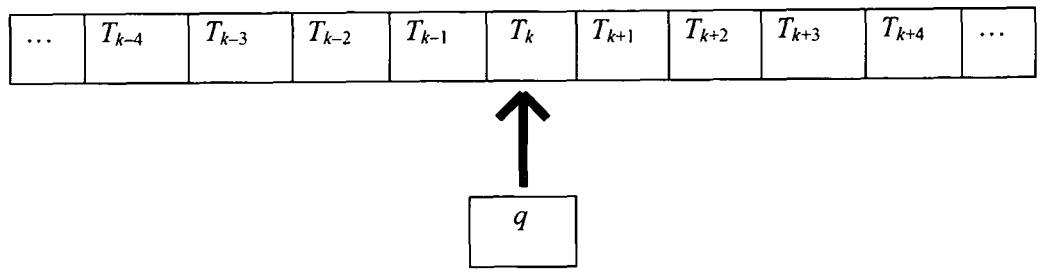
FIGURE 20
| *q* | ... | *1* | 2 | *1* | 2 | 1 | 2 | 1 | 2 | 2 | 2 | 2 | *1* | 2 | 2 | 2 | 2 | ... |
|---|---|---|---|---|---|---|---|---|---|---|---|---|---|---|---|---|---|---|
| *r* | ... | *1* | 2 | *1* | 2 | 1 | 2 | 1 | 2 | 2 | 2 | 2 | *1* | 2 | 2 | 2 | 2 | ... |
| *s* | ... | *1* | 2 | *1* | 2 | 1 | 2 | 1 | 2 | 2 | 2 | 2 | *1* | 2 | 2 | 2 | 2 | ... |
| *t* | ... | *1* | 2 | *1* | 2 | 1 | 2 | 1 | 2 | 2 | 2 | 2 | *1* | 2 | 2 | 2 | 2 | ... |
| *u* | ... | *1* | 2 | *1* | 2 | 1 | 2 | 1 | 2 | 2 | 2 | 2 | *1* | 2 | 2 | 2 | 2 | ... |
| *v* | ... | *1* | 2 | *1* | 2 | 1 | 2 | 1 | 2 | 1 | 2 | 2 | *1* | 2 | 2 | 2 | 2 | ... |
| *w* | ... | *1* | 2 | *1* | 2 | 1 | 2 | 1 | 2 | 1 | 2 | 2 | *1* | 2 | 2 | 2 | 2 | ... |
| *x* | ... | *1* | 2 | *1* | 2 | 1 | 2 | 1 | 2 | 1 | 2 | 1 | 2 | *1* | 2 | 2 | 2 | ... |
| *q* | ... | *1* | 2 | *1* | 2 | 1 | 2 | 1 | 2 | 1 | 2 | 1 | 2 | *1* | 2 | 2 | 2 | ... |
FIGURE 21
Unit Square Coordinates
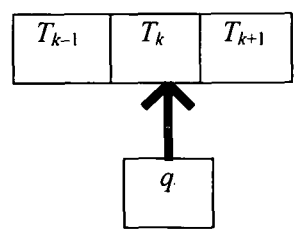

Left Affine Function

Right Affine Function

Edge Pattern Substitution Operator: Case A.

Edge Pattern Substitution Operator: Case B.

FIGURE 26

Edge Pattern Substitution Operator: Case C.

| $v_0$ | ... | $v_{s-u}$ | ... | $\underline{v_s}$ | ... | $v_{s+m-u}$ | | $v_n$ |
|---|---|---|---|---|---|---|---|---|
| $w_0$ | ... | $w_{s-u}$ | ... | $w_s$ | ... | $w_{s+m-u}$ | | $w_n$ |

FIGURE 27

Edge Pattern Substitution Operator: Case D.

| $p_0$ | | ... | | $\underline{p_u}$ | ... | $p_{u+n-s}$ | | ... | $p_m$ |
|---|---|---|---|---|---|---|---|---|---|

| $v_0$ | ... | $v_{s-u}$ | ... | ... | $\underline{v_s}$ | ... | $v_n$ |
|---|---|---|---|---|---|---|---|
| $w_0$ | ... | $w_{s-u}$ | ... | ... | $w_s$ | ... | $w_n$ |

FIGURE 28

APERIODIC MACHINE $f_1(x,y) = (\frac{1}{11}x + 34, 11y - 682)$ on $W_1 = [(12, 69), (13, 69), (13, 70), (12, 70)]$  $p = (12\frac{1}{10}, 69\frac{21}{110})$

| Tape Coordinate | -2 | -1 | 0 | 1 | 2 | 3 | 4 | 5 | 6 |
|---|---|---|---|---|---|---|---|---|---|
| Tape Contents | 0 | 0 | 1 | 2 | 0 | 0 | 0 | 0 | 0 |
| State |  |  |  |  | b |  |  |  |  |

$f_2(x,y) = (11x - 363, \frac{1}{11}y + 106)$ on $W_2 = [(35, 79), (36, 79), (36, 80), (35, 80)]$  $p = (35\frac{1}{10}, 79\frac{1}{10})$

| Tape Coordinate | -2 | -1 | 0 | 1 | 2 | 3 | 4 | 5 | 6 |
|---|---|---|---|---|---|---|---|---|---|
| Tape Contents | 0 | 0 | 1 | 2 | 1 | 0 | 0 | 0 | 0 |
| State |  |  |  |  | c |  |  |  |  |

$f_3(x,y) = (11x - 242, \frac{1}{11}y + 57)$ on $W_3 = [(23, 113), (24, 113), (24, 114), (23, 114)]$  $p = (23\frac{1}{10}, 113\frac{21}{110})$

| Tape Coordinate | -2 | -1 | 0 | 1 | 2 | 3 | 4 | 5 | 6 |
|---|---|---|---|---|---|---|---|---|---|
| Tape Contents | 0 | 0 | 1 | 2 | 1 | 0 | 0 | 0 | 0 |
| State |  |  |  |  | f |  |  |  |  |

$f_4(x,y) = (\frac{1}{11}x + 12, 11y - 660)$ on $W_4 = [(12, 67), (13, 67), (13, 68), (12, 68)]$  $p = (12\frac{1}{10}, 67\frac{351}{1210})$

| Tape Coordinate | -2 | -1 | 0 | 1 | 2 | 3 | 4 | 5 | 6 |
|---|---|---|---|---|---|---|---|---|---|
| Tape Contents | 0 | 0 | 1 | 2 | 0 | 0 | 0 | 0 | 0 |
| State |  |  |  |  | b |  |  |  |  |

$f_5(x,y) = (\frac{1}{11}x + 35, 11y - 825)$ on $W_5 = [(13, 80), (14, 80), (14, 81), (13, 81)]$  $p = (13\frac{1}{10}, 80\frac{21}{110})$

| Tape Coordinate | -2 | -1 | 0 | 1 | 2 | 3 | 4 | 5 | 6 |
|---|---|---|---|---|---|---|---|---|---|
| Tape Contents | 0 | 0 | 1 | 2 | 0 | 1 | 0 | 0 | 0 |
| State |  |  |  |  | c |  |  |  |  |

$f_6(x,y) = (11x - 363, \frac{1}{11}y + 108)$ on $W_6 = [(36, 57), (37, 57), (37, 58), (36, 58)]$  $p = (36\frac{21}{110}, 57\frac{1}{10})$

| Tape Coordinate | -2 | -1 | 0 | 1 | 2 | 3 | 4 | 5 | 6 |
|---|---|---|---|---|---|---|---|---|---|
| Tape Contents | 0 | 0 | 1 | 2 | 2 | 1 | 0 | 0 | 0 |
| State |  |  |  |  | a |  |  |  |  |

$f_7(x,y) = (\frac{1}{11}x + 31, 11y - 1166)$ on $W_7 = [(35, 113), (36, 113), (36, 114), (35, 114)]$  $p = (35\frac{1}{10}, 113\frac{21}{110})$

| Tape Coordinate | -2 | -1 | 0 | 1 | 2 | 3 | 4 | 5 | 6 |
|---|---|---|---|---|---|---|---|---|---|
| Tape Contents | 0 | 0 | 1 | 2 | 2 | 1 | 0 | 0 | 0 |
| State |  |  |  |  | f |  |  |  |  |

$f_8(x,y) = (11x - 363, \frac{1}{11}y + 106)$ on $W_8 = [(34, 79), (35, 79), (35, 80), (34, 80)]$  $p = (34\frac{21}{110}, 79\frac{1}{10})$

| Tape Coordinate | -2 | -1 | 0 | 1 | 2 | 3 | 4 | 5 | 6 |
|---|---|---|---|---|---|---|---|---|---|
| Tape Contents | 0 | 0 | 1 | 2 | 0 | 1 | 0 | 0 | 0 |
| State |  |  |  | c |  |  |  |  |  |

FIGURE 29

$f_9(x,y) = (11x - 121, \frac{1}{11}y + 60)$ on $W_9 = [(13, 113), (14, 113), (14, 114), (13, 114)]$  $p = (13\frac{1}{10}, 113\frac{21}{110})$

| Tape Coordinate | -2 | -1 | 0 | 1 | 2 | 3 | 4 | 5 | 6 |
|---|---|---|---|---|---|---|---|---|---|
| Tape Contents | 0 | 0 | 1 | 2 | 0 | 1 | 0 | 0 | 0 |
| State | | | | | $f$ | | | | |

$f_{10}(x,y) = (\frac{1}{11}x + 44, 11y - 671)$ on $W_{10} = [(23, 70), (24, 70), (24, 71), (23, 70)]$  $p = (23\frac{1}{10}, 70\frac{351}{1210})$

| Tape Coordinate | -2 | -1 | 0 | 1 | 2 | 3 | 4 | 5 | 6 |
|---|---|---|---|---|---|---|---|---|---|
| Tape Contents | 0 | 0 | 1 | 2 | 3 | 1 | 0 | 0 | 0 |
| State | | | | | | $b$ | | | |

$f_{11}(x,y) = (11x - 484, \frac{1}{11}y + 102)$ on $W_{11} = [(46, 102), (47, 102), (47, 103), (46, 103)]$  $p = (46\frac{1}{10}, 102\frac{21}{110})$

| Tape Coordinate | -2 | -1 | 0 | 1 | 2 | 3 | 4 | 5 | 6 |
|---|---|---|---|---|---|---|---|---|---|
| Tape Contents | 0 | 0 | 1 | 2 | 3 | 1 | 0 | 0 | 0 |
| State | | | | | $e$ | | | | |

$f_{12}(x,y) = (11x - 242, \frac{1}{11}y + 57)$ on $W_{12} = [(23, 111), (24, 111), (24, 112), (23, 112)]$  $p = (23\frac{1}{10}, 111\frac{351}{1210})$

| Tape Coordinate | -2 | -1 | 0 | 1 | 2 | 3 | 4 | 5 | 6 |
|---|---|---|---|---|---|---|---|---|---|
| Tape Contents | 0 | 0 | 1 | 2 | 0 | 1 | 0 | 0 | 0 |
| State | | | | | | $f$ | | | |

FIGURE 30

PERIODIC MACHINE $f_1(x,y) = (7x - 49, \frac{1}{7}y + 33)$ on $W_1 = [(8, 29), (9, 29), (9, 30), (8, 30)]$   $p = (8\frac{1}{6}, 29\frac{1}{6})$

| Tape Coordinate | 0 | 1 | 2 | 3 | 4 | 5 | 6 | 7 | 8 |
|---|---|---|---|---|---|---|---|---|---|
| Tape Contents | # | #̲ | # | # | # | # | # | # | # |
| State | | $q_0$ | | | | | | | |

$f_{15}(x,y) = (\frac{1}{7}x + 16, 7y - 231)$ on $W_{15} = [(8, 37), (9, 37), (9, 38), (8, 38)]$   $p = (8\frac{1}{6}, 37\frac{1}{6})$

| Tape Coordinate | 0 | 1 | 2 | 3 | 4 | 5 | 6 | 7 | 8 |
|---|---|---|---|---|---|---|---|---|---|
| Tape Contents | # | a | #̲ | # | # | # | # | # | # |
| State | | | $q_1$ | | | | | | |

$f_4(x,y) = (\frac{1}{7}x + 7, 7y - 175)$ on $W_4 = [(17, 29), (18, 29), (18, 30), (17, 30)]$   $p = (17\frac{1}{6}, 29\frac{1}{6})$

| Tape Coordinate | 0 | 1 | 2 | 3 | 4 | 5 | 6 | 7 | 8 |
|---|---|---|---|---|---|---|---|---|---|
| Tape Contents | # | a̲ | b | # | # | # | # | # | # |
| State | | $q_0$ | | | | | | | |

$f_2(x,y) = (7x - 49, \frac{1}{7}y + 33)$ on $W_2 = [(9, 29), (10, 29), (10, 30), (9, 30)]$   $p = (9\frac{19}{42}, 29\frac{1}{6})$

| Tape Coordinate | 0 | 1 | 2 | 3 | 4 | 5 | 6 | 7 | 8 |
|---|---|---|---|---|---|---|---|---|---|
| Tape Contents | #̲ | a | b | # | # | # | # | # | # |
| State | $q_0$ | | | | | | | | |

$f_{13}(x,y) = (7x - 98, \frac{1}{7}y + 32)$ on $W_{13} = [(17, 37), (18, 37), (18, 38), (17, 38)]$   $p = (17\frac{1}{6}, 37\frac{1}{6})$

| Tape Coordinate | 0 | 1 | 2 | 3 | 4 | 5 | 6 | 7 | 8 |
|---|---|---|---|---|---|---|---|---|---|
| Tape Contents | a | a̲ | b | # | # | # | # | # | # |
| State | | $q_1$ | | | | | | | |

$f_{11}(x,y) = (7x - 147, \frac{1}{7}y + 33)$ on $W_{11} = [(22, 37), (23, 37), (23, 38), (22, 38)]$   $p = (22\frac{1}{6}, 37\frac{13}{42})$

| Tape Coordinate | 0 | 1 | 2 | 3 | 4 | 5 | 6 | 7 | 8 |
|---|---|---|---|---|---|---|---|---|---|
| Tape Contents | a | a | b̲ | # | # | # | # | # | # |
| State | | | $q_1$ | | | | | | |

$f_{16}(x,y) = (\frac{1}{7}x + 23, 7y - 238)$ on $W_{16} = [(8, 38), (9, 38), (9, 39), (8, 39)]$   $p = (8\frac{1}{6}, 38\frac{97}{294})$

| Tape Coordinate | 0 | 1 | 2 | 3 | 4 | 5 | 6 | 7 | 8 |
|---|---|---|---|---|---|---|---|---|---|
| Tape Contents | a | a | b | #̲ | # | # | # | # | # |
| State | | | $q_1$ | | | | | | |

$f_7(x,y) = (\frac{1}{7}x + 14, 7y - 182)$ on $W_7 = [(24, 30), (25, 30), (25, 31), (24, 31)]$   $p = (24\frac{1}{6}, 30\frac{13}{42})$

| Tape Coordinate | 0 | 1 | 2 | 3 | 4 | 5 | 6 | 7 | 8 |
|---|---|---|---|---|---|---|---|---|---|
| Tape Contents | a | a | b̲ | b | # | # | # | # | # |
| State | | | $q_0$ | | | | | | |

$f_5(x,y) = (\frac{1}{7}x + 14, 7y - 182)$ on $W_5 = [(17, 30), (18, 30), (18, 31), (17, 31)]$   $p = (17\frac{19}{42}, 30\frac{1}{6})$

| Tape Coordinate | 0 | 1 | 2 | 3 | 4 | 5 | 6 | 7 | 8 |
|---|---|---|---|---|---|---|---|---|---|
| Tape Contents | a | a̲ | b | b | # | # | # | # | # |
| State | | $q_0$ | | | | | | | |

FIGURE 31

$f_3(x,y) = (\frac{1}{7}x + 7, 7y - 175)$ on $W_3 = [(16, 29), (17, 29), (17, 30), (16, 30)]$  $p = (16\frac{145}{294}, 29\frac{1}{6})$

| Tape Coordinate | 0 | 1 | 2 | 3 | 4 | 5 | 6 | 7 | 8 |
|---|---|---|---|---|---|---|---|---|---|
| Tape Contents | <u>a</u> | a | b | b | # | # | # | # | # |
| State | $q_0$ | | | | | | | | |

$f_2(x,y) = (7x - 49, \frac{1}{7}y + 33)$ on $W_2 = [(9, 29), (10, 29), (10, 30), (9, 30)]$  $p = (9\frac{733}{2058}, 29\frac{1}{6})$

| Tape Coordinate | -1 | 0 | 1 | 2 | 3 | 4 | 5 | 6 | 7 | 8 |
|---|---|---|---|---|---|---|---|---|---|---|
| Tape Contents | <u>#</u> | a | a | b | b | # | # | # | # | # |
| State | $q_0$ | | | | | | | | | |

$f_{14}(x,y) = (7x - 98, \frac{1}{7}y + 32)$ on $W_{14} = [(16, 37), (17, 37), (17, 38), (16, 38)]$  $p = (16\frac{145}{294}, 37\frac{1}{6})$

| Tape Coordinate | -1 | 0 | 1 | 2 | 3 | 4 | 5 | 6 | 7 | 8 |
|---|---|---|---|---|---|---|---|---|---|---|
| Tape Contents | a | <u>a</u> | a | b | b | # | # | # | # | # |
| State | | $q_1$ | | | | | | | | |

$f_{13}(x,y) = (7x - 98, \frac{1}{7}y + 32)$ on $W_{13} = [(17, 37), (18, 37), (18, 38), (17, 38)]$  $p = (17\frac{19}{42}, 37\frac{13}{42})$

| Tape Coordinate | -1 | 0 | 1 | 2 | 3 | 4 | 5 | 6 | 7 | 8 |
|---|---|---|---|---|---|---|---|---|---|---|
| Tape Contents | a | a | <u>a</u> | b | b | # | # | # | # | # |
| State | | | $q_1$ | | | | | | | |

$f_9(x,y) = (7x - 147, \frac{1}{7}y + 33)$ on $W_9 = [(24, 37), (25, 37), (25, 38), (24, 38)]$  $p = (24\frac{1}{6}, 37\frac{97}{294})$

| Tape Coordinate | -1 | 0 | 1 | 2 | 3 | 4 | 5 | 6 | 7 | 8 |
|---|---|---|---|---|---|---|---|---|---|---|
| Tape Contents | a | a | a | <u>b</u> | b | # | # | # | # | # |
| State | | | | $q_1$ | | | | | | |

$f_{12}(x,y) = (7x - 147, \frac{1}{7}y + 33)$ on $W_{12} = [(22, 38), (23, 38), (23, 39), (22, 39)]$  $p = (22\frac{1}{6}, 38\frac{685}{2085})$

| Tape Coordinate | -1 | 0 | 1 | 2 | 3 | 4 | 5 | 6 | 7 | 8 |
|---|---|---|---|---|---|---|---|---|---|---|
| Tape Contents | a | a | a | b | <u>b</u> | # | # | # | # | # |
| State | | | | $q_1$ | | | | | | |

$f_{16}(x,y) = (\frac{1}{7}x + 23, 7y - 238)$ on $W_{16} = [(8, 38), (9, 38), (9, 39), (8, 39)]$  $p = (8\frac{1}{6}, 38\frac{6847}{14406})$

| Tape Coordinate | -1 | 0 | 1 | 2 | 3 | 4 | 5 | 6 | 7 | 8 |
|---|---|---|---|---|---|---|---|---|---|---|
| Tape Contents | a | a | a | b | b | <u>#</u> | # | # | # | # |
| State | | | | | $q_1$ | | | | | |

$f_8(x,y) = (\frac{1}{7}x + 21, 7y - 189)$ on $W_8 = [(24, 31), (25, 31), (25, 32), (24, 32)]$  $p = (24\frac{1}{6}, 31\frac{685}{2058})$

| Tape Coordinate | -1 | 0 | 1 | 2 | 3 | 4 | 5 | 6 | 7 | 8 |
|---|---|---|---|---|---|---|---|---|---|---|
| Tape Contents | a | a | a | b | <u>b</u> | b | # | # | # | # |
| State | | | | | $q_0$ | | | | | |

$f_7(x,y) = (\frac{1}{7}x + 14, 7y - 182)$ on $W_7 = [(24, 30), (25, 30), (25, 31), (24, 31)]$  $p = (24\frac{19}{42}, 30\frac{97}{294})$

| Tape Coordinate | -1 | 0 | 1 | 2 | 3 | 4 | 5 | 6 | 7 | 8 |
|---|---|---|---|---|---|---|---|---|---|---|
| Tape Contents | a | a | a | <u>b</u> | b | b | # | # | # | # |
| State | | | | $q_0$ | | | | | | |

FIGURE 32

$f_5(x,y) = (\frac{1}{7}x+14, 7y - 182)$ on $W_5 = [(17,30), (18,30), (18,31), (17,31)]$   $p = (17\frac{145}{294}, 30\frac{13}{42})$

| Tape Coordinate | -1 | 0 | 1 | 2 | 3 | 4 | 5 | 6 | 7 | 8 |
|---|---|---|---|---|---|---|---|---|---|---|
| Tape Contents | a | a | $\underline{a}$ | b | b | b | # | # | # | # |
| State | | | $q_0$ | | | | | | | |

$f_6(x,y) = (\frac{1}{7}x+14, 7y - 182)$ on $W_6 = [(16,30), (17,30), (17,31), (16,31)]$   $p = (16\frac{1027}{2058}, 30\frac{1}{6})$

| Tape Coordinate | -1 | 0 | 1 | 2 | 3 | 4 | 5 | 6 | 7 | 8 |
|---|---|---|---|---|---|---|---|---|---|---|
| Tape Contents | a | $\underline{a}$ | a | b | b | b | # | # | # | # |
| State | | $q_0$ | | | | | | | | |

$f_3(x,y) = (\frac{1}{7}x+7, 7y - 175)$ on $W_3 = [(16,29), (17,29), (17,30), (16,30)]$   $p = (16\frac{5143}{14406}, 29\frac{1}{6})$

| Tape Coordinate | -1 | 0 | 1 | 2 | 3 | 4 | 5 | 6 | 7 | 8 |
|---|---|---|---|---|---|---|---|---|---|---|
| Tape Contents | $\underline{a}$ | a | a | b | b | b | # | # | # | # |
| State | $q_0$ | | | | | | | | | |

$f_2(x,y) = (7x-49, \frac{1}{7}y + 33)$ on $W_3 = [(9,29), (10,29), (10,30), (9,30)]$   $p \approx (9.3367, 29\frac{1}{6})$

| Tape Coordinate | -2 | -1 | 0 | 1 | 2 | 3 | 4 | 5 | 6 | 7 | 8 |
|---|---|---|---|---|---|---|---|---|---|---|---|
| Tape Contents | $\underline{\#}$ | a | a | a | b | b | b | # | # | # | # |
| State | $q_0$ | | | | | | | | | | |

$f_{14}(x,y) = (7x-98, \frac{1}{7}y + 32)$ on $W_3 = [(16,37), (17,37), (17,38), (16,38)]$   $p \approx (16.357, 37\frac{1}{6})$

| Tape Coordinate | -2 | -1 | 0 | 1 | 2 | 3 | 4 | 5 | 6 | 7 | 8 |
|---|---|---|---|---|---|---|---|---|---|---|---|
| Tape Contents | a | $\underline{a}$ | a | b | b | b | # | # | # | # | |
| State | | $q_1$ | | | | | | | | | |

$f_{14}(x,y) = (7x-98, \frac{1}{7}y + 32)$ on $W_3 = [(16,37), (17,37), (17,38), (16,38)]$   $p \approx (16.499, 37.3095)$

| Tape Coordinate | -2 | -1 | 0 | 1 | 2 | 3 | 4 | 5 | 6 | 7 | 8 |
|---|---|---|---|---|---|---|---|---|---|---|---|
| Tape Contents | a | a | $\underline{a}$ | a | b | b | b | # | # | # | # |
| State | | | $q_1$ | | | | | | | | |

$f_{13}(x,y) = (7x-98, \frac{1}{7}y + 32)$ on $W_3 = [(17,37), (18,37), (18,38), (17,38)]$   $p \approx (17.493, 37.3299)$

| Tape Coordinate | -2 | -1 | 0 | 1 | 2 | 3 | 4 | 5 | 6 | 7 | 8 |
|---|---|---|---|---|---|---|---|---|---|---|---|
| Tape Contents | a | a | a | $\underline{a}$ | b | b | b | # | # | # | # |
| State | | | | $q_1$ | | | | | | | |

SECURE ACTIVE ELEMENT MACHINE

RELATED APPLICATIONS

This application claims priority benefit of U.S. Provisional Patent Application Ser. No. 61/462,260, entitled "Navajo Active Element Machine" filed Jan. 31, 2011, which is incorporated herein by reference. This application claims priority benefit of U.S. Provisional Patent Application Ser. No. 61/465,084, entitled "Unhackable Active Element Machine" filed Mar. 14, 2011, which is incorporated herein by reference. This application claims priority benefit of U.S. Provisional Patent Application Ser. No. 61/571,822, entitled "Unhackable Active Element Machine Using Randomness" filed Jul. 6, 2011, which is incorporated herein by reference. This application claims priority benefit of U.S. Provisional Patent Application Ser. No. 61/572,607, entitled "Unhackable Active Element Machine Unpredictable Firing Interpretations" filed Jul. 18, 2011, which is incorporated herein by reference. This application claims priority benefit of U.S. Provisional Patent Application Ser. No. 61/572,996, entitled "Unhackable Active Element Machine with Random Firing Interpretations and Level Sets" filed Jul. 26, 2011, which is incorporated herein by reference. This application claims priority benefit of U.S. Provisional Patent Application Ser. No. 61/626,703, entitled "Unhackable Active Element Machine with Turing Undecidable Firing Interpretations" filed Sep. 30, 2011, which is incorporated herein by reference. This application claims priority benefit of U.S. Provisional Patent Application Ser. No. 61/628,332, entitled "Unhackable Active Element Machine with Turing Incomputable Firing Interpretations" filed Oct. 28, 2011, which is incorporated herein by reference. This application claims priority benefit of U.S. Provisional Patent Application Ser. No. 61/628,826, entitled "Unhackable Active Element Machine with Turing Incomputable Computation" filed Nov. 7, 2011, which is incorporated herein by reference.

FIELD

The specification generally relates to computing.

BRIEF DESCRIPTION OF FIGURES AND TABLES

In the following figures and tables, although they may depict various examples of the invention, the invention is not limited to the examples depicted in the figures and tables.

FIG. 1 shows a fire pattern of 0000 for active elements $X_0$, $X_1$, $X_2$, and $X_3$. Elements $X_0$, $X_1$, $X_2$, and $X_3$ don't fire during window W.

FIG. 2 shows a fire pattern of 0001 for active elements $X_0$, $X_1$, $X_2$, and $X_3$. During window W, elements $X_0$, $X_1$, $X_2$ don't fire and $X_3$ fires.

FIG. 3 shows a fire pattern of 0010 for active elements $X_0$, $X_1$, $X_2$, and $X_3$. During window W, only element $X_2$ fires.

FIG. 4 shows a fire pattern of 0011 for active elements $X_0$, $X_1$, $X_2$, and $X_3$. During window W, only elements $X_2$ and $X_3$ fire.

FIG. 5 shows a fire pattern of 0100 for active elements $X_0$, $X_1$, $X_2$, and $X_3$. During window W, only element $X_1$ fires.

FIG. 6 shows a fire pattern of 0010 for active elements $X_0$, $X_1$, $X_2$, and $X_3$ used to compute $1 \oplus 0$.

FIG. 7 shows a fire pattern of 0010 for active elements $X_0$, $X_1$, $X_2$, and $X_3$ used to compute $0 \oplus 1$.

FIG. 8 shows a fire pattern of 1011 for active elements $X_0$, $X_1$, $X_2$, and $X_3$ used to compute $1 \oplus 1$.

FIG. 9 shows a fire pattern of 0100 for active elements $X_0$, $X_1$, $X_2$, and $X_3$ used to compute $0 \oplus 0$.

FIG. 10 shows a fire pattern of 0101 for active elements $X_0$, $X_1$, $X_2$, and $X_3$ used to compute $\neg (0 \wedge 0) = 1$.

FIG. 11 shows a fire pattern of 0101 for active elements $X_0$, $X_1$, $X_2$, and $X_3$ used to compute $\neg (1 \wedge 0) = 1$.

FIG. 12 shows a fire pattern of 0101 for active elements $X_0$, $X_1$, $X_2$, and $X_3$ used to compute $\neg (0 \wedge 1) = 1$.

FIG. 13 shows a fire pattern of 1010 for active elements $X_0$, $X_1$, $X_2$, and $X_3$ used to compute $\neg (1 \wedge 1) = 0$.

FIG. 19 shows a Turing machine configuration (q, k, T) with the machine in state q, tape head at tape square k and containing alphabet symbol T(k) in tape square k.

FIG. 20 shows the window of execution for one cycle of a periodic point p=[q, $\overline{12 \langle 1 \rangle \overline{212222}}$].

FIG. 21 shows the pertinent parts of the machine configuration used to determine the unit square domain of a left affine map (2.16) or right affine map (2.19).

FIG. 26 shows case C of the definition the Edge Pattern Substitution Operator.

FIG. 27 shows case D of the definition the Edge Pattern Substitution Operator.

FIG. 28 shows 8 points of the affine map orbit corresponding to the aperiodic machine defined in 6.2.

FIG. 29 shows 4 additional points of the affine map orbit in 6.2.

FIG. 30 shows 9 points of the affine map orbit corresponding to the periodic machine defined in 6.3.

FIG. 31 shows 9 additional points of the affine map orbit corresponding to the periodic machine defined in 6.3.

FIG. 32 shows 7 additional points of the affine map orbit corresponding to the periodic machine defined in 6.3.

Figure 14:
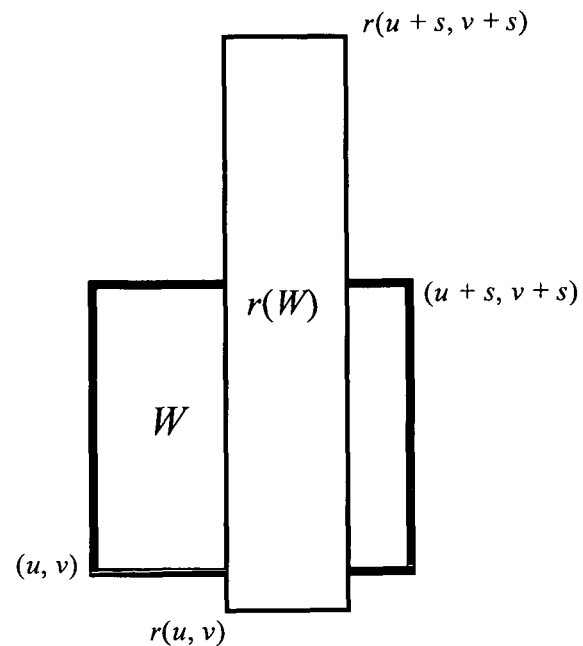
FIG. 14 shows the geometry of a vertical cover.

For each boolean function $f: \{0, 1\} \times \{0, 1\} \rightarrow \{0, 1\}$, table 1 shows the level set rules used to design an active element machine program that separate elements of $\{(0, 0), (1, 0), (0, 1), (1, 1)\}$.

Table 2 shows Minsky's universal Turing machine.

Table 3 shows the Boolean version of the universal Turing machine in table 2.

Table 4 shows the level set rules for $\eta_0$: the $0^{th}$ bit of Turing program $\eta$ in table 3.

Table 5 shows the level set rules for $\eta_1$: the $1^{st}$ bit of Turing program $\eta$ in table 3.

Table 6 shows the level set rules for $\eta_2$: the $2^{nd}$ bit of Turing program $\eta$ in table 3.

Table 7 shows the level set rules for $\eta_3$: the $3^{rd}$ bit of Turing program $\eta$ in table 3.

Table 8 shows the level set rules for $\eta_4$: the $4^{th}$ bit of Turing program $\eta$ in table 3.

Table 9 shows the level set rules for $\eta_5$: the $5^{th}$ bit of Turing program $\eta$ in table 3.

Table 10 shows all sixteen firing patterns of elements $X_0$, $X_1$, $X_2$, $X_3$ which represents four bits that are added using elements $C_0$, $C_1$, $C_2$, $C_3$ and elements $P_0$, $P_1$, $P_2$, $P_3$.

Table 11 shows the amplitudes from elements $X_0$, $X_1$, $X_2$, $X_3$ to elements $C_0$, $C_1$, $C_2$, $C_3$ and thresholds for elements $C_0$, $C_1$, $C_2$, $C_3$. Table 12 shows the amplitudes from elements $C_0$, $C_1$, $C_2$, $C_3$ to elements $P_0$, $P_1$, $P_2$, $P_3$ and thresholds for elements $P_0$, $P_1$, $P_2$, $P_3$.

Table 13 shows four bit multiplication where one four bit number is $y_3 y_2 y_1 y_0$ and the other four bit number is $z_3 z_2 z_1 z_0$ and the result is $e_7 e_6 e_5 e_4 e_3 e_2 e_1 e_0$ Table 14 shows the amplitude and threshold used to compute the value of $e_0$. Table 15 shows the firing patterns for elements $S_{10}$ and $S_{01}$ representing the value of products $y_0 z_0$ and $y_0 z_1$. Table 16 shows the amplitudes from elements $S_{10}$ and $S_{0l}$ to elements $C_{0l}$ and $C_{11}$ and the thresholds of $C_{01}$ and $C_{11}$. Table 17 shows the amplitude and threshold used to compute the value of $e_1$.

Table 18 shows the firing patterns for elements $S_{20}, S_{11}, S_{02}$ and $C_{11}$. Table 19 shows the amplitudes from elements $S_{20}$, $S_{11} S_{02}$, $C_{11}$ to elements $C_{02}, C_{12}, C_{22} C_{32}$ and thresholds of $C_{02}, C_{12}, C_{22}$ and $C_{32}$. Table 20 shows the amplitudes from elements $C_{02}, C_{12}, C_{22}, C_{32}$ to elements $P_{02}, P_{12}, P_{22}$ and the thresholds of elements $P_{02}, P_{12}, P_{22}$. Table 21 shows the amplitude and threshold used to compute the value of $e_2$.

Table 22 shows the firing patterns for elements $S_{30}$, $S_{21}$, $S_{12}, S_{03}, P_{12}$ representing the value of products $y_3 z_0, y_2 z_1, y_1 z_2$ and $y_0 z_3$ and the carry value. Table 23 shows the amplitudes from elements $S_{30}$, $S_{21}$, $S_{12}$ and $S_{03}$ to elements $C_{03}$, $C_{13}, C_{23}, C_{33}$, and $C_{43}$. Table 24 shows the amplitudes from elements $C_{03}, C_{13}, C_{23}, C_{33}$, and $C_{43}$ to elements $P_{03}, P_{13}, P_{23}$ and the thresholds of elements $P_{03}, P_{13}, P_{23}$. Table 25 shows the amplitude and threshold used to compute the value of $e_3$.

Table 26 shows the firing patterns for elements $S_{31}$, $S_{22}$, $S_{13}, P_{13}, P_{22}$. Table 27 shows the amplitudes from elements $S_{31}, S_{22}, S_{13}, P_{13}, P_{22}$ to elements $C_{04}, C_{14}, C_{24}, C_{34}, C_{44}$ and the thresholds of $C_{04}, C_{14}, C_{24}, C_{34}$ and $C_{44}$.

Table 28 shows the amplitudes from elements $C_{04}$, $C_{14}$, $C_{24}, C_{34}$, and $C_{44}$ to elements $P_{04}, P_{14}, P_{24}$ and the thresholds of elements $P_{04}, P_{14}, P_{24}$. Table 29 shows the amplitude and threshold used to compute the value of $e_4$.

Table 30 shows the firing patterns for elements $S_{32}$, $S_{23}$, $P_{14}, P_{23}$. Table 31 shows the amplitudes from elements $S_{32}$, $S_{23}, P_{14}, P_{23}$ to elements $C_{05}, C_{15}, C_{25}, C_{35}$ and the thresholds of $C_{05}, C_{15}, C_{25}, C_{35}$. Table 32 shows the amplitudes from elements $C_{05}, C_{15}, C_{25}, C_{35}$ to elements $P_{05}, P_{15}, P_{25}$ and the thresholds of elements $P_{05}, P_{15}, P_{25}$. Table 33 shows the amplitude and threshold used to compute the value of $e_5$.

Table 34 shows the firing patterns for elements $S_{33}$, $P_{15}$, $P_{24}$. Table 35 shows the amplitudes from elements $S_{33}$, $P_{15}$, $P_{24}$ to elements $C_{06}, C_{16}, C_{26}$ and the thresholds of $C_{06}, C_{16}$, $C_{26}$. Table 36 shows the amplitudes from elements $C_{06}, C_{16}$, $C_{26}$ to elements $P_{06}, P_{16}$ and the thresholds of elements $P_{06}$, $P_{16}$. Table 37 shows the amplitude and threshold used to compute the value of $e_6$.

Table 38 shows some details of the four bit multiplication 1110*0111. Table 39 shows some details of the four bit multiplication 1011*1001. Table 40 shows some details of the four bit multiplication 1111*1110. Table 41 shows some details of the four bit multiplication 1111*1111.

BRIEF SUMMARY OF THE INVENTION

What are you trying to do? Why is this compelling?

Based upon the principles of Turing incomputability and connectedness and novel properties of the Active Element Machine, a malware-resistant computing machine is constructed. This novel computing machine is a non-Turing, non-register machine (non von-Neumann), called an active element machine (AEM). AEM programs are designed so that the purpose of the AEM computations are difficult to apprehend by an adversary and hijack with malware. As a method of protecting intellectual property, these methods can also be used to help thwart reverse engineering of proprietary algorithms, hardware design and other areas of intellectual property.

Limitations and Deficiencies of Prior Art

How is it done at present? What are the limitations of present cybersecurity approaches?

Some prior art (approaches) has tried to conceal and protect a computation by enclosing it in a physical barrier, or by using a virtual barrier, e.g. firewall, or private network. The prior art has not been successful at securing computers, networks and the Internet. Operating system weaknesses and the proliferation of mobile devices and Internet connectivity have enabled malware to circumvent these boundaries.

In regard to confidentiality of data, some prior art uses cryptography based on the P≠NP complexity assumption, which relies on large enough computing bounds to prevent breaking the cryptography. In the future, these approaches may be compromised by more advanced methods such as Shor's algorithm, executing on a quantum computing machine.

In the case of homomorphic cryptography <http://crypto.stanford.edu/craig/> its computing operations are about twelve orders of magnitude too slow and the operations execute on a register machine. Homomorphic cryptography assumes that the underlying encryption E operations obey the homomorphism ring laws $E(x+y)=E(x)+E(y)$ and $E(x) \cdot E(y)=E(x \cdot y)$ <http://tinyurl.com/4csspud>. If the encrypted execution is tampered with (changed), then this destroys the computation even though the adversary may be unable to decrypt it. This is analogous to a DDoS attack in that you don't have to be able to read confidential data to breach the cybersecurity of a system. Homomorphic cryptography executing on a register machine along with the rest of the prior art is still susceptible to fundamental register machine weaknesses discussed below.

Some prior art has used the evolution of programs executing on a register machine (von=Neumann architecture) architecture. [Fred Cohen, "Operating Systems Protection Through Program Evolution", IFIP-TC11 'Computers and Security' (1993) V12#6 (October 1993) pp. 565-584].

The von Neumann architecture is a computing model for a stored-program digital computer that uses a CPU and a separate structure (memory) to store both instructions and data. Generally, a single instruction is executed at a time in sequential order and there is no notion of time in von-Neumann machine instructions: This creates attack points for malware to exploit. Some prior art has used obfuscated code that executes on a von-Neumann architecture. See <http://www.ioccc.org/main.html> on the International Obfuscated C code contest.

In the prior art, computer program instructions are computed the same way at different instances: fixed representation of the execution of a program instruction. For example, the current microprocessors have the fixed representation of the execution of a program instruction property. (See http://en.wikipedia.org/wiki/Microprocessor.) The processors made by Intel, Qualcomm, Samsung, Texas Instrument and Motorola use a fixed representation of the execution of their program instructions. (See www.intel.com http://en.wiki edia.org/wiki/Intel_processor, http://www.qualcomm.com/, www.samsung.com and http://www.ti.com/)

The ARM architecture, which is licensed by many companies, uses a fixed representation of the execution of its program instructions. (See www.arm.com and www.wikipedia.org/wiki/Arm_instruction_set.) In the prior art, not only are the program instructions computed the same way at different instances, there are also a finite number of program instructions representable by the underlying processor architecture. This affects the compilation of a computer program written into the processor's (machine's) program instructions. As a consequence, the compiled machine instructions generated from a program written in a programming language such as—C, JAVA, C++, Fortran, assembly language, Ruby, Forth, LISP, Haskell, RISC machine instructions, java virtual machine, Python or even a Turing machine program—are computed the same way at different instances. This fixed representation of the execution of a program instruction property in the prior art makes it easier for malware to exploit security weaknesses in these computer programs.

Some prior art relies on operating systems that execute on a register machine architecture. The register machine model creates a security vulnerability because its computing steps are disconnected. This topological property (disconnected) creates a fundamental mathematical weakness in the register machine so that register machine programs may be hijacked by malware. Next, this weakness is explained from the perspective of a digital computer program (computer science).

In DARPA's CRASH program <http://tinyurl.com/4khv28q>, they compared the number of lines of source code in security software written over twenty years versus malware written over the same period. The number of lines of code in security software grew from about 10,000 to 10 million lines; the number of lines of code in malware was almost constant at about 125 lines. It is our thesis that this insightful observation is a symptom of fundamental security weakness(es) in digital computer programs (prior art of register machines): It still takes about the same number of lines of malware code to hijack digital computer's program regardless of the program's size.

The sequential execution of single instructions in the register and von-Neumann machine make the digital computer susceptible to hijacking and sabotage. As an example, by inserting just one jmp WVCTF instruction into the program or changing the address of one legitimate jmp instruction to WVCTF, the purpose of the program can be hijacked.

| Malware Instructions (polymorphic variant) | | | |
|---|---|---|---|
| WVCTF: | mov | eax, | drl |
|  | jmp | Loc1 |  |
| Loc2: | mov | edi, | [eax] |
| LOWVCTF: | pop | ecx |  |
|  | jecxz | SFMM |  |
|  | inc | eax |  |
|  | mov | esi, | ecx |
|  | dec | eax |  |
|  | nop |  |  |
|  | mov | eax, | 0d601h |
|  | jmp | Loc3 |  |
| Loc1: | mov | ebx, | [eax+10h] |
|  | jmp | Loc2 |  |

-continued

| Malware Instructions (polymorphic variant) | | |
|---|---|---|
| Loc3: | pop | edx |
|  | pop | ecx |
|  | nop |  |
|  | call | edi |
|  | jmp | LOWVCTF |
| SFMM: | pop | ebx |
|  | Pop | eax |
|  | stc |  |

From a Turing machine (TM) perspective, only one output state r of one TM program, command $\eta(q, a)=(r, b, x)$ needs to be changed to state m combined with additional hijacking TM commands adjoined to the original TM program. After visiting state m, these hijacking commands are executed, which enables the purpose of the original TM program to be hijacked.

Furthermore, once the digital computer program has been hijacked, if there is a friendly routine to check if the program is behaving properly, this safeguard routine will never get executed. As a consequence, the sequential execution of single instructions cripples the register machine program from defending and repairing itself. As an example of this fundamental security weakness of a digital computer, while some malware may have difficulty decrypting the computations of a homomorphic encryption operation, the malware can still hijack a register machine program computing homomorphic encryption operations and disable the program.

Brief Summary of Novelty and Advantages Over Prior Art

What is novel about the Secure Active Element Machine?

A. A novel non-Turing computing machine—called the active element machine—is presented that has new capabilities. Turing machine, digital computer programs, register machine programs and standard neural networks have a finite prime directed edge complexity. (See definition 4.23.) A digital computer program or register machine program can be executed by a Turing machine. (See [7], [20] and [24]).

An active element machine (AEM) that has unbounded prime directed edge complexity can be designed or programmed. This is important advantage because rules describing a AEM program are not constant as a function of time. Furthermore, these rules change unpredictably because the AEM program interpretation can be based on randomness and in some embodiments uses quantum randomness. In some embodiments, quantum randomness uses quantum optics or quantum phenomena from a semiconductor. The changing the rules property of the AEM programs with randomness makes it difficult for malware to apprehend the purpose of an AEM program.

B. Meta commands and the use of time enable the AEM to change its program as it executes, which makes the machine inherently self-modifying. In the AEM, self-modification of the connection topology and other parameters can occur during a normal run of the machine when solving computing problems. Traditional multi-element machines change their architecture only during training phases, e.g. when training neural networks or when evolving structures in genetic programming. The fact that self-modification happens during runtime is an important aspect for cybersecurity of the AEM. Constantly changing systems can be designed that are difficult to reverse engineer or to disable in an attack. When the AEM has enough redundancy and random behavior when self-modifying, multiple instances of an AEM—even if built for the same type of computing problems—all look different from the inside. As a result, machine learning capabilities are built right into the machine architecture. The self-modifying behavior also enables AEM programs to be designed that can repair themselves if they are sabotaged.

C. The inherent AEM parallelism and explicit use of time can be used to conceal the computation and greatly increase computing speed compared to the register machine. There are no sequential instructions in an AEM program. Multiple AEM commands can execute at the same time. As a result, AEM programs can be designed so that additional malware AEM commands added to the AEM program would not effect the intended behavior of the AEM program. This is part of the topological connectedness.

D. An infinite number of spatio-temporal firing interpretations can be used to represent the same underlying computation. As a result, at two different instances a Boolean function can be computed differently by an active element machine. This substantially increases the AEM's resistance to reverse engineering and apprehension of the purpose of an AEM program. This enables a computer program instruction to be executed differently at different instances. In some embodiments, these different instances are at different times. In some embodiments, these different instances of computing the program instruction are executed by different collections of active elements and connections in the machine. Some embodiments use random active element machine firing interpretations to compute a Boolean function differently at two different instances.

E. Incomputability is used instead of complexity. Incomputability means that a general Turing machine algorithm can not unlock or solve an incomputable problem. This means that a digital computer program can not solve an incomputable problem. This creates a superior level of computational security.

F. Randomness in the AEM computing model. Because the AEM Interpretation approach relies on quantum randomness to dynamically generate random firing patterns, the AEM implementing this technique is no longer subject to current computability theory that assumes the Turing machine or register machine as the computing model. This means that prior art methods and their lack of solutions for malware that depend on Turing's halting problem and undecidability no longer apply to the AEM in this context. This is another aspect of the AEM's non-Turing behavior (i.e. beyond a digital computer's capabilities) that provides useful novel cybersecurity capabilities.

In some embodiments, the quantum randomness utilized with the AEM helps create a more powerful computational procedure in the following way. An active element machine (AEM) that uses quantum randomness can deterministically execute a universal Turing machine (i.e. digital computer program that can execute any possible digital computer program) such that the firing patterns of the AEM are Turing incomputable. An active element machine (AEM) that uses quantum randomness deterministically executes digital computer instructions such that the firing patterns of the active element machine are Turing incomputable. This means that this security method will work for any digital computer program and the capability works for any digital computer hardware/software implementation and for digital computer programs written in C, C++, JAVA, Fortran, Assembly Language, Ruby, Forth, Haskell, RISC machine instructions (digital computer machine instructions, JVM (Java virtual machine), Python and other digital computer languages.

Register machine instructions, Turing machine or digital computer instructions can be executed with active element machine instructions where it is Turing incomputable to understand what the active element machine computation is doing. In these embodiments, the active element machine computing behavior is non-Turing. This enhances the capability of a computational procedure: it secures the computational process (new secure computers) and helps protect a computation from malware.

Why is now a good time?

a. It was recently discovered that an Active Element machine can exhibit non-Turing dynamical behavior. The use of prime directed edge complexity was discovered. Every Turing machine (digital computer program) has a finite prime directed edge complexity. (See 4.20 and 4.23.) An active element machine that has unbounded prime directed edge complexity can be designed using physical randomness. For example, the physical or quantum randomness can be realized with quantum optics or quantum effects in a semiconductor or another quantum phenomena.

b. The Meta command was discovered which enables the AEM to change its program as execution proceeds. This enables the machine to compute the same computational operation in an infinite number of ways and makes it conducive to machine learning and self-repair. The AEM can compute with a language that randomly evolves while the AEM program is executing.

c. It was recently realized that Active Element machine programs can be designed that are connected (in terms of topology), making them resistant to tampering and hijacking.

d. When a Turing machine or register machine (digital computer) executes an unbounded (non-halting) computation, the long term behavior of the program has recurrent points. This demonstrates the machine's predictable computing behavior which creates weaknesses and attack points for malware to exploit. This recurrent behavior in Turing machine and register machine is described in the section titled IMMORTAL ORBIT and RECURRENT POINTS.

e. Randomness can be generated from physical processes using quantum phenomena i.e. quantum optics, quantum tunneling in a semiconductor or other quantum phenomena. Using quantum randomness as a part of the active element machine exhibits non-Turing computing behavior. This non-Turing computing behavior generates random AEM firing interpretations that are difficult for malware to comprehend.

What is novel about the new applications that can be built?

In some embodiments, an AEM can execute on current computer hardware and in some embodiments is augmented. These novel methods using an AEM are resistant to hackers and malware apprehending the purpose of AEM program's computations and in terms of sabotaging the AEM program's purpose; sabotaging a computation's purpose is analogous to a denial of service or distributed denial of service attack. The machine has computing performance that is orders of magnitude faster when implemented with hardware that is specifically designed for AEM computation. The AEM is useful in applications where reliability, security and performance are of high importance: protecting and reliably executing the Domain Name Servers, securing and running critical infrastructure such as the electrical grid, oil refineries, pipelines, irrigation systems, financial exchanges, financial institutions and the cybersecurity system that coordinates activities inside institutions such as the government.

Brief Summary of Prior Art Computing Models

For completeness, a brief introduction to Turing machines is presented a later section. In [32], Alan Turing introduces the Turing Machine, which is a basis for the current digital computer. Sturgis and Shepherdson present the register machine in [31] and demonstrate the register machine's computational equivalence to the Turing machine: a Turing machine can compute a function in a finite number of steps if and only if a register machine can also compute this function in a finite number of steps. The works [7], [20], [21], [22] and [24] cover computability where other notions of computation equivalent to the Turing machine are also described.

In [23], McCulloch and Pitts present one of the early alternative computing models influenced by neurophysiology. In [27], Rosenblatt presents the perceptron model, which has a fixed number of perceptrons and has no feedback (cycles) in its computation. In [25], Minsky and Papert mathematically analyze the perceptron model and attempt to understand serial versus parallel computation by studying the capabilities of linear threshold predicates. In [16], Hopfield shows how to build a content addressable memory with neural networks that use feedback and where each neuron has two states. The number of neurons and connections are fixed during the computation. In [17], Hopfield presents an analog hardware neural network to perform analog computation on the Traveling-Salesman problem, which is NP-complete [12]. Good, suboptimal solutions to this problem are computed by the analog neural network within an elapsed time of only a few neural time constants.

In [18], Hopfield uses time to represent the values of variables. In the conclusion, he observes that the technique of using time delays is similar to that of using radial basis functions in computer science.

In [15], Hertz et al. discuss the Hopfield model and various computing models that extend his work. These models describe learning algorithms and use statistical mechanics to develop the stochastic Hopfield model. They use some statistical mechanics techniques to analyze the Hopfield model's memory capacity and the capacity of the simpler perceptron model.

For early developments on quantum computing models, see [2], [3], [9], [10], [21] and [22]. In [29], Shor discovers a quantum algorithm showing that prime factorization can be executed on quantum computers in polynomical time (i.e. considerably faster than any known classical algorithm). In [13], Grover discovers a quantum search algorithm among n objects that can be completed in $cn^{0.5}$ computational steps.

In [8], Deutsch argues that there is a physical assertion in the underlying Church-Turing hypothesis: Every finitely realizable physical system can be perfectly simulated by a universal model computing machine operating by finite means. Furthermore, Deutsch presents a quantum generalization of the class of Turing machines: a universal quantum computer that covers quantum parallelism and shows an increase in computing speed. This universal quantum computer does not demonstrate the computation of non-Turing computable functions. For the most part, these prior results on computing models have studied the model's speed of computation, memory capacity, learning ability or have demonstrated that a particular computing model is equivalent to the Turing machine (digital computer)—in terms of computability (see [7] pages 10-12).

Summary of Methods a. AEM representations are randomly generated that are Turing incomputable to determine their computational purpose.

b. AEM representations are created that are also topologically connected.

c. AEM parallelism is used to solve computationally difficult tasks as shown in the section titled An AEM Program Computes a Ramsey Number.

d. Turing machine computation (digital computer computation) is topologically disconnected as shown by the affine map correspondence in 2.25.

Synthesis of Multiple Methods

In some embodiments, multiple methods are used and the solution is a synthesis of some of the following methods, A-E.

A. An AEM program—with input active elements fired according to $b_1 b_2 \ldots b_m$—accepts $[b_1 b_2 \ldots b_m]$ if active elements $E_1, E_2, \ldots, E_n$ exhibit a set or sequence of firing patterns. In some embodiments, this sequence of firing patterns has Turing incomputable interpretations using randomness.

B. AEM programs are created with an unbounded prime edge complexity. Turing and register machine programs have a finite prime directed edge complexity as shown in the section titled Prime Edge Complexity, Periodic Points & Repeating State Cycles.

C. AEM programs are created with no recurrent points when computation is unbounded with respect to time. This is useful for cybersecurity as it helps eliminate weaknesses for malware to exploit. When a Turing machine or register machine (digital computer) executes an unbounded (non-halting) computation, the long term behavior of the program has recurrent points. The recurrent behavior in a digital computer is described in the section titled Immortal Orbit and Recurrent Points.

D. Multiple AEM firing patterns are computed concurrently and then one can be selected according to an interpretation executed by a separate AEM machine. The AEM interpretation is kept hidden and changes over time. In some embodiments, evolutionary methods using randomness may help build AEMs that utilize incomputability and topological connectedness in their computations.

E. In some embodiments, AEMs programs represent the Boolean operations in a digital computer using multiple spatio-temporal representations, which is further described in the detailed description. In some embodiments, level set methods on random AEM firing interpretations may be used that do not use Boolean functions. This enables a digital computer program instruction to be executed differently at different instances. In some embodiments, these different instances are at different times. In some embodiments, these different instances of computing the program instruction are executed by different collections of active elements and connections in the active element machine.

F. In some embodiments, the parallel computing speed increase of an AEM is substantial. As described in the section titled An AEM Program Computes a Ramsey Number, an AEM program is shown that computes a Ramsey number using the parallelism of the AEM. The computation of Ramsey numbers is an NP-hard problem [12].

DETAILED DESCRIPTION

Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

Active Element Machine Description

An active element machine is composed of computational primitives called active elements. There are three kinds of active elements: Input, Computational and Output active elements. Input active elements receive information from the environment or another active element machine. This information received from the environment may be produced by a physical process.

In some embodiments, information from the environment may come from the physical process of photons originating from sunlight or other kinds of light traveling through space. In some embodiments, information from the environment may come from the physical process of sound. The sounds waves may be received by a sensor or transducer that causes one or more input elements to fire. In some embodiments, the acoustic transducer may be a part of the input elements and each input element may be more sensitive to a range of sound frequencies. In some embodiments, the sensor(s) or transducer(s) may be a part of one or more of the input elements and each input element may be more sensitive to a range of light frequencies analogous to the cones in the retina.

In some embodiments, information from the environment may come from the physical process of molecules present in the air or water. In some embodiments, sensor(s) or transducer(s) may be sensitive to particular molecules diffusing in the air or water, which is analogous to the molecular receptors in a person's nose. For example, one or more input elements may fire if a particular concentration of cinnamon molecules are detected by olfactory sensor(s).

In some embodiments, the information from the environment may originate from the physical process of pressure. In some embodiments, pressure information is transmitted to one or more of the input elements. In some embodiments, the sensor(s) that are a part of the input elements or connected to the input elements may be sensitive to pressure, which is analogous to a person's skin. In some embodiments, sensor sensitive to heat may be a part of the input elements or may be connected to the input elements. This is analogous to a person's skin detecting temperature.

Computational active elements receive messages from the input active elements and other computational active elements firing activity and transmit new messages to computational and output active elements. The output active elements receive messages from the input and computational active elements firing activity. Every active element is active in the sense that each one can receive and transmit messages simultaneously.

Each active element receives messages, formally called pulses, from other active elements and itself and transmits messages to other active elements and itself. If the messages received by active element $E_i$ at the same time sum to a value greater than the threshold and $E_i$'s refractory period has expired, then active element $E_i$ fires. When an active element $E_i$ fires, it sends messages to other active elements.

Let Z denote the integers. Define the extended integers as $\mathcal{Z} = \{m+kdT: m, k \in Z$ and $dT$ is a fixed infinitesimal$\}$. For more on infinitesimals, see [26] and [14]. The extended integers can also be expressed using the correspondence m+ndT ↔ (m, n) where (m, n) lies in Z×Z. Then use the dictionary order (m, ṅ)<(k, l) if and only if (m<k) OR (m=k AND n<l). Similarly, m+ndT<k+ldT if and only if (m<k) OR (m=k AND n<l).

Machine Architecture $\Gamma$, $\Omega$, and $\Delta$ are index sets that index the input, computational, and output active elements, respectively. Depending on the machine architecture, the intersections $\Gamma \cap \Omega$ and $\Omega \cap \Delta$ can be empty or non-empty. A machine architecture, denoted as $\mathcal{M}$ (I, $\mathcal{E}$, O), consists of a collection of input active elements, denoted as I={$E_i$: i∈Γ}; a collection of computational active elements $\mathcal{E}$ ={$E_i$: i∈Ω}; and a collection of output active elements O={$E_i$: i∈Δ}.

Each computational and output active element, $E_i$, has the following components and properties.

A threshold $\theta_i$

A refractory period $r_i$ where $r_i > 0$.

A collection of pulse amplitudes $\{A_{ki}: k \in \Gamma \cup \Omega\}$.

A collection of transmission times $\{\tau_{ki}: k \in \Gamma \cup \Omega\}$, where $\tau_{ki} > 0$ for all $k \in \Gamma \cup \Omega$.

A function of time, $\Psi_i(t)$, representing the time active element $E_i$ last fired. $\Psi_i(t) = \sup\{s: s<t$ and $g_i(s)=1\}$, where $g_i(s)$ is the output function of active element $E_i$ and is defined below. The sup is the least upper bound.

A binary output function, $g_i(t)$, representing whether active element $E_i$ fires at time t. The value of $g_i(t)=1$ if $\Sigma A_{ki}(t) > 0$; where the sum ranges over all $k \in \Gamma \cup \Omega$ and $t \geq \Psi_i(t) + r_i$. In all other cases, $g_i(t)=0$. For example, $g_i(t)=0$, if $t < \Psi_i(t) + r_i$.

A set of firing times of active element $E_k$ within active element $E_i$'s integrating window, $W_{ki}(t) = \{s:$ active element $E_k$ fired at time s and $0 \leq t-s-\tau_{ki} < \omega_{ki}\}$. Let $|W_{ki}(t)|$ denote the number of elements in the set $W_{ki}(t)$. If $W_{ki}(t) = \emptyset$, then $|W_{ki}(t)| = 0$.

A collection of input functions, $\{\phi_{ki}: k \in \Gamma \cup \Omega\}$, each a function of time, and each representing pulses coming from computational active elements, and input active elements. The value of the input function is computed as $\phi_{ki}(t) = |W_{ki}(t)| A_{ki}(t)$.

The refractory periods, transmission times and pulse widths are positive integers; and pulse amplitudes and thresholds are integers. These parameters are a function of i.e. $\theta_i(t)$, $r_i(t)$, $A_{ki}(t)$, $\omega_{ki}(t)$, $\tau_{ki}(t)$. The time t is an element of the extended integers $\mathcal{Z}$.

Input active elements that are not computational active elements have the same characteristics as computational active elements, except they have no inputs $\phi$ki coming from active elements in this machine. In other words, they don't receive pulses from active elements in this machine. Input active elements are assumed to be externally firable. An external source such as the environment or an output active element from another distinct machine $\mathcal{M}$ (I, $\mathcal{E}$, O) can cause an input active element to fire. The input active element can fire at any time as long as the current time minus the time the input active element last fired is greater than or equal to the input active element's refractory period.

An active element $E_i$ can be an input active element and a computational active element. Similarly, an active element can be an output active element and a computational active element. Alternatively, when an output active element $E_i$ is not a computational active element, where $i \in \Delta - \Omega$, then $E_i$ does not send pulses to active elements in this machine.

Some notions of the machine architecture are summarized. If $g_i(s)=1$, this means active element $E_i$ fired at time s. The refractory period $r_i$ is the amount of time that must elapse after active element $E_i$ just fired before $E_i$ can fire again. The transmission time $\tau_{ki}$ is the amount of time it takes for active element $E_i$ to find out that active element $E_k$ has fired. The pulse amplitude $A_{ki}$ represents the strength of the pulse that active element $E_k$ transmits to active element $E_i$ after active element $E_k$ has fired. After this pulse reaches $E_i$, the pulse width $\omega_{ki}$ represents how long the pulse lasts as input to active element $E_i$. At time s, the connection from $E_k$ to $E_i$ represents the triplet $(A_{ki}(s), \omega_{ki}(S), \tau_{ki}(S))$. If $A_{ki}=0$, then there is no connection from active element $E_k$ to active element E.

Refractory Period

In an embodiment, each computational element and output element has a refractory period $r_i$, where $r_i>0$, which is a period of time that must elapse after last sending a message before it may send another message. In other words, the refractory period, $r_i$, is the amount of time that must elapse after active element $E_i$ just fired and before active element $E_1$ can fire again. In an alternative embodiment, refractory period $r_i$ could be zero, and the active element could send a message simultaneously with receiving a message and/or could handle multiple messages simultaneously.

Message Amplitude and Width

In an embodiment, each computational element and output element may be associated with a collection of message amplitudes, $\{A_{ki}\}_{k\ \Gamma \cup \Lambda}$, where the first of the two indices k and i denote the active element from which the message associated with amplitude $A_{ki}$ is sent, and the second index denotes the active element receiving the message. The amplitude, $A_{ki}$, represents the strength of the message that active element $E_k$ transmits to active element $E_i$ after active element $E_k$ has fired. There are many different measures of amplitude that may be used for the amplitude of a message. For example, the amplitude of a message may be represented by the maximum value of the message or the root mean square height of the message. The same message may be sent to multiple active elements that are either computational elements or output elements, as indicated by the subscript k $\Gamma \cup \Lambda$. However, each message may have a different amplitude $A_{ki}$. Similarly, each message may be associated with its own message width, $\{\omega_{ki}\}_{k\ \Gamma \cup \Lambda}$, sent from active element $E_i$ to $E_k$, where $\omega_{ki}>0$ for all $\Gamma \cup \Lambda$. After a message reaches active $E_i$, the message width $\omega_{ki}$ represents how long the message lasts as input to active element $E_i$.

Threshold

In an embodiment, any given active element may be capable of sending and receiving a message, in response to receiving one or more messages, which when summed together, have an amplitude that is greater than a threshold associated with the active element. For example, if the messages are pulses, each computational and output active element, $E_i$, may have a threshold, $\theta_i$, such that when a sum of the incoming pulses is greater than the threshold the active element fires (e.g., sends an output message). In an embodiment, when a sum of the incoming messages is lower than the threshold the active element does not fire. In another embodiment, it is possible to set the active element such that the active element fires when the sum of incoming messages is lower than the threshold; and when the sum of incoming messages is higher than the threshold, the active element does not fire.

In still another embodiment, there are two numbers $\alpha$ and $\theta$ where $\alpha \leq \theta$ and such that if the sum of the incoming messages lie in $[\alpha, \theta]$, then the active element fires, but the active element does not fire if the sum lies outside of $[\alpha, \theta]$. In a variation of this embodiment, the active element fires if the sum of the incoming messages does not lie in $[\alpha, \theta]$ and does not fire if the sum lies in $[\alpha, \theta]$.

In another embodiment, the incoming pulses may be combined in other ways besides a sum. For example, if the product of the incoming pulses is greater than the threshold the active element may fire. Another alternative is for the active element to fire if the maximum of the incoming pulses is greater than the threshold. In still another alternative, the active element fires if the minimum of the incoming pulses is less than the threshold. In even another alternative if the convolution of the incoming pulses over some finite window of time is greater than the threshold, then the active element may fire.

Transmission Time

In an embodiment, each computational and output element may be associated with collection of transmission times, $\{\tau_{ki}\}_{k\ \Gamma \cup \Lambda}$, where $\tau_{ki}>0$ for all k $\Gamma \cup \Lambda$, which are the times that it takes a message to be sent from active element $E_k$ to active element $E_i$. The transmission time, $\tau_{ki}$, is the amount of time it takes for active element $E_i$ to find out that active element $E_k$ has fired. The transmission times, $\tau_{ki}$, may be chosen in the process of establishing the architecture.

Firing Function

In an embodiment, each active element is associated with a function of time, $\psi_i(t)$, representing the time t at which active element $E_i$ last fired. Mathematically, the function of time can be defined as $\psi_i(t)$=supremum $\{s\ R: s<t\ AND\ g_i(s)=1\}$. The function $\psi_i(t)$ always has the value of the last time that the active element fired. In general, throughout this specification the variable t is used to represent the current time, while in contrast s is used as variable of time that is not necessarily the current time.

Set of Firing Times and the Integrating Window

In an embodiment, each active element is associated with a function of time $\Xi_{ki}(t)$, which is a set of recent firing times of active element $E_k$ that are within active element $E_i$'s integrating window. In other words, the set of firing times $\Xi_{ki}(t)=\{s\ R:$ active element k fired at time s and $0 \leq t-s-\tau_{ki}<\omega_{ki}\}$. The integrating window is a duration of time during which the active element accepts messages. The integrating window may also be referred to as the window of computation. Other lengths of time could be chosen for the integrating window. In contrast to $\psi_i(t)$, $\Xi_{ki}(t)$ is not a function, but a set of values. Also, where as $\psi_i(t)$ has a value as long as active element $E_i$ fired at least once, $\Xi_{ki}(t)$ does not have any values (is an empty set) if the last time that active element $E_i$ fired is outside of the integrating window. In other words, if there are no firing times, s, that satisfy the inequality $0 \leq t-s-\tau_{ki}<\omega_{ki}$, then $\Xi_{ki}(t)$ is the empty set. Let $|\Xi_{ki}(t)|$ denote the number of elements in the set $\Xi_{ki}(t)$. If $\Xi_{ki}(t)$ is the empty set, then $|\Xi_{ki}(t)|=0$. Similarly, if $\Xi_{ki}(t)$ has only one element in it then $|\Xi_{ki}(t)|=1$.

Input Function

In an embodiment, each input element and output element may have associated with it a collection of input functions, $\{\emptyset_{ki}(t)\}_{k\ \Gamma \cup \Lambda}$. Each input function may be a function of time, and may represent messages coming from computational elements and input elements. The value of input function $\emptyset_{ki}(t)$ is given by $\emptyset_{ki}(t)=|\Xi_{ki}(t)|A_{ki}$, because each time a message from active element $E_k$ reaches active element $E_i$, the amplitude of the message is added to the last message. The number of messages inside the integrating window is the same as the value of $|\Xi_{ki}(t)|$. Since for a static machine the amplitude of the message sent from active element k to i is always the same value, $A_{ki}$, therefore, the value $\emptyset_{ki}(t)$ equals $|\Xi_{ki}(t)|A_{ki}$.

Input elements that are not computational elements have the same characteristics as computational elements, except they have no input functions, $\emptyset_{ki}(t)$, coming from active elements in this machine. In other words, input elements do not receive messages from active elements in the machine with which the input element is associated. In an embodiment, input elements are assumed to be externally firable. An externally firable element is an element that an external element or machine can cause to fire. In an embodiment, an external source such as the environment or an output element from another distinct machine, M'(J'; E'; D') can cause an input element to fire. An input element can fire at any time as long as this time minus the time the input element last fired is greater than or equal to the input element's refractory period.

Output Function

An output function, $g_i(t)$, may represent whether the active element fires at time t. The function $g_i(t)$ is given by $$g_i(t) = \begin{cases} 1 & \text{if } \sum_{k \in \Gamma \cup \Lambda} \emptyset_{ki} > \theta_i \text{ AND } t - \psi_i(t) \geq r_i \\ 0 & \text{otherwise.} \end{cases}$$

In other words, if the sum of the input functions $\emptyset_{ki}(t)$ is greater than the threshold, $\theta_i$, and time t is greater than or equal to the refractory period, $r_i$, plus the time, $\psi_i(t)$, that the active element last fired, then the active element $E_i$ fires, and $g_i(t)=1$. If $g_i(t_0)=1$, then active element $E_i$ fired at time $t_0$.

The fact that in an embodiment, output elements do not send messages to active elements in this machine is captured formally by the fact that the index k for the transmission times, message widths, message amplitudes, and input functions lies in $\Gamma \cup \Lambda$ and not in $\Delta$ in that embodiment.

Connections

The expression "connection" from k to i represents the triplet $(A_{ki}; \omega_{ki}; \tau_{ki})$. If $A_{ki}=0$, then there is no connection from active element $E_k$ to active element $E_i$. If $A_{ki} \neq 0$, then there is a non-zero connection from active element $E_k$ to active element $E_i$. In any given embodiment the active elements may have all of the above properties, only one of the above properties, or any combination of the above properties. In an embodiment, different active elements may have different combinations of the above properties. Alternatively, all of the active elements may have the same combination of the above properties.

Active Element Machine Programming Language

This section shows how to program an active element machine and how to change the machine architecture as program execution proceeds. It is helpful to define a programming language, influenced by S-expressions. There are five types of commands: Element, Connection, Fire, Program and Meta.

Syntax 1. AEM Program

In Backus-Naur form, an AEM program is defined as follows.

```
<AEM_program> ::= <cmd_sequence>
<cmd_sequence> ::= "" | <AEM_cmd><cmd_sequence> |
    <program_def><cmd_sequence>
<AEM_cmd> ::= <element_cmd> | <fire_cmd> | <meta_cmd> |
    <cnct_cmd> | <program_cmd>
<ename> ::= "" | <int> | <symbol>
<symbol> ::= <symbol_string> | (<ename> ... <ename>)
<symbol_string> ::= "" | <char_symbol><str_tail>
<str_tail> ::= "" | <char_symbol><str_tail> | 0<str_tail> |
    <pos_int><str_tail>
<char_symbol> ::= <letter> | <special_char>
<letter> ::= <lower_case> | <upper_case>
<lower_case> ::=    a | b | c | d | e | f | g | h | i | j | k | l | m |
                    n | o | p | q | r | s | t | u | v | w | x | y | z
<upper_case> ::=    A | B | C | D | E | F | G | H | I | J | K | L | M |
                    N | O | P | Q | R | S | T | U | V | W | X | Y | Z
<special_char> ::= "" | _
```

These rules represent the extended integers, addition and subtraction.

```
<int> ::= <pos_int> | <neg_int> | 0
<neg_int> ::= - <pos_int>
<pos_int> ::= <non_zero><digits>
<digits> ::= <numeral> | <numeral><digits>
```

-continued

```
<non_zero> ::= 1 | 2 | 3 | 4 | 5 | 6 | 7 | 8 | 9
<numeral> ::= "" | <non_zero> | 0
<aint> ::= <aint> <math_op> <d> | <d> <math_op> <aint> | <d>
<math_op> ::= + | −
<d> ::= <int> | <symbol_string> | <infinitesimal>
<infinitesimal> ::= dT
```

Element Command.

An Element command specifies the time when an active element's values are updated or created. This command has the following Backus-Naur syntax.

```
<element_cmd> ::= (Element   (Time <aint>) (Name <ename>)
                             (Threshold <int>)
                             (Refractory <pos_int>) (Last <int>))
```

The keyword Time indicates the time value s at which the element is created or updated. In some embodiments the time value s is an extended integer. If the name symbol value is E, the keyword Name tags the name E of the active element. The keyword Threshold tags the threshold $\theta_E(s)$ assigned to E. Refractory indicates the refractory value $r_E(s)$. The keyword Last tags the last time fired value $\Psi(s)$. Sometimes the time value, name value, threshold value, refractory value, or last time fired value are referred to as parameter values.

Below is an example of an element command.
(Element (Time 2) (Name H) (Threshold −3) (Refractory 2) (Last 0))

At time 2, if active element H does not exist, then it is created. Active element H has its threshold set to −3, its refractory period set to 2, and its last time fired set to 0. After time 2, active element H exists indefinitely with threshold=−3, refractory=2 until a new Element command whose name value H is executed at a later time; in this case, the Threshold, Refractory and Last values specified in the new command are updated.

Connection Command.

A Connection command creates or updates a connection from one active element to another active element. This command has the following Backus-Naur syntax.

```
<cnct_cmd> ::= (Connection   (Time <aint>) (From <ename>) (To
                             <ename>)
                             [(Amp <int>) (Width <pos_int>) (Delay
                             <pos_int>)])
```

The keyword Time indicates the time value s at which the connection is created or updated. In some embodiments the time value s is an extended integer. The keyword From indicates the name F of the active element that sends a pulse with these updated values. The keyword To tags the name T of the active element that receives a pulse with these updated values. The keyword Amp indicates the pulse amplitude value $A_{FT}(s)$ that is assigned to this connection. The keyword Width indicates the pulse width value $\omega_{FT}(s)$. In some embodiments the pulse width value $\omega_{FT}(s)$ is an extended integer. The keyword Delay tags the transmission time $\tau_{FT}(s)$. In some embodiments the transmission time $\tau_{FT}(s)$ is an extended integer. Sometimes the time value, from name, to name, pulse amplitude value, pulse width value, or transmission time value are referred to as parameter values.

When the AEM clock reaches time s, F and T are name values that must be the name of an element that already has been created or updated before or at time s. Not all of the connection parameters need to be specified in a connection command. If the connection does not exist beforehand and the Width and Delay values are not specified appropriately, then the amplitude is set to zero and this zero connection has no effect on the AEM computation. Observe that the connection exists indefinitely with the same parameter values until a new connection is executed at a later time between From element F and To element T.

The following is an example of a connection command.

(Connection (Time 2) (From C) (To L) (Amp −7) (Width 1) (Delay 3))

At time 2, the connection from active element C to active element L has its amplitude set to −7, its pulse width set to 1, and its transmission time set to 3.

Fire Command.

The Fire command has the following Backus-Naur syntax.

<fire_cmd>::=(Fire (Time <aint>) (Name <ename>))

The Fire command fires the active element indicated by the Name tag at the time indicated by the Time tag. Sometimes the time value and name value are referred to as parameter values of the fire command. In some embodiments, the fire command is used to fire input active elements in order to communicate program input to the active element machine. An example is (Fire (Time 3) (Name C)), which fires active element C at t=3.

Program Command.

The Program command is convenient when a sequence of commands are used repeatedly. This command combines a sequence of commands into a single command. It has the following definition syntax.

```
<program_def> ::= (Program <pname> [(Cmds <cmds>)] [(Args <args>)]
<cmd_sequence>)
<pname> ::= <ename>
<cmds> ::= <cmd_name> | <cmd_name><cmds>
<cmd_name> ::= Element | Connection | Fire | Meta | <pname>
<args> ::= <symbol> | <symbol><args>
```

The Program command has the following execution syntax.

```
<program_cmd> ::= (<pname> [(Cmds <cmds>)] [(Args
<args_cmd>)] )
<args_cmd> ::= <ename> | <ename><args_cmd>
```

The FireN program is an example of definition syntax.

```
(Program FireN (Args t E)
    (Element (Time 0) (Name E)(Refractory l)(Threshold 1) (Last 0))
    (Connection (Time 0) (From E) (To E)(Amp 2)(Width 1) (Delay 1))
    (Fire (Time 1) (Name E))
    (Connection (Time t+1) (From E) (To E) (Amp 0))
)
```

The execution of the command (FireN (Args 8 E1)) causes element E1 to fire 8 times at times 1, 2, 3, 4, 5, 6, 7, and 8 and then E1 stops firing at time=9.

Keywords Clock and dT

The keyword clock evaluates to an integer, which is the current active element machine time. clock is an instance of <ename>. If the current AEM time is 5, then the command (Element (Time clock) (Name clock) (Threshold 1) (Refractory 1) (Last −1))
is executed as
(Element (Time 5) (Name 5) (Threshold 1) (Refractory 1) (Last −1))

Once command (Element (Time clock) (Name clock) (Threshold 1) (Refractory 1) (Last −1)) is created, then at each time step this command is executed with the current time of the AEM. If this command is in the original AEM program before the clock starts at 0, then the following sequence of elements named 0, 1, 2, . . . will be created.

```
(Element (Time 0) (Name 0) (Threshold 1) (Refractory 1) (Last −1))
(Element (Time 1) (Name 1) (Threshold 1) (Refractory 1) (Last −1))
(Element (Time 2) (Name 2) (Threshold 1) (Refractory 1) (Last −1))
. . .
```

The keyword dT represents a positive infinitesimal amount of time. If m and n are integers and $0 \leq m < n$, then $mdT < ndT$. Furthermore, $dT > 0$ and dT is less than every positive rational number. Similarly, $-dT < 0$ and $-dT$ is greater than every negative rational number. The purpose of dT is to prevent an inconsistency in the description of the machine architecture. For example, the use of dT helps remove the inconsistency of a To element about to receive a pulse from a From element at the same time that the connection is removed.

Meta Command.

The Meta command causes a command to execute when an element fires within a window of time. This command has the following execution syntax.

```
<meta_cmd> ::= (Meta (Name <ename>)[<win_time>] <AEM_cmd>)
<win_time> ::= (Window <aint> <aint>)
```

To understand the behavior of the Meta command, consider the execution of (Meta (Name E) (Window l w) (C (Args t a))

where E is the name of the active element. The keyword Window tags an interval i.e. a window of time. l is an integer, which locates one of the boundary points of the window of time. Usually, w is a positive integer, so the window of time is [l, l+w]. If w is a negative integer, then the window of time is [l+w, l].

The command C executes each time that E fires during the window of time, which is either [l, l+w] or [l+w, l], depending on the sign of w. If the window of time is omitted, then command C executes at any time that element E fires. In other words, effectively $l = -\infty$ and $w = \infty$. Consider the example where the FireN command was defined before.

```
(FireN (Args 8 E1))
(Meta (Name E1) (Window 1 5) (C (Args clock a b)) )
```

Command C is executed 6 times with arguments dock, a, b. The firing of E1 triggers the execution of command C.

In regard to the Meta command, the following assumption is analogous to the Turing machine tape being unbounded as Turing program execution proceeds. During execution of a finite active element program, an active element can fire and due to one or more Meta commands, new elements and connections can be added to the machine. As a consequence, at any time the active element machine only has a finite number of computing elements and connections but the number of elements and connections can be unbounded as a function of time as the active element program executes.

Active Element Machine Computation

In a prior section, the firing patterns of active elements are used to represent the computation of a boolean function. In the next three definitions, firing representations, machine computation and interpretation are defined.

Firing Representation

Consider active element $E_i$'s firing times in the interval of time $W=[t_1, t_2]$. Let $s_1$ be the earliest firing time of $E_i$ lying in W, and $s_n$ the latest firing time lying in W. Then $E_i$'s firing sequence $\mathcal{F}(E_i, W)=[s_1, \ldots, s_n]=\{s \in W: g_i(s)=1\}$ is called a firing sequence of the active element $E_i$ over the window of time W. From active elements $\{E_1, E_2, \ldots, E_n\}$ create the tuple $(\mathcal{F}(E_1, W), \mathcal{F}(E_2, W), \ldots, \mathcal{F}(E_n, W))$ which is called a firing representation of the active elements $\{E_1, E_2, \ldots, E_n\}$ within the window of time W.

At the machine level of interpretation, firing representations (firing patterns) express the input to, the computation of, and the output of an active element machine. At a more abstract level, firing representations can represent an input symbol, an output symbol, a sequence of symbols, a spatio-temporal pattern, a number, or even a family of program instructions for another computing machine.

Sequence of Firing Representations.

Let $W_1, \ldots, W_n$ be a sequence of time intervals. Let $\mathcal{F}(\mathcal{E}, W_1)=(\mathcal{F}(E_1, W_1), \mathcal{F}(E_2, W_1), \ldots, \mathcal{F}(E_n, W_1))$ be a firing representation of active elements $\mathcal{E}=\{E_1, \ldots, E_n\}$ over the interval $W_1$. In general, let $\mathcal{F}(E, W_k)=(\mathcal{F}(E_1, W_k), \mathcal{F}(E_2, W_k), \ldots \mathcal{F}(E_n, W_k))$ be a firing representation over the interval of time $W_k$. From these, a sequence of firing representations, $[\mathcal{F}(\mathcal{E}, W_1), \mathcal{F}(\mathcal{E}, W_2), \ldots, \mathcal{F}(\mathcal{E}, W_n)]$ is created.

Machine Computation

Let $[\mathcal{F}(\mathcal{E}, W_1), \mathcal{F}(\mathcal{E}, W_2), \ldots \mathcal{F}(\mathcal{E}, W_n)]$ be a sequence of firing representations. $[\mathcal{F}(\mathcal{E}, S_1), \mathcal{F}(\mathcal{E}, S_2), \ldots, \mathcal{F}(\mathcal{E}, S_m)]$ is some other sequence of firing representations. Suppose machine architecture $\mathcal{M}$ (I, E, O) has input active elements/fire with the pattern $[\mathcal{F}(\mathcal{E}, S_1), \mathcal{F}(\mathcal{E}, S_2), \ldots, \mathcal{F}(\mathcal{E}, S_m)]$ and consequently $\mathcal{M}$'s output active elements O fire according to $[\mathcal{F}(\mathcal{E}, W_1), \mathcal{F}(\mathcal{E}, W_2), \ldots, \mathcal{F}(\mathcal{E}, W_n)]$. In this case, the machine M computes $[\mathcal{F}(\mathcal{E}, W_1), \mathcal{F}(\mathcal{E}, W_2), \ldots, \mathcal{F}(\mathcal{E}, W_n)]$ from $[\mathcal{F}(\mathcal{E}, S_1), \mathcal{F}(\mathcal{E}, S_2), \ldots, \mathcal{F}(\mathcal{E}, S_m)]$.

An active element machine is an interpretation between two sequences of firing representations if the machine computes the output sequence of firing representations from the input sequence of firing representations.

Concurrent Generation of AEM Commands

This section shows embodiments pertaining to two or more commands about to set parameter values of the same connection or same element at the same time. Consider two or more connection commands, connecting the same active elements, that are generated and scheduled to execute at the same time.

(Connection (Time t) (From A) (To B) (Amp 2) (Width 1) (Delay 1))
(Connection (Time t) (From A) (To B) (Amp −4) (Width 3) (Delay 7))

Then the simultaneous execution of these two commands can be handled by defining the outcome to be equivalent to the execution of only one connection command where the respective amplitudes, widths and transmission times are averaged.

(Connection (Time t) (From A) (To B) (Amp −1) (Width 2) (Delay 4))

In the general case, for n connection commands (Connection (Time t) (From A) (To B) (Amp a1) (Width w1) (Delay s1))
(Connection (Time t) (From A) (To B) (Amp a2) (Width w2) (Delay s2))
...
(Connection (Time t) (From A) (To B) (Amp an)(Width wn)(Delay sn))

resolve these to the execution of one connection command (Connection (Time t) (From A) (To B) (Amp a) (Width w) (Delay s)) where a, w and s are defined based on the application. These embodiments can be implemented in active element machine software, AEM hardware or a combination of AEM hardware and software.

For some embodiments of the AEM, averaging the respective amplitudes, widths and transmission times is useful.

$a=(a1+a2+\ldots +an)/n$ $w=(w1+w2+\ldots +wn)/n$ $s=(s1+s2+\ldots +sn)/n$

For embodiments that use averaging, they can be implemented in active element machine software, AEM hardware or a combination of AEM hardware and software.

For some embodiments, when there is noisy environmental data fed to the input elements and amplitudes, widths and transmission times are evolved and mutated, extremely large (in absolute value) amplitudes, widths and transmission times can arise that skew an average function. In these embodiments, computing the median of the amplitudes, widths and delays provides a simple method to address skewed amplitude, width and transmission time values.

$a=\text{median}(a1,a2,\ldots,an)$ $w=\text{median}(w1,w2,\ldots,wn)$ $s=\text{median}(s1,s2,\ldots,sn)$ Another alternative embodiment adds the parameter values.

$a=a1+a2+\ldots +an$ $w=w1+w2+\ldots +wn$ $s=s1+s2+\ldots +sn$

Similarly, consider when two or more element commands—that all specify the same active element E—are generated and scheduled to execute at the same time.

(Element (Time t) (Name E) (Threshold h1) (Refractory r1) (Last s1))
(Element (Time t) (Name E) (Threshold h2) (Refractory r2) (Last s2))
...
(Element (Time t) (Name E) (Threshold hn) (Refractory rn) (Last sn))

resolve these to the execution of one element command, (Element (Time t) (Name E) (Threshold h) (Refractory r) (Last s)) where h, r and s are defined based on the application. Similar to the connection command, for theoretical studies of the AEM, the threshold, refractory and last time fired values can be averaged.

$h=(h1+h2+\ldots +hn)/n$ $r=(r1+r2+\ldots +rn)/n$ $s=(s1+s2+\ldots +sn)/n$

In autonomous embodiments, where evolution of parameter values occurs, the median can also help address skewed values in the element commands.

$h=\text{median}(h1, h2, \ldots hn)$ $r=\text{median}(r1, r2, \ldots rn)$ $s=\text{median}(s1, s2, \ldots sn)$ Another alternative is to add the parameter values.

$h=h1+h2+\ldots+hn$ $r=r1+r2+\ldots+rn$ $s=s1+s2+\ldots+sn$

Rules A, B, and C resolve concurrencies pertaining to the Fire, Meta and Program commands. Rule A. If two or more Fire commands attempt to fire element E at time t, then element E is fired just once at time t.

Rule B. Only one Meta command can be triggered by the firing of an active element. If a new Meta command is created and it happens to be triggered by the same element E as a prior Meta command, then the old Meta command is removed and the new Meta command is triggered by element E.

Rule C. If a Program command is called by a Meta command, then the Program's internal Element, Connection, Fire and Meta commands follow the previous concurrency rules defined. If a Program command exists within a Program command, then these rules are followed recursively on the nested Program command.

An AEM Program Computes a Ramsey Number

This section shows how to compute a Ramsey number with an AEM program. Ramsey theory can be intuitively described as structure which is preserved under finite decomposition. Applications of Ramsey theory include computer science, including lower bounds for parallel sorting, game theory and information theory. Progress on determining the basic Ramsey numbers r(k, l) has been slow. For positive integers k and l, r(k, l) denotes the least integer n such that if the edges of the complete graph $K_n$ are 2-colored with colors red and blue, then there always exists a complete subgraph $K_k$ containing all red edges or there exists a subgraph $K_l$ containing all blue edges. To put our slow progress into perspective, arguably the best combinatorist of the 20th century, Paul Erdos asks us to imagine an alien force, vastly more powerful than us, landing on Earth and demanding the value of r(5, 5) or they will destroy our planet. In this case, Erdos claims that we should marshal all our computers and all our mathematicians and attempt to find the value. But suppose instead that they ask for r(6, 6). For r(6, 6), Erdos believes that we should attempt to destroy the aliens.

Theorem R. The Standard Finite Ramsey Theorem.

For any positive integers m, k, n, there is a least integer N(m, k, n) with the following property: no matter how we color each of the n-element subsets of S={1, 2, ..., N} with one of k colors, there exists a subset Y of S with at least m elements, such that all n-element subsets of Y have the same color.

When G and H are simple graphs, there is a special case of theorem R. Define the Ramsey number r(G, H) to be the smallest N such that if the complete graph $K_N$ is colored red and blue, either the red subgraph contains G or the blue subgraph contains H. (A simple graph is an unweighted, undirected graph containing no graph loops or multiple edges. In a simple graph, the edges of the graph form a set and each edge is a pair of distinct vertices.) In [10], S. A. Burr proves that determining r(G, H) is an NP-hard problem.

An AEM program is shown that solves a special case of Theorem 3. Similar embodiments can compute larger Ramsey numbers. Consider the Ramsey number where each edge of the complete graph $K_6$ is colored red or blue. Then there is always at least one triangle, which contains only blue edges or only red edges. In terms of the standard Ramsey theorem, this is the special case N(3, 2, 2) where n=2 since we color edges (i.e. 2-element subsets); k=2 since we use two colors; and m=3 since the goal is to find a red or blue triangle. To demonstrate how an AEM program can be designed to compute N(3, 2, 2)=6, an AEM program is shown that verifies N(3, 2, 2)>5.

The symbols B and R represent blue and red, respectively. Indices are placed on B and R to denote active elements that correspond to the $K_5$ graph geometry. The indices come from graph geometry. Let E={{1,2},{1,3},{1,4},{1,5}, {2,3},{2,4},{2,5}, {3,4},{3,5},{4,5}} denote the edge set of $K_5$.

The triangle set T={{1,2,3}, {1,2,4}, {1,2,5}, {1,3,4}, {1,3,5}, {1,4,5}, {2,3,4}, {2,3,5}, {2,4,5}, {3,4,5}}. Each edge is colored red or blue. Thus, the red edges are {{1,2}, {1,5}, {2,3}, {3,4}, {4,5}} and the blue edges are {{1,3},{1,4},{2,4},{2,5},{3,5}}. Number each group of AEM commands for $K_5$, based on the group's purpose. This is useful because these groups will be used when describing the computation for $K_6$.

1. The elements representing red and blue edges are established as follows.

```
(Element (Time 0) (Name R__12) (Threshold 1) (Refractory 1) (Last −1))
(Element (Time 0) (Name R__15) (Threshold 1) (Refractory 1) (Last −1))
(Element (Time 0) (Name R__23) (Threshold 1) (Refractory 1) (Last −1))
(Element (Time 0) (Name R__34) (Threshold 1) (Refractory 1) (Last −1))
(Element (Time 0) (Name R__45) (Threshold 1) (Refractory 1) (Last −1))
(Element (Time 0) (Name B__13) (Threshold 1) (Refractory 1) (Last −1))
(Element (Time 0) (Name B__14) (Threshold 1) (Refractory 1) (Last −1))
(Element (Time 0) (Name B__24) (Threshold 1) (Refractory 1) (Last −1))
(Element (Time 0) (Name B__25) (Threshold 1) (Refractory 1) (Last −1))
(Element (Time 0) (Name B__35) (Threshold 1) (Refractory 1) (Last −1))
```

2. Fire element R__24 if edge {j, k} is red.

```
(Fire (Time 0) (Name R__12))
(Fire (Time 0) (Name R__15))
(Fire (Time 0) (Name R__23))
(Fire (Time 0) (Name R__34))
(Fire (Time 0) (Name R__45))
```

Fire element B_jk if edge {j, k} is blue where j<k.

```
(Fire (Time 0) (Name B__13))
(Fire (Time 0) (Name B__14))
(Fire (Time 0) (Name B__24))
(Fire (Time 0) (Name B__25))
(Fire (Time 0) (Name B__35))
```

3. The following Meta commands cause these elements to keep firing after they have fired once.

```
(Meta (Name R__jk) (Window 0 1)
(Connection (Time 0) (From R__jk) (To R__jk) (Amp 2) (Width 1)
(Delay 1)))
(Meta (Name B__jk) (Window 0 1)
(Connection (Time 0) (From B__jk) (To B__jk) (Amp 2) (Width 1)
(Delay 1)))
```

4. To determine if a blue triangle exists on vertices $\{i, j, k\}$, where $\{i, j, k\}$ ranges over T, three connections are created for each potential blue triangle.

---

(Connection (Time 0) (From B_ij) (To B_ijk) (Amp 2) (Width 1) (Delay 1))
(Connection (Time 0) (From B_jk) (To B_ijk) (Amp 2) (Width 1) (Delay 1))
(Connection (Time 0) (From B_ik) (To B_ijk) (Amp 2) (Width 1) (Delay 1))

---

5. To determine if a red triangle exists on vertex set $\{i, j, k\}$, where $\{i, j, k\}$ ranges over T, three connections are created for each potential red triangle.

---

(Connection (Time 0) (From R_ij) (To R_ijk) (Amp 2) (Width 1) (Delay 1))
(Connection (Time 0) (From R_jk) (To R_ijk) (Amp 2) (Width 1) (Delay 1))
(Connection (Time 0) (From R_ik) (To R_ijk) (Amp 2) (Width 1) (Delay 1))

---

6. For each vertex set $\{i, j, k\}$ in T, the following elements are created.

---

(Element (Time 0) (Name R_ijk) (Threshold 5) (Refractory 1) (Last −1))
(Element (Time 0) (Name B_ijk) (Threshold 5) (Refractory 1) (Last −1))

---

Because the threshold is 5, the element R_ijk only fires when all three elements R_ij, R_jk, R_ik fired one unit of time ago. Likewise, the element B_ijk only fires when all three elements B_ij, B_jk, B_jk fired one unit of time ago. From this, we observe that as of clock=3 i.e. 4 time steps, this AEM program determines that $N(3, 2, 2) > 5$. This AEM computation uses $$|E| + 2|T| = \frac{5!}{2!3!} + 2\frac{5!}{3!2!} = 30 \text{ active elements.}$$

Further, this AEM program creates and uses $3|T|+3|T|+|E|=70$ connections.

For $K_6$, the edge set E={{1, 2}, {1, 3}, {1, 4}, {1, 5}, ≡1, 6}, {2, 3}, {2, 4}, {2, 5}, {2, 6}, {3, 4}, {3, 5}, {3, 6}, {4, 5}, {4, 6}, {5, 6}}. The triangle set T={{1, 2, 3}, {1, 2, 4}, {1, 2, 5}, {1, 2, 6}, {1, 3, 4}, {1, 3, 5}, {1, 3, 6}, {1, 4, 5}, {1, 4, 6}, {1, 5, 6}, {2, 3, 4}, {2, 3, 5}, {2, 3, 6}, {2, 4, 5}, {2, 4, 6}, {2, 5, 6}, {3, 4, 5}, {3, 4, 6}, {3, 5, 6}, {4, 5, 6}}1. For each 2-coloring of E, each edge is colored red or blue. There are $2^{|E|}$ 2-colorings of E. For this graph, $$|E| = \frac{6!}{2!4!}$$

To build a similar AEM program, the commands in groups 1 and 2 range over every possible 2-coloring of E. The remaining groups 3, 4, 5 and 6 are the same based on the AEM commands created in groups 1 and 2 for each particular 2-coloring.

This AEM program verifies that every 2-coloring of E contains at least one red triangle or one blue triangle i.e. $N(3, 2, 2)=6$. There are no optimizations using graph isomorphisms made here. If an AEM language construct is used for generating all active elements for each 2-coloring of E at time zero, then the resulting AEM program can determine the answer in 5 time steps. One more time step is needed, 215 additional connections and one additional element to verify that every one of the 215 AEM programs is indicating that it found a red or blue triangle. This AEM program—that determines the answer in 5 time steps—uses $2^{|E|}(|E|+2|T|)+1$ active elements and $2^{|E|}(3|T|+3|T|+|E|+1)$ connections, where $|E|=15$ and $|T|=20$. Some graph problems are related to the computation of Ramsey numbers.

A couple common graph problems are the traveling salesman problem and the traveling purchaser problem. (See <http://en.wikipedia.org/wiki/Traveling_salesman_problem> and <http://en.wikipedia.org/wiki/Traveling_purchaser_problem>.)

The traveling salesman problem can be expressed as a list of cities and their pairwise distances. The solution of the problem consists of finding the shortest possible tour that visits each city exactly once. Methods of solving the traveling salesman problem are useful for FedEx and other shipping companies where fuel costs and other shipping costs are substantial.

The traveling salesman problem has applications in planning, logistics, and the manufacture of microchips. Slightly modified, the traveling salesman problem appears as a sub-problem in many areas, such as DNA sequencing. In these applications, the concept city represents, for example, customers, soldering points, or DNA fragments, and the concept distance represents travelling times or cost, or a similarity measure between DNA fragments.

In embodiments similar to the computation of Ramsey numbers, the cities (customers, soldering points or DAN fragments) correspond to active elements and there is one connection between two cities for a possible tour that is being explored. In some embodiments, the thresholds of the two elements are used to account for the distance between the cities while exploring a path for a shortest possible tour. In other embodiments, the different distances between cities can be accounted for by using time.

Multiplying Numbers with an Active Element Machine

This section shows how to multiply numbers with an active element machine. Elements Y0, Y1, Y2, Y3 denote a four bit number and elements Z0, Z1 Z2, Z3 denote a four bit number. The corresponding bit values are $y_0$, $y_1$, $y_2$, $y_3$ and $z_0$, $z_1$, $z_2$, $z_3$. The multiplication of $y_3\, y_2\, y_1\, y_0 * z_3\, z_2\, z_1\, z_0$ is shown in Table 13. An active element program is constructed based on Table 13.

The following commands set up elements and connections to perform a four bit multiplication of $y_3\, y_2\, y_1\, y_0 * z_3\, z_2\, z_1\, z_0$ where the result of this multiplication $e_7\, e_6\, e_5\, e_4\, e_3\, e_2\, e_1\, e_0$ is stored in elements E7, E6, E5, E4, E3, E2, E1 and E0. The computation is encoded by the elements S_jk corresponds to the product $y_j\, z_k$ where S_jk fires if and only if $y_j=1$ and $z_k=1$. The elements C_jk help determine the value of $e_i$ represented by element Ei where j+k=

First, two useful program commands are defined.

---

(Program set_element (Args s xk theta r L)
    (Element (Time s−2dT) (Name xk) (Threshold theta) (Refractory r) (Last L))
)
(Program set_connection (Args s f xk a w tau)
    (Connection (Time s−dT) (From f) (To xk) (Amp a) (Width w) (Delay tau))
)

The firing activity of element $E_0$ expresses the value of $e_0$. The elements and connections for the product $y_0 z_0$ which determine the value of $e_0$ are determined by the following three program commands.

```
(set_element s E0 3 1 s-2)
(set_connection s Y0 E0 2 1 1)
(set_connection s Z0 E0 2 1 1)
```

Table 14 shows the amplitude and threshold used to compute the value of $e_0$. Table 15 shows the firing patterns for elements $S_{10}$ and $S_{0l}$ representing the value of products $y_1 z_0$ and $y_0 z_1$. Table 16 shows the amplitudes from elements $S_{10}$ and $S_{0l}$ to elements $C_{0l}$ and $C_{11}$ and the thresholds of $C_{01}$ and $C_{11}$. Table 17 shows the amplitudes from elements $C_{0l}$ and $C_{11}$ to element $E_1$ and the threshold of $E_1$. The firing activity of element $E_1$ expresses the value of $e_1$. Below are active element machine commands that express the parameter values of these elements and connections shown in table 14, table 15, table 16 and table 17.

```
(set_element s S_10 3 1 s-2)
(set_connection s Y1 S_10 2 1 1)
(set_connection s Z0 S_10 2 1 1)
(set_element s S_01 3 1 s-2)
(set_connection s Y0 S_01 2 1 1)
(set_connection s Z1 S_01 2 1 1)
(set_element s C_01 1 1 s-2)
(set_element s C_11 3 1 s-2)
(set_connection s S_10 C_01 2 1 1)
(set_connection s S_10 C_11 2 1 1)
(set_connection s S_01 C_01 2 1 1)
(set_connection s S_01 C_11 2 1 1)
(set_element s E1 1 1 s-2)
(set_connection s C_01 E1 2 1 1)
(set_connection s C_11 E1 -2 1 1)
```

Table 18 shows the firing patterns for elements $S_{20}$, $S_{11}$, $S_{02}$ and $C_{11}$. Table 19 shows the amplitudes from elements $S_{20}$, $S_{11}$ $S_{02}$, $C_{11}$ to elements $C_{02}$, $C_{12}$, $C_{22}$ $C_{32}$ and the thresholds of $C_{02}$, $C_{12}$, $C_{22}$ and $C_{32}$. Table 20 shows the amplitudes from elements $C_{02}$, $C_{12}$, $C_{22}$, $C_{32}$ to elements $P_{02}$, $P_{12}$, $P_{22}$ and the thresholds of elements $P_{02}$, $P_{12}$, $P_{22}$. Table 21 shows the amplitude and threshold used to compute the value of $e_2$. The firing activity of element $E_2$ expresses the value of $e_2$. Below are active element machine commands that express the parameter values of the elements and connections indicated in table 18, table 19, table 20 and table 21.

```
(set_element s S_20 3 1 s-2)
(set_connection s Y2 S_20 2 1 1)
(set_connection s Z0 S_20 2 1 1)
(set_element s S_11 3 1 s-2)
(set_connection s Y1 S_11 2 1 1)
(set_connection s Z1 S_11 2 1 1)
(set_element s S_02 3 1 s-2)
(set_connection s Y0 S_02 2 1 1)
(set_connection s Z2 S_02 2 1 1)
(set_element s C_02 1 1 s-2)
(set_element s C_12 3 1 s-2)
(set_element s C_22 5 1 s-2)
(set_element s C_32 7 1 s-2)
(set_connection s S_20 C_02 2 1 1)
(set_connection s S_20 C_12 2 1 1)
(set_connection s S_20 C_22 2 1 1)
(set_connection s S_20 C_32 2 1 1)
(set_connection s S_11 C_02 2 1 1)
(set_connection s S_11 C_12 2 1 1)
(set_connection s S_11 C_22 2 1 1)
(set_connection s S_11 C_32 2 1 1)
(set_connection s S_02 C_02 2 1 1)
(set_connection s S_02 C_12 2 1 1)
(set_connection s S_02 C_22 2 1 1)
(set_connection s S_02 C_32 2 1 1)
(set_connection s C_11 C_02 2 1 1)
(set_connection s C_11 C_12 2 1 1)
(set_connection s C_11 C_22 2 1 1)
(set_connection s C_11 C_32 2 1 1)
(set_element s P_02 1 1 s-2)
(set_element s P_12 1 1 s-2)
(set_element s P_22 7 1 s-2)
(set_connection s C_02 P_02 2 1 1)
(set_connection s C_02 P_12 0 1 1)
(set_connection s C_02 P_22 2 1 1)
(set_connection s C_12 P_02 -2 1 1)
(set_connection s C_12 P_12 2 1 1)
(set_connection s C_12 P_22 2 1 1)
(set_connection s C_22 P_02 2 1 1)
(set_connection s C_22 P_12 2 1 1)
(set_connection s C_22 P_22 2 1 1)
(set_connection s C_32 P_02 -2 1 1)
(set_connection s C_32 P_12 -4 1 1)
(set_connection s C_32 P_22 2 1 1)
(set_element s E2 1 1 s-2)
(set_connection s P_02 E2 2 1 1)
```

Table 22 shows the firing patterns for elements $S_{30}$, $S_{21}$, $S_{12}$, $S_{03}$, $P_{12}$ representing the value of products $y_3 z_0$, $y_2 z_1$, $y_1 z_2$ and $y_0 z_3$ and the carry value. Table 23 shows the amplitudes from elements $S_{30}$, $S_{21}$, $S_{12}$ and $S_{03}$ to elements $C_{03}$, $C_{13}$, $C_{23}$, $C_{33}$, and $C_{43}$. Table 24 shows the amplitudes from elements $C_{03}$, $C_{13}$, $C_{23}$, $C_{33}$, and $C_{43}$ to elements $P_{03}$, $P_{13}$, $P_{23}$ and the thresholds of elements $P_{03}$, $P_{13}$, $P_{23}$. Table 25 shows the amplitude and threshold used to compute the value of $e_3$. The firing activity of element $E_3$ expresses the value of $e_3$. Below are active element machine commands that express the parameter values shown in table 22, table 23, table 24 and table 25.

```
(set_element s S_30 3 1 s-2)
(set_connection s Y3 S_30 2 1 1)
(set_connection s Z0 S_30 2 1 1)
(set_element s S_21 3 1 s-2)
(set_connection s Y2 S_21 2 1 1)
(set_connection s Z1 S_21 2 1 1)
(set_element s S_12 3 1 s-2)
(set_connection s Y1 S_12 2 1 1)
(set_connection s Z2 S_12 2 1 1)
(set_element s S_03 3 1 s-2)
(set_connection s Y0 S_03 2 1 1)
(set_connection s Z3 S_03 2 1 1)
(set_element s C_03 1 1 s-2)
(set_element s C_13 3 1 s-2)
(set_element s C_23 5 1 s-2)
(set_element s C_33 7 1 s-2)
(set_element s C_43 9 1 s-2)
(set_connection s S_30 C_03 2 1 1)
(set_connection s S_30 C_13 2 1 1)
(set_connection s S_30 C_23 2 1 1)
(set_connection s S_30 C_33 2 1 1)
(set_connection s S_30 C_43 2 1 1)
(set_connection s S_21 C_03 2 1 1)
(set_connection s S_21 C_13 2 1 1)
(set_connection s S_21 C_23 2 1 1)
(set_connection s S_21 C_33 2 1 1)
(set_connection s S_21 C_43 2 1 1)
(set_connection s S_12 C_03 2 1 1)
(set_connection s S_12 C_13 2 1 1)
(set_connection s S_12 C_23 2 1 1)
(set_connection s S_12 C_33 2 1 1)
(set_connection s S_12 C_43 2 1 1)
(set_connection s S_03 C_03 2 1 1)
(set_connection s S_03 C_13 2 1 1)
(set_connection s S_03 C_23 2 1 1)
```

-continued

```
(set_connection s S__03 C__33 2 1 1)
(set_connection s S__03 C__43 2 1 1)
(set_connection s P__12 C__03 2 1 1)
(set_connection s P__12 C__13 2 1 1)
(set_connection s P__12 C__23 2 1 1)
(set_connection s P__12 C__33 2 1 1)
(set_connection s P__12 C__43 2 1 1)
(set_element s P__03 1 1 s-2)
(set_element s P__13 1 1 s-2)
(set_element s P__23 7 1 s-2)
(set_connection s C__03 P__03 2 1 1)
(set_connection s C__03 P__13 0 1 1)
(set_connection s C__03 P__23 2 1 1)
(set_connection s C__13 P__03 -2 1 1)
(set_connection s C__13 P__13 2 1 1)
(set_connection s C__13 P__23 2 1 1)
(set_connection s C__23 P__03 2 1 1)
(set_connection s C__23 P__13 2 1 1)
(set_connection s C__23 P__23 2 1 1)
(set_connection s C__33 P__03 -2 1 1)
(set_connection s C__33 P__13 -4 1 1)
(set_connection s C__33 P__23 2 1 1)
(set_connection s C__43 P__03 2 1 1)
(set_connection s C__43 P__13 0 1 1)
(set_connection s C__43 P__23 2 1 1)
(set_element s E3 1 1 s-2)
(set_connection s P__03 E3 2 1 1)
```

Table 26 shows the firing patterns for elements $S_{31}$, $S_{22}$, $S_{13}$, $P_{13}$, $P_{22}$. Table 27 shows the amplitudes from elements $S_{31}$, $S_{22}$, $S_{13}$, $P_{13}$, $P_{22}$ to elements $C_{04}$, $C_{14}$, $C_{24}$, $C_{34}$, $C_{44}$ and the thresholds of $C_{04}$, $C_{14}$, $C_{24}$, $C_{34}$ and $C_{44}$. Table 28 shows the amplitudes from elements $C_{04}$, $C_{14}$, $C_{24}$, $C_{34}$, and $C_{44}$ to elements $P_{04}$, $P_{14}$, $P_{24}$ and the thresholds of elements $P_{04}$, $P_{14}$, $P_{24}$. Table 29 shows the amplitude and threshold used to compute the value of $e_4$. The firing activity of element $E_4$ expresses the value of $e_4$. Below are active element machine commands that express the parameter values shown in table 26, table 27, table 28 and table 29.

```
(set_element s S__31 3 1 s-2)
(set_connection s Y3 S__31 2 1 1)
(set_connection s Z1 S__31 2 1 1)
(set_element s S__22 3 1 s-2)
(set_connection s Y2 S__22 2 1 1)
(set_connection s Z2 S__22 2 1 1)
(set_element s S__13 3 1 s-2)
(set_connection s Y1 S__13 2 1 1)
(set_connection s Z2 S__13 2 1 1)
(set_element s C__04 1 1 s-2)
(set_element s C__14 3 1 s-2 )
(set_element s C__24 5 1 s-2 )
(set_element s C__34 7 1 s-2 )
(set_element s C__44 9 1 s-2 )
(set_connection s S__31 C__04 2 1 1)
(set_connection s S__31 C__14 2 1 1)
(set_connection s S__31 C__24 2 1 1)
(set_connection s S__31 C__34 2 1 1)
(set_connection s S__31 C__44 2 1 1)
(set_connection s S__22 C__04 2 1 1)
(set_connection s S__22 C__14 2 1 1)
(set_connection s S__22 C__24 2 1 1)
(set_connection s S__22 C__34 2 1 1)
(set_connection s S__22 C__44 2 1 1)
(set_connection s S__13 C__04 2 1 1)
(set_connection s S__13 C__14 2 1 1)
(set_connection s S__13 C__24 2 1 1)
(set_connection s S__13 C__34 2 1 1)
(set_connection s S__13 C__44 2 1 1)
(set_connection s P__22 C__04 2 1 1)
(set_connection s P__22 C__14 2 1 1)
(set_connection s P__22 C__24 2 1 1)
(set_connection s P__22 C__34 2 1 1)
(set_connection s P__22 C__44 2 1 1)
```

```
(set_connection s P__13 C__04 2 1 1)
(set_connection s P__13 C__14 2 1 1)
(set_connection s P__13 C__24 2 1 1)
(set_connection s P__13 C__34 2 1 1)
(set_connection s P__13 C__44 2 1 1)
(set_element s P__04 1 1 s-2)
(set_element s P__14 1 1 s-2)
(set_element s P__24 7 1 s-2)
(set_connection s C__04 P__04 2 1 1)
(set_connection s C__04 P__14 0 1 1)
(set_connection s C__04 P__24 2 1 1)
(set_connection s C__14 P__04 -2 1 1)
(set_connection s C__14 P__14 2 1 1)
(set_connection s C__14 P__24 2 1 1)
(set_connection s C__24 P__04 2 1 1)
(set_connection s C__24 P__14 2 1 1)
(set_connection s C__24 P__24 2 1 1)
(set_connection s C__34 P__04 -2 1 1)
(set_connection s C__34 P__14 -4 1 1)
(set_connection s C__34 P__24 2 1 1)
(set_connection s C__44 P__04 2 1 1)
(set_connection s C__44 P__14 0 1 1)
(set_connection s C__44 P__24 2 1 1)
(set_element s E4 1 1 s-2)
(set_connection s P__04 E4 2 1 1)
```

Table 30 shows the firing patterns for elements $S_{32}$, $S_{23}$, $P_{14}$, $P_{23}$. Table 31 shows the amplitudes from elements $S_{32}$, $S_{23}$, $P_{14}$, $P_{23}$ to elements $C_{05}$, $C_{15}$, $C_{25}$, $C_{35}$ and the thresholds of $C_{05}$, $C_{15}$, $C_{25}$, $C_{35}$. Table 32 shows the amplitudes from elements $C_{05}$, $C_{15}$, $C_{25}$, $C_{35}$ to elements $P_{05}$, $P_{15}$, $P_{25}$ and the thresholds of elements $P_{05}$, $P_{15}$, $P_{25}$. Table 33 shows the amplitude and threshold used to compute the value of $e_5$. The firing activity of element $E_5$ expresses the value of $e_5$. Below are active element machine commands that express the parameter values shown in table 30, table 31, table 32 and table 33.

```
(set_element s S__32 3 1 s-2)
(set_connection s Y3 S__32 2 1 1)
(set_connection s Z2 S__32 2 1 1)
(set_element s S__23 3 1 s-2)
(set_connection s Y2 S__23 2 1 1)
(set_connection s Z3 S__23 2 1 1)
(set_element s C__05 1 1 s-2)
(set_element s C__15 3 1 s-2)
(set_element s C__25 5 1 s-2)
(set_element s C__35 7 1 s-2)
(set_connection s S__32 C__05 2 1 1)
(set_connection s S__32 C__15 2 1 1)
(set_connection s S__32 C__25 2 1 1)
(set_connection s S__32 C__35 2 1 1)
(set_connection s S__23 C__05 2 1 1)
(set_connection s S__23 C__15 2 1 1)
(set_connection s S__23 C__25 2 1 1)
(set_connection s S__23 C__35 2 1 1)
(set_connection s P__14 C__05 2 1 1)
(set_connection s P__14 C__15 2 1 1)
(set_connection s P__14 C__25 2 1 1)
(set_connection s P__14 C__35 2 1 1)
(set_connection s P__23 C__05 2 1 1)
(set_connection s P__23 C__15 2 1 1)
(set_connection s P__23 C__25 2 1 1)
(set_connection s P__23 C__35 2 1 1)
(set_element s P__05 1 1 s-2)
(set_element s P__15 1 1 s-2)
(set_element s P__25 7 1 s-2)
(set_connection s C__05 P__05 2 1 1)
(set_connection s C__05 P__15 0 1 1)
(set_connection s C__05 P__25 2 1 1)
(set_connection s C__15 P__05 -2 1 1)
(set_connection s C__15 P__15 2 1 1)
(set_connection s C__15 P__25 2 1 1)
(set_connection s C__25 P__05 2 1 1)
```

```
(set_connection s C__25 P__15 2 1 1)
(set_connection s C__25 P__25 2 1 1)
(set_connection s C__35 P__05 -2 1 1)
(set_connection s C__35 P__15 -4 1 1)
(set_connection s C__35 P__25 2 1 1)
(set_element s E5 1 1 s-2)
(set_connection s P__05 E5 2 1 1)
```

Table 34 shows the firing patterns for elements $S_{33}$, $P_{159}$ $P_{24}$. Table 35 shows the amplitudes from elements $S_{33}$, $P_{15}$, $P_{24}$ to elements $C_{06}$, $C_{16}$, $C_{26}$ and the thresholds of $C_{06}$, $C_{16}$, $C_{26}$. Table 36 shows the amplitudes from elements $C_{06}$, $C_{16}$, $C_{26}$ to elements $P_{06}$, $P_{16}$ and the thresholds of elements $P_{06}$, $P_{16}$. Table 37 shows the amplitude of the connection from element $P_{06}$ to element $E_6$ and the threshold of $E_6$. The firing activity of $E_6$ expresses the value of $e_6$. Below are active element machine commands that express the parameter values shown in table 34, table 35, table 36 and table 37.

```
(set_element s S__33 3 1 s-2)
(set_connection s Y3 S__33 2 1 1)
(set_connection s Z3 S__33 2 1 1)
(set_element s C__06 1 1 s-2)
(set_element s C__16 3 1 s-2)
(set_element s C__26 5 1 s-2)
(set_connection s S__33 C__06 2 1 1)
(set_connection s S__33 C__16 2 1 1)
(set_connection s S__33 C__26 2 1 1)
(set_connection s P__15 C__06 2 1 1)
(set_connection s P__15 C__16 2 1 1)
(set_connection s P__15 C__26 2 1 1)
(set_connection s P__24 C__06 2 1 1)
(set_connection s P__24 C__16 2 1 1)
(set_connection s P__24 C__26 2 1 1)
(set_element s P__06 1 1 s-2 )
(set_element s P__16 1 1 s-2 )
(set_connection s C__06 P__06 2 1 1)
(set_connection s C__06 P__16 0 1 1)
(set_connection s C__16 P__06 -2 1 1)
(set_connection s C__16 P__16 2 1 1)
(set_connection s C__26 P__06 2 1 1)
(set_connection s C__26 P__16 2 1 1)
(set_element s E6 1 1 s-2)
(set_connection s P__06 E6 2 1 1)
```

The firing activity of element $E_7$ represents bit $e_7$. When element $P_{16}$ is firing, this means that there is a carry so $E_7$ should fire. The following commands accomplish this.

```
(set_element s E7 1 1 s-2)
(set_connection s P__16 E7 2 1 1)
```

Table 38 shows how the active element machine commands were designed to compute 1110*0111. Suppose that the AEM commands from the previous sections are called with s=2. Then $y_0$=0. $y_1$=1. $y_2$=1. $y_3$=1. $z_0$=1. $z_1$=1. $z_2$=1. $z_3$=0. Thus, fire input elements $Y_1$, $Y_2$ and $Y_3$ at time 2. Similarly, fire input elements $Z_0$, $Z_1$ and $Z_2$ at time 2.

```
(set_element 2 Y1 1 1 0)
(set_connection 2 Y1 Y1 2 1+dT 1)
(fire (Time 2) (Name Y1))
(set_element 2 Y2 1 1 0)
(set_connection 2 Y2 Y2 2 1+dT 1)
(fire (Time 2) (Name Y2))
(set_element 2 Y3 1 1 0)
(set_connection 2 Y3 Y3 2 1+dT 1)
(fire (Time 2) (Name Y3))
(set_element 2 Z0 1 1 0)
(set_connection 2 Z0 Z0 2 1+dT 1)
(fire (Time 2) (Name Z0))
(set_element 2 Z1 1 1 0)
(set_connection 2 Z1 Z1 2 1+dT 1)
(fire (Time 2) (Name Z1))
(set_element 2 Z2 1 1 0)
(set_connection 2 Z2 Z2 2 1+dT 1)
(fire (Time 2) (Name Z2))
```

Element $E_0$ never fires because $E_0$ only receives a pulse of amplitude 2 from $Z_0$ and has threshold 3. The fact that $E_0$ never fires represents that $e_0$=0.

In regard to the value of $e_1$, element $S_{10}$ fires at time 3 because $Y_1$ and $Z_0$ fire at time 2 and $S_{10}$ has a threshold of 3 and receives a pulse of amplitude 2 from $Y_1$, and $Z_0$. The following commands set these values.

```
(set_element s S__10 3 1 s-2)
(set_connection s Y1 S__10 2 1 1)
(set_connection s Z0 S__10 2 1 1)
```

Element $S_{01}$ does not fire at time 3 because it only receives a pulse of amplitude 2 from element $Z_1$ and has threshold 3. The firing of $S_{10}$ at time 3 causes $C_{01}$ to fire at time 4 because $C_{01}$'s threshold is 1. The following commands set up these element and connection values.

```
(set_element s C__01 1 1 s-2)
(set_connection s S__10 C__01 2 1 1)
```

The commands

```
(set_element s E1 1 1 s-2)
(set_connection s C__01 E1 2 1 1)
``` cause $E_1$ to fire at time 5 and $E_1$ continues to fire indefinitely because the input elements $Y_1, Y_2, Y_3, Z_0, Z_1$ and $Z_2$ continue to fire at time steps 3, 4, 5, 6, 7, 8, . . . . The firing of element $E_1$ indicates that $e_1$=1.

In regard to the value of $e_2$, since elements $Y_1$ and $Z_1$ fire at time 2, element $S_{11}$ fires at time 3. Since elements $Y_2$ and $Z_0$ fire at time 2, element $S_{20}$ also fires at time 3. From the following commands

```
(set_element 2 C__02 1 1 0)
(set_element 2 C__12 3 1 0)
(set_connection 2 S__20 C__02 2 1 1)
(set_connection 2 S__20 C__12 2 1 1)
(set_connection 2 S__11 C__02 2 1 1)
(set_connection 2 S__11 C__12 2 1 1)
``` then elements $C_{02}$ and $C_{12}$ fire at time 4.

Element $P_{12}$ fires at time 5 because of the commands

```
(set_element 2 P__12 1 1 0)
(set_connection 2 C__12 P__12 2 1 1)
(set_connection 2 C__02 P__12 0 1 1)
```

Observe that element $P_{02}$ does not fire because $C_{12}$ sends a pulse with amplitude −2 and $C_{02}$ sends a pulse with amplitude 2 and element $P_{02}$ has threshold 1 as a consequence of command (set_element 2 P__02 1 1 0).

Since $P_{02}$ does not fire, element $E_2$ does not fire as it threshold is 1 and the only connection to element $E_2$ is from $P_{02}$: (set_connection 2 P__02 E2 2 1 1). Since element $E_2$ does not fire, this indicates that $e_2=0$.

In regard to the value of $e_3$, since elements $Y_3$ and $Z_0$ fire at time 2, element $S_{30}$ fires at time 3. Since elements $Y_2$ and $Z_1$ fire at time 2, element $S_{21}$ fires at time 3. Since elements $Y_1$ and $Z_2$ fire at time 2, element $S_{12}$ fires at time 3. $S_{03}$ does not fire. From the following commands

```
(set_element 2 C__03 1 1 0)
(set_element 2 C__13 3 1 0)
(set_element 2 C__23 5 1 0)
(set_element 2 C__33 7 1 0)
(set_connection 2 S__30 C__03 2 1 1)
(set_connection 2 S__30 C__13 2 1 1)
(set_connection 2 S__30 C__23 2 1 1)
(set_connection 2 S__30 C__33 2 1 1)
(set_connection 2 S__21 C__03 2 1 1)
(set_connection 2 S__21 C__13 2 1 1)
(set_connection 2 S__21 C__23 2 1 1)
(set_connection 2 S__21 C__33 2 1 1)
(set_connection 2 S__12 C__03 2 1 1)
(set_connection 2 S__12 C__13 2 1 1)
(set_connection 2 S__12 C__23 2 1 1)
(set_connection 2 S__12 C__33 2 1 1)
(set_connection 2 P__12 C__03 2 1 1)
(set_connection 2 P__12 C__13 2 1 1)
(set_connection 2 P__12 C__23 2 1 1)
(set_connection 2 P__12 C__33 2 1 1)
``` then elements $C_{03}, C_{13}, C_{23}$ fire at time 4 and they will continue to fire every time step 5, 6, 7, 8 . . . because the elements $Y_1, Y_2, Y_3, Z_0, Z_1$ and $Z_2$ continue to fire at time steps 3, 4, 5, 6, 7, 8, . . . .

As a result of $P_{12}$ firing at time 5, $C_{33}$ fires at time 6, so at time 7, only $P_{23}$ fires. As a result, the long term behavior (after time step 7) of $P_{03}$ does not fire. Thus, $E_3$ does not fire after time step 7, which indicates that $e_3=0$.

Similar to that of element $E_3$, in the long term element $E_4$ does not fire, which indicates that $e_4=0$. Similarly, in the long term element $E_5$ fires, which indicates that $e_5=1$. Similarly, in the long term element $E_6$ fires, which indicates that $e_6=1$. Similarly, in the long term element $E_7$ does not fire, which indicates that $e_7=0$.

As a consequence, multiplication of 1110*0111 equals 1100010 in binary, which represents that 14*7=98 in base 10. This active element program can execute any multiplication of two four bit binary numbers. Similar to the multiplication just described, tables 39, 40 and 41 show the multiplication steps for 11*9=99; 15*14=210; and 15*15=225.

AEM Firing Patterns Execute a Digital Computer Program

In some embodiments, an AEM using randomness deterministically executes a universal Turing machine or a von Neumann machine (digital computer program). In some embodiments, the randomness is generated using quantum phenomena. In some embodiments, the randomness is generated from a physical process. In some embodiments, the firing patterns of the active elements computing the execution of these machines are Turing incomputable. In some embodiments, the AEM accomplishes this by executing a universal Turing machine or von Neumann machine instructions with random firing interpretations. In some embodiments, if the state and tape contents of the universal Turing machine—represented by the AEM elements and connections—and the random bits generated from the random—in some embodiments, quantum—source are kept perfectly secret and no information is leaked about the dynamic connections in the AEM, then it is Turing incomputable to construct a translator Turing machine that maps the random firing interpretations back to the sequence of instructions executed by the universal Turing machine or von Neumann machine. As a consequence, in some embodiments, the AEM can deterministically execute any Turing machine (digital computer program) with active element firing patterns that are Turing incomputable. Since Turing incomputable AEM firing behavior can deterministically execute a universal Turing machine or digital computer with a finite active element machine using quantum randomness, this creates a novel computational procedure ([6], [32]). In [20], Lewis and Papadimitriou discuss the prior art notion of a digital computer's computational procedure:

Because the Turing machines can carry out any computation that can be carried out by any similar type of automata, and because these automata seem to capture the essential features of real computing machines, we take the Turing machine to be a precise formal equivalent of the intuitive notion of algorithm: nothing will be considered as an algorithm if it cannot be rendered as a Turing machine.

The principle that Turing machines are formal versions of algorithms and that no computational procedure will be considered as an algorithm unless it can be presented as a Turing machine is known as Church's thesis or the Church-Turing Thesis. It is a thesis, not a theorem, because it is not a mathematical result: It simply asserts that a certain informal concept corresponds to a certain mathematical object. It is theoretically possible, however, that Church's thesis could be overthrown at some future date, if someone were to propose an alternative model of computation that was publicly acceptable as fulfilling the requirement of finite labor at each step and yet was provably capable of carrying out computations that cannot be carried out by any Turing machine. No one considers this likely.

In a cryptographic system, Shannon [28] defines the notion of perfect secrecy.

Perfect Secrecy is defined by requiring of a system that after a cryptogram is intercepted by the enemy the a posteriori probabilities of this cryptogram representing various messages be identically the same as the a priori probabilities of the same messages before the interception.

In this context, perfect secrecy means that no information is ever released or leaked about the state and the contents of the universal Turing machine tape, the random bits generated from a quantum source and the dynamic connections of the active element machine.

In [19], Kocher et al. present differential power analysis. Differential power analysis obtains information about cryptographic computations executed by register machine hardware, by statistically analyzing the electromagnetic radiation leaked by the hardware during its computation. In some embodiments, when a quantum active element computing system is built so that its internal components remain perfectly secret or close to perfectly secret, then it may be extremely challenging for an adversary to carry out types of attacks such as differential power analysis.

Active Element Machine Interpretations of Boolean Functions

In this section, the same boolean function is computed by two or more distinct active element firing patterns, which can be executed at distinct times or by different circuits (two or more different parts) in the active element machine. These methods provide useful embodiments in a number of ways. They show how digital computer program computations can be computed differently at distinct instances. In some embodiments, distinct instances are two or more different times. In some embodiments, distinct instances use different elements and connections of the active element machine to differently compute the same Boolean function. The methods shown here demonstrate the use of level sets so that multiple active element machine firing patterns may compute the same boolean function or computer program instruction. Third, these methods demonstrate the utility of using multiple, dynamic firing interpretations to perform the same task—for example, execute a computer program—or represent the same knowledge.

The embodiments shown here enable one or more digital computer program instructions to be computed differently at different instances. In some embodiments, these different instances are different times. In some embodiments, these different instances of computing the program instruction are executed by different collections of active elements and connections in the active element machine. In some embodiments, the computer program may be an active element machine program.

The following procedure uses a random physical process to either fire input element I or not fire I at time t=n where n is a natural number $\{0, 1, 2, 3, \ldots\}$. This random sequence of 0 and 1's can be generated by quantum optics, or quantum effects in a semiconductor material or other physical phenomena. The procedure is used to help execute the same computation with multiple interpretations. In some embodiments, this same computation is a program instruction executed at two different instances.

Procedure 1.

Randomness generates an AEM, representing a real number in [0, 1]. Using a random process to fire or not fire one input element I at each unit of time, a finite active element program can represent a randomly generated real number in the unit interval [0, 1]. In some embodiments, the random process is physically contained in the active element machine. In other embodiments, the random process is outside of the active element machine.

The Meta command and a random sequence of bits creates active elements 0, 1, 2, . . . that store the binary representation $b_0 b_1 b_2 \ldots$ of real number $x \in [0, 1]$. If input element I fires at time t=n, then $b_n=1$; thus, create active element n so that after t=n, element n fires every unit of time indefinitely. If input element I doesn't fire at time t=n, then $b_n=0$ and active element n is created so that it never fires. The following finite active element machine program exhibits this behavior.

(Program C (Args t))
(Connection (Time t) (From I) (To t) (Amp 2) (Width 1) (Delay 1))
(Connection (Time t+1+dT) (From I) (To t) (Amp 0))
(Connection (Time t) (From t) (To t) (Amp 2) (Width 1) (Delay 1)) )
(Element (Time clock) (Name clock)
(Threshold 1) (Refractory 1) (Last −1))
(Meta (Name I) (C (Args clock)))

Suppose a sequence of random bits—obtained from the environment or from a physical process inside the active element machine—begins with 1, 0, 1, . . . . Thus, input element I fires at times 0, 2, . . . . At time 0, the following commands are executed.

(Element (Time 0) (Name 0) (Threshold 1) (Refractory 1) (Last −1))
(C (Args 0))

The execution of (C (Args 0)) causes three connection commands to execute.

(Connection (Time 0) (From I) (To 0) (Amp 2) (Width 1) (Delay 1))
(Connection (Time 1+dT) (From I) (To 0) (Amp 0))
(Connection (Time 0) (From 0) (To 0) (Amp 2) (Width 1) (Delay 1))

Because of the first connection command
(Connection (Time 0) (From I) (To 0) (Amp 2) (Width 1) (Delay 1))
the firing of input element I at time 0 sends a pulse with amplitude 2 to element 0. Thus, element 0 fires at time 1. Then at time 1+dT, a moment after time 1, the connection from input element I to element 0 is removed. At time 0, a connection from element 0 to itself with amplitude 2 is created. As a result, element 0 continues to fire indefinitely, representing that $b_0=1$.
At time 1, command
(Element (Time 1) (Name 1) (Threshold 1) (Refractory 1) (Last −1)) is created. Since element 1 has no connections into it and threshold 1, element 1 never fires. Thus $b_1=0$. At time 2, input element I fires, so the following commands are executed.

(Element (Time 2) (Name 2) (Threshold 1) (Refractory 1) (Last −1))
(C (Args 2))

The execution of (C (Args 2)) causes the three connection commands to execute.

(Connection (Time 2) (From I) (To 2) (Amp 2) (Width 1) (Delay 1))
(Connection (Time 3+dT) (From I) (To 2) (Amp 0))
(Connection (Time 2) (From 2) (To 2) (Amp 2) (Width 1) (Delay 1))

Because of the first connection command
(Connection (Time 2) (From I) (To 2) (Amp 2) (Width 1) (Delay 1))
the firing of input element I at time 2 sends a pulse with amplitude 2 to element 2. Thus, element 2 fires at time 3. Then at time 3+dT, a moment after time 3, the connection from input element I to element 2 is removed. At time 2, a connection from element 2 to itself with amplitude 2 is created. As a result, element 2 continues to fire indefinitely, representing that $b_2=1$.

Active Element Machine Firing Patterns

During a window of time, firing patterns can be put in 1-to-1 correspondence with the boolean functions $f:\{0, 1\}^n \rightarrow \{0, 1\}$. In the next section, the firing pattern methods explained here are combined with procedure 1 so that a randomly chosen firing pattern can compute the functions used to execute a universal Turing machine. Consider four active elements $X_0, X_1, X_2$ and $X_3$ during window of time W=[a, b]. The refractory periods of $X_0, X_1, X_2$ and $X_3$ are chosen so that each $X_k$ either fires or doesn't fire during window W. Thus, there are sixteen distinct firing patterns. Five of these firing patterns are shown in FIGS. 1, 2, 3, 4, and 5.

A one-to-one correspondence is constructed with the sixteen boolean functions of the form $f: \{0, 1\} \times \{0, 1\} \rightarrow \{0, 1\}$. These boolean functions comprise the binary operators: and $\wedge$, or $\vee$, nand $\neg \wedge$, equal $\leftrightarrow$, and so on. One of these firing patterns is distinguished from the other fifteen by building the appropriate connections to element P, which in the general case represents the output of a boolean function $f: \{0, 1\}^n \rightarrow \{0, 1\}$. A key notion is that element P fires within the window of time W if and only if P receives a unique firing pattern from elements $X_0, X_1, X_2$ and $X_3$. (This is analogous to the notion of the grandmother nerve cell that only fires if you just saw your grandmother.) The following definition covers the Boolean interpretation explained here and also handles more complex types of interpretations.

Definition 2.1. Number of Firings During a Window

Let X denote the set of active elements $\{X_0, X_1, \ldots, X_{n-1}\}$ that determine the firing pattern during the window of time W. Then $|(X_k, W)|$=the number of times that element $X_k$ fired during window of time W. Thus, define the number of firings during window W as $$|(X, W)| = \sum_{k=0}^{n-1} |(X_k, W)|.$$

Observe that $|(X, W)|=0$ for firing pattern 0000 shown in FIG. 1 and $|(X, W)|=2$ for firing pattern 0011. To isolate a firing pattern so that element P only fires if this unique firing pattern occurs, set the threshold of element $P=2|(X, W)|-1$.

The element command for P is:
(Element (Time a–dT) (Name P) (Threshold 2|(X, W)|–1) (Refractory b–a) (Last 2a–b))

Further, if element $X_k$ doesn't fire during window of time W, then set the amplitude of the connection from $X_k$ to P to –2. If element $X_k$ does fire during window of time W, then set the amplitude of the connection from $X_k$ to P equal to 2. For each element $X_k$, the pulse width is set to |W|=b–a. Each connection from $X_k$ to P is based on whether $X_k$ is supposed to fire or is not supposed to fire during W. If $X_k$ is supposed to fire during W, then the following connection is established. (Connection (Time a–dT) (From X_k) (To P) (Amp 2) (Width b–a) (Delay 1)) If $X_k$ is not supposed to fire during W, then the following connection is established.
(Connection (Time a–dT) (From X_k) (To P) (Amp –2) (Width b–a) (Delay 1))

The firing pattern is already known because it is determined based on a random source of bits received by input elements, as discussed in procedure 1. Consequently, –2|(X, W)| is already known. How an active element circuit is designed to create a firing pattern that computes the appropriate boolean function is discussed in the following example.

EXAMPLE

Computing ⊕ with Firing Pattern 0010

Consider firing pattern 0010. In other words, $X_2$ fires but the other elements do not fire. The AEM is supposed to compute the boolean function exclusive-or $A \oplus B = (A \vee B) \wedge (\neg A \vee \neg B)$. The goal here is to design an AEM circuit such that $A \oplus B=1$ if and only if the firing pattern for $X_0, X_1, X_2, X_3$ is 0010. Following definition 2.1, as a result of the distinct firing pattern during W, if $A \oplus B=1$ then P fires. If $A \oplus B=0$ then P doesn't fire. Below are the commands that connect elements A and B to elements $X_0, X_1, X_2, X_3$.

(Connection (Time a–2) (From A) (To X_0) (Amp 2) (Width b–a+1) (Delay 2))
(Connection (Time a–2) (From B) (To X_0) (Amp 2) (Width b–a+1) (Delay 2))
(Element (Time a–2) (Name X_0) (Threshold 3) (Refractory b–a) (Last 2a–b))
(Connection (Time a–2) (From A) (To X_1) (Amp –2) (Width b–a+1) (Delay 2))
(Connection (Time a–2) (From B) (To X_1) (Amp –2) (Width b–a+1) (Delay 2))
(Element (Time a–2) (Name X_1) (Threshold –1) (Refractory b–a) (Last 2a–b))
(Connection (Time a–2) (From A) (To X_2) (Amp 2) (Width b–a+1) (Delay 2))
(Connection (Time a–2) (From B) (To X_2) (Amp 2) (Width b–a+1) (Delay 2))
(Element (Time a–2) (Name X_2) (Threshold 1) (Refractory b–a) (Last 2a–b))
(Connection (Time a–2) (From A) (To X_3) (Amp 2) (Width b–a+1) (Delay 2))
(Connection (Time a–2) (From B) (To X_3) (Amp 2) (Width b–a+1) (Delay 2))
(Element (Time a–2) (Name X_3) (Threshold 3) (Refractory b–a) (Last 2a–b))

There are four cases for $A \oplus B$: $1 \oplus 0, 0 \oplus 1, 1 \oplus 1$ and $0 \oplus 0$. In regard to this, choose the refractory periods so that A and B either fire or don't fire at t=0. Recall that W=[a, b]. In this example, assume a=2 and b=3. Thus, all refractory periods of $X_0, X_1, X_2, X_3$ are 1 and all last time fireds are 1. All pulse widths are the length of the window W+1 which equals 2.

Case 1. Element A fires at time t=0 and element B doesn't fire at t=0.

Element $X_0$ receives a pulse from A with amplitude 2 at time t=2. Element $X_0$ doesn't fire because its threshold=3. Element $X_1$ receives a pulse from A with amplitude –2 at time t=2. Element $X_1$ doesn't fire during W because $X_1$ has threshold=–1. Element $X_2$ receives a pulse from A with amplitude 2. Element $X_2$ fires at time t=2 because its threshold is 1. Element $X_3$ receives a pulse from A with amplitude 2 but doesn't fire during window W because $X_3$ has threshold=3.

Case 2. Element $X_0$ receives a pulse from B with amplitude 2 at time t=2.

Element $X_0$ doesn't fire because its threshold=3. Element $X_1$ receives a pulse from B with amplitude –2 at time t=2. Element $X_1$ doesn't fire during W because $X_1$ has threshold=–1. Element $X_2$ receives a pulse from B with amplitude 2. Element $X_2$ fires at time t=2 because its threshold is 1. Element $X_3$ receives a pulse from B with amplitude 2, but doesn't fire during window W because $X_3$ has threshold=3.

Case 3. Element A fires at time t=0 and element B fires at t=0.

Element $X_0$ receives two pulses from A and B each with amplitude 2 at time t=2. Element $X_0$ fires because its threshold=3. Element $X_1$ receives two pulses from A and B each with amplitude –2 at time t=2. Element $X_1$ doesn't fire during W because $X_1$ has threshold=–1. Element $X_2$ receives two pulses from A and B each with amplitude 2. Element $X_2$ fires at time t=2 because its threshold is 1. Element $X_3$ receives two pulses from A and B each with amplitude 2. Element $X_3$ fires at time t=2 because $X_3$ has threshold=3.

Case 4. Element A doesn't fire at time t=0 and element B doesn't fire at t=0. Thus, elements $X_0, X_2$ and $X_3$ do not fire because they have positive thresholds. Element $X_1$ fires at t=2 because it has threshold=–1.

For the desired firing pattern 0010, the threshold of $P=2|(X, W)|-1=1$. Below is the element command for P.
(Element (Time 2–dT) (Name P) (Threshold 1) (Refractory 1) (Last 1)).

Below are the connection commands for making P fire if and only if firing pattern 0010 occurs during W.

(Connection (Time 2–dT) (From X_0) (To P) (Amp –2) (Width 1) (Delay 1))
(Connection (Time 2–dT) (From X_1) (To P) (Amp –2) (Width 1) (Delay 1))

-continued (Connection (Time 2−dT) (From X_2) (To P) (Amp 2) (Width 1) (Delay 1))
(Connection (Time 2−dT) (From X_3) (To P) (Amp −2) (Width 1) (Delay 1))

For cases 1 and 2 (i.e., 1⊕0 and 0⊕1) only $X_2$ fires. A moment before $X_2$ fires at t=2 (i.e., −dT), the amplitude from $X_2$ to P is set to 2. At time t=2, a pulse with amplitude 2 is sent from $X_2$ to P, so P fires at time t=3 since its threshold=1. In other words, 1⊕0=1 or 0⊕1=1 has been computed. For case 3, (1⊕1), $X_0$, $X_2$ and $X_3$ fire. Thus, two pulses each with amplitude=−2 are sent from $X_0$ and $X_3$ to P. And one pulse with amplitude 2 is sent from $X_2$ to P. Thus, P doesn't fire. In other words, 1⊕1=0 has been computed. For case 4, (0⊕0), $X_1$ fires. One pulse with amplitude=−2 is sent to $X_2$. Thus, P doesn't fire. In other words, 0⊕0=0 has been computed.

Level Set Separation Rules

This section describes how any of the sixteen boolean functions are uniquely mapped to one of the sixteen firing patterns by an appropriate active element machine program. The domain $\{0, 1\} \times \{0, 1\}$ of the sixteen boolean functions has four members $\{(0, 0), (1, 0), (0, 1), (1, 1)\}$. Furthermore, for each active element $X_k$, separate these members based on the (amplitude from A to $X_k$, amplitude from B to $X_k$, threshold of $X_k$, element $X_k$) quadruplet. For example, the quadruplet $(0, 2, 1, X_1)$ separates $\{(1, 1), (0, 1)\}$ from $\{(1, 0), (0, 0)\}$ with respect to $X_1$. Recall that A=1 means A fires and B=1 means B fires. Then $X_1$ will fire with inputs $\{(1, 1), (0, 1)\}$ and $X_1$ will not fire with inputs $\{(1, 0), (0, 0)\}$. The separation rule is expressed as $$(0, 2, 1, X_1) \leftrightarrow \frac{\{(1, 1), (0, 1)\}}{\{(1, 0), (0, 0)\}}.$$

Similarly, $$(0, -2, -1, X_2) \leftrightarrow \frac{\{(1, 0), (0, 0)\}}{\{(1, 1), (0, 1)\}}$$

indicates that $X_2$ has threshold −1 and amplitudes 0 and −2 from A and B respectively. Further, $X_2$ will fire with inputs $\{(1, 0), (0, 0)\}$ and will not fire with inputs $\{(1, 1), (0, 1)\}$.

Table 1 shows how to compute all sixteen boolean functions $f_k: \{0, 1\} \times \{0, 1\} \to \{0, 1\}$. For each X, use one of 14 separation rules to map the level set $f_k^{-1}\{1\}$ or alternatively map the level set $f_k^{-1}\{0\}$ to one of the sixteen firing patterns represented by $X_0$, $X_1$, $X_2$ and $X_3$. The level set method works as follows.

Suppose the nand boolean function $f_{13} = \neg(A \wedge B)$ is to be computed with the firing pattern 0101. Observe that $f_{13}^{-1}\{1\} = \{(1, 0), (0, 1), (0, 0)\}$. Thus, the separation rules $$(2, 2, 3, X_k) \leftrightarrow \frac{\{(1, 1)\}}{\{(1, 0), (0, 1), (0, 0)\}}$$

for k in $\{0, 2\}$ work because $X_0$ and $X_2$ fire if and only if A fires and B fires. Similarly, $$(-2, -2, -3, X_j) \leftrightarrow \frac{\{(1, 0), (0, 1), (0, 0)\}}{\{(1, 1)\}}$$

for j in $\{1, 3\}$ work because $X_1$ and $X_3$ don't fire if and only if A fires and B fires. These rules generate the commands.

(Connection (Time a−2) (From A) (To X_0) (Amp 2) (Width b−a+1) (Delay 2))
(Connection (Time a−2) (From B) (To X_0) (Amp 2) (Width b−a+1) (Delay 2))
(Element (Time a−2) (Name X_0) (Threshold 3) (Refractory b−a) (Last 2a−b))
(Connection (Time a−2) (From A) (To X_1) (Amp −2) (Width b−a+1) (Delay 2))
(Connection (Time a−2) (From B) (To X_1) (Amp −2) (Width b−a+1) (Delay 2))
(Element (Time a−2) (Name X_1) (Threshold −3) (Refractory b−a) (Last 2a−b))
(Connection (Time a−2) (From A) (To X_2) (Amp 2) (Width b−a+1) (Delay 2))
(Connection (Time a−2) (From B) (To X_2) (Amp 2) (Width b−a+1) (Delay 2))
(Element (Time a−2) (Name X_2) (Threshold 3) (Refractory b−a) (Last 2a−b))
(Connection (Time a−2) (From A) (To X_3) (Amp −2) (Width b−a+1) (Delay 2))
(Connection (Time a−2) (From B) (To X_3) (Amp −2) (Width b−a+1) (Delay 2))
(Element (Time a−2) (Name X_3) (Threshold −3) (Refractory b−a) (Last 2a−b))

The five commands make element P fire if and only if firing pattern 0101 occurs.

(Element (Time 2−dT) (Name P) (Threshold 3) (Refractory 1) (Last 1))
(Connection (Time 2−dT) (From X_0) (To P) (Amp −2) (Width 1) (Delay 1))
(Connection (Time 2−dT) (From X_1) (To P) (Amp 2) (Width 1) (Delay 1))
(Connection (Time 2−dT) (From X_2) (To P) (Amp −2) (Width 1) (Delay 1))
(Connection (Time 2−dT) (From X_3) (To P) (Amp 2) (Width 1) (Delay 1))

Case 1: $\neg(0 \wedge 0)$. A doesn't fire and B doesn't fire. Thus, no pulses reach $X_1$ and $X_3$, who each have threshold −3. Thus, $X_1$ and $X_3$ fire. Similarly, no pulses reach $X_0$ and $X_2$, who each have threshold 3. Thus, the firing pattern 0101 shown in table 10 causes P to fire because element $X_1$ and $X_3$ each send a pulse with amplitude 2 to P which has threshold 3. Therefore, $\neg(0 \wedge 0)=1$ is computed.

Case 2: $\neg(1 \wedge 0)$. A fires and B doesn't fire. Thus, one pulse from A with amplitude 2 reaches $X_0$ and $X_2$, who each have threshold 3. Thus, $X_0$ and $X_2$ don't fire. Similarly, one pulse from A with amplitude −2 reaches $X_1$ and $X_3$, who each have threshold −3. Thus, the firing pattern 0101 shown in table 11 causes P to fire because element $X_1$ and $X_3$ each send a pulse with amplitude 2 to P which has threshold 3. Therefore, $\neg(1 \wedge 0)=1$ is computed.

Case 3: $\neg(0 \wedge 1)$. A doesn't fire and B fires. Thus, one pulse from B with amplitude 2 reaches $X_0$ and $X_2$, who each have threshold 3. Thus, $X_0$ and $X_2$ don't fire. Similarly, one pulse from B with amplitude −2 reaches $X_1$ and $X_3$, who each have threshold −3. Thus, the firing pattern 0101 shown in table 12 causes P to fire because element $X_1$ and $X_3$ each send a pulse with amplitude 2 to P which has threshold 3. Therefore, $\neg(0 \wedge 1)=1$ is computed.

Case 4: $\neg(1 \wedge 1)$. A fires and B fires. Thus, two pulses each with amplitude 2 reach $X_0$ and $X_2$, who each have threshold 3.

Thus, $X_0$ and $X_2$ fire. Similarly, two pulses each with amplitude $-2$ reach $X_1$ and $X_3$, who each have threshold $-3$. As a result, $X_1$ and $X_3$ don't fire. Thus, the firing pattern 1010 shown in table 13 prevents P from firing because $X_0$ and $X_2$ each send a pulse with amplitude $-2$ to P which has threshold 3. Therefore, $\neg (1 \wedge 1)=0$ is computed.

Overall, any one of the sixteen boolean functions in table 1 are uniquely mapped to one of the sixteen firing patterns by an appropriate AEM program. These mappings can be chosen arbitrarily: as a consequence, each register machine instruction can be executed at different times using distinct AEM firing representations.

Executing a Digital Computer with Random Firing Interpretations

A universal Turing Machine (UTM) is a Turing machine that can execute the computation of any Turing Machine by reading the other Turing Machine's description and input from the UTM's tape. Table 2 shows Minsky's universal Turing machine described in [24]. This means that this universal Turing machine can execute any program that a digital computer or a distruted system computers or a vonNeumann machine can execute.

The elements of $\{0, 1\}^2$ are denoted as $\{00, 01, 10, 11\}$. Create a one-to-one correspondence between the tape symbols in the alphabet $\mathcal{A}$ and the elements in $\{0, 1\}^2$ as follows: $0 \leftrightarrow 00, 1 \leftrightarrow 01, y \leftrightarrow 10$ and $A \leftrightarrow 11$. Furthermore, consider the following correspondence of the states with the elements of $\{0, 1\}^3$: $q_1 \leftrightarrow 001$, $q_2 \leftrightarrow 010$, $q_3 \leftrightarrow 011$, $q_4 \leftrightarrow 100$, $q_5 \leftrightarrow 101$, $q_6 \leftrightarrow 110$, $q_7 \leftrightarrow 111$ and the halting state $h \leftrightarrow 000$. Further consider $L \leftrightarrow 0$ and $R \leftrightarrow 1$ in $\{0, 1\}$. An active element machine is designed to compute the universal Turing Machine program $\eta$ shown in table 3. Following the methods in the previous section, multiple AEM firing interpretations are created that compute $\eta$. When the universal Turing machine halts, $\eta(011, 00)=(000, 00, h)$, this special case is handled with a halting firing pattern $\mathcal{H}$ that the active element machine enters. Concatenate the three boolean variables U, W, X to represent the current state of the UTM. The two boolean variables Y, Z represent the current tape symbol. From table 3, observe that $\eta=(\eta_0 \eta_1 \eta_2, \eta_3 \eta_4, \eta_5)$. For each k such that $0 \leq k \leq 5$, the level sets of the function $\eta_k$: $\{0, 1\}^3 \times \{0, 1\}^2 \rightarrow \{0, 1\}$ are shown below.

$\eta_0^{-1}(UWX, YZ)\{1\}=\{(111, 10), (111, 01), (111, 00), (110, 11), (110, 10), (110, 01), (101, 11), (101, 10), (101, 01), (100, 11), (100, 10), (100, 01), (100, 00), (011, 11) (010, 11)\}$ $\eta_0^{-1}(UWX, YZ)\{0\}=\{(111, 11), (110, 00), (101, 00), (011, 10), (011, 01), (011, 00), (010, 10), (010, 01), (010, 00), (001, 11), (001, 10), (001, 01), (001, 00), (000, 11), (000, 10), (000, 01), (000, 00)\}$ $\eta_1^{-1}(UWX, YZ)\{1\}=\{(111, 11), (111, 10), (111, 01), (111, 00), (110, 11), (110, 10), (110, 01), (110, 00), (101, 00), (100, 01), (011, 10), (011, 01), (010, 11), (010, 01), (010, 00), (001, 01)\}$ $\eta_1^{-1}(UWX, YZ)\{0\}=\{(101, 11), (101, 10), (101, 01), (100, 11), (100, 10), (100, 00), (011, 11), (011, 00), (010, 10), (001, 11), (001, 10), (001, 00), (000, 11), (000, 10), (000, 01), (000, 00)\}$ $\eta_2^{-1}(UWX, YZ)\{1\}=\{011, 10), (111, 01), (110, 00), (101, 11), (101, 10), (101, 01), (101, 00), (100, 01), (100, 00), (011, 10), (011, 01), (010, 10), (001, 11), (001, 10), (001, 00)\}$ $\eta_2^{-1}(UWX, YZ)\{0\}=\{(111, 11), (111, 00), (110, 11), (110, 10), (110, 01), (100, 11), (100, 10), (011, 11), (011, 00), (010, 11), (010, 00), (001, 01), (000, 11), (000, 10), (000, 01), (000, 00)\}$ $\eta_3^{-1}(UWX, YZ)\{1\}=\{(111, 00), (110, 00), (110, 01), (110, 10), (101, 00), (101, 01), (101, 10), (100, 00), (100, 10), (011, 01), (011, 10), (010, 11), (010, 01), (010, 00)\}$ $\eta_4^{-1}(UWX, YZ)\{0\}=\{(111, 01), (111, 10), (111, 11), (110, 11), (101, 11), (100, 01), (100, 11), (011, 00), (011, 11), (010, 10), (001, 00), (001, 01), (001, 10), (001, 11), (000, 01), (000, 10), (000, 11), (000, 00)\}$ $\eta_4^{-1}(UWX, YZ)\{1\}=\{(111, 01), (110, 11), (110, 01), (110, 00), (101, 11), (101, 01), (100, 11), (100, 01), (011, 11), (011, 01), (010, 01), (001, 11), (001, 01)\}$ $\eta_4^{-1}(UWX, YZ)\{0\}=\{(111, 11), (111, 10), (111, 00), (110, 10), (101, 10), (101, 00), (100, 10), (100, 00), (011, 10), (011, 00), (010, 11), (010, 10), (010, 00), (001, 10), (001, 00), (000, 11), (000, 10), (000, 01), (000, 00)\}$ $\eta_5^{-1}(UWX, YZ)\{1\}=(111, 11), (111, 10), (111, 01), (111, 00), (110, 11), (110, 10), (110, 01), (101, 11), (101, 10), (101, 01), (100, 00), (010, 11), (010, 01), (010, 00)$ $\eta_5^{-1}(UWX, YZ)\{0\}=\{(110, 00), (101, 00), (100, 11), (100, 10), (100, 01), (011, 11), (011, 10), (011, 01), (010, 10), (001, 11), (001, 10), (001, 01), (001, 00), (000, 11), (000, 10)\}(000, 01), (000, 00)$ The level set $\eta_5^{-1}(UWX, YZ)\{h\}=\{(011, 00)\}$ is the special case when the universal Turing machine halts. At this time, the active element machine reaches a halting firing pattern H. The next example copies one element's firing state to another element's firing state, which helps assign the value of a random bit to an active element and perform other functions in the UTM.

Copy Program.

This active element program copies active element a's firing state to element b.

(Program copy (Args s t b a)
   (Element (Time s−1) (Name b) (Threshold 1) (Refractory 1) (Last s−1))
   (Connection (Time s−1)(From a) (To b)(Amp 0) (Width 0) (Delay 1))
   (Connection (Time s) (From a) (To b) (Amp 2) (Width 1) (Delay 1))
   (Connection (Time s) (From b) (To b) (Amp 2) (Width 1) (Delay 1))
   (Connection (Time t) (From a) (To b) (Amp 0) (Width 0) (Delay 1))
)

When the copy program is called, active element b fires if a fired during the window of time [s, t). Further, a connection is set up from b to b so that b will keep firing indefinitely. This enables b to store active element a's firing state. The following procedure describes the computation of the Turing program with random firing interpretations.

Procedure 2. Computing Turing Program with Random Firing Patterns Consider function $\eta_3$: $\{0, 1\}^5 \rightarrow \{0, 1\}$ as previously defined. The following scheme for mapping boolean values 1 and 0 to the firing of an active element is used. If active element U fires during window W, then this corresponds to input U=1 in $\eta_3$; if active element U doesn't fire during window W, then this corresponds to input U=0 in $\eta_3$. When U fires, W doesn't fire, X fires, Y doesn't fire and Z doesn't fire, this corresponds to computing $\eta_3$ (101, 00). The value $1=\eta_3(101, 00)$ is the underlined bit in (011, 10, 0), which is located in row 101, column 00 of table 3. Procedure 1 and the separation rules in table 4 are synthesized so that is computed using random active element firing patterns. In other words, the boolean function $r_{73}$ can be computed using an active element machine's dynamic interpretation. The dynamic part of the interpretation is determined by the random bits received from a quantum source. The firing activity of active element $P_3$ represents the value of $\eta_3$ (UWX, YZ). Fourteen random bits are read from a quantum random generator—for example, see [5]. These random bits are used to create a corresponding random firing pattern of active elements $R_0, R_1, \ldots R_{13}$. Meta commands dynamically build active elements and connections based on the separation rules in table 4 and the firing activity of elements $R_0, R_1, \ldots R_{13}$. These dynamically created active elements and connections determine the firing activity of active element $P_3$ based on the firing activity of active elements U, W, X, Y and Z. The details of this procedure are described below.

Read fourteen random bits $a_0, a_1, \ldots$ and $a_{13}$ from a quantum source. The values of these random bits are stored in active elements $R_0, R_1, \ldots R_{13}$. If random bit $a_k=1$, then $R_k$ fires; if random bit $a_k=0$, then $R_k$ doesn't fire.

Set up dynamical connections from active elements U, X, W, Y, Z to elements $D_0, D_1, \ldots D_{13}$. These connections are based on Meta commands that use the firing pattern from elements $R_0, R_1, \ldots R_{13}$.

```
(Program set_dynamic_C (Args s t f xk a w tau rk)
  (Connection (Time s–dT) (From f) (To xk) (Amp –a) (Width w) (Delay
    tau))
  (Meta (Name rk) (Window s t)
    (Connection (Time t) (From f) (To xk) (Amp a) (Width w) (Delay
      tau)))
)
(Program set_dynamic_E (Args s t xk theta r L rk)
  (Element (Time s–2dT) (Name xk) (Threshold –theta) (Refractory r)
    (Last L))
  (Meta (Name rk) (Window s t)
    (Element (Time t) (Name xk) (Threshold theta) (Refractory r) (Last
      L)))
)
```

For $D_0$, follow the first row of separation table 4, reading the amplitudes from U, W, X, Y, Z to $D_0$ and the threshold for $D_0$. Observe that at time s-dT program set_dynamic_C initializes the amplitudes of the connections to $A_{U,D0}=-2$, $A_{W,D0}=-2, A_{X,D0}=-2, A_{Y,D0}=2, A_{Z,D0}=2$ as if $R_0$ doesn't fire. If $R_0$ does fire, then the Meta command in set_dynamic_C dynamically flips the sign of each of these amplitudes: at time t, the amplitudes are flipped to $A_{U,D0}=2, A_{W,D0}=2, A_{X,D0}=2, A_{Y,D0}=-2, A_{Z,D0}=-2$.

Similarly, the meta command in set_dynamic_E initializes the threshold of $D_0$ to $\theta_{D0}=-5$ as if $R_0$ doesn't not fire. If $R_0$ does fire the meta command flips the sign of the threshold of $D_0$; for the $D_0$ case, the meta command sets $\theta_{D0}=5$.

```
(set_dynamic_E s t D0 5 1 s–2 R0)
(set_dynamic_C s t U D0 2 1 1 R0)
(set_dynamic_C s t W D0 2 1 1 R0)
(set_dynamic_C s t X D0 2 1 1 R0)
(set_dynamic_C s t Y D0 –2 1 1 R0)
(set_dynamic_C s t Z D0 –2 1 1 R0)
```

Similarly, for elements $D_1, \ldots, D_{13}$, the commands set_dynamic_E and set_dynamic_C dynamically set the element parameters and the connections from U, X, W, Y, Z to $D_1, \ldots D_{13}$ based on the rest of the quantum random firing pattern $R_1, \ldots, R_{13}$.

```
(set_dynamic_E s t D1 3 1 s–2 R1)
(set_dynamic_C s t U D1 2 1 1 R1)
(set_dynamic_C s t W D1 2 1 1 R1)
(set_dynamic_C s t X D1 –2 1 1 R1)
(set_dynamic_C s t Y D1 –2 1 1 R1)
(set_dynamic_C s t Z D1 –2 1 1 R1)
(set_dynamic_E s t D2 5 1 s–2 R2)
(set_dynamic_C s t U D2 2 1 1 R2)
(set_dynamic_C s t W D2 2 1 1 R2)
```

-continued

```
(set_dynamic_C s t X D2 –2 1 1 R2)
(set_dynamic_C s t Y D2 –2 1 1 R2)
(set_dynamic_C s t Z D2 2 1 1 R2)
(set_dynamic_E s t D3 5 1 s–2 R3)
(set_dynamic_C s t U D3 2 1 1 R3)
(set_dynamic_C s t W D3 2 1 1 R3)
(set_dynamic_C s t X D3 –2 1 1 R3)
(set_dynamic_C s t Y D3 2 1 1 R3)
(set_dynamic_C s t Z D3 –2 1 1 R3)
(set_dynamic_E s t D4 3 1 s–2 R4)
(set_dynamic_C s t U D4 2 1 1 R4)
(set_dynamic_C s t W D4 –2 1 1 R4)
(set_dynamic_C s t X D4 2 1 1 R4)
(set_dynamic_C s t Y D4 –2 1 1 R4)
(set_dynamic_C s t Z D4 –2 1 1 R4)
(set_dynamic_E s t D5 5 1 s–2 R5)
(set_dynamic_C s t U D5 2 1 1 R5)
(set_dynamic_C s t W D5 –2 1 1 R5)
(set_dynamic_C s t X D5 2 1 1 R5)
(set_dynamic_C s t Y D5 –2 1 1 R5)
(set_dynamic_C s t Z D5 2 1 1 R5)
(set_dynamic_E s t D6 5 1 s–2 R6)
(set_dynamic_C s t U D6 2 1 1 R6)
(set_dynamic_C s t W D6 –2 1 1 R6)
(set_dynamic_C s t X D6 2 1 1 R6)
(set_dynamic_C s t Y D6 2 1 1 R6)
(set_dynamic_C s t Z D6 –2 1 1 R6)
(set_dynamic_E s t D7 1 1 s–2 R7)
(set_dynamic_C s t U D7 2 1 1 R7)
(set_dynamic_C s t W D7 –2 1 1 R7)
(set_dynamic_C s t X D7 –2 1 1 R7)
(set_dynamic_C s t Y D7 –2 1 1 R7)
(set_dynamic_C s t Z D7 –2 1 1 R7)
(set_dynamic_E s t D8 3 1 s–2 R8)
(set_dynamic_C s t U D8 2 1 1 R8)
(set_dynamic_C s t W D8 –2 1 1 R8)
(set_dynamic_C s t X D8 –2 1 1 R8)
(set_dynamic_C s t Y D8 2 1 1 R8)
(set_dynamic_C s t Z D8 –2 1 1 R8)
(set_dynamic_E s t D9 5 1 s–2 R9)
(set_dynamic_C s t U D9 –2 1 1 R9)
(set_dynamic_C s t W D9 2 1 1 R9)
(set_dynamic_C s t X D9 2 1 1 R9)
(set_dynamic_C s t Y D9 –2 1 1 R9)
(set_dynamic_C s t Z D9 2 1 1 R9)
(set_dynamic_E s t D10 5 1 s–2 R10)
(set_dynamic_C s t U D10 –2 1 1 R10)
(set_dynamic_C s t W D10 2 1 1 R10)
(set_dynamic_C s t X D10 2 1 1 R10)
(set_dynamic_C s t Y D10 2 1 1 R10)
(set_dynamic_C s t Z D10 –2 1 1 R10)
(set_dynamic_E s t D11 1 1 s–2 R11)
(set_dynamic_C s t U D11 –2 1 1 R11)
(set_dynamic_C s t W D11 2 1 1 R11)
(set_dynamic_C s t X D11 –2 1 1 R11)
(set_dynamic_C s t Y D11 –2 1 1 R11)
(set_dynamic_C s t Z D11 –2 1 1 R11)
(set_dynamic_E s t D12 3 1 s–2 R12)
(set_dynamic_C s t U D12 –2 1 1 R12)
(set_dynamic_C s t W D12 2 1 1 R12)
(set_dynamic_C s t X D12 –2 1 1 R12)
(set_dynamic_C s t Y D12 –2 1 1 R12)
(set_dynamic_C s t Z D12 2 1 1 R12)
(set_dynamic_E s t D13 5 1 s–2 R13)
(set_dynamic_C s t U D13 –2 1 1 R13)
(set_dynamic_C s t W D13 2 1 1 R13)
(set_dynamic_C s t X D13 –2 1 1 R13)
(set_dynamic_C s t Y D13 2 1 1 R13)
(set_dynamic_C s t Z D13 2 1 1 R13)
```

Set up connections to active elements $G_0, G_1, G_2, \ldots G_{14}$ which represent the number of elements in $\{R_0, R_1, R_2, \ldots R_{13}\}$ that are firing. If 0 are firing, then only $G_0$ is firing. Otherwise, if k>0 elements in $\{R_0, R_1, R_2, \ldots R_{13}\}$ are firing, then only $G_1, G_2, \ldots G_k$ are firing.

```
(Program firing_count (Args G a b theta)
    (Element (Time a-2dT) (Name G) (Threshold theta) (Refractory b-a)
        (Last 2a-b))
    (Connection (Time a-dT) (From R0) (To G) (Amp 2) (Width b-a)
        (Delay 1))
    (Connection (Time a-dT) (From R1) (To G) (Amp 2) (Width b-a)
        (Delay 1))
    (Connection (Time a-dT) (From R2) (To G) (Amp 2) (Width b-a)
        (Delay 1))
    (Connection (Time a-dT) (From R3) (To G) (Amp 2) (Width b-a)
        (Delay 1))
    (Connection (Time a-dT) (From R4) (To G) (Amp 2) (Width b-a)
        (Delay 1))
    (Connection (Time a-dT) (From R5) (To G) (Amp 2) (Width b-a)
        (Delay 1))
    (Connection (Time a-dT) (From R6) (To G) (Amp 2) (Width b-a)
        (Delay 1))
    (Connection (Time a-dT) (From R7) (To G) (Amp 2) (Width b-a)
        (Delay 1))
    (Connection (Time a-dT) (From R8) (To G) (Amp 2) (Width b-a)
        (Delay 1))
    (Connection (Time a-dT) (From R9) (To G) (Amp 2) (Width b-a)
        (Delay 1))
    (Connection (Time a-dT) (From R10) (To G) (Amp 2) (Width b-a)
        (Delay 1))
    (Connection (Time a-dT) (From R11) (To G) (Amp 2) (Width b-a)
        (Delay 1))
    (Connection (Time a-dT) (From R12) (To G) (Amp 2) (Width b-a)
        (Delay 1))
    (Connection (Time a-dT) (From R13) (To G) (Amp 2) (Width b-a)
        (Delay 1))
)
(firing_count G0 a b -1)
(firing_count G1 a b 1)
(firing_count G2 a b 3)
(firing_count G3 a b 5)
(firing_count G4 a b 7)
(firing_count G5 a b 9)
(firing_count G6 a b 11)
(firing_count G7 a b 13)
(firing_count G8 a b 15)
(firing_count G9 a b 17)
(firing_count G10 a b 19)
(firing_count G11 a b 21)
(firing_count G12 a b 23)
(firing_count G13 a b 25)
(firing_count G14 a b 27)
```

$P_3$ is the output of $\eta_3$. Initialize element $P_3$'s threshold based on meta commands that use the information from elements $G_0, G_1, \ldots G_{13}$. Observe that $t+dT < t+2dT < \ldots < t+15dT$ so the infinitesimal $dT$ enables us to set the appropriate threshold for $P_3$ to $-2(14-k)+1$ based on k denoting the number of firings. For example, if nine of the randomly chosen bits are high, then $G_9$ will fire, so the threshold of $P_3$ is set to $-9$. If five of the random bits are high, then the threshold of $P_3$ is set to $-17$. Each element of the level set creates a firing pattern of $D_0, D_1, \ldots D_{13}$ equal to the complement of the random firing pattern $R_0, R_1, \ldots R_{13}$ (i.e., $D_k$ fires if and only if $R_k$ does not fire).

```
(Program set_P_threshold (Args G P s t a b theta kdT)
    (Meta (Name G) (Window s t)
        (Element (Time t+kdT) (Name P) (Threshold theta) (Refractory b-a)
            (Last t-b+a))
)
(set_P_threshold G0 P3 s t a b -27 dT)
(set_P_threshold G1 P3 s t a b -25 2dT)
(set_P_threshold G2 P3 s t a b -23 3dT)
(set_P_threshold G3 P3 s t a b -21 4dT)
(set_P_threshold G4 P3 s t a b -19 5dT)
(set_P_threshold G5 P3 s t a b -17 6dT)
(set_P_threshold G6 P3 s t a b -15 7dT)
(set_P_threshold G7 P3 s t a b -13 8dT)
(set_P_threshold G8 P3 s t a b -11 9dT)
(set_P_threshold G9 P3 s t a b -9 10dT)
(set_P_threshold G10 P3 s t a b -7 11dT)
(set_P_threshold G11 P3 s t a b -5 12dT)
(set_P_threshold G12 P3 s t a b -3 13dT)
(set_P_threshold G13 P3 s t a b -1 14dT)
(set_P_threshold G14 P3 s t a b 1 15dT)
```

Set up dynamical connections from $D_0, D_1, \ldots D_{13}$ to $P_3$ based on the random bits stored by $R_0, R_1, \ldots R_{13}$. These connections are based on meta commands that use the firing pattern from elements $R_0, R_1, \ldots R_{13}$.

```
(Program set_from_Xk_to_Pj (Args s t Xk Pj amp w tau Rk)
    (Connection (Time s-dT) (From Xk) (To Pj) (Amp -amp) (Width w)
        (Delay tau))
    (Meta (Name Rk) (Window s t)
        (Connection (Time t) (From Xk) (To Pj) (Amp amp) (Width w)
            (Delay tau))
)
(set_from_Xk_to_Pj s t D0 P3 2 b-a 1 R0)
(set_from_Xk_to_Pj s t D1 P3 2 b-a 1 R1)
(set_from_Xk_to_Pj s t D2 P3 2 b-a 1 R2)
(set_from_Xk_to_Pj s t D3 P3 2 b-a 1 R3)
(set_from_Xk_to_Pj s t D4 P3 2 b-a 1 R4)
(set_from_Xk_to_Pj s t D5 P3 2 b-a 1 R5)
(set_from_Xk_to_Pj s t D6 P3 2 b-a 1 R6)
(set_from_Xk_to_Pj s t D7 P3 2 b-a 1 R7)
(set_from_Xk_to_Pj s t D8 P3 2 b-a 1 R8)
(set_from_Xk_to_Pj s t D9 P3 2 b-a 1 R9)
(set_from_Xk_to_Pj s t D10 P3 2 b-a 1 R10)
(set_from_Xk_to_Pj s t D11 P3 2 b-a 1 R11)
(set_from_Xk_to_Pj s t D12 P3 2 b-a 1 R12)
(set_from_Xk_to_Pj s t D13 P3 2 b-a 1 R13)
```

Similar procedures use random firing patterns on active elements $\{A_0, A_1, \ldots A_{14}\}$, $\{B_0, B_1, \ldots B_{15}\}$, $\{C_0, C_1, \ldots C_{14}\}$, $\{E_0, E_1, \ldots E_{12}\}$, and $\{F_0, F_1, \ldots F_{13}\}$ to compute $\eta_0, \eta_1, \eta_2, \eta_4$ and $\eta_5$, respectively. The outputs of $\eta_0, f_1, \eta_2, \eta_4$ and $\eta_5$ are represented by active elements $P_0, P_1, P_2, P_4$ and $P_5$, respectively. The level set rules for $\eta_0, \eta_1, \eta_2, \eta_4$ and $\eta_5$ are shown, respectively in tables 5, 6, 7, 8 and 9.

Since the firing activity of element $P_k$ represents a single bit that helps determine the next state or next tape symbol during a UTM computational step, its firing activity and parameters can be assumed to remain perfectly secret. Alternatively, if an eavesdropper is able to listen to the firing activity of $P_0, P_1, P_2, P_3, P_4$ and $P_5$, which collectively represent the computation of $\eta(UXW, YZ)$, then this leaking of information could be used to reconstruct some or all of the UTM tape contents.

This weakness can be rectified as follows. For each UTM computational step, the active element machine uses six additional quantum random bits $b_0, b_1, b_2, b_3, b_4$ and $b_5$. For element $P_3$, if random bit $b_3=1$, then the dynamical connections from $D_0, D_1, \ldots D_{13}$ to $P_3$ are chosen as described above. However, if random bit $b_3=0$, then the amplitudes of the connections from $D_0, D_1, \ldots D_{13}$ to $P_3$ and the threshold of $P_3$ are multiplied by $-1$. This causes $P_3$ to fire when $\eta(UXW, YZ)=0$ and $P_3$ doesn't fire when $\eta(UXW, YZ)=1$.

This cloaking of $P_3$'s firing activity can be coordinated with a meta command based on the value of $b_3$ so that $P_3$'s firing can be appropriately interpreted to dynamically change the active elements and connections that update the tape contents and state after each UTM computational step. This cloaking procedure can also be used for element $P_0$ and random bit $b_0$, $P_1$ and random bit $b_1$, $P_2$ and random bit $b_2$, $P_4$ and random bit $b_4$, and $P_5$ and random bit $b_5$.

Besides representing and computing the program $\eta$ with quantum random firing patterns, there are other important functions computed by active elements executing the UTM. Assume that these connections and the active element firing activity are kept perfectly secret as they represent the state and the tape contents of the UTM tape contents. These functions are described below.

Three active elements (q 0), (q 1) and (q 2) store the current state of the UTM.

There are a collection of elements to represent the tape head location k where k is an integer.

A marker active element $\mathcal{L}$ locates the leftmost tape square and a separate marker active element $\mathcal{R}$ locates the rightmost tape square. Any tape symbols outside these markers are assumed to be blank i.e. 0. If the tape head moves beyond the leftmost tape square, then $\mathcal{L}$'s connection is removed and updated one tape square to the left and the machine is reading a 0. If the tape head moves beyond the rightmost tape square, then $\mathcal{R}$'s connection is removed and updated one tape square to the right and the machine is reading a 0.

There are a collection of elements that represent the tape contents of the UTM. For each tape square k inside the marker elements, there are two elements named (S k) and (T k) whose firing pattern determines the alphabet symbol at tape square k. For example, if elements (S 5) and (T 5) are not firing, then tape square 5 contains alphabet symbol 0. If element (S −7) is firing and element (T −7) is not firing, then tape square −7 contains alphabet symbol 1. If element (S 13) is firing and element (T 13) is firing, then tape square 13 contains alphabet symbol A.

Representing alphabet symbol 0 with two active elements that are not firing is convenient because if the tape head moves beyond the initial tape contents of the UTM, then the Meta command can add two elements that are not firing to represent the contents of the new square.

The copy program can be used to construct important functionality in the UTM. The following program enables a new alphabet symbol to be copied to the tape.

```
(Program copy_symbol (Args s t b0 a0 b1 a1)
    (copy s t b0 a0)
    (copy s t b1 a1)
)
```

The following program enables a new state to be copied.

```
(Program copy_state (Args s t b0 a0 b1 a1 b2 a2)
    (copy s t b0 a0)
    (copy s t b1 a1)
    (copy s t b2 a2)
)
```

The sequence of steps by which the UTM is executed with an AEM are described.

1. Tape contents are initialized and the marker elements L and R are initialized.
2. The tape head is initialized to tape square k=0 and the current machine state is initialized to $q_2$. In other words, (q 0) is not firing (q 1) is firing and (q 2) is not firing.
3. (S k) and (T k) are copied to $a_{in}$, and the current state (q 0), (q 1), (q 2) is copied to $q_{in}$.
4. $\eta(q_{1n}, a_{in})=(q_{out}, a_{out}, m)$ is computed where $q_{out}$ represents the new state, $a_{out}$ represents the new tape symbol and m represents the tape head move.
5. If $q_{out}=h$, then the UTM halts. The AEM reaches a static firing pattern that stores the current tape contents indefinitely and keeps the tape head fixed at tape square k where the UTM halted.
6. Otherwise, the firing pattern of the three elements representing $q_{out}$ are copied to (q 0), (q 1), (q 2). $a_{out}$ is copied to the current tape square represented by (S k), (T k).
7. If m=L, then first determine if the tape head has moved to the left of the tape square marked by $\mathcal{L}$. If so, then have $\mathcal{L}$ remove its current marker and mark tape square k−1. In either case, go back to step 3 where (S k−1) and (T k−1) are copied to $a_{in}$.
8. If m=R, then first determine if the tape head has moved to the right of the tape square marked by $\mathcal{R}$. If so, then have $\mathcal{R}$ remove its current marker and mark tape square k+1. In either case, go back to step 3 where (S k+1) and (T k+1) are copied to $a_{in}$.

Calude and Svozil showed that quantum randomness is Turing incomputable. Since the firing pattern of the active elements $\{A_0, A_1, \ldots A_{14}\}$ computing $\eta_0$; the firing pattern of elements $\{B_0, B_1, \ldots B_{15}\}$ computing $\eta_1$; the firing pattern of elements $\{C_0, C_1, \ldots C_{14}\}$ computing $\eta_2$; the firing pattern of elements $\{D_0, D_1, \ldots D_{13}\}$ computing $\eta_3$; the firing pattern of elements $\{E_0, E_1, \ldots E_{12}\}$ computing $\eta_4$; and the firing pattern of elements $\{F_0, F_1, \ldots F_{13}\}$ computing are all generated from quantum randomness, these firing patterns are Turing incomputable. As a consequence, there does not exist a Turing machine that can map these firing patterns back to the sequence of instructions executed by the universal Turing machine. In summary, these methods demonstrate a new class of computing machines where the purpose of the program's execution is incomprehensible (Turing incomputable) to malware.

Affine Fixed Points

Remark 1.1 Linear Maps as Matrices

The linear maps L and M are represented with matrices in the standard basis.

$$L\begin{pmatrix}x\\y\end{pmatrix}=\begin{pmatrix}a & b\\c & d\end{pmatrix}\begin{pmatrix}x\\y\end{pmatrix} \quad M\begin{pmatrix}x\\y\end{pmatrix}=\begin{pmatrix}h & i\\j & k\end{pmatrix}\begin{pmatrix}x\\y\end{pmatrix}$$

Each affine transformation is of the form $$f\begin{pmatrix}x\\y\end{pmatrix}=L\begin{pmatrix}x\\y\end{pmatrix}+\begin{pmatrix}m\\n\end{pmatrix}$$

where L or $$\begin{pmatrix}a & b\\c & d\end{pmatrix}$$

is called the linear part and $$\begin{pmatrix}m\\n\end{pmatrix}$$

is called the translational part. The unit square with lower left corner at coordinate (j, k) is denoted as $U_{(j,k)}=\{(x,y):j\le x\le j+1$ & $k\le y\le k+1\}$ or it is sometimes represented with the corners of the square [(j, k), (j+1, k), (j+1, k+1), (j, k+1)].

Remark 1.3 Computation of the Composition of the Affine Maps $$g \circ f \begin{pmatrix} x \\ y \end{pmatrix} = \begin{pmatrix} ah+ci & bh+di \\ aj+ck & bj+dk \end{pmatrix} \begin{pmatrix} x \\ y \end{pmatrix} + \begin{pmatrix} mh+ni+p \\ mj+nk+q \end{pmatrix}$$

Definition 1.4 Rectangular Area Preserving Affine Maps

An affine transformation r is called an rectangular area preserving affine transformation if it is of the form $$r \begin{pmatrix} x \\ y \end{pmatrix} = \begin{pmatrix} \frac{1}{A} & 0 \\ 0 & A \end{pmatrix} \begin{pmatrix} x \\ y \end{pmatrix} + \begin{pmatrix} m \\ n \end{pmatrix}$$

for some A>0. In the next section, A is a number of the form $B^k$, where k is an integer and B is an integer greater than 1, and m, n are rational numbers.

Remark 1.5 Rectangular Area Preserving Affine Maps are Closed.

Rectangular area preserving affine maps are closed under function composition. Consider $$r_1 \begin{pmatrix} x \\ y \end{pmatrix} = \begin{pmatrix} \frac{1}{A} & 0 \\ 0 & A \end{pmatrix} \begin{pmatrix} x \\ y \end{pmatrix} + \begin{pmatrix} m \\ n \end{pmatrix} \text{ and}$$

$$r_2 \begin{pmatrix} x \\ y \end{pmatrix} = \begin{pmatrix} \frac{1}{B} & 0 \\ 0 & B \end{pmatrix} \begin{pmatrix} x \\ y \end{pmatrix} + \begin{pmatrix} p \\ q \end{pmatrix}.$$

Then 
$$r_1 \circ r_2 \begin{pmatrix} x \\ y \end{pmatrix} = \begin{pmatrix} \frac{1}{AB} & 0 \\ 0 & AB \end{pmatrix} \begin{pmatrix} x \\ y \end{pmatrix} + \begin{pmatrix} \frac{m}{B}+p \\ nB+q \end{pmatrix}$$
$$= \begin{pmatrix} \frac{1}{AB} & 0 \\ 0 & AB \end{pmatrix} \begin{pmatrix} x \\ y \end{pmatrix} + \begin{pmatrix} \frac{p}{A}+m \\ qA+n \end{pmatrix}$$

Remark 1.6

If $bc+(1-a)(d-1) \neq 0$ then $$f \begin{pmatrix} x \\ y \end{pmatrix} = \begin{pmatrix} a & b \\ c & d \end{pmatrix} \begin{pmatrix} x \\ y \end{pmatrix} + \begin{pmatrix} m \\ n \end{pmatrix}$$

has a fixed point at $$\left( \frac{(d-1)m - bn}{bc+(1-a)(d-1)}, \frac{(a-1)n-cm}{bc+(1-a)(d-1)} \right).$$

Remark 1.7

When $b=c=0$ and $(1-a)(d-1)\neq 0$, then $$f \begin{pmatrix} x \\ y \end{pmatrix} = \begin{pmatrix} a & 0 \\ 0 & d \end{pmatrix} \begin{pmatrix} x \\ y \end{pmatrix} + \begin{pmatrix} m \\ n \end{pmatrix}$$

has a fixed point at $$\left( \frac{m}{1-a}, \frac{n}{1-d} \right).$$

Definition 1.8 Vertical Covers
Consider the rectangular area preserving affine map $$r \begin{pmatrix} x \\ y \end{pmatrix} = \begin{pmatrix} \frac{1}{A} & 0 \\ 0 & A \end{pmatrix} \begin{pmatrix} x \\ y \end{pmatrix} + \begin{pmatrix} m \\ n \end{pmatrix}$$

where A>1 and with square domain W=[(u, v), (u+s, v), (u+s, v+s), (u, v+s)] with sides of length s. r(W) vertically covers W if and only if all four conditions A, B, C and D hold.
1.) The y-coordinate of $r(u, v) \leq v$.
2.) The y-coordinate of $r(u+s, v+s) \geq v+s$.
C. The x-coordinate of $r(u, v) \geq u$.
D. The x-coordinate of $r(u+s, v+s) \leq u+s$.
See FIG. 14.
Remark 1.9 Vertical Cover Fixed Point
When $a=1/A$ and $d=A$ such that $A>1$, then $$r \begin{pmatrix} x \\ y \end{pmatrix} = \begin{pmatrix} \frac{1}{A} & 0 \\ 0 & A \end{pmatrix} \begin{pmatrix} x \\ y \end{pmatrix} + \begin{pmatrix} m \\ n \end{pmatrix}$$

has a fixed point at $$\left( \frac{mA}{A-1}, \frac{n}{1-A} \right).$$

On square W=[(0,0), (s,0), (s,s), (0,s)], the image of affine map r on W is $$r(W) = \left[ (m, n), \left( m+\frac{s}{A}, n \right), \left( m+\frac{s}{A}, n+sA \right), (m, n+sA) \right]$$

which is a rectangle with width $$\frac{s}{A}$$

and height sA.
Definition 1.10 Horizontal Covers
Consider the rectangular area preserving affine map $$r \begin{pmatrix} x \\ y \end{pmatrix} = \begin{pmatrix} A & 0 \\ 0 & \frac{1}{A} \end{pmatrix} \begin{pmatrix} x \\ y \end{pmatrix} + \begin{pmatrix} m \\ n \end{pmatrix}$$

where A>1 and with square domain W=[(u, v), (u+s, v), (u+s, v+s), (u, v+s)] with sides of length s. r(W) horizontally covers W if and only if all four conditions hold:
1.) The x-coordinate of $r(u, v) \leq u$.
2.) The x-coordinate of $r(u+s, v+s) \geq u+s$.
C. The y-coordinate of $r(u, v) \geq v$.
D. The y-coordinate of $r(u+s, v+s) \leq v+s$.

Figure 15:
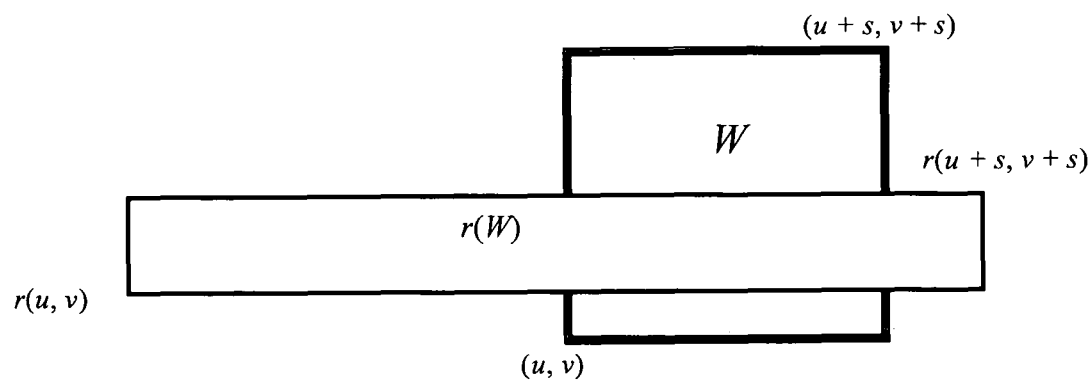
FIG. 15 shows the geometry of a horizontal cover.

See FIG. 15.

Remark 1.11 Horizontal Cover Fixed Point
When a=A and $$d = \frac{1}{A}$$

such that A>1, then $$r\begin{pmatrix} x \\ y \end{pmatrix} = \begin{pmatrix} A & 0 \\ 0 & \frac{1}{A} \end{pmatrix}\begin{pmatrix} x \\ y \end{pmatrix} + \begin{pmatrix} m \\ n \end{pmatrix}$$

has a fixed point $$\left(\frac{m}{1-A}, \frac{nA}{A-1}\right).$$

On square W=[(0, 0), (s, 0), (s, s), (0, s)]

$$r(W) = \left[(m, n)(m+sA, n), \left(m+sA, n+\frac{s}{A}\right), \left(m, n+\frac{s}{A}\right)\right]$$

is a rectangle with width sA and height $$\frac{s}{A}.$$

Figure 16:
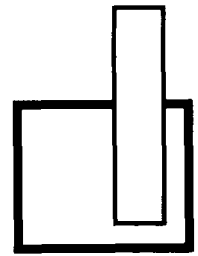
FIG. 16 shows the geometry when the map is not a vertical cover.

Example 1.12

$$r\begin{pmatrix} x \\ y \end{pmatrix} = \begin{pmatrix} 1/2 & 0 \\ 0 & 2 \end{pmatrix}\begin{pmatrix} x \\ y \end{pmatrix} + \begin{pmatrix} \frac{4}{10} \\ \frac{1}{10} \end{pmatrix}$$

with standard unit square $U_{(0, 0)}$. The fixed point $$\left(\frac{8}{10}, \frac{-1}{10}\right)$$

is not in $U_{(0,0)}$. The geometry is shown in FIG. 16.

Theorem 1.13 Vertical Covering Fixed Point Theorem
Consider the rectangular, area-preserving affine map $$r\begin{pmatrix} x \\ y \end{pmatrix} = \begin{pmatrix} \frac{1}{A} & 0 \\ 0 & A \end{pmatrix}\begin{pmatrix} x \\ y \end{pmatrix} + \begin{pmatrix} m \\ n \end{pmatrix}$$

for some A>1 and square W=[(u, v), (u+s, v), (u+s, v+s) (u, v+s)]. Then r(W) vertically covers W if and only if fixed point $$\left(\frac{mA}{A-1}, \frac{n}{1-A}\right)$$

lies in W.

PROOF. Define $$r'\begin{pmatrix} x \\ y \end{pmatrix} = r\begin{pmatrix} x \\ y \end{pmatrix} - \begin{pmatrix} u \\ v \end{pmatrix}$$

to translate W so that W is a square of sides with length s with lower left corner at the origin. Thus, WLOG it can be assumed that the square domain W=[(0, 0), (s, 0), (s, s), (0, s)]. Observe that r(0, 0)=(m, n) and $$r(s, s) = \left(m + \frac{s}{A}, n + sA\right).$$

Figure 17:
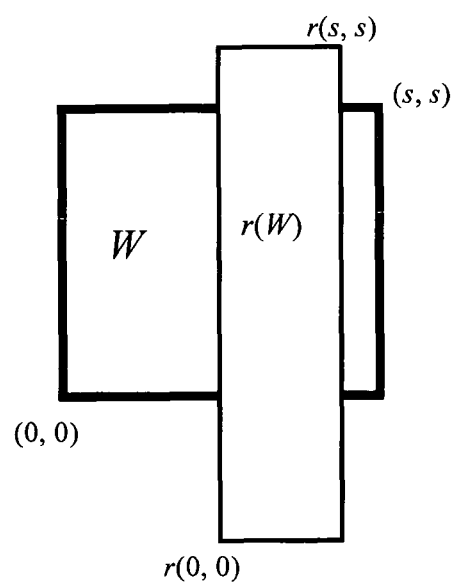
FIG. 17 shows the geometry of a vertical cover for the Vertical Covering Fixed Point Theorem in 1.13.

See FIG. 17. Hence,

1.) The y-coordinate of r(0, 0)=n
2.) The y-coordinate of r(s, s)=n+sA
3.) The x-coordinate of r(0, 0)=m
4.) The x-coordinate of $$r(s, s) = m + \frac{s}{A} (\Leftrightarrow)\left(\frac{mA}{A-1}, \frac{n}{1-A}\right)$$

lies in W if and only if $$0 \le \frac{n}{1-A} \le s \text{ AND } 0 \le \frac{mA}{A-1} \le s$$

if and only if [n≤0 AND n≥(1−A)s] AND [0≤mA≤(A−1)s] if and only if $$[n \le 0 \text{ AND } n + sA \ge s] \text{ AND } \left[0 \le m \text{ AND } m + \frac{s}{A} \le s\right]$$

if and only if [The y-coordinate of r(0, 0)≤0] AND [the y-coordinate of r(s, s)≤s] AND [the x-coordinate of r(0, 0)≥0] AND [the x-coordinate of r(s, s)≤s]

Theorem 1.14 Horizontal Covering Fixed Point Theorem
Consider the rectangular, area-preserving affine map $$r\begin{pmatrix} x \\ y \end{pmatrix} = \begin{pmatrix} A & 0 \\ 0 & \frac{1}{A} \end{pmatrix}\begin{pmatrix} x \\ y \end{pmatrix} + \begin{pmatrix} m \\ n \end{pmatrix}$$

for some A>1 and square W=[(u, v), (u+s, v), (u+s, v+s) (u, v+s)].

Then r(W) horizontally covers W if and only if fixed point $$\left(\frac{m}{1-A}, \frac{nA}{A-1}\right)$$

lies in W.

PROOF. Define $$r'\begin{pmatrix}x\\y\end{pmatrix} = r\begin{pmatrix}x\\y\end{pmatrix} - \begin{pmatrix}u\\v\end{pmatrix}$$

to translate W so that W is the square with lower left corner at the origin. Thus, WLOG it can be assumed that W=[(0, 0), (s, 0), (s, s), (0, s)].
Observe r(0, 0)=(m, n) and $$r(s, s) = \left(m + sA, n + \frac{s}{A}\right).$$

Figure 18:
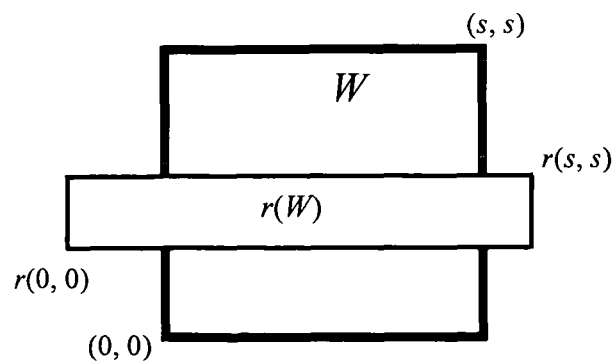
FIG. 18 shows the geometry of a horizontal cover for the Horizontal Covering Fixed Point Theorem in 1.14.

See FIG. 18.
Hence,
1.) The x-coordinate of r(0, 0)=m
2.) The x-coordinate of r(s, s)=m+sA
3.) The y-coordinate of r(0, 0)=n
4.) The y-coordinate of $$r(s, s) = n + \frac{s}{A} (\Leftrightarrow) \left(\frac{m}{1-A}, \frac{nA}{A-1}\right)$$

lies in W if and only if $$0 \le \frac{m}{1-A} \le s \text{ and } 0 \le \frac{nA}{A-1} \le s$$

if and only if [m≤0 AND m≥A)s] and [0≤nA≤(A−1)s] if and only if $$[m \le 0 \text{ AND } m + sA \ge s] \text{ and } \left[0 \le n \text{ AND } n + \frac{s}{A} \le s\right]$$

if and only if [The x-coordinate of r(0, 0)≤0] AND [the x-coordinate of r(s, s)≥s]
AND [the y-coordinate of r(0, 0)≥0] AND [the y-coordinate of r(s, s)≤s].

Turing Machine and Affine Map Correspondence
Definition 2.1 Turing Machine
A Turing machine is a triple (Q, A, η) where
There is a unique state h, called the halt state.
Q is a finite set of states that does not contain the halt state h. The states are represented as Q={$q_1$, $q_2$, ... $q_K$} or as the natural numbers Q={2, ..., K} and the halt state as 1. Before machine execution begins, there is a starting state s and s is an element of Q.
L and R are special symbols that instruct the machine to advance to the left square or to the right square on the tape T.
A is a finite set of alphabet symbols that are read from and written to the tape. The alphabet symbols are denoted as A={$a_1$, $a_2$, ..., $a_J$} or as the natural numbers A={1, 2, ..., J}. A does not contain the symbols L, R.
η is a function where η: Q×A→(Q∪{h})×A×{L, R}.
The η function acts as the program for the Turing machine in the following manner. For each q in Q and a in A, the expression η(q, a)=(r, β, x) describes how machine (Q, A, η) executes one computational step. When in state q and scanning alphabet symbol a on the tape:

1.) Machine (Q, A, η) changes to state r.
2.) Machine (Q, A, η) rewrites alphabet symbol a as symbol β on the tape.
3.) If x=L, then machine (Q, A, η) moves its tape head one square to the left on the tape and is subsequently scanning the symbol in this square.
4.) If x=R, then machine (Q, A, η) moves its tape head one square to the right on the tape and is subsequently scanning the symbol in this square.
5.) If r=h, machine (Q, A, η) enters the halting state h, and the machine stops (halts).

Definition 2.2 Turing Machine Tape
The Turing machine tape T is represented as a function T: Z→A where Z denotes the integers. The tape T is M-bounded if there exists a bound M>0 such that for T(k)=T(j) whenever |j|, |k|>M. (In some cases, the blank symbol # is used and T(k)=# when |k|>M) The symbol on the kth square of the tape is denoted as $T_k$. Here we do not assume the tape is M-bounded unless it is explicitly stated for particular cases.

Definition 2.3 Turing Machine Configuration with Tape Head Location
Let (Q, A, η) be a Turing machine with tape T. A configuration is an element of the set $C$ =(Q∪{h})×Z×{T: T is tape with range A}. The standard definition of a Turing machine assumes the initial tape is M-bounded and the tape contains only blank symbols, denoted as #, outside the bound.
If (q, k, T) is a configuration in $C$, then k is called the tape head location. The tape head location is M-bounded if there exists a natural number M>0 such that the tape head location k satisfies |k|≤M. A configuration whose first coordinate equals h is called a halted configuration. The set of non-halting configurations is $N$ ={(q, k, T)∈$C$ : q≠h}
The purpose of the definition of a configuration is that the first coordinate stores the current state of the Turing machine, the third coordinate stores the contents of the tape, and the second coordinate stores the location of the tape head on the tape. Before presenting some examples of configurations, it is noted that there are different methods to describe the tape contents. One method is $$T(k) = \begin{cases} \alpha_k & \text{if } l \le k \le n \\ \# & \text{otherwise} \end{cases}.$$

This is a max{|l|, |n|}-bounded tape. Another convenient representation is to list the tape contents and underline the symbol to indicate the location of the tape head. ( ... ##αβ## ... ).
A diagram can also represent the tape, tape head location, and the configuration (q, k, T). See FIG. 19.
Example 2.4
Turing Machine Configuration
Consider configuration (p, 2, ... ##αβ## ... ). The first coordinate indicates that the Turing machine is in state p. The second coordinate indicates that its tape head is currently scanning tape square 2, denoted as $T_2$ or T(2). The third coordinate indicates that tape square 1 contains symbol α, tape square 2 contains symbol β, and all other tape squares contain the # symbol.
Example 2.5
Halt Configuration Represented as Natural Numbers
A second example of a configuration is (1, 6, ... 1111 233111 ... ). This configuration is a halted configuration. The first coordinate indicates that the machine is in halt state 1. The second coordinate indicates that the tape head is scanning tape square 6. The underlined 2 in the third coordinate indicates that the tape head is currently scanning a 2. In other words, T(6)=2, T(7)=3, T(8)=3, and T(k)=1 when k<6 OR k>8.

Definition 2.6 Turing Machine Computational Step

Consider machine $(Q, A, \eta)$ with configuration $(q, k, T)$ such that $T(k)=\alpha$. After the execution of one computational step, the new configuration is one of the three cases such that for all three cases $S(k)=\beta$ and $S(j)=T(j)$ whenever $j \neq k$:

Case I. $(r, k-1, 5)$ if $\eta(q, \alpha)=(r, \beta, L)$.
Case II. $(r, k+1, S)$ if $\eta(q, \alpha)=(r, \beta, R)$.
Case III. $(h, k, 7)$. In this case, the machine execution stops (halts).

If the machine is currently in configuration $(q_0, k_0, T_0)$ and over the next n steps the sequence of machine configurations (points) is $(q_0, k_0, T_0), (q_n, k_n, T_n), \ldots, (q_n, k_n, T_n)$ then this execution sequence is sometimes called the next n+1 computational steps.

If Turing machine $(Q, A, \eta)$ with initial configuration $(s, k, T)$ reaches the halt state h after a finite number of execution steps, then the machine execution halts. Otherwise, it is said that the machine execution is immortal on initial configuration $(s, k, T)$.

The program symbol $\eta$ induces a map $\eta: \mathcal{N} \to \mathcal{C}$ where $\eta(q, k, T)=(r, k-1, S)$ when $\eta(q, \alpha)=(r, \beta, L)$ and $\eta(q, k, T)=(r, k+1, S)$ when $\eta(q, \alpha)=(r, \beta, R)$.

Definition 2.7 Turing Program Length

The program length is the number of elements in the domain of $\eta$. The program length is denoted as $|\eta|$. Observe that $|\eta|=|Q \times A|=|Q||A|$. Note that in [7] and [32], they omit quintuples $(q, a, r, b, x)$ when r is the halting state. In our representation, $\eta(q, a)=(1, b, x)$ or $\eta(q, a)=(h, b, x)$.

Definition 2.8 Tape Head glb $\mathcal{L}$, lub $\mathcal{U}$, Window of Execution $[\mathcal{L}, \mathcal{U}]$

Suppose a Turing machine begins or continues its execution with tape head at tape square k. During the next N computational steps, the greatest lower bound $\mathcal{L}$ of the tape head is the left most (smallest integer) tape square that the tape head visits during these N computational steps; and the least upper bound $\mathcal{U}$ of the tape head is the right most (largest integer) tape square that the tape head visits during these N computational steps. The window of execution denoted as $[\mathcal{L}, \mathcal{U}]$ or $[\mathcal{L}, \mathcal{L}+1, \ldots, \mathcal{U}-1, \mathcal{U}]$ is the sequence of integers representing the tape squares that the tape head visited during these N computational steps. The length of the window of execution is $\mathcal{U} - \mathcal{L} +1$ which is also the number of distinct tape squares visited by the tape head during these N steps. To express the window of execution for the next n computational steps, the lower and upper bounds are expressed as a function of n: $[\mathcal{L}(n), \mathcal{U}(n)]$.

Example 2.9

$Q=\{q, r, s, t, u, v, w, x\}$. $A=\{1, 2\}$. Halting State=h

Remark 2.10 If $j \leq k$, then $[\mathcal{L}(j), \mathcal{U}(j)] \subseteq [\mathcal{L}(k), \mathcal{U}(k)]$ This follows immediately from the definition of the window of execution.

Since the tape squares may be renumbered without changing the results of the machine execution, for convenience it is often assumed that the machine starts execution at tape square 0. In example 2.9, during the next 8 computational steps—one cycle of the immortal periodic point—the window of execution is [0, 6]. The length of the window of execution is 7: Observe that if the tape squares are renumbered and the goal is to refer to two different windows of execution, for example $[\mathcal{L}(j), \mathcal{U}(j)]$ and $[\mathcal{L}(k), \mathcal{U}(k)]$, then both windows are renumbered with the same relative offset so that the two windows can be compared.

Definition 2.11 Value Function and Base

Suppose the alphabet $A=\{a_1, a_2, \ldots, a_J\}$ and the states are $Q=\{q_1, q_2, \ldots q_K\}$. Define the symbol value function v: $A \cup Q \cup \{h\} \to N$ where N denotes the natural numbers. $v(h)=0$. $v(a_k)=k$. $v(q_k)=k+|A|$. $v(q_K)=|Q|+|A|$. Choose the number base $B=|Q|+|A|+1$. Observe that $0 \leq v(x) < B$ and that each symbol chosen from $A \cup Q \cup \{h\}$ has a unique value in base B.

Definition 2.12 Turing Machine Program Isomorphism

Two Turing machines $M_1(Q_1, A_1, \eta_1)$ and $M_2(Q_2, A_2, \eta_2)$ have a program isomorphism denoted as $\Psi: M_1 \to M_2$ if A. There is a function $\phi: Q_1 \to Q_2$ that is a bijection.
B. There is a function $\gamma: A_1 \to A_2$ that is a bijection.
C. There is a function $\Psi: M_1 \to M_2$ such that for each pair $(q, a)$ in $Q_1 \times A_1$ $\Psi(\eta_1(q, a))=\eta_2(\phi(q), \gamma(a))$

Remark 2.13 If alphabet $A=\{a\}$, then the halting behavior of the Turing machine is completely determined in $\leq |Q|+1$ execution steps.

PROOF. Suppose $Q=\{q_1, q_2, \ldots q_K\}$. Observe that the program length is $|\eta|=|Q|$. Also, after an execution step every tape symbol on the tape must be a. Consider the possible execution steps: $\eta(q_{S(1)}, a) \to \eta(q_{S(2)}, a) \to \eta(q_{S(3)}, a) \ldots \to \eta(q_{S(K+1)}, a)$. If the program execution does not halt in these $|Q|+1$ steps, then $S(i)=S(j)$ for some $i \neq j$; and the tape contents are still all a's. Thus, the program will exhibit periodic behavior whereby it will execute $\eta(q_{S(i)}, a) \to \ldots \to \eta(q_{S(j)}, a)$ indefinitely. If the program does not halt in $|Q|+1$ execution steps, then the program will never halt.

As a result of Remark 2.13, from now on, it is assumed that $|A| \geq 2$. Further, since at least one state is needed, then from here on, it is assumed that the base $B \geq 3$.

Definition 2.14 Turing Machine Configuration to x-y plane P correspondence. See FIG. 19. For a fixed machine $(Q, A, \eta)$, each configuration $(q, k, T)$ represents a unique point $(x, y)$ in P. The coordinate functions x: $\mathcal{C} \to P$ and y: $\mathcal{C} \to P$, where $\mathcal{C}$ is the set of configurations, are $x(q, k, T)=T_k T_{k+1} \cdot T_{k+2} T_{k+3} T_{k+4} \ldots$ where this decimal sequence in base B represents the real number

| | | | |
|---|---|---|---|
| $\eta(q, 1) = (r, 1, R)$. | $\eta(q, 2) = (h, 2, R)$. | $\eta(r, 1) = (h, 1, R)$. | $\eta(r, 2) = (s, 2, R)$. |
| $\eta(s, 1) = (t, 1, R)$. | $\eta(s, 2) = (h, 2, R)$. | $\eta(t, 1) = (h, 1, R)$. | $\eta(t, 2) = (u, 2, R)$. |
| $\eta(u, 1) = (h, 1, R)$. | $\eta(u, 2) = (v, 1, R)$. | $\eta(v, 1) = (h, 1, R)$. | $\eta(v, 2) = (w, 2, R)$. |
| $\eta(w, 1) = (h, 1, R)$. | $\eta(w, 2) = (x, 1, L)$. | $\eta(x, 1) = (h, 1, R)$. | $\eta(x, 2) = (q, 2, R)$. |
| Left pattern = 12. | Spanning Middle Pattern = 121 2212. | | Right pattern = 212. |

The machine execution steps are shown in FIG. 20 with tape head initially at square 1. The tape head location is underlined. The tape head moves are $\{R^6LR\}^n$. The point $p=[q, \overline{12\langle 1 \rangle 212222}]$ is an immortal periodic point with period 8 and hyperbolic degree 6.

$$Bv(T_k) + v(T_{k+1}) + \sum_{j=1}^{x} v(T_{k+j+1})B^{-j} y(q, k, T) = qT_{k-1} \cdot T_{k-2}T_{k-3}T_{k-4} \ldots$$

where this decimal sequence in base B represents a real number as $$Bv(q) + v(T_{k-1}) + \sum_{j=1}^{\infty} v(T_{k-j-1})B^{-j}$$

Define function $\phi: \mathcal{C} \to P$ as $\phi(q, k, T)$ $(x(q, k, T), y(q, k, T))$. $\phi$ is the function that maps machine configurations into points into the plane P.

Definition 2.15 Equivalent Configurations

With respect to Turing machine $(Q, A, \eta)$, the two configurations $(q, k, T)$ and $(q, j, V)$ are equivalent [i.e. $(q, k, T) \sim (q, j, V)$] if $T(m) = V(m+j-k)$ for every integer m. Observe that $\sim$ is an equivalence relation on $\mathcal{C}$. Let $\mathcal{C}'$ denote the set of equivalence classes $[(q, k, T)]$ on $\mathcal{C}$ Also observe that $\phi$ maps every configuration in equivalence class $[(q, k, T)]$ to the same ordered pair of real numbers in P. Recall that $(D, X)$ is a metric space if the following three conditions hold.

1. $D(a, b) \geq 0$ for all a, b in X where equality holds if and only if $a=b$.
2. $D(a, b) = D(b, a)$ for all a, b. (Symmetric)
3. $D(a, b) = D(a, c) + D(c, b)$ for all a, b, c in X. (Triangle inequality.)

$(\rho, \mathcal{C}')$ is a metric space where $\rho$ is induced via $\phi$ by the Euclidean metric in P. Consider points $p_1$, $p_2$ in P with $p = (x_1, y_1)$ and $p_2 = (x_2, y_2)$ where $(d, P)$ is a metric space with Euclidean metric $d(p_1, P_2) = \sqrt{(x_1 - x_2)^2 + (y_1 - y_2)^2}$
Let $u = [(q, k, S)]$, $w = [(r, l, T)]$ be elements of $\mathcal{C}'$. Define $\rho: \mathcal{C}' \times \mathcal{C}' \to R$ as $\rho(u, w) = d(\phi(u),$ $$\varphi(w)) = \sqrt{[x(q, k, S) - x(r, l, T)]^2 + [y(r, l, T)]^2}$$

The symmetric property and the triangle inequality hold for $\rho$ because d is a metric. In regard to property (i), $\rho(u, w) \geq 0$ because d is a metric. The additional condition that $\rho(u, w) = 0$ if and only if $u = w$ holds because d is a metric and because the equivalence relation—collapses non-equal equivalent configurations (i.e. two configurations in the same state but with different tape head locations and with all corresponding symbols on their respective tapes being equal) into the same point in $\mathcal{C}'$.

The unit square $U_{(\lfloor x \rfloor, \lfloor y \rfloor)}$ has a lower left corner with coordinates $(\lfloor x \rfloor, \lfloor y \rfloor)$ where $\lfloor x \rfloor = Bv(T_k) + v(T_{k+1})$ and $\lfloor y \rfloor = Bv(q) + v(T_{k-1})$. See FIG. 21.

Definition 2.16 Left Affine Function

Figure 22:
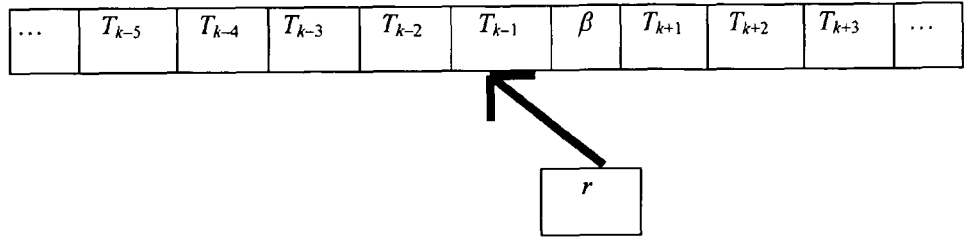
FIG. 22 shows a Turing machine computational step that corresponds to one iteration of a corresponding left affine function (2.16).

This is for case I. where $\eta(q, T_k) = (r, \beta, L)$. See FIG. 22.

$$x \mapsto T_{k-1}\beta \cdot T_{k+1}T_{k+2}T_{k+3}\ldots$$

$$B^{-1}x = T_k \cdot T_{k+1}T_{k+2}T_{k+3}T_{k+4}$$

Thus, $m = T_{k-1}\beta - T_k$ where the subtraction of integers is in base B.

$$y \mapsto rT_{k-2} \cdot T_{k-3}T_{k-4}T_{k-5}\ldots$$

$$By = qT_{k-1}T_{k-2} \cdot T_{k-3}T_{k-4}T_{k-5}\ldots$$

Thus, $n = rT_{k-2} - qT_{k-1}T_{k-2}$ where the subtraction of integers is in base B.

Define the left affine function $F_{(\lfloor x \rfloor, \lfloor y \rfloor)}: U_{(\lfloor x \rfloor, \lfloor y \rfloor)} \to P$ where $$F_{(\lfloor x \rfloor, \lfloor y \rfloor)}\begin{pmatrix} x \\ y \end{pmatrix} = \begin{pmatrix} \frac{1}{B} & 0 \\ 0 & B \end{pmatrix}\begin{pmatrix} x \\ y \end{pmatrix} + \begin{pmatrix} m \\ n \end{pmatrix},$$

$m = Bv(T_{k-1}) + v(\beta) - v(Tk)$ and $n = Bv(r) - B^2v(q) - Bv(T_{k-1})$.

Lemma 2.17 Left Affine Function ⇔ Turing Machine Computational Step

Let $(q, k, T)$ be a Turing machine configuration. Suppose $\eta(q, T_k) = (r, b, L)$ for some state r in $Q \cup \{h\}$ and some alphabet symbol b in A and where $T_k = a$. Consider the next Turing Machine computational step. The new configuration is $(r, k-1, T^b)$ where $T^b(j) = T(j)$ for every $j \neq k$ and $T^b(k) = b$. The commutative diagram $\phi\eta(q, k, T) = F_{(\lfloor x \rfloor, \lfloor y \rfloor)} \phi(q, k, T)$ holds. In other words, $F_{(\lfloor x \rfloor, \lfloor y \rfloor)}[x(q, k, T), y(q, k, T)] = [x(r, k-1, T^b), y(r, k-1, T^b)]$.

PROOF. $x(r, k-1, T^b) = T_{k-1}b \cdot T_{k+1} T_{k+2} \ldots$
The x coordinate of $$F_{(\lfloor x \rfloor, \lfloor y \rfloor)}[x(q, k, T), y(q, k, T)] = B^{-1}x(q, k, T) + Bv(T_{k-1}) + v(b) - v(a)$$
$$= B^{-1}(aT_{k+1} \cdot T_{k+2}T_{k+3}\ldots) + Bv(T_{k-1}) + v(b) - v(a)$$
$$= a \cdot T_{k+1}T_{k+2}T_{k+3}\ldots + Bv(T_{k-1}) + v(b) - v(a)$$
$$= T_{k-1}b \cdot T_{k+1}T_{k+2}T_{k+3}\ldots$$

$$y(r, k-1, T^b) = rT_{k-2} \cdot T_{k-3}T_{k-4}\ldots$$

The y coordinate of $$F_{(\lfloor x \rfloor, \lfloor y \rfloor)}[x(q, k, T), y(q, k, T)] = By(q, k, T) + Bv(r) - B^2v(q) - Bv(T_{k-1}).$$
$$= B(qT_{k-1} \cdot T_{k-2}T_{k-3}\ldots) + Bv(r) - B^2v(q) - Bv(T_{k-1}).$$
$$= qT_{k-1}T_{k-2} \cdot T_{k-3}\ldots + Bv(r) - B^2v(q) - Bv(T_{k-1}).$$
$$= rT_{k-2} \cdot T_{k-3}T_{k-4}\ldots$$
$$= y(r, k-1, T^b).$$

Remark 2.18 Minimum vertical translation for left affine function As in 2.16, n is the vertical translation. $|Bv(r) - Bv(T_{k-1})| = B|v(r) - v(T_{k-1})| \leq B(B-1)$. Since q is a state, $v(q) \geq (|A|+1)$. This implies $|-B^2v(q)| \geq (|A|+1)B^2$ This implies that $|n| \geq (|A|+1)B^2 - B(B-1) \geq |A|B^2 + B$.
Thus, $|n| \geq |A|B^2 + B$.

Definition 2.19 Right Affine Function

Figure 23:
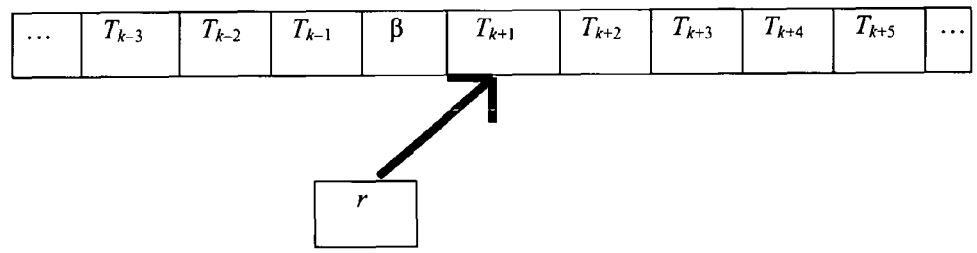
FIG. 23 shows a Turing machine computational step that corresponds to one iteration of a right affine function (2.19)

This is for case II. where $\eta(q, T_k) = (r, \beta, R)$. See FIG. 23.

$$x \mapsto T_{k+1}T_{k+2} \cdot T_{k+3}T_{k+4}\ldots$$

$$Bx = T_kT_{k+1} \cdot T_{k+2}T_{k+3}T_{k+4}\ldots$$

Thus, $m = T_{k+1}T_{k+2} - T_kT_{k+1}T_{k+2}$ where the subtraction of integers is in base B.

$$y \mapsto r\beta \cdot T_{k-1}T_{k-2}T_{k-3}\ldots$$

$$B^{-1}y = q \cdot T_{k-1}T_{k-2}T_{k-3}\ldots$$

Thus, $n = r\beta - q$ where the subtraction of integers is in base B.
Define the right affine function $G_{(\lfloor x \rfloor, \lfloor y \rfloor)}: U_{(\lfloor x \rfloor, \lfloor y \rfloor)} \to P$ such that $$g_{(\lfloor x \rfloor, \lfloor y \rfloor)}\begin{pmatrix} x \\ y \end{pmatrix} = \begin{pmatrix} B & 0 \\ 0 & \frac{1}{B} \end{pmatrix}\begin{pmatrix} x \\ y \end{pmatrix} + \begin{pmatrix} m \\ n \end{pmatrix}$$

where $m = -B^2v(T_k)$ and $n = Bv(r) + v(\beta) - v(q)$.

Lemma 2.20 Right Affine Function⇔Turing Machine Computational Step

Let (q, k, T) be a Turing machine configuration. Suppose $\eta(q, T_k)=(r, b, R)$ for some state r in $Q \cup \{h\}$ and some alphabet symbol b in A and where $T_k=a$. Consider the next Turing Machine computational step. The new configuration is (r, k+1, $T^b$) where $T^b(j)=T(j)$ for every $j \neq k$ and $T^b(k)=b$. The commutative diagram $\eta(q, k, T)=G_{([x], [y])}\phi(q, k, T)$ holds.

In other words, $G_{([x], [y])}[x(q, k, T), y(q, k, T)]=[x(r, k+1, T^b), y(r, k+1, T^b)]$.

PROOF. From $\eta(q, T_k)=(r, b, R)$, it follows that $x(r, k+1, T^b)=T_{k+1} T_{k+2} \cdot T_{k+3} T_{k+4} \cdots$ The x coordinate of $$G_{([x],[y])}[x(q, k, T), y(q, k, T)] = Bx(q, k, T) - B^2 v(a)$$
$$= B(aT_{k+1} \cdot T_{k+2} T_{k+3} T_{k+4} \cdots ) - B^2 v(a)$$
$$= aT_{k+1} T_{k+2} \cdot T_{k+3} T_{k+4} \cdots - B^2 v(a)$$
$$= T_{k+1} T_{k+2} \cdot T_{k+3} T_{k+4}$$
$$= x(r, k+1, T^b)$$

From $\eta(q, T_k)=(r, b, R)$, it follows that $y(r, k+1, T^b)=rb \cdot T_{k-1} T_{k-2} T_{k-3} \cdots$ The y coordinate of $$G_{([x],[y])}[x(q, k, T), y(q, k, T)] = B^{-1} y(q, k, T) + Bv(r) + v(b) - v(q)$$
$$= B^{-1}(qT_{k-1} \cdot T_{k-2} T_{k-3} \cdots ) + Bv(r) + v(b) - v(q)$$
$$= q \cdot T_{k-1} T_{k-2} T_{k-3} \cdots + Bv(r) + v(b) - v(q)$$
$$= rb \cdot T_{k-1} T_{k-2} T_{k-3} \cdots$$
$$= y(r, k+1, T^b).$$

Remark 2.21 Minimum vertical translation for right affine function First, $$|v(\beta) - v(q)| \leq B - 1.$$
$$|n| = |Bv(r) + v(\beta) - v(q)|$$
$$\geq Bv(r) - (B - 1)$$
$$\geq (|A| + 1)B - (B - 1)$$

because
$$v(r) \geq |A| + 1$$
$$= |A|B + 1.$$

Thus, $|n| \geq |A|B+1$.

Definition 2.22 Function Index Sequence and Function Sequence

Let $\{f_1, f_2, \ldots, f_I\}$ be a set of functions such that each function $f_k: X \to X$. Then a function index sequence is a function $S: N \to \{1, 2, \ldots I\}$ that indicates the order in which the functions $\{f_1, f_2, \ldots, f_I\}$ are applied. If p is a point in X, then the orbit with respect to this function index sequence is [p, $f_{S(1)}(p), f_{S(2)}f_{S(1)}(p), \ldots, f_{S(m)}f_{S(m-1)} \cdots f_{S(2)}f_{S(1)}(p), \ldots$]. Square brackets indicate that the order matters. Sometimes the first few functions will be listed in a function sequence when it is periodic. For example, $[f_0, f_1, f_0, f_1, \ldots]$ is written when formally this function index sequence is $S: N \to \{0, 1\}$ where $S(n)=n \mod 2$.

Example 2.23

$$f\begin{pmatrix} x \\ y \end{pmatrix} = \begin{pmatrix} \frac{1}{4} & 0 \\ 0 & 4 \end{pmatrix}\begin{pmatrix} x \\ y \end{pmatrix} + \begin{pmatrix} 4 \\ 0 \end{pmatrix}$$

on domain $U_{(0, 0)}$ and $$g\begin{pmatrix} x \\ y \end{pmatrix} = \begin{pmatrix} \frac{1}{4} & 0 \\ 0 & 4 \end{pmatrix}\begin{pmatrix} x \\ y \end{pmatrix} + \begin{pmatrix} -1 \\ 0 \end{pmatrix}$$

on $U_{(4, 0)}$ $$g \circ f\begin{pmatrix} x \\ y \end{pmatrix} = \begin{pmatrix} \frac{1}{16} & 0 \\ 0 & 16 \end{pmatrix}\begin{pmatrix} x \\ y \end{pmatrix} + \begin{pmatrix} 0 \\ 0 \end{pmatrix} \text{ and}$$

$$f\begin{pmatrix} 0 \\ 0 \end{pmatrix} = \begin{pmatrix} 4 \\ 0 \end{pmatrix} \quad f\begin{pmatrix} 1 \\ 0 \end{pmatrix} = \begin{pmatrix} 4.25 \\ 0 \end{pmatrix} \quad f\begin{pmatrix} 0 \\ 1 \end{pmatrix} = \begin{pmatrix} 4 \\ 1 \end{pmatrix}$$

(0, 0) is a fixed point of gf. The orbit of point p chosen from the horizontal segment connected by the points (0, 0) and (1,0) with respect to the function sequence [f, g, f, g, ...] is a subset of $U_{(0, 0)} \cup U_{(4, 0)}$. The point p is called an immortal point. The orbit of a point Q outside this segment exits (halts) $U_{(0,0)} \cup U_{(4, 0)}$.

Definition 2.24 Halting and Immortal Orbits in the Plane.

Let P denote the two dimensional x,y plane. Suppose $f_k: U_k \to P$ is a function for each k such that whenever $j \neq k$, then $U_j \cap U_k = \emptyset$. For any point p in the plane P an orbit may be generated as follows. The $0^{th}$ iterate of the orbit is p. Given the kth iterate of the orbit is point q, if point q does not lie in any $U_k$, then the orbit halts. Otherwise, q lies in at least one $U_j$. Inductively, the k+1 iterate of q is defined as $f_j(q)$. If p has an orbit that never halts, this orbit is called an immortal orbit and p is called an immortal point. If p has an orbit that halts, this orbit is called a halting orbit and p is called a halting point.

Theorem 2.25 Turing Machine Execution⇔ Affine Map Orbit Halting/Immortal Orbit Correspondence Theorem Consider Turing machine (Q, A, $\eta$) with initial tape configuration (s, 0, T). W.L.O.G., it is assumed that the machine begins executing with the tape head at zero. Let $f_1, f_2, \ldots, f_I$ denote the I affine functions with corresponding unit square domains $W_1, W_2, W_3, \ldots, W_i$ determined from 2.14, 2.15, 2.16 and 2.19. Let $p=(x(s, 0, T), y(s, 0, T))$. Then from 2.14, $$x(s, 0, T) = Bv(T_0) + v(T_1) + \sum_{j=1}^{\infty} v(T_{j+1}) B^{-j}.$$

Also, $$y(s, 0, T) = Bv(s) + v(T_{-1}) + \sum_{j=1}^{\infty} v(T_{-j-1}) B^{-j}.$$

There is a 1 to 1 correspondence between the mth point of the orbit $$[p, f_{S(1)}(p), f_{S(2)}f_{S(1)}(p), \ldots, f_{S(m)}f_{S(m-1)} \cdots f_{S(2)}f_{S(1)}(p), \ldots] \subseteq \bigcup_{k=1}^{I} W_k$$

and the mth computational step of the Turing machine $(Q, A, \eta)$ with initial configuration $(s, 0, T)$. In particular, the Turing Machine halts on initial configuration $(s, 0, T)$ if and only if p is a halting point with respect to affine functions $f_k: W_k \to P$ where $1 \le k \le I$. Dually, the Turing Machine is immortal on initial configuration $(s, 0, T)$ if and only if p is an immortal point with respect to affine functions $f_k: W_k \to P$ where $1 \le k \ge I$.

PROOF. From lemmas 2.17, 2.20, definition 2.14 and remark 2.15, every computational step of $(Q, A, \eta)$ on current configuration $(q, k, T')$ corresponds to the application of one of the unique affine maps $f_k$, uniquely determined by remark 2.15 and definitions 2.16, 2.19 on the corresponding point $p=[x(r, k, T'), y(r, k, T')]$. Thus by induction, the correspondence holds for all n if the initial configuration $(s, 0, T)$ is an immortal configuration which implies that $[x(s, 0, T), y(s, 0, T)]$ is an immortal point. Similarly, if the initial configuration $(s, 0, T)$ is a halting configuration, then the machine $(Q, A, \eta)$ on $(s, 0, T)$ halts after N computational steps. For each step, the correspondence implies that the orbit of initial point $p_0 = [x(s, 0, T), y(s, 0, T)]$ exits $$\bigcup_{k=1}^{I} W_k$$

on the Nth iteration of the orbit. Thus, $p_0$ is a halting point.

Corollary 2.26 Immortal Periodic Points, Induced by Configurations, Correspond to Equivalent Configurations that are Immortal Periodic.

PROOF. Suppose $p=[x(q, k, T), y(q, k, T)]$ with respect to $(Q, A, \eta)$ and p lies in $$\bigcup_{k=1}^{I} W_k$$

such that $f_{S(N)}f_{S(N-1)} \cdots f_{S(1)}(p)=p$. Starting with configuration $(q, k, T)$, after N execution steps of $(Q, A, \eta)$, the resulting configuration $(q, j, V)$ satisfies $x(q, k, T)=x(q, j, V)$ and $y(q, k, T)=y(q, j, V)$ because of $f_{S(N)}f_{S(N-1)} \cdots f_{S(1)}(p)=p$ and Theorem 2.25. This implies that $(q, k, T)$ is translation equivalent to $(q, j, V)$.

By induction this argument may be repeated indefinitely. Thus, $(q, k, T)$ is an immortal configuration such that for every N computational steps of $(Q, A, \eta)$, the kth resulting configuration $(q, j_k, V_k)$ is translation equivalent to $(q, k, T)$.

Corollary 2.27 Immortal Periodic Points, Induced by Configurations, Correspond to Equivalent Configurations that are Immortal Periodic.

PROOF. Suppose $p=[x(q, k, T), y(q, k, T)]$ with respect to $(Q, A, \eta)$ and p lies in $$\bigcup_{k=1}^{I} W_k$$

such that $f_{S(N)}f_{S(N-1)} \cdots f_{S(1)}(p)=p$. Starting with configuration $(q, k, T)$, after N execution steps of $(Q, A, \eta)$, the resulting configuration $(q, j, V)$ satisfies $x(q, k, T)=x(q, j, V)$ and $y(q, k, T)=y(q, j, V)$ because of $f_{S(N)}f_{S(N-1)} \cdots f_{S(1)}(p)=p$ and Theorem 2.25. This implies that $(q, k, T)$ is translation equivalent to $(q, j, V)$.

By induction this argument may be repeated indefinitely. Thus, $(q, k, T)$ is an immortal configuration such that for every N computational steps of $(Q, A, \eta)$, the kth resulting configuration $(q, j_k, V_k)$ is translation equivalent to $(q, k, T)$.

Lemma 2.28 Two affine functions with adjacent unit squares as their respective domains are either both right affine or both left affine functions. (Adjacent unit squares have lower left x and y coordinates that differ at most by 1. It is assumed that $|Q| \ge 2$, since any Turing program with only one state has a trivial halting behavior that can be determined in $|A|$ execution steps when the tape is bounded.)

PROOF. The unit square $U_{(\lfloor x \rfloor, \lfloor y \rfloor)}$ has a lower left corner with coordinates $(\lfloor x \rfloor, \lfloor y \rfloor)$ where $\lfloor x \rfloor = Bv(T_k) + v(T_{k+1})$ and $\lfloor y \rfloor = Bv(q) + v(T_{k-1})$. A left or right affine function (left or right move) is determined by the state q and the current tape square $T_k$. If states $q \ne r$, then $|Bv(q) - Bv(r)| \ge B$. If two alphabet symbols a, b are distinct, then $|v(a) - v(b)| < |A|$.

Thus, if two distinct program instructions have different states $q \ne r$, then the corresponding unit squares have y-coordinates that differ by at least $B - |A| = |Q| \ge 2$, since any Turing program with just one state has trivial behavior that can be determined in $|A|$ execution steps when the tape is bounded. Otherwise, two distinct program instructions must have distinct symbols at $T_k$. In this case, the corresponding unit squares have x-coordinates that differ by at least $B - |A| = |Q| \ge 2$.

Definition 2.29 Rationally Bounded Coordinates

Let $f_1, f_2, \ldots, f_I$ denote the I affine functions with corresponding unit square domains $W_1, W_2, \ldots, W_I$. Let p be a point in the plane P with orbit $[p, f_{S(1)}(p), f_{S(2)}f_{S(1)}(p), \ldots, f_{S(m)}f_{S(m-1)} \cdots f_{S(2)}f_{S(1)}(p), \ldots]$. The orbit of p has rationally bounded coordinates if conditions I & II hold.

I) For every point in the orbit $z = f_{S(k)}f_{S(k-1)} \cdots f_{S(2)}f_{S(1)}(p)$ the x-coordinate of z, $x(z)$, and the y-coordinate of z, $y(z)$, are both rational numbers.

II) There exists a natural number M such that for every point $$z = \left(\frac{p_1}{q_1}, \frac{p_2}{q_2}\right)$$

in the orbit, where $p_1$, $p_2$, $q_1$, and $q_2$ are integers in reduced form, then $|p_1| < M$, $|p_2| < M$, $|q_1| < M$, and $|q_2| < M$.

An orbit is rationally unbounded if the orbit does not have rationally bounded coordinates.

Theorem 2.30 An Orbit with Rationally Bounded Coordinates is Periodic or Halting.

Proof. Suppose both coordinates are rationally bounded for the whole orbit and M is the natural number. If the orbit is halting we are done. Otherwise, the orbit is immortal. Since there are less than 2 M integer values for each one of $p_1$, $p_2$, $q_1$ and $q_2$ to hold, then the immortal orbit has to return to a point that it was already at. Thus it is periodic.

Corollary 2.31 A Turing machine execution whose tape head location is unbounded over the whole program execution corresponds to an immortal orbit.

Theorem 2.32 Suppose the initial tape contents is bounded as defined in definition 2.2. Then an orbit with rationally unbounded coordinates is an immortal orbit that is not periodic.

PROOF. If the orbit halts, then the orbit has a finite number of points. Thus, it must be an immortal orbit. This orbit is not periodic because the coordinates are rationally unbounded.

Corollary 2.33 If the Turing Machine execution is unbounded on the right half of the tape, then in regard to the corresponding affine orbit, there is a subsequence $S(1)$, $S(2), \ldots, S(k), \ldots$ of the indices of the function sequence $g_1$, $g_2, \ldots, g_k, \ldots$ such that for each natural number n the composition of functions $g_{S(n)} g_{S(n-1)} \cdots g_{S(1)}$ iterated up to the s(n)th orbit point is of the form $$\begin{pmatrix} B^n & 0 \\ 0 & \frac{1}{B^n} \end{pmatrix} \begin{pmatrix} x \\ y \end{pmatrix} + \begin{pmatrix} m_{s(n)} \\ t_{s(n)} \end{pmatrix}$$

where $m_{s(n)}$, $t_{s(n)}$ are rational numbers.

Corollary 2.34 If the Turing Machine execution is unbounded on the left half of the tape, then in regard to the corresponding affine orbit, there is a subsequence $S(1)$, $S(2), \ldots, S(k), \ldots$ of the indices of the function sequence $g_1$, $g_2, \ldots, g_k, \ldots$ such that for each natural number n the composition of functions $g_{S(n)} g_{S(n-1)} \cdots g_{S(1)}$ iterated up to the s(n)th orbit point is of the form:

$$\begin{pmatrix} \frac{1}{B^n} & 0 \\ 0 & B^n \end{pmatrix} \begin{pmatrix} x \\ y \end{pmatrix} + \begin{pmatrix} m_{s(n)} \\ t_{s(n)} \end{pmatrix}$$

where $m_{s(n)}$, $t_{s(n)}$ are rational numbers.

Theorem 2.35 M-Bounded Execution Implies a Halting or Periodic Orbit

Suppose that the Turing Machine $(Q, A, \eta)$ begins or continues execution with a configuration such that its tape head location is M-bounded during the next $(2M+1)|Q||A|^{2M+1}+1$ execution steps. Then the Turing Machine program halts in at most $(2M+1)|Q||A|^{2M+1}+1$ execution steps or its corresponding orbit is periodic with period less than or equal to $(2M+1)|Q||A|^{2M+1}+1$.

PROOF. If the program halts in $(2M+1)|Q||A|^{2M+1}+1$ steps, then the proof is completed. Otherwise, consider the first $(2M+1)|Q||A|^{2M+1}+1$ steps. There are a maximum of $|Q||A|$ program commands for each tape head location. There are a maximum of $(2M+1)$ tape head locations. For each of the remaining 2M tape squares, each square can have at most $|A|$ different symbols, which means a total of $|A|^{2M}$ possibilities for these tape squares. Thus, in the first $(2M+1)|Q||A|^{2M+1}+1$ points of the corresponding orbit in P, there are at most distinct $(2M+1)|Q||A|^{2M+1}$ points so at least one point in the orbit must occur more than once.

Prime Edge Complexity, Periodic Points & Repeating State Cycles

Definition 3.1 Overlap Matching & Intersection Patterns

The notion of an overlap match expresses how a part or all of one pattern may match part or all of another pattern. Let V and W be patterns. (V, s) overlap matches (W, t) if and only if $V(s+c)=W(t+c)$ for each integer c satisfying $\lambda \leq c \leq \mu$ such that $\lambda=\min\{s, t\}$ and $\mu=\min\{|V|-1-s, |W|-1-t\}$ where $0 \leq s < |V|$ and $0 \leq t < |W|$. The index s is called the head of pattern V and t is called the head of pattern W. If V is also a subpattern, then (V, s) submatches (W, t).

If (V, s) overlap matches (W, t), then define the intersection pattern I with head $u=\lambda$ as $(I, u)=(V, s) \cap (W, t)$, where $I(c)=V(c+s-\lambda)$ for every integer c satisfying $0 \leq c \leq (\mu+\lambda)$ where $\lambda=\min\{s, t\}$ and $\mu=\min\{|V|-1-s, |W|-1-t\}$.

Definition 3.2 Edge Pattern Substitution Operator

Consider pattern $V=v_0 v_1 \ldots v_n$, pattern $W=w_0 w_1 \ldots w_n$ with heads s, t satisfying $0 \leq s, t \leq n$ and pattern $P=p_0 p_1 \ldots p_m$ with head u satisfying $0 \leq u \leq m$. Suppose (P, u) overlap matches (V, s). Then define the edge pattern substitution operator $\oplus$ as $E=(P, u) \oplus [(v, s) \Rightarrow (W, t)]$ according to the four different cases A., B., C. and D.

Figure 24:
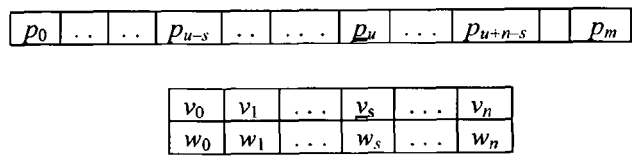
FIG. 24 shows case A of the definition the Edge Pattern Substitution Operator.

Case A.) $u > s$ and $m-u > n-s$. See FIG. 24.

$$E(k) = \begin{cases} W(k+s-u) & \text{when} \quad u \leq k+s \leq u+n \\ P(k) & \text{when } 0 \leq k < u-s \text{ OR } u+n-s < k \leq m \end{cases}$$

where the head of E is $u+t-s$. Observe that $|E|=m+1$

Figure 25:
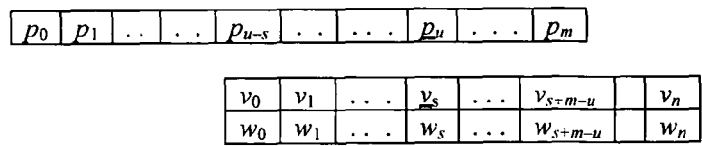
FIG. 25 shows case B of the definition the Edge Pattern Substitution Operator.
Figure 33:
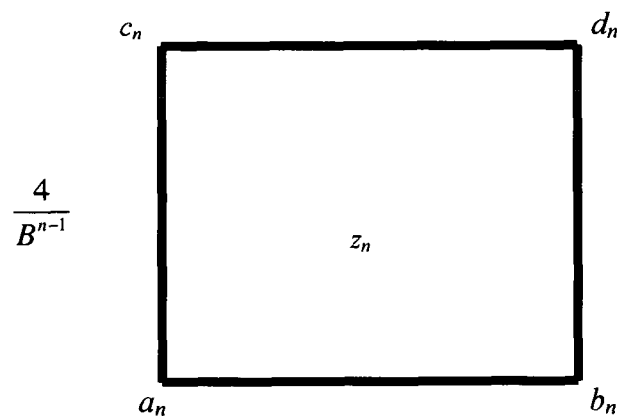
FIG. 33 shows a square about point $z_n$ referred to in 6.20.
Figure 34:
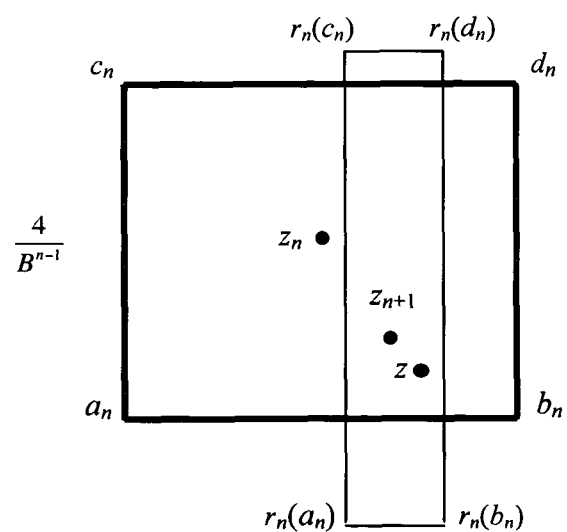
FIG. 34 shows a vertical cover referred to in 6.20.

Case B.) $u > s$ and $m-u \leq n-s$. See FIG. 25.

$$E(k) = \begin{cases} W(k+s-u) & \text{when} \quad u-s \leq k \leq n+s-u \\ P(k) & \text{when} \quad 0 \leq k < u-s \end{cases}$$

where the head of E is $u+t-s$. Also, $|E|=n+s-u+1$

Case C.) $u \leq s$ and $m-u < n-s$. See FIG. 26.

$E(k)=W(k)$ when $0 \leq k \leq n$ and the head of E is t. Also, $|E|=|W|=n+1$.

Case D.) $u \leq s$ and $m-u > n-s$. See FIG. 27.

$$E(k) = \begin{cases} W(k+u-s) & \text{when} \quad n < k \leq m+s-u \\ W(k) & \text{when} \quad 0 \leq k \leq n \end{cases}$$

where the head of E is t. Also, $|E|=m+s-u+1$

Overlap and intersection matching and edge pattern substitution are useful in searching for periodic points and in algorithms that execute all possible finite Turing machine configurations.

Example 3.3

Overlap Matching and Edge Substitution

Set pattern $P=0101\ 110$. Set pattern $V=11\ \underline{0}101$. Set pattern $W=01\ 00\underline{1}0$. Then (P, 0) overlap matches (V, 2). Edge pattern substitution is well-defined so $E=(P, 0) \oplus [(V, 2) \Rightarrow (W, 4)]=01\ 00\underline{1}0\ 110$. The head or index of pattern $E=4$. Also, (P, 4) overlap matches (V, 0). $F=(P, 4) \oplus [(V, 0) \Rightarrow (W, 4)]=0101\ 0100\underline{1}0$. The index of pattern $F=u+t-s=4+4-0=8$.

Definition 3.4 State Cycle

Consider N execution steps of Turing Machine $(Q, A, \eta)$. After each execution step, the machine is in some state $q_k$ and the tape head is pointing to some alphabet symbol $a_k$. Relabeling the indices of the states and the alphabet symbols if necessary and assuming the machine has not halted after N execution steps in terms of the input commands is denoted as: $(q_0, a_0) \mapsto (q_1, a_1) \mapsto \ldots \mapsto (q_{N-1}, a_{N-1}) \mapsto (q_N, a_N)$. A state cycle is a valid execution sequence of input commands such that the first and last input command in the sequence have the same state i.e. $(q_k, a_k) \mapsto (q_{k+1}, a_{k+1}) \mapsto \ldots \mapsto (q_{N-1}, a_{N-1}) \mapsto (q_k, a_k)$. The length of this state cycle equals the number of input commands minus one. A state cycle is called a prime state cycle if it contains no proper state subcycles. For a prime state cycle, the length of the cycle equals the number of distinct states in the sequence. For example, $(2, 0) \mapsto (3, 1) \mapsto (4, 0) \mapsto (2, 1)$ is called a prime 3-state cycle because it has length 3 and also 3 distinct states $\{2, 3, 4\}$.

Remark 3.5 any Prime State Cycle has Length $\leq |Q|$

This follows from the Dirichlet principle and the definition of a prime state cycle.

Remark 3.6 Maximum Number of Distinct Prime State Cycles

Given an alphabet A and states Q, consider an arbitrary prime state cycle with length 1, $(q, a) \mapsto (q, b)$. There are $|Q||A|$ choices for the first input command and $|A|$ choices for the second input command since the states must match. Thus, there are $|Q||A|^2$ distinct prime state cycles with length 1. Similarly, consider a prime state cycle with window of execution whose length is 2, this can be represented as $(q_1, a_1) \mapsto (q_2, a_2) \mapsto (q_1, b_1)$.

Then there are $|Q||A|$ choices for $(q_1, a_1)$ and once $(q_1, a_1)$ is chosen there is only one choice for $q_2$ because it is completely determined by $\eta(q_1, a_1) = (q_2, b_1)$ where $\eta$ is the program in $(Q, A, \eta)$. Similarly, there is only one choice for $b_1$. There are $|A|$ choices for $a_2$. Thus, there are $|Q||A|^2$ distinct choices.

For an arbitrary prime state cycle $(q_1, a_1) \mapsto (q_2, a_2) \mapsto \ldots \mapsto (q_n, a_n) \mapsto (q_1, a_{n+1})$ with window of execution of length k then there are $|Q||A|$ choices for $(q_1, a_1)$ and $|A|$ choices for $a_2$ since the current window of execution length after the first step increases by 1. There is only one choice for $q_2$ because it is determined by $\eta(q_1, a_1)$. Similarly, for the jth computational step, if the current window of execution length increases by 1, then there are $|A|$ choices for $(q_{j+1}, a_{j+1})$. Similarly, for the jth computational step, if the current window of execution stays unchanged, then there is only one choice for $a_{j+1}$ that was determined by one of the previous j computational steps. Thus, there are at most $|Q||A|^k$ distinct prime state cycles whose window of execution length equals k. Definitions 2.8 and remark 2.10 imply that a prime k-state cycle has a window of execution length less than or equal to k. Thus, from the previous and 3.5, there are at most $$|Q| \sum_{k=1}^{|Q|} |A|^k$$

distinct prime state cycles in $(Q, A, \eta)$.

Remark 3.7 any State Cycle Contains a Prime State Cycle

PROOF. Relabeling if necessary let $S(q_1, q_1) = (q_1, a_1) \mapsto \ldots \mapsto (q_n, a_n) \mapsto (q_1, a_{n+1})$ be a state cycle. If $q_i$ is the only state visited twice, then the proof is completed. Otherwise, define $\mu = \min\{|S(q_k, q_k)| \; S(q_k, q_k)$ is a subcycle of $S(q_1, q_1)\}$. Then $\mu$ exists because $S(q_1, q_1)$ is a subcycle of $S(q_1, q_1)$. Claim: Any state cycle $S(q_j, q_j)$ with $|S(q_j, q_j)| = \mu$ must be a prime state cycle. Suppose not. Then there is a state $r \neq q_j$ that is visited twice in the state cycle $S(q_j, q_j)$. But then $S(q_r, q_r)$ is a cycle with length less than $\mu$ which contradicts $\mu$'s definition.

Definition 3.8 Consecutive Repeating State Cycle for $(Q, A, \eta)$

If machine $(Q, A, \eta)$ starts execution and repeats a state cycle two consecutive times i.e. $(q_1, b_1) \mapsto \ldots \mapsto (q_n, b_n) \mapsto (q_1, b_1) \mapsto \ldots \mapsto (q_n, b_n) \mapsto (q_1, b_1)$, then $(Q, A, \eta)$ has a consecutive repeating state cycle.

Definition 3.9 Execution Node for $(Q, A, \eta)$

An execution node (or node) is a triplet $\Pi = [q, w_0 \ldots w_n, t]$ for some state q in Q where $w_0 w_1 \ldots w_n$ is a pattern of n+1 alphabet symbols each in A such that t is a non-negative integer satisfying $0 \leq t \leq n$. Intuitively, $w_0 w_1 \ldots w_n$ is the pattern of alphabet symbols on n+1 consecutive tape squares on the tape and t represents the location of the tape head.

Lemma 3.10 Every Immortal Periodic Point Induces a Consecutive Repeating State Cycle.

PROOF. Suppose p is an immortal periodic point with period n. Then by the Turing-Affine correspondence theorem the kth iterate of p is $f_{S(k)} f_{S(k-1)} \ldots f_{S(1)}(p)$ and the application of affine function $f_{S(k)}$ corresponds to the execution of input command $(q_k, b_k)$. Thus, let the input command sequence $(q_1, b_1) \mapsto \ldots \mapsto (q_n, b_n) \mapsto (q_{n+1}, b_{n+1})$ denote the first n input commands that are executed. Since p has period n, $f_{S(n)} \ldots f_{S(k)} \ldots f_{S(1)}(p) = p$. Thus, $(q_1, b_1) = (q_{n+1}, b_{+1})$. Thus, the first n steps are a state cycle $(q_1, b_1) \mapsto \ldots \mapsto (q_n, b_n) \mapsto (q_1, b_1)$. Since the n+1 computational step corresponds to applying $f_{S(1)}$ to p which corresponds to input command $(q_1, b_1)$. By induction, the n+k computational step corresponds to applying function $f_{S(k)}$ to the point $f_{S(k-1)} \ldots f_{S(1)}(p)$ which by the previous paragraph corresponds to the execution of the input command $(q_k, b_k)$. Thus, the sequence of input commands is $(q_1, b_1) \mapsto \ldots \mapsto (q_n, b_n) \mapsto (q_1, b_1) \mapsto \ldots \mapsto (q_n, b_n) \mapsto (q_1, b_1)$.

Lemma 3.11 Every Consecutive Repeating State Cycle Induces an Immortal Periodic Orbit Suppose Turing machine $(Q, A, \eta)$ begins or resumes execution at some tape square and repeats a state cycle two consecutive times. Then $(Q, A, \eta)$ has an immortal periodic point and this state cycle induces the immortal periodic point.

PROOF. Let the state cycle that is repeated two consecutive times be denoted as $(q_1, b_1) \mapsto \ldots \mapsto (q_n, b_n) \mapsto (q_1, b_1) \mapsto \ldots \mapsto (q_n, b_n) \mapsto (q_1, b_1)$. Let $s_k$ denote the tape square right before input command $(q_k, b_k)$ is executed the first time where $1 \leq k \leq n$. Let $T_k$ denote the tape square right before input command $(q_k, b_k)$ is executed the second time where $1 \leq k \leq n$.

Thus, the window of execution for the first repetition of the state cycle, right before input command $(q_1, b_1)$ is executed a second time, denoted $I_n = \{s_1, s_2, \ldots s_k, s_{k+1} \ldots s_n, s_{n+1}\}$ where $s_{n+1} = t_1$. The window of execution for the second repetition of the state cycle is $J_n = \{t_1, t_2, \ldots, t_n, t_{n+1}\}$ where $t_{n+1} = t_n + t_1 - s_n$.

Furthermore, observe that the window of execution for the computational steps 1 thru k is $I_k = \{s_1, s_2, \ldots s_k, s_{k+1}\}$ where the tape square $s_{k+1}$ is indicated after input command $(q_k, b_k)$ is executed the first time. Also, observe that the window of execution for the computational steps n+1 thru n+k is $J_k = \{t_1, t_2, \ldots, t_k, t_{k+1}\}$ where the tape square $T_{k+1}$ is indicated after the input command $(q_k, b_k)$ is executed the second time (in the second repeating cycle).

Next a useful notation represents the tape patterns for each computational step. Then the proof is completed using induction.

Let $V_1$ denote the tape pattern—which is the sequence of alphabet symbols in the tape squares over the window of execution $I_n$—right before input command $(q_1, b_1)$ is executed the first time. Thus, $V_1(s_1) = b_1$. Let $V_k$ denote the tape pattern—which is the sequence of alphabet symbols in the tape squares over the window of execution $I_n$—right before input command $(q_k, b_k)$ is executed the first time. Thus, $V_k(s_k) = b_k$.

Let $W_1$ denote the tape pattern—which is the sequence of alphabet symbols in the tape squares over the window of execution $J_n$—right before input command $(q_1, b_1)$ is executed the second time. Thus, $W_1(t_1) = b_1$. Let $W_k$ denote the tape pattern—which is the sequence of alphabet symbols in the tape squares over the window of execution $J_n$—right before input command $(q_k, b_k)$ is executed the second time. Thus, $W_k(t_k) = b_k$.

Using induction, it is shown that $V_1$ on window of execution $I_n$ equals $W_1$ on window of execution $J_n$. This completes the proof.

Since $(q_1, b_1)$ is the input command before computational step 1 and $(q_1, b_1)$ is the input command before computational step n+1, then $V_1(s_1)=b_1=W_1(t_1)$. Thus, $V_1$ restricted to window of execution $I_1$ equals $W_1$ restricted to window of execution $J_1$.

From the definition, $\eta(q_1, b_1)=\eta(q_2, a_1, x)$ for some $a_1$ in A and where x equals L or R. Note that L represents a left tape head move and R a right tape head move.

Case x=R. A right tape head move.

$\quad\quad s_1 \quad s_2$

| | | | |
|---|---|---|---|
| $V_1$ | $\underline{b_1}$ | $b_2$ | |
| $V_2$ | $a_1$ | $\underline{b_2}$ | |

$\quad\quad t_1 \quad t_2$

| | | | |
|---|---|---|---|
| $W_1$ | $\underline{b_1}$ | $b_2$ | |
| $W_2$ | $a_1$ | $\underline{b_2}$ | |

Then $s_2=s_1+1$, $t_2=t_1+1$ and $V_1(s_2)=b_2=W_1(t_2)$. It has already been observed that $V_1(s_1)=b_1=W_1(t_1)$. Thus, $V_1$ restricted to the window of execution $I_2$ equals $W_1$ restricted on the window of execution $J_2$. Furthermore, the tape head is at $s_1$ right before computational step 1 and input command $(q_1, b_1)$ is executed; the tape head is at $t_1$ right before computational step n+1 and input command $(q_1, b_1)$ is executed.

Also, $V_2(s_1)=a_1=W_2(t_1)$ and $V_2(s_2)=b_2=W_2(t_2)$. Thus, $V_2$ restricted to the window of execution $I_2$ equals $W_2$ restricted to the window of execution $J_2$. Furthermore, the tape head is at $s_2$ right before computational step 2 with input command $(q_2, b_2)$ is executed; the tape head is at $t_2$ right before computational step n+2 with input command $(q_2, b_2)$ is executed.

Case x=L. A left tape head move.

$\quad\quad s_2 \quad s_1$

| | | | |
|---|---|---|---|
| $V_1$ | $b_2$ | $\underline{b_1}$ | |
| $V_2$ | $\underline{b_2}$ | $a_1$ | |

$\quad\quad t_2 \quad t_1$

| | | | |
|---|---|---|---|
| $W_1$ | $b_2$ | $\underline{b_1}$ | |
| $W_2$ | $\underline{b_2}$ | $a_1$ | |

Then $s_2=s_1-1$, $t_2=t_1-1$ and $V_1(s_2)=b_2=W_1(t_2)$. And $V_1(s_1)=b_1=W_1(t_1)$. Thus, $V_1$ restricted to the window of execution $I_2$ equals $W_1$ restricted on the window of execution $J_2$. Furthermore, the tape head is at $s_1$ right before computational step 1 and input command $(q_1, b_1)$ is executed; the tape head is at $t_1$ right before computational step n+1 and input command $(q_1, b_1)$ is executed.

Also, $V_2(s_1)=a_1=W_2(t_1)$ and $V_2(s_2)=b_2=W_2(t_2)$. Thus, $V_2$ restricted to the window of execution $I_2$ equals $W_2$ restricted to the window of execution $J_2$. Furthermore, the tape head is at $s_2$ right before computational step 2 and input command $(q_2, b_2)$ is executed; the tape head is at $t_2$ right before computational step n+2 and input command $(q_2, b_2)$ is executed. This completes the base case of induction.

Induction Hypothesis.

Suppose that for the 1, 2, . . . , k−1 computational steps and the corresponding n+1, n+2, . . . , n+k−1 steps that for every i with 1≤i≤k $V_1$ restricted to the window of execution $I_i$ equals $W_1$ restricted on the window of execution $J_i$; $V_2$ restricted to the window of execution $I_i$ equals $W_2$ restricted on the window of execution $J_i$; and . . . $V_i$ restricted to the window of execution $I_i$ equals $W_i$ restricted on the window of execution $J_i$.

Furthermore, the tape head is at $s_i$ right before computational step i and input command $(q_i, b_i)$ is executed; the tape head is at $t_i$ right before computational step n+i and input command $(q_i, b_i)$ is executed.

Induction Step.

Since $(q_k, b_k)$ is the input command before computational step k and before computational step n+k, then $V_k(s_k)=b_k=W_k(t_k)$.

From the definition, $\eta(q_k, b_k)=\eta(q_{k+1}, a_k, x)$ for some $a_k$ in A and x equals L or R. Note that L represents a left tape head move and R a right tape head move.

Case x=R. A right tape head move for computational steps k and n+k.

$\quad\quad s_k \quad s_{k+1}$

| | | | |
|---|---|---|---|
| $V_k$ | $\underline{b_k}$ | $b_k$ | |
| $V_{k+1}$ | $a_k$ | $\underline{b_{k+1}}$ | |

$\quad\quad t_k \quad t_{k+1}$

| | | | |
|---|---|---|---|
| $W_k$ | $\underline{b_k}$ | $b_k$ | |
| $W_{k+1}$ | $a_k$ | $\underline{b_{k+1}}$ | |

By the inductive hypothesis $V_k$ restricted to window of execution $I_k$ equals $W_k$ restricted to window of execution $J_k$ and the only change to the tape and tape head after executing $\eta(q_k, b_k)=\eta(q_{k+1}, a_k, R)$ for the steps k and n+k is that $V_{k+1}(s_k)=a_k=W_{k+1}(t_k)$ and $V_{k+1}(s_{k+1})=b_{k+1}=W_{k+1}(t_{k+1})$ and that the tape heads move right to $s_{k+1}$ and $T_{k+1}$ respectively.

Thus, $V_{k+1}$ restricted to the window of execution $I_{k+1}$ equals $W_{k+1}$ restricted on the window of execution $J_{k+1}$. And for each j satisfying 1≤j≤k, then $V_j$ restricted to the window of execution $I_{k+1}$ equals $W_j$ restricted on the window of execution $J_{k+1}$.

Case x=L. A left tape head move for computational steps k and n+k.

$\quad\quad s_{k+1} \quad s_k$

| | | | |
|---|---|---|---|
| $V_k$ | $b_{k+1}$ | $\underline{b_k}$ | |
| $V_{k+1}$ | $\underline{b_{k+1}}$ | $a_k$ | |

$\quad\quad t_{k+1} \quad t_k$

| | | | |
|---|---|---|---|
| $W_k$ | $b_{k+1}$ | $\underline{b_k}$ | |
| $V_{k+1}$ | $\underline{b_{k+1}}$ | $a_k$ | |

By the inductive hypothesis $V_k$ restricted to window of execution $I_k$ equals $W_k$ restricted to window of execution $J_k$ and the only change to the tape and tape head after executing $\eta(q_k, b_k)=\eta(q_{k+1}, a_k, L)$ for the steps k and n+k is that $V_{k+1}(s_k)=a_k=W_{k+1}(t_k)$ and $V_{k+1}(S_{k+1})=b_{k+1}=W_{k+1}(t_{k+1})$ and that the tape heads move left to $s_{k+1}$ and $T_{k+1}$ respectively.

Thus, $V_{k+1}$ restricted to the window of execution $I_{k+1}$ equals $W_{k+1}$ restricted on the window of execution $J_{k+1}$. And for each j satisfying 1≤j≤k, then $V_j$ restricted to the window of execution $I_{k+1}$ equals $W_j$ restricted on the window of execution $J_{k+1}$.

Prime Directed Sequences & Periodic Point Search

Definition 4.1 Prime Directed Edge from Head and Tail Execution Nodes

A prime head execution node $\Delta=[q, v_0 v_1 \ldots v_n, s]$ and prime tail execution node$=[r, w_0 w_1 \ldots w_n, t]$ are called a prime directed edge if and only if all of the following hold:

When Turing machine $(Q, A, \eta)$ starts execution, it is in state q; the tape head is located at tape square s. For each j satisfying $0 \leq j \leq n$ tape square j contains symbol $v_j$. In other words, the initial tape pattern is $v_0 v_1 \ldots v_s \ldots v_n$.

During the next N computational steps, state r is visited twice and all other states in Q are visited at most once. In other words, the corresponding sequence of input commands during the N computational steps executed contains only one prime state cycle.

After N computational steps, where $1 \leq N \leq |Q|$, the machine is in state r. The tape head is located at tape square t. For each j satisfying $0 \leq j \leq n$ tape square j contains symbol $w_j$. The tape pattern after the N computational steps is $w_0 w_1 \ldots \underline{w}_t \ldots w_n$.

The window of execution for these N computational steps is [0, n].

A prime directed edge is denoted as $\Delta \Rightarrow \Gamma$ or $[q, v_0 v_1 \ldots v_n, s] \Rightarrow [r, w_0 w_1 \ldots t]$. The number of computational steps N is denoted as $|\Delta \Rightarrow \Gamma|$.

Definition 4.2 Prime Input Command Sequence 3.4 introduced input commands. If $(q_1, a_1) \mapsto \ldots \mapsto (q_n, a_n)$ is an execution sequence of input commands for $(Q, A, \eta)$, then $(q_1, a_1) \mapsto \ldots \mapsto (q_n, a_n)$ is a prime input command sequence if $q_n$ is visited twice and all other states in the sequence are visited once. In other words, a prime input command sequence contains exactly one prime state cycle.

Notation 4.3 Prime Input Command Sequence Notation

Using the same notation as lemma 3.11, let $V_1$ denote the initial tape pattern—which is the sequence of alphabet symbols in the tape squares over the window of execution of the prime input command sequence—right before the first input command $(q_1, a_1)$ in the sequence is executed. And let $s_1$ denote the location of the tape head i.e. $V_1(s_1)=a_1$. Let $V_k$ denote the tape pattern right before the kth input command $(q_k, a_k)$ in the sequence is executed and let $s_k$ denote the location of the tape head i.e. $V_k(s_k)=a_k$.

Definition 4.4 Composition of Prime Input Command Sequences

Let $(q_1, a_1) \mapsto \ldots \mapsto (q_n, a_n)$ and $(r_1, b_1) \mapsto \ldots \mapsto (r_m, b_m)$ be prime input command sequences where $V_k$ denotes the tape pattern right before the kth input command $(q_k, a_k)$ with tape head at $s_k$ with respect to $V_k$ and $W_k$ denotes the tape pattern right before the kth input command $(r_k, b_k)$ with tape head at $t_k$ with respect to $W_k$.

Suppose $(V_n, s_n)$ overlap matches with $(W_1, t_1)$ and $q_n = r_1$. Then $(q_n, a_n)=(r_1, b_1)$. And the composition of these two prime input command sequences is defined as $(q_1, a_1) \mapsto \ldots \mapsto (q_n, a_n) \mapsto (r_2, b_2) \mapsto \ldots \mapsto (r_m, b_m)$. The composition is undefined if $(V_n, s_n)$ and $(W_1, t_1)$ do not overlap match or $q_n \neq r_1$.

If $(q_1, a_1) \mapsto \ldots \mapsto (q_n, a_n) \mapsto (q_1, b_1)$ is a prime state cycle, then it is also prime input command sequence. For simplicity in upcoming lemma 4.15, it is called a composition of one prime input command sequence.

The purpose of these next group of definitions is to show that any consecutive repeating state cycle is contained inside a composition of prime input command sequences. From lemmas 3.10 and 3.11, there is a one to one correspondence between a consecutive repeating state cycle and an immortal periodic point.

If this consecutive repeating state cycle is rotated, then it is still part of the same periodic orbit of the original periodic point. Next it is shown that there is a one to one correspondence between prime input command sequences and prime directed edges. Subsequently, it is explained how to link match prime directed edges. Then it is demonstrated how to find all prime directed edges for a particular Turing machine or a digital computer program. If a particular Turing machine (digital computer program) has any immortal periodic points, then it will have corresponding consecutive repeating state cycles which will be contained in an edge sequence of prime directed edges that are link matched.

Example 4.5

Directed Partition Method

Start with the finite sequence (0, 4, 2, 3, 4, 1, 3, 0, 1, 2, 0, 4, 2, 3, 4, 1, 3, 0, 1, 2).

| Partition Steps | | |
|---|---|---|
| (0 4 2 3 4 1 3 0 1 2 0 4 2 3 4 1 3 0 1 2) | | |
| ((0 4 2 3) 4 1 3 0 1 2 0 4 2 3 4 1 3 0 1 2) | 4 lies in (0 4 2 3). | 1st element found. |
| ((0 4 2 3) (4 1 3 0) 1 2 0 4 2 3 4 1 3 0 1 2) | 1 lies in (4 1 3 0). | 2nd element found. |
| ((0 4 2 3) (4 1 3 0) (1 2 0 4) 2 3 4 1 3 0 1 2) | 2 lies in (1 2 0 4). | 3rd element found. |
| ((0 4 2 3) (4 1 3 0) (1 2 0 4) (2 3 4 1) 3 0 1 2) | 3 lies in (2 3 4 1). | 4th element found. |
| ((0 4 2 3) (4 1 3 0) (1 2 0 4) (2 3 4 1) (3 0 1 2)) | 0 lies in (0 4 2 3). | 5th element found. |

Definition 4.6 Tuples

A tuple is a finite sequence of objects denoted as $(\sigma_1, \sigma_2, \ldots \sigma_m)$. The length of the tuple is the number of objects in the sequence denoted as $|(\sigma_1, \sigma_2, \ldots, \sigma_m)|=m$. For our purposes, the objects of the tuple may be states, input commands or natural numbers. (3) is a tuple of length one. (1, 4, 5, 6) is a tuple of length four. Sometimes the commas will be omitted as in the previous example. (4 6 0 1 2 3) is a tuple of length six. The 4 is called the first object in tuple (4 6 0 1 2 3). 1 is called a member of tuple (4 6 0 1 2 3).

Definition 4.7 Tuple of Tuples

A tuple of tuples is of the form $(w_1, w_2, \ldots, w_n)$ where each $w_k$ may have a different length. An example of a tuple of tuples is ((3), (1, 4, 5, 6), (4, 5, 6)). Sometimes the commas are omitted: ((0 8 2 3) (1 7 5 7) (5 5 6)).

Definition 4.8 Directed Partition of a Sequence

A directed partition is a tuple of tuples $(w_1, w_2, \ldots, w_n)$ that satisfies Rules A and B.

Rule A. No object a occurs in any element tuple $w_k$ more than once.

Rule B. If $w_k$ and $w_{k+1}$ are consecutive tuples, then the first object in tuple $w_{k+1}$ is a member of tuple $W_k$.

Example 4.9

Directed Partition Examples ((0 8 2 3) (8 7 5 4) (5 0 6)) is an example of a directed partition.

((0 8 2 3) (8 7 5 4) (5 0 6)) is sometimes called a partition tuple.

(0 8 2 3) is the first element tuple. And the first object in this element tuple is 0.

Element tuple (8 0 5 7 0 3) violates Rule A because object 0 occurs twice.

((0 8 2 3) (1 7 5 4) (5 0 6)) violates Rule B since 1 is not a member of element tuple (0 8 2 3).

Definition 4.10 Consecutive Repeating Sequence and Extensions

A consecutive repeating sequence is a sequence $(x_1, x_2, \ldots, x_n, \ldots, x_{2n})$ of length 2n for some positive integer n such that $x_k = x_{n+k}$ for each k satisfying $1 \leq k \leq n$. An extension sequence is the same consecutive repeating sequence for the first 2n elements $(x_1 \ldots x_n \ldots x_{2n} \ldots X_{2n+m})$ such that $x_k = x_{2n+k}$ for each k satisfying $1 \leq k \leq m$.

A minimal extension sequence is an extension sequence $(x_1, \ldots x_{2n+m})$ where m is the minimum positive number such that there is one element in $x_{2n}, x_{2n+1}, \ldots, x_{2n+m}$ that occurs more than once. Thus, $x_{2n+k} = x_{2n+m}$ for some k satisfying $0 \leq k < m$.

For example, the sequence S=(4 2 3 4 1 3 0 1 2 0 4 2 3 4 1 3 0 1 2 0) is a consecutive repeating sequence and $\overline{S}$=(4 2 3 4 1 3 0 1 2 0 4 2 3 4 1 3 0 1 2 0 4 2 3 4 1) is an extension sequence. $\overline{S}$ contains consecutive repeating sequence S.

Definition 4.11 Directed Partition Extension with Last Tuple Satisfying Rule B

Suppose $(x_1 \ldots x_n \ldots x_{2n}, x_{2n+1}, \ldots x_{2n+m})$ is an extension of consecutive repeating sequence $(x_1 \ldots x_n \ldots X_{2n})$. Then $(w_1, w_2, \ldots, w_r)$ is a directed partition extension if it is a directed partition of the extension: The last tuple $w_r$ satisfies Rule B if $x_{2n+m}$ is the last object in tuple $w_r$ and $x_{m+1}$ lies in tuple $w_r$.

For example, the extension $\overline{S}$=(4 2 3 4 1 3 0 1 2 0 4 2 3 4 1 3 0 1 2 0 4 2 3) has directed partition extension ((4 2 3) (4 1 3 0) (1 2 0 4) (2 3 4 1) (3 0 1 2) (0 4 2 3)) and the last tuple satisfies Rule B since 4 lies in (0 4 2 3)

Method 4.12 Directed Partition Method

---

Given a finite sequence $(x_1 \ldots x_n)$ of objects.
Initialize element tuple $w_1$ to the empty tuple, ( )
Initialize partition tuple P to the empty tuple, ( )
For each element $x_k$ in sequence $(x_1 \ldots x_n)$
{
   if $x_k$ is a member of the current element tuple $w_r$.
   {
      Append element tuple $w_r$ to the end of partition tuple so that
      P = $(w_1 \ldots w_r)$
      Initialize current element tuple $w_{r+1} = (x_k)$
   }
   else update $w_r$ by appending $x_k$ to end of element tuple $w_r$.
}
The final result is the current partition tuple P after element $x_n$ is examined in the loop.
Observe that the tail of elements from $(x_1 \ldots x_n)$ with no repeated elements will not lie in the last element tuple of the final result P.

---

Example 4.13
Directed Partition Method Implemented in newLISP, www.newlisp.org

---

```
(define (add_object element_tuple object)
    (if (member object element_tuple) nil
        (append element_tuple (list object)) ))
(define (find_partition seq)
    (let
        ( (partition_tuple '( ) )
          (element_tuple '( ) )
          (test_add nil)
        )
        (dolist (object seq)
            (set 'test_add (add_object element_tuple object) )
            (if test_add
```

(set 'element_tuple test_add)
(begin
    (set 'partition_tuple
        (append partition_tuple (list
            element_tuple) ) )
    (set 'element_tuple (list object) )
) ) )
partition_tuple
))
(set 'seq '(4234130120 4234130120 4234) )
> (find_partition seq)
( (423) (4130) (1204) (2341) (3012) (0423) )

---

4 lies in the last tuple (0 4 2 3)

Lemma 4.14 Every Consecutive Repeating Sequence has an Extension Sequence with a Directed Partition Such that the Last Tuple Satisfies the Rule B Property.

PROOF. As defined in 4.10, extend consecutive repeating sequence $(x_1, x_2 \ldots x_{2n})$ to the extension sequence $(x_1, x_2 \ldots x_{2n}, x_{2n+1} \ldots x_{2n+m})$ such that m is the minimum positive number such that there is one element in $x^{2n}, x_{2n+1} \ldots X_{2n+m}$ that occurs more than once. Thus, $X_{2n+k} = x_{2n+m}$ for some k satisfying $0 \leq k < m$.

Apply method 4.12 to $\overline{S}=(x_1, x_2 \ldots x_{2n}, x_{2n+1} \ldots x_{2n+m})$. Then the resulting partition tuple P extends at least until element $x_{2n}$ and the last tuple in P satisfies rule B. If the partition tuple P is mapped back to the underlying sequence of elements, then it is an extension sequence since it reaches element $x_{2n}$.

Lemma 4.15 any Consecutive Repeating State Cycle is Contained in a Composition of One or More Prime Input Command Sequences.

PROOF. Let $\sigma=[(q_1, a_1) \mapsto \ldots \mapsto (q_n, a_n) \mapsto (q_1, a_1) \mapsto \ldots \mapsto (q_n, a_n)]$ be a consecutive repeating cycle. Method 4.12 & 4.14 show that this sequence of consecutive repeating input commands may be extended to a minimal extension sequence: $[(q_1, a_1) \mapsto \ldots \mapsto (q_n, a_n) \mapsto (q_1, a_1) \mapsto \ldots \mapsto (q_n, a_n) \mapsto (q_1, a_1) \mapsto \ldots \mapsto (q_m, a_m)]$ For simplicity, let $v_k$ denote input command $(q_k, a_k)$.

Apply method 4.12 to $(v_1, \ldots v_n v_1 \ldots v_n v_1 \ldots v_m)$ so that the result is the partition tuple $P=(w_1, \ldots w_r)$. Then the sequence of element tuples in P represent a composition of one or more prime input command sequences. Rules A and B imply that for consecutive tuples $w_k=(v_{k(1)} v_{k(2)} \ldots v_{k(m)})$ and $w_{k+1}=(v_{(k+1)(1)} v_{(k+1)(2)} \ldots v_{(k+1)(m)})$, then $(q_{k(1)}, a_{k(1)}) \mapsto (q_{k(2)}, a_{k(2)}) \mapsto \ldots \mapsto (q_{k(m)}, a_{k(m)}) \mapsto (q_{k+1(1)}, a_{(k+1)(1)})$ is a prime input command sequence. And 4.14 implies that the last tuple $w_r$ corresponds to a prime input command sequence and that the consecutive repeating state cycle is contained in the partition P mapped back to the sequence of input commands.

Definition 4.16 Finite Sequence Rotation

Let $(x_0 x_1 \ldots x_n)$ be a finite sequence. A k-rotation is the resulting sequence $(x_k x_{k+1} \ldots x_n x_0 X_1 \ldots x_{k-1})$. The 3-rotation of (8 7 3 4 5) is (3 4 5 8 7). When it does matter how many elements it has been rotated, it is called a sequence rotation.

Definition 4.17 Rotating a State-Symbol Cycle

Let $(q_1, a_1) \mapsto \ldots \mapsto (q_n, a_n) \mapsto (q_1, b_1)$ be a state cycle. This state cycle is called a state-symbol cycle if $a_1=b_1$. A rotation of this state-symbol cycle is the state cycle $(q_k, a_k) \mapsto \ldots \mapsto (q_n, a_n) \mapsto (q_1, a_1) \mapsto \ldots \mapsto (q_k, a_k)$ for some k satisfying $0 \leq k \leq n$. In this case, the state-symbol cycle has been rotated by k-1 steps.

Lemma 4.18 any Consecutive Repeating Rotated State Cycle Generated from a Consecutive Repeating State Cycle Induces the Same Immortal Periodic Orbit.

PROOF. Let p be the immortal periodic point induced by this consecutive repeating state cycle. Rotating this state cycle by k steps corresponds to iterating p by the next k corresponding affine functions.

Lemma 4.19 Prime Directed Edges ⇔ Prime Input Command Sequences

Prime directed edges and prime input command sequences are in 1 to 1 correspondence. PROOF. ($\Rightarrow$) Let $\Delta \Rightarrow \Gamma$ be a prime directed edge where $\Delta=[q, v_0 v_1 \ldots v_n, s]$ and $\Gamma=[r, w_0 w_1 \ldots w_n, t]$. From the definition of a prime directed edge, over the next N computational steps some state r is visited twice, all other states in Q are visited at most once and there is a sequence of input commands $(q, v_s) \mapsto (q_1, a_1) \mapsto \ldots (r, a_k) \ldots \mapsto (r, w_t)$ corresponding to these N steps. This is a prime input command sequence.

($\Leftarrow$) Let $(q_1, a_1) \mapsto \ldots \mapsto (q_n, a_n)$ be a prime input command sequence with N computational steps. Then $q_n$ is visited twice and all other states in the sequence are visited only once. Let $v_0 V_1 \ldots v$, be the initial tape pattern over the window of execution during the N computational steps. Now $a_1=v_s$ for some s. Let $w_0 w_1 \ldots w_n$ be the final tape pattern over the window of execution as a result of these N steps. Then $a_n=v$, for some t. Thus, $[q, v_0 v_1 \ldots v_n, s] \Rightarrow [r, w_0 w_1 \ldots w_n, t]$ is a prime directed edge.

Remark 4.20 Upper Bound for the Number of Prime Directed Edges

Each prime head node determines a unique prime directed edge so an upper bound for head nodes provides an upper bound for the number of distinct prime directed edges. Consider prime head node [q, V, s]. There are |Q| choices for the state q. Any pattern that represents the window of execution has length ≤|Q|+1. Furthermore, by the previous remark any pattern P such that (V, s) submatches (P, t) for some t, then the resultant pattern is the same since V spans the window of execution. Thus, $|A|^{|Q|+1}$ is an upper bound for the number of different patterns V.

Lastly, there are two choices for s in a |Q|+1 length pattern because the maximum number of execution steps is |Q| i.e. the tape head move sequence is $L^{|Q|}$ or $R^{|Q|}$. Thus, |Q| is an upper bound for the number of choices for s unless |Q|=1. The following bound works in the trivial case that |Q|=1. Thus, there are at most $|Q|^2 |A|^{|Q|+1}$ prime directed edges.

Example 4.21
3-State Machine Prime Directed Edges and Prime Input Command Sequences Consider Turing Machine (Q, A, η). Q={2, 3, 4} and 1 is the halting state. A={0, 1}. η is specified as follows. η(2, 0)=(3, 1, L). η(2, 1)=(4, 0, L). η(3, 0)=(4, 1, R). η(3, 1)=(4, 0, R). η(4, 0)=(1, 0, R). η(4, 1)=(2, 0, R).

| Prime Directed Edges | Prime Input Command Sequences |
| --- | --- |
| [2, 0<u>0</u>0, 1] ⇒ [2, 10<u>0</u>, 2] | (2, 0) ↦ (3, 0) ↦ (4, 1) ↦ (2, 0) |
| [2, 1<u>0</u>0, 2] ⇒ [2, 00<u>0</u>, 2] | (2, 0) ↦ (3, 1) ↦ (4, 1) ↦ (2, 0) |
| [2, 1<u>1</u>, 1] ⇒ [2, 0<u>0</u>, 1] | (2, 1) ↦ (4, 1) ↦ (2, 0) |
| [2, 0<u>0</u>1, 1] ⇒ [2, 10<u>1</u>, 2] | (2, 0) ↦ (3, 0) ↦ (4, 1) ↦ (2, 1) |
| [2, 1<u>0</u>1, 1] ⇒ [2, 00<u>1</u>, 2] | (2, 0) ↦ (3, 1) ↦ (4, 1) ↦ (2, 1) |
| [3, 0<u>1</u>0, 0] ⇒ [3, 1<u>0</u>1, 1] | (3, 0) ↦ (4, 1) ↦ (2, 0) ↦ (3, 0) |
| [3, 1<u>1</u>0, 0] ⇒ [3, 0<u>0</u>1, 1] | (3, 1) ↦ (4, 1) ↦ (2, 0) ↦ (3, 0) |
| [4, 1<u>0</u>, 0] ⇒ [4, 1<u>1</u>, 1] | (4, 1) ↦ (2, 0) ↦ (3, 0) ↦ (4, 1) |
| [4, <u>1</u>1, 0] ⇒ [4, 0<u>0</u>, 1] | (4, 1) ↦ (2, 1) ↦ (4, 0) |

There are 9 distinct prime state cycles. Observe that $|Q|^2 |A|^{|Q|+1} = 3^2 (4^2)$ 144.

Observe that $|Q|(|A|+|A|^2) = 2(2+4) = 12$.

The upper bound in 4.20 is not sharp. Although sharp upper bounds for the number of prime directed edges can be important, the sharpness of the upper bounds does not affect the speed of method 4.34 in finding prime directed edges for a particular Turing machine.

In what follows prime directed edges are link matched so that for a given Turing Machine a method for finding consecutive repeating state cycles is demonstrated. It is proved that this method will find immortal periodic points if they exist.

Definition 4.22 Halting Execution Node

Suppose $[q, v_0 v_1 \ldots v_n, s]$ is an execution node and over the next |Q| computational steps a prime state cycle is not found. In other words, a prime directed edge is not generated. Then the Turing machine execution halted in |Q| or less steps. Let W be a pattern such that (W, t) submatches (V, s) and W spans the window of execution until execution halts. Define the halting node as H=[q, W, t].

Definition 4.23 Prime Directed Edge Complexity

Remark 4.20 provides an upper bound on the number of prime directed edges. Let $\{\Delta_1 \Rightarrow \Gamma_1, \ldots, \Delta_k \Rightarrow \Gamma_k, \ldots, \Delta_N \Rightarrow \Gamma_N\}$ denote the finite set of prime directed edges for machine (Q, A, η). Define the prime directed edge complexity of Turing machine (Q, A, η) to be the number of prime directed edges denoted as |P|.

Observe that any digital computer program also has a finite prime directed edge complexity. This follows from the fact that any digital computer program can be executed by a Turing machine.

Definition 4.24 Overlap Matching of a Node to a Prime Head Node Execution Node Π Overlap Matches Prime Head Node Δ if and Only if the Following Hold.

$\Pi=[r, w_0 w_1 \ldots w_n, t]$ is an execution node satisfying 0≤t≤n
$\Delta=[q, v_0 v_j \ldots v_n, s]$ is a prime head node satisfying 0≤s≤m
State q=State r.
W denotes pattern $w_0 w_1 \ldots w_n$ and V denotes pattern $v_0 v_1 \ldots v_m$
Pattern (W, t) overlap matches (V, s) as defined in definition 3.1.

Lemma 4.25 Overlap Matching Prime Head Nodes are Equal

If $\Delta=[q, P, u]$ and $\Delta_k=[q, V, s]$ are prime head nodes and they overlap match, then they are equal. (Distinct edges have prime head nodes that do not overlap match.)

Proof.

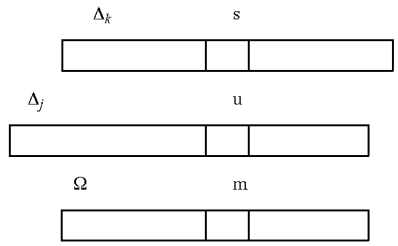

0≤u≤$|\Delta_j|$ and 0≤s≤$|\Delta_k|$. Let (I, m)=(P, u)∩(V, s) where m=min{s, u}. Suppose the same machine begins execution on tape I with tape head at m in state q. If s=u and $|\Delta_j|=|\Delta_k|$, then the proof is complete.

Otherwise, s≠u or $|\Delta_j| \neq |\Delta_k|$ or both. $\Delta_j$ has a window of execution [0, $|\Delta_j|-1$] and $\Delta_k$ has window of execution [0, $|\Delta_k|-1$]. Let the ith step be the first time that the tape head exits finite tape I. This means the machine would execute the same machine instructions with respect to $\Delta_j$ and $\Delta_k$ up to the ith step, so on the ith step, $\Delta_j$ and $\Delta_k$ must execute the same instruction. Since it exits tape I at the ith step, this would imply that either pattern P or V are exited at the ith step. This contradicts either that $[0, |\Delta_j|-1]$ is the window of execution for $\Delta_j$ or $[0, |\Delta_k|-1]$ is the window of execution for $\Delta_k$.

Definition 4.26 Edge Node Substitution Operator $\Pi \oplus (\Delta \Rightarrow \Gamma)$ Let $\Delta \Rightarrow \Gamma$ be a prime directed edge with prime head node $\Delta = [q, v_0 \ v \ldots s]$ and tail node $\Gamma = [r, w_0 \ w_1 \ldots w_n, t]$. If execution node $\Pi = [q, p_0 \ p_1 \ldots p_m, u]$ overlap matches $\Delta$, then the edge pattern substitution operator from 3.2 induces a new execution node $\Pi \oplus (\Delta \Rightarrow \Gamma) = [r, (P,u) \oplus [(V,s) \Rightarrow (W,t)], k]$ with head k=u+t−s if u>s and head k=t if u≤s such that 0≤s, t≤n and 0≤u≤m and patterns $V = v_0 \ v_1 \ldots v_n$ and $W = w_0 \ w_1 \ldots w_n$ and $P = p_0 \ p_1 \ldots p_m$.

Definition 4.27 Prime Directed Edge Sequence and Link Matching

A prime directed edge sequence is defined inductively. Each element is a coordinate pair with the first element being a prime directed edge and the second element is an execution node. Each element is abstractly expressed as $(\Delta_k \Rightarrow \Gamma_k, \Pi_k)$.

The first element of a prime directed edge sequence is $(\Delta_1 \Rightarrow \Gamma_1, \Pi_1)$ where $\Pi_1 = \Gamma_1$, and $\Delta_1 \Rightarrow \Gamma_1$ is some prime directed edge in P. For simplicity in this definition, the indices in P are relabeled if necessary so the first element has indices equal to 1. If $\Pi_1$ overlap matches some non-halting prime head node $\Delta_2$, the second element of the prime directed edge sequence is $(\Delta_2 \Rightarrow \Gamma_2, \Pi_2)$ where $\Pi_2 = \Pi_1 \oplus (\Delta_2 \Rightarrow \Gamma_2)$. This is called a link match step.

Otherwise, $\Pi_1$ overlap matches a halting node, then the prime directed edge sequence terminates. This is expressed as $[(\Delta_1 \Rightarrow \Gamma_1, \Gamma_1), \text{HALT}]$. In this case it is called a halting match step.

If the first k−1 steps are link match steps, then the prime directed edge sequence is denoted as $[(\Delta_1 \Rightarrow \Gamma_1, \Pi_1), (\Delta_2 \Rightarrow \Gamma_2, \Pi_2), \ldots, (\Delta_k \Rightarrow \Gamma_k, \Pi_k)]$ where $\Pi_j$ overlap matches prime head node $\Delta_{j+1}$ and $\Pi_{j+1} = \Pi_j \oplus (\Delta_{j+1} \Rightarrow \Gamma_{j+1})$ for each j satisfying 0≤j≤k.

Notation 4.28 Edge Sequence Notation $E([p_1, p_2, \ldots, p_k], k)$

To avoid subscripts of a subscript, $p_k$ and the subscript $p_{(j)}$ represent the same number. As defined in 4.27, $P = \{\Delta_1 \Rightarrow \Gamma_1, \ldots \Delta_k \Rightarrow \Gamma_k, \ldots, \Delta_N \Rightarrow \Gamma_N\}$ denotes the set of all prime directed edges. $E([p_1], 1)$ denotes the edge sequence $[(\Delta_{p(1)} \Rightarrow \Gamma_{p(1)}, \Pi_{p(1)})]$ of length 1 where $\Pi_{p(1)} = \Gamma_{p(1)}$ and $1 \le p_1 \le |P|$. Next $E([p_1, p_2], 2)$ denotes the edge sequence $[(\Delta_{p(1)} \Rightarrow \Gamma_{p(1)}, \Pi_{p(1)}), (\Delta_{p(2)} \Rightarrow \Gamma_{p(2)}, \Pi_{p(2)})]$ of length 2 where $\Pi_{p(2)} = \Pi_{p(1)} \oplus (\Delta_{p(2)} \Rightarrow \Gamma_{p(2)})$ and $1 \le p_1, p_2 \le |P|$.

In general, $E([p_1, p_2, \ldots, p_k], k)$ denotes the edge sequence of length k which is explicitly $[(\Delta_{p(1)} \Rightarrow \Gamma_{p(1)}, \Pi_{p(1)}), (\Delta_{p(2)} \Rightarrow \Gamma_{p(2)}, \Pi_{p(2)}), \ldots, (\Delta_{p(k)} \Rightarrow \Gamma_{p(k)}, \Pi_{p(k)})]$ where $\Pi_{p(j+1)} = \Pi_{p(j)} \oplus (\Delta_{p(j+1)} \Rightarrow \Gamma_{p(j+1)})$ for each j satisfying $1 \le j \le k-1$ and $1 \le p(j) \le |P|$.

Definition 4.29 Edge Sequence Contains a Consecutive Repeating State Cycle

Lemma 4.19 implies that an edge sequence corresponds to a composition of prime input commands. The expression an edge sequence contains a consecutive repeating state cycle is used if the corresponding sequence of prime input commands contains a consecutive repeating state cycle.

Theorem 4.30 Any consecutive repeating state cycle of (Q, A, η) is contained in an edge sequence of (Q, A, η).

PROOF. This follows immediately from definition 4.29 and lemmas 4.15 and 4.19.

Remark 4.31 Period of an Immortal Periodic Point Contained in Edge Sequence

If $E([p_1, p_2, \ldots, p_r], r)$ contains a consecutive repeating state cycle, then the corresponding immortal periodic point has period $$\le \frac{1}{2} \sum_{k=1}^{r} |\Delta_{p(k)} \Rightarrow \Gamma_{p(k)}|.$$

PROOF. This follows from lemma 3.11 that a consecutive repeating state cycle induces an immortal periodic point. The length of the state cycle equals the period of the periodic point. Further, the number of input commands corresponding to the number of computational steps equals $|\Delta_{p(k)} \Rightarrow \Gamma_{p(k)}|$ in directed edge $\Delta_{p(k)} \Rightarrow \Gamma_{p(k)}$.

Method 4.32 Finding a Consecutive Repeating State Cycle in an Edge Sequence

Given an edge sequence whose corresponding prime input command sequence $(q_0, a_0) \mapsto (q_1, a_1) \mapsto \ldots \mapsto (q_N, a_N)$ has length N Set n=N/2 if N is even; otherwise, set n=(N+1)/2 if N is odd for each k in {1, 2, . . . , n}

```
{
    for each j in {0, 1, ..., N−2k−1}
    {
        if sequence (q_j, a_j) ↦ (q_{j+1}, a_{j+1}) ↦ ... ↦ (q_{j+k}, a_{j+k}) equals
            sequence (q_{j+k+1}, a_{j+k+1}) ↦ (q_{j+k+2}, a_{j+k+2}) ↦ ... ↦ (q_{j+2k+1}, a_{j+2k+1})
        then
        {
            return consecutive repeating state cycle
                (q_j, a_j) ↦ (q_{j+1}, a_{j+1}) ↦ ... ↦ (q_{j+k}, a_{j+k}) ↦ ... ↦ (q_{j+k+1}, a_{j+k+1})
        }
    }
}
```

If exited outer for loop without finding a consecutive repeating state cycle

Return NO consecutive repeating state cycles were found.

Example 4.33

A newLISP Function that Finds a Consecutive Repeating Sequence

```
(define (find_pattern_repeats p_length seq)
    (let
        (
            (k 0)
            (max_k (− (length seq) (+ p_length p_length)) )
            (pattern nil)
            (repeat_pair nil)
            (no_repeats true)
        )
        (while (and (<= k max_k) no_repeats)
            (set 'pattern (slice seq k p_length))
            (if (= pattern (slice seq (+ k p_length) p_length))
                (begin
                    (set 'repeat_pair (list pattern k))
                    (set 'no_repeats false)
                )
            )
            (set 'k (+ k 1))
        )
        repeat_pair
    ))
(define (find_repeats seq)
    (let
        (
            (p_length 1)
            (max_p_length (/ (length seq) 2) )
            (repeat_pair nil)
        )
        (while (and (<= p_length max_p_length) (not repeat_pair) )
            (set 'repeat_pair (find_pattern_repeats p_length seq))
            (set 'p_length (+ p_length 1))
```

-continued

```
    )
    repeat_pair
))
(set 's1 '(3 5 7 2 3 5 7 11 5 7 ))
;; s1 does not have a consecutive repeating sequence.
(set 's2 '(3 5 7 2 3 5 7 11 5 7 11 2 4 6 8 ))
;; 5 7 11 5 7 11 is a consecutive repeating sequence starting at element in
list s2
(set 's3 '(1 2 0 2 1 0 2 0 1 2 0 2 1 0 1 2 1 0 2 1 2 0 2 1 0 1 2 0 2 1 2 0 1 2
1 0 1 2 0 1 0 1))
;; 0 1 0 1 is a consecutive repeating sequence starting at element 38 in list
s3
> (find_repeats s1)
nil
> (find_repeats s2)
( (5 7 11) 5)
> (find_repeats s3)
( (0 1) 38)
```

Method 4.34 Prime Directed Edge Search Method

Given Turing Machine $(Q, A, \eta)$ as input, the search method works as follows.

Set $P = \emptyset$.

For each non-halting state q in Q

For each pattern $a_{-|Q|} \ldots a_{-2} a_{-1} a_0 a_1 a_2 \ldots a_{|Q|}$ selected from $A^{2|Q|+1}$

{

| Tape Square   |   | -\|Q\|   | ... | -2   | -1   | 0   | 1   | 2   | ... | \|Q\|   |
|---|---|---|---|---|---|---|---|---|---|---|
| Tape Contents |   | $a_{-|Q|}$ | ... | $a_{-2}$ | $a_{-1}$ | $a_0$ | $a_1$ | $a_2$ | ... | $a_{|Q|}$ |
| Start State   | q |   |   |   |   |   |   |   |   |   |

With tape head located at $a_0$, start executing machine $(Q, A, \eta)$ until one state has been visited twice or $(Q, A, \eta)$ reaches a halting state. The Dirichlet principle implies this will take at most $|Q|$ computational steps. If it does not halt, let r be the state that is first visited twice. As defined in 4.1, over this window of execution, a prime directed edge $\Delta \Rightarrow \Gamma$ is constructed where $\Delta = [q, v_0 v_1 \ldots v_n, s]$, $\Gamma = [r, w_0 w_1 \ldots w_n, t]$ and $0 \leq s, t \leq n \leq |Q|$.

Set $P = P \cup \{\Delta \Rightarrow \Gamma\}$

}

Remark 4.35 Prime Directed Edge Search Method Finds all Prime Directed Edges

Method 4.34 finds all prime directed edges of $(Q, A, \eta)$ and all halting nodes.

PROOF. Let $\Delta \Rightarrow \Gamma$ be a prime directed edge of $(Q, A, \eta)$. Then $\Delta \Rightarrow \Gamma$ has a head node $A = [r, v_0 v_1 \ldots v_n, s]$, for some state r in Q, for some tape pattern $v_0 v_1 \ldots v_n$ that lies in $A^{n+1}$, such that $n \leq |Q|$ and $0 \leq s \leq n$. In the outer loop of 4.34, when r is selected from Q and in the inner loop when the tape pattern $a_{-|Q|} \ldots a_{-2} a_{-1} a_0 a_1 a_2 \ldots a_{|Q|}$ is selected from $A^{2|Q|+1}$ such that $$a_0 = v_s \quad a_1 = v_{s+1} \quad \ldots \quad a_k = v_{s+k} \quad \ldots \quad a_{n-s} = v_n$$

$$a_{-1} = v_{s-1} \quad a_{-2} = v_{s-2} \quad \ldots \quad a_{-k} = v_{s-k} \quad \ldots \quad a_{-s} = v_0$$

then the machine execution in 4.34 will construct prime directed edge $\Delta \Rightarrow \Gamma$. When the head node is a halting node, the machine execution must halt in at most $|Q|$ steps. Otherwise, it would visit a non-halting state twice and thus, be a non-halting head node. The rest of the argument for this halting node is the same as for the non-halting head node.

Method 4.36 Immortal Periodic Point Search Method

Given Turing Machine $(Q, A, \eta)$ as input, the method works as follows.

Use method 4.34 to find all prime directed edges, P.

```
set k = 1.
set Φ(1) = { E([1], 1), E([2], 1), ..., E([|P|], 1) }
while ( Φ(k) ≠ ∅ )
{
    set Φ(k+1) = ∅.
    for each E([p_1, p_2, ..., p_k], k) in Φ(k)
    {
        for each prime directed edge Δ_j ⇒ Γ_j in P
        {
            if Δ_j ⇒ Γ_j link matches with Π_{p(k)} then
            {
                set p_{k+1} = j
                set Φ(k+1) = Φ(k+1) ∪ E([p_1, p_2, ..., p_k, p_{k+1}], k+1)
                if E([p_1, p_2, ..., p_k, p_{k+1}], k+1) contains a consecutive
                   repeating state cycle
                then return the consecutive repeating state cycle
            }
        }
    }
    k is incremented.
}
``` if (while loop exited because $\Phi(m) = \emptyset$ for some m) then return $\emptyset$ Remark 4.37 $|\Phi(k)|$ is finite and $|\Phi(k)| \leq |P|^k$ PROOF. $|\Phi(1)| = |P|$. Analyzing the nested loops, in method 4.36 for each $E([p_1, p_2, \ldots, p_k], k)$ in $\Phi(k)$ for each $\Delta_j \Rightarrow \Gamma_j$ in P { ... }

For each edge sequence $E([p_1, p_2, \ldots, p_k], k)$ chosen from $\Phi(k)$, at most $|P|$ new edge sequences are put in $\Phi(k+1)$. Thus $|\Phi(k+1)| \leq |P||\Phi(k)|$, so $|\Phi(k)| \leq |P|^k$.

Definition 4.38 Periodic Turing Machine

A Turing machine $(Q, A, \eta)$ that has at least one periodic configuration, whenever it has an immortal configuration is said to be a periodic Turing machine.

Theorem 4.39 If $(Q, A, \eta)$ is a periodic machine, then method 4.36 terminates in a finite number of steps with either a consecutive repeating state cycle or for some positive integer J, then $\Phi(J) = \emptyset$ PROOF. If $(Q, A, \eta)$ has at least one configuration $(q, k, T)$ that has an immortal orbit, then the assumption that $(Q, A, \eta)$ is a periodic machine implies the existence of a periodic point p with some finite period N. Thus, from lemma 3.10, there is a consecutive repeating state cycle that corresponds to the immortal periodic orbit of p. Since method 4.36 searches through all possible prime edge sequences of length k, a consecutive repeating state cycle will be found that is contained in a prime directed edge sequence with length at most 2N. Thus, this immortal periodic point of period N will be reached before or while computing $\Phi(2N)$.

Otherwise, $(Q, A, \eta)$ does not have any configurations with an immortal orbit; in other words, for every configuration, $(Q, A, \eta)$ halts in a finite number of steps.

claim: There is a positive integer J such that every edge sequence terminates while executing method 4.36. By reductio absurdum, suppose not. Then there is at least one infinite prime directed edge sequence that exists: this corresponds to an immortal orbit, which contradicts that $(Q, A, \eta)$ does not have any configuration with an immortal orbit.

Periodic Point Properties

Lemma 5.1 All right head moves or all left tape head moves

If Turing Machine $(Q, A, \eta)$ can execute $|Q|$ consecutive computational steps which are all right tape head moves or all left tape head moves without halting, then the machine has an immortal periodic point with period ≤|Q|.

PROOF. Consecutive Right Tape Head Moves.

Suppose there are |Q| consecutive computational steps which are all right tape head moves. Thus, there is a sequence of |Q| commands $\eta(q_k, a_k)=(q_{k+1}, b_k, R)$ satisfying $1 \leq k \leq |Q|$ that execute these |Q| computational steps without halting. In the table below, the subscript k in each state $q_k$ indicates the state of the machine just before the kth computational step.

| State | k | | | | | k − |Q| + 1 | k + |Q| |
|---|---|---|---|---|---|---|---|
| $q_1$ | $\underline{a_1}$ | $a_2$ | ... | $a_k$ | ... | $a_{|Q|}$ | |
| $q_2$ | $b_1$ | $\underline{a_2}$ | ... | $a_k$ | ... | $a_{|Q|}$ | |
| ... | | | | | | | |
| $q_k$ | $b_1$ | $b_2$ | ... | $\underline{a_k}$ | ... | $a_{|Q|}$ | |
| ... | | | | | | | |
| $q_{|Q|}$ | $b_1$ | $b_2$ | ... | $b_k$ | ... | $\underline{a_{|Q|}}$ | |
| $q_{|Q|+1}$ | $b_1$ | $b_2$ | ... | $b_k$ | ... | $b_{|Q|}$ | $a_{|Q|+1}$ |

The Dirichlet Box principle applied to the |Q|+1 states $\{q_1, q_2, \ldots q_{|Q|}, q_{|Q|+1}\}$ implies that two of the states are equal; namely, $q_j = q_k$ for some j<k. Thus, the point $$p = [q_j, \overline{b_j b_{j+1} \ldots b_{k-1}} \; \overline{\langle a_j \rangle a_{j+1} \ldots a_{k-1}}]$$

is an immortal periodic point with period k−j and (k−j)≤|Q|.

Consecutive Left Tape Head Moves.

Suppose there are |Q| consecutive computational steps which are all left tape head moves. Thus, there is a sequence of |Q| commands $\eta(q_k, a_k)=(q_{k+1}, b_k, L)$ satisfying $1 \leq k \leq |Q|$ that execute these |Q| computational steps without halting. In the table below, the subscript k in each state $q_k$ indicates the state of the machine just before the kth computational step.

| STATE | k − |Q| | k − |Q| + 1 | | | | | k |
|---|---|---|---|---|---|---|---|
| $q_1$ | | $a_{|Q|}$ | ... | $a_k$ | ... | $a_2$ | $\underline{a_1}$ |
| $q_2$ | | $a_{|Q|}$ | ... | $a_k$ | ... | $\underline{a_2}$ | $b_1$ |
| ... | | | | | | | |
| $q_k$ | | $a_{|Q|}$ | ... | $\underline{a_k}$ | ... | $b_2$ | $b_1$ |
| ... | | | | | | | |
| $q_{|Q|}$ | | $\underline{a_{|Q|}}$ | ... | $b_k$ | ... | $b_2$ | $b_1$ |
| $q_{|Q|+1}$ | $a_{|Q|+1}$ | $b_{|Q|}$ | ... | $b_k$ | ... | $b_2$ | $b_1$ |

The Dirichlet Box principle applied to the |Q|+1 states $\{q_1, q_2, \ldots q_{|Q|}, q_{|Q|+1}\}$ implies that two of the states are equal; namely, $q_j = q_k$ for some j<k. Thus, the point $$p = [q_j, \overline{a_{k-1} \ldots \langle a_j \rangle} \; \overline{b_{k-1} \ldots b_j}]$$

is an immortal periodic point with period k−j and (k−j)≤|Q|.

Remark 5.2

Consider Turing Machine (Q, A, η). If for some q in Q, and for some a, b in A, $\eta(q, a)=(q, b, R)$ or $\eta(q, a)=(q, b, L)$, then (Q, A, η) has an immortal fixed point.

PROOF. If $\eta(q, a)=(q, b, R)$, then $p=[q, \overline{b} \langle a \rangle \overline{a}]$ is an immortal fixed point of (Q, A, η). If $\eta(q, a)=(q, b, L)$, then $p=[q, \overline{a} \langle a \rangle \overline{b}]$ is an immortal fixed point of (Q, A, η).

Definition 5.3 Minimal Period

If (Q, A, η) has no immortal orbits, then it is called a halting machine. Otherwise, the minimum{C(p): p is an immortal periodic point of (Q, A, η)} is well-defined because it is the minimum of a non-empty subset of the natural numbers. This minimum is called the minimal period of (Q, A, η).

Theorem 5.4 Two State Minimal Period Theorem

If Q={q, r} has only two non-halting states and A={0, 1}, then (Q, A, η) is a halting machine or its minimal period is 1, 2 or 4.

PROOF. If (Q, A, η) is a halting machine, then the proof is completed. Otherwise; suppose (Q, A, η) has an immortal periodic point with period ≥5. Then it is shown that this implies the machine must have an immortal periodic point with period ≤4.

Consider the first 5 computational steps of the immortal periodic point p. If two consecutive steps stay in the same state, then by remark 5.2, then (Q, A, η) has an immortal periodic point with period 1. Done. Furthermore, if there are two consecutive right tape head moves or left tape head moves, during these five computational steps, then by lemma 5.1, there is an immortal periodic point with period ≤2.

Thus, W.L.O.G. (symmetry), for the remaining cases the first five computational steps look like—where the variables $x_1, x_2, x_3, x_4, y_1, y_2, y_3$ represent elements of A:

| STATE | | MOVE | STEP |
|---|---|---|---|
| q | $x_1$ | $y_1$ | |
| r | $x_2$ | $\underline{y_1}$ | R | 1 |
| q | $\underline{x_2}$ | $y_2$ | L | 2 |
| r | $x_3$ | $\underline{y_2}$ | R | 3 |
| q | $\underline{x_3}$ | $y_3$ | L | 4 |
| r | $x_4$ | $y_3$ | R | 5 |

Observation 1.

$x_1 = x_2$ implies $x_1 = x_2 = x_3$ because computational steps 1 and 3 are $\eta(q, x_1)=(r, x_2, R)$ and $\eta(q, x_2)=(r, x_3, R)$.

Observation 2.

$y_1 = y_2$ implies that $y_1 = y_2 = y_3$ because computational steps 2 and 4 are $\eta(r, y_1)=(q, y_2, L)$ and $\eta(r, y_2)=(q, y_3, L)$.

Observation 3.

Since A has 2 elements, [$x_1 = x_2$ or $x_1 = x_3$ or $x_2 = x_3$] and [$y_1 = y_2$ or $y_1 = y_3$ or $y_2 = y_3$].

Case 1: $x_2 = x_3$ and $y_2 = y_3$. Based on steps 3 and 4, point $p=[q, \overline{0} \langle x_2 \rangle y_2 \overline{0}]$ is an immortal periodic point with period 2.

Many of the nine cases below are reduced to previous cases.

Case 2: $x_1 = x_2$ and $y_2 = y_3$. The first observation reduces case 2 to case 1.

Case 3: $x_1 = x_3$ and $y_2 = y_3$. By replacing all occurrences of $x_3$ by $x_1$ and all occurrences of $y_3$ by $y_2$, then the previous table becomes:

| STATE | | MOVE | STEP |
|---|---|---|---|
| q | $x_1$ | $y_1$ | |
| r | $x_2$ | $\underline{y_1}$ | R | 1 |
| q | $\underline{x_2}$ | $y_2$ | L | 2 |
| r | $x_1$ | $\underline{y_2}$ | R | 3 |
| q | $\underline{x_1}$ | $y_2$ | L | 4 |
| r | $x_2$ | $\underline{y_2}$ | R | 5 |
| q | $\underline{x_2}$ | $y_2$ | L | 6 |

After the substitution, from step 4, then $\eta(r, y_2)=(q, y_2, L)$. This implies step 6 in the table.

Looking at steps 2 and 6, point $p=[q, \overline{0} \langle x_2 \rangle y_2 \overline{0}]$ is an immortal periodic point with period 2 or 4.

Case 4: $x_1 = x_3$ and $y_1 = y_3$. Substituting $x_1$ for $x_3$ and $y_1$ for $y_3$ in step 4 of the original table, then the point $p=[q, \overline{0} \langle x_1 \rangle y_1 \overline{0}]$ is an immortal periodic point with period 2 or 4.

Case 5: $x_1=x_2$ and $y_1=y_3$. This reduces to case 4 from the first observation.

Case 6: $x_2=x_3$ and $y_1=y_3$. Substituting $x_2$ for $x_3$ and $y_1$ for $y_3$ in the original table and observing that from step 3 that $\eta(q, x_2)=(q, x_2, R)$. This implies that $x_4=x_2$

| STATE | | | MOVE | STEP |
|---|---|---|---|---|
| q | $\underline{x_1}$ | $y_1$ | | |
| r | $x_2$ | $\underline{y_1}$ | R | 1 |
| q | $\underline{x_2}$ | $y_2$ | L | 2 |
| r | $x_2$ | $\underline{y_2}$ | R | 3 |
| q | $\underline{x_2}$ | $y_1$ | L | 4 |
| r | $x_2$ | $\underline{y_1}$ | R | 5 |

Then observe that after step 1 and step 5, the points are identical. Thus, the point $p=[r, \overline{0}x_2\langle y_1\rangle\overline{0}]$ is immortal with period equal to 2 or 4.

Case 7: $x_1=x_2$ and $y_1=y_2$.

This reduces to case 2 from the second observation.

Case 8: $x_1=x_3$ and $y_1=y_2$. This reduces to case 4 from the second observation.

Case 9: $x_2=x_3$ and $y_1=y_2$. This reduces to case 6 from the second observation.

Finally, it is shown that any machine having an immortal periodic point with period 3 must have an immortal periodic point with period 1 or 2. Suppose the machine has an immortal period 3 point. During the three computational steps, the claim is that there has to be two consecutive steps that are in the same state. For example, the state sequence q, r, q, r would contradict that it is a period 3 orbit because at step 0 it is in state q and after step 3 it is in state r; similarly, the state sequence r, q, r, q would contradict that is a period 3 orbit. Thus, there must be two consecutive steps that are in the same state, which implies it is an immortal fixed point. Thus, the machine can not have a minimal period of 3.

Immortal Orbit and Recurrent Points

In this section, recurrent points (configurations) are defined and the Immortal Orbit theorem is shown, which generalizes the behavior in the two previous examples. In particular, if machine $(Q, A, \eta)$ has an immortal configuration $(q, k, T)$, then the corresponding orbit of the point $p=\phi(q, k, T)$ with respect to the corresponding affine functions has a recurrent point and at least one recurrent point z is a fixed point of a composition sequence of these affine functions iterated according to the correspondence in Theorem 2.22

Definition 6.1 Recurrent Points

Let X be a metric space, S: $N \to N$ a function index sequence, and a family of functions $f_k$: $X \to X$, where $k \in N$. The orbit of point $p \in X$ is $\{p, f_{S(1)}(p), f_{S(2)}f_{S(1)}(p), \ldots, f_{S(m)}f_{S(m-1)} \cdots f_{S(2)}f_{S(1)}(p), \ldots\}$. The $\omega$-limit set, $\omega(p, f_k)$, is the set of cluster points of the orbit of p i.e.

$$\omega(p, f_k) = \bigcap_{n \in N} \overline{\{f_{S(k)} \circ f_{S(k-1)} \circ \ldots \circ f_1(p) : k > n\}}.$$

Any point $z \in X$ that lies in $\omega(p, f_k)$ is called a recurrent point. The closure of the set of recurrent points of $f_k$ is denoted $R(f_k)$ and is called the recurrent set of $f_k$.

An aperiodic Turing machine has at least one immortal configuration, but has no periodic immortal configurations. This first example is an aperiodic Turing machine.

Example 6.2
Aperiodic Turing Machine Execution and Affine Orbit Correspondence

Consider the Turing machine with state set Q={a, b, c, d, e, f}, halting state h and alphabet A={0, 1, 2, 3}. The Turing program $\eta$ is shown below.

$\eta(a, 0) = (d, 1, R)$ $\eta(a, 1) = (f, 1, R)$ $\eta(a, 2) = (f, 2, R)$ $\eta(a, 3) = (f, 3, R)$ $\eta(b, 0) = (c, 1, L)$ $\eta(b, 1) = (e, 1, L)$ $\eta(b, 2) = (e, 2, L)$ $\eta(b, 3) = (e, 3, L)$ $\eta(c, 0) = (a, 2, L)$ $\eta(c, 1) = (f, 1, R)$ $\eta(c, 2) = (f, 2, R)$ $\eta(c, 3) = (f, 3, R)$ $\eta(d, 0) = (b, 2, R)$ $\eta(d, 1) = (e, 1, L)$ $\eta(d, 2) = (e, 2, L)$ $\eta(d, 3) = (e, 3, L)$ $\eta(e, 0) = (a, 3, L)$ $\eta(e, 1) = (a, 0, L)$ $\eta(e, 3) = (d, 0, R)$ $\eta(e, 3) = (f, 0, R)$ $n(f, 0) = (b, 3, R)$ $\eta(f, 1) = (b, 0, R)$ $\eta(f, 2) = (c, 0, L)$ $\eta(f, 3) = (e, 0, L)$ Base B=|Q||A|+1=11. The value function v: $A \cup Q \cup \{h\} \to N$ is defined explicitly as v(h)=0. v(0)=1. v(1)=2. v(2)=3. v(3)=4. v(a)=5. v(b)=6. v(c)=7. v(d)=8. v(e)=9. and v(f)=10. Before program execution starts, we assume the machine is in state b. See FIGS. 28 and 29. The tape head is at tape square 2. T(1)=2, T(0)=1 and all other tape squares contain 0 i.e. the initial machine configuration is [b, $\overline{0}$ $0\overline{0}$]. The first computational step is $\eta(b, 0)=(c, 1, -1)$ which is equivalent to applying the affine map $$f_1(x, y) = \left(\frac{1}{11}x + 34, 11y - 682\right) \text{ to the point } \left(12\frac{1}{10}, 69\frac{21}{110}\right).$$

The calculation of the x-coordinate is $$11v(0) + v(0) + \frac{\frac{1}{11}}{1 - \frac{1}{11}} = 12\frac{1}{10}.$$

The y-coordinate is $$11v(b) + v(2) + \frac{1}{11}v(1) + \frac{\frac{1}{11^2}}{1-\frac{1}{11}} = 69\frac{21}{110}.$$

Observe that the machine configuration $[b, \overline{0\underline{0}0}]$ is a recurrent point of this orbit starting at point $[b, \overline{0120\underline{0}}]$. Furthermore, $$\varphi[b, \overline{0\underline{0}0}] = \left(12\frac{1}{10}, 67\frac{1}{10}\right).$$

Observe that $$f_3 f_2 f_1(x, y) = \left(11x - 121, \frac{1}{11}y + 61\right)$$

has fixed point $$\left(12\frac{1}{10}, 67\frac{1}{10}\right)$$

which corresponds to recurrent point $[b, \overline{0\underline{0}0}]$. Also, observe that $$f_{12} f_{11} \ldots f_5 f_4(x, y) = \left(11x - 121, \frac{1}{11}y + 61\right).$$

In other words, this recurrent point of the immortal orbit is a fixed point of a finite composition sequence of the corresponding affine maps.

A Turing machine that has at least one periodic configuration, whenever it has an immortal configuration is called a periodic Turing machine.

Example 6.3
$Q = \{q_0, q_1, q_2\}$ $A = \{\#, a, b\}$
$\eta(q_0, \#) = (q_1, a, R)$. $\eta(q_0, a) = (q_0, a, L)$. $\eta(q_0, b) = (q_0, b, L)$.
$\eta(q_1, \#) = (q_0, b, L)$. $\eta(q_1, a) = (q_1, a, R)$. $\eta(q_1, b) = (q_1, b, R)$.
$\eta(q_2, \#) = (h, \#, R)$. $\eta(q_2, a) = (h, a, R)$. $\eta(q_2, b) = (h, b, R)$.

The initial tape contents are all #'s. Formally, $T(k) = \#$ for every integer k. Base $B = |Q| + |A| + 1 = 7$. The value function $v: A \cup Q \cup \{h\} \to N$ is explicitly $v(h) = 0$ $v(\#) = 1$ $v(a) = 2$ $v(b) = 3$ $v(q_0) = 4$ $v(q_1) = 5$ $vv(q_2) = 6$.

In regard to the affine orbit and Turing Machine execution correspondence see FIGS. 30, 31 and 32. The affine functions $f_j$ and unit square domains $W_j$, the current Turing Machine state, tape head and tape are shown after each execution step. The location of the tape head is indicated by underlining the tape symbol and placing the state of the machine directly underneath this tape square.

The point $$u = \left(14 + 3 + \frac{\frac{3}{7}}{1-\frac{1}{7}}, 35 + 2 + \frac{\frac{2}{7}}{1-\frac{1}{7}}\right) = \left(17\frac{1}{2}, 37\frac{1}{3}\right)$$

is a recurrent point that corresponds to the machine being in state $q_1$ and the tape head location is at square 1 and the tape contents are $T(k) = a$ whenever $k \leq 1$ and $T(k) = b$ whenever $k > 1$.

The point $$v = \left(2 \cdot 7 + 2 + \frac{\frac{2}{7}}{1-\frac{1}{7}}, 5 \cdot 7 + 2 + \frac{\frac{2}{7}}{1-\frac{1}{7}}\right) = \left(16\frac{1}{3}, 37\frac{1}{3}\right)$$

is a recurrent point of the immortal orbit that corresponds to the machine being in state $q_1$ and the tape head location can be at any square j and the tape contents are $T(k) = a$ for every k on the tape. Observe that v is a fixed point of $$f_{14}(x, y) = \left(7x - 98, \frac{1}{7}y + 32\right)$$

lying in the interior of the unit square $W_{14} = [(16, 37), (17, 37), (17, 38), (16, 38)]$.

Set $$v_0 = \left(16\frac{145}{294}, 37\frac{1}{6}\right)$$

which is when the tape head is at 0; the machine is in state $q_1$; and $T(0-1) = T(0) = T(0+1) = a$. Then $v_0$ is in this immortal orbit.

| | Tape Coordinate | | | | | | | | | |
|---|---|---|---|---|---|---|---|---|---|---|
| | −1 | 0 | 1 | 2 | 3 | 4 | 5 | 6 | 7 | 8 |
| Tape Contents | a | a̲ | a | b | b | # | # | # | # | # |
| State | | $q_1$ | | | | | | | | |

Set $v_1 =$ to the first time the point in the immortal orbit has its tape head at 4; and the machine is in state $q_0$; and $T(-1-2) = T(-1-1) = T(-1) = T(-1+1) = T(-1+2) = a$.

| | Tape Coordinate | | | | | | | | | | | | |
|---|---|---|---|---|---|---|---|---|---|---|---|---|---|
| | −4 | −3 | −2 | −1 | 0 | 1 | 2 | 3 | 4 | 5 | 6 | 7 | 8 |
| Tape Contents | # | a | a | a̲ | a | a | b | b | b | b | # | # | # |
| State | | | | $q_1$ | | | | | | | | | |

By induction, for every $k > 1$, set $v_k =$ to the first time the point in the immortal orbit has its tape head at $-k$; the machine is in state $q_0$; and $T(-k+j) = a$ for every j such that $|j| \leq k+1$. This implies that $$\lim_{n \to \infty} v_n = v.$$

The point $$w = \left(\frac{21 \cdot 7}{7-1}, \frac{-189}{1-7}\right) = \left(24\frac{1}{2}, 31\frac{1}{2}\right)$$

is a recurrent point of the immortal orbit that corresponds to the machine being in state $q_0$ and the tape head location can be at any square j and the tape contents are T(k)=b for every k on the tape. Observe that w is a fixed point of $\eta_8(x,y)=(\frac{1}{7}x+21, 7y-189)$ lying in the interior of the unit square $W_8=[(24, 31), (25, 31), (25, 32), (24, 32)]$. Also, observe that if $$w_3 = \left(24\frac{1}{6}, 31\frac{685}{2085}\right)$$

which is when the tape head is at 3; and the machine is in state $q_0$; and T(3−1)=T(3)=T(3+1)=b, then $w_3$ is in this immortal orbit.

| Tape Coordinate | | | | | | | | | | |
|---|---|---|---|---|---|---|---|---|---|---|
| | −1 | 0 | 1 | 2 | 3 | 4 | 5 | 6 | 7 | 8 |
| Tape Contents | a | a | a | b | <u>b</u> | b | # | # | # | # |
| State | | | | | $q_0$ | | | | | |

Set $w_4$ equal to the first time the point in the immortal orbit has its tape head at 4; and the machine is in state $q_0$; and T(4−2)=T(4−1)=T(4)=T(4+1)=T(4+2)=b.

| Tape Coordinate | | | | | | | | | | | | | |
|---|---|---|---|---|---|---|---|---|---|---|---|---|---|
| | −4 | −3 | −2 | −1 | 0 | 1 | 2 | 3 | 4 | 5 | 6 | 1 | 8 |
| Tape Contents | # | a | a | a | a | a | b | b | <u>b</u> | b | b | # | # |
| State | | | | | | | | | $q_0$ | | | | |

By induction, for every k>4, set $w_k$ equal to the first time the point in the immortal orbit has its tape head at k; and the machine is in state $q_0$; and T(k+j)=b for every j such that $|j| \leq k-2$. Observe that $$\lim_{n \to \infty} w_n = w.$$

The next theorem states what was already illustrated in the previous examples.

Theorem 6.4 an Immortal Orbit has Recurrent Points.

PROOF. Let $\epsilon > 0$. Let $f_1, f_2, \ldots, f_I$ denote the I affine functions with corresponding unit square domains $W_1, W_2, W_3, \ldots, W_I$. Let p be an immortal point. Then its orbit $$\{p, f_{S(1)}(p), f_{S(2)}f_{S(1)}(p), \ldots, f_{S(m)}f_{S(m-1)} \cdots f_{S(2)}f_{S(1)}(p), \ldots\} \subseteq \bigcup_{k=1}^{I} W_k.$$

The area of $$\bigcup_{k=1}^{I} W_k$$

equals I. There exists a natural number N such that $$\frac{1}{N} < \frac{\varepsilon}{\sqrt{2}}.$$

Consider the first $I(N^2+1)$ points of this orbit. Then at least $N^2+1$ points of the orbit must lie in at least one of these unit squares $W_k$. This implies that there are two points from the orbit in unit square $W_k$ with the distance between them less than or equal to $$\frac{1}{N}.$$

By choosing each $N_k$ such that $$N_k < \frac{1}{2}N_{k-1}$$

and using induction, create a subsequence $\{p_1, p_2, \ldots\}$ of the immortal orbit of p such that $p_k \to z$. Then z is a recurrent point.

Definition 6.5 Cluster Point

Let $\{p_n\}_{n=1}^{\infty}$ be a sequence of points and d a metric. The point q is a cluster point of $\{p_n\}_{n=1}^{\infty}$ if for any $\epsilon > 0$ and for any N, there exists $m \geq N$ such that $d(q, p_m) < \epsilon$.

Definition 6.6 Immortal Points

Let $$U(Q, A, \eta) = \left\{ p \in \bigcup_{k=1}^{I} W_k : \right.$$

p has an immortal orbit with respect to machine $(Q, A, \eta)\}$ U is called the set of immortal points with respect to Turing machine $(Q, A, \eta)$.

Theorem 6.7 Immortal Points are a Closed Set

Suppose $$\lim_{n \to \infty} p_n = p$$

and for each n that $p_n$ lies in $U(Q, A, \eta)$. Then p is an immortal point.

PROOF. Since $$\lim_{n \to \infty} p_n = p$$

a subsequence $q_n$ of $p_n$ may be constructed with the property that $$d(q_n, p) < \frac{1}{B^n}$$

where base $B=|Q|+|A|+1$. This means the corresponding tape of p and the corresponding tape of $q_n$ are the same for the first n symbols on the tape in both directions.

| p Tape Contents | | | | | | | | | |
|---|---|---|---|---|---|---|---|---|---|
| ... | $b_{n+1}$ | $b_n$ | ... | $b_1$ | $\underline{a_0}$ | $a_1$ | ... | $a_n$ | $a_{n+1}$ ... |
| State with tape head at $\underline{a_0}$ | | | | | w | | | | |

| $q_n$ Tape Contents | | | | | | | | | |
|---|---|---|---|---|---|---|---|---|---|
| ... | $d_{n+1}$ | $b_n$ | ... | $b_1$ | $\underline{a_0}$ | $a_1$ | ... | $a_n$ | $c_{n+1}$ ... |
| State with tape head at $\underline{a_0}$ | | | | | w | | | | |

By reductio absurdum, suppose p is not an immortal point. Then execution of $(Q, A, \eta)$ on p halts at the Nth execution step for some natural number N. Since each computational step of $(Q, A, \eta)$ moves either one tape square to the left or to the right, this means that execution of $(Q, A, \eta)$ on p must halt on some tape symbol $a_k$ or $b_k$ such that $k \leq N$. Assuming execution begins at tape square 0 or renumbering if necessary: this means that $(Q, A, \eta)$ starting at point p must halt before moving to the right of tape square N or to the left of tape square —N. Consider point $q_{N+2}$. By assumption, $q_{N+2}$ is immortal but the first N+2 execution steps of $(Q, A, \eta)$ on $q_{N+2}$ and p must be the same because their tape symbols agree in both directions for at least the first N+2 tape squares. This is a contradiction: p halts on execution step N and $q_{N+2}$ does not halt on step N. Thus, p must be an immortal point.

Lemma 6.8 Every point in an immortal orbit and all cluster points lie in the interior of $$\bigcup_{k=1}^{l} W_k.$$

Each point is a distance at least $$\frac{1}{B-1}$$

from the boundary of every $W_k$.

PROOF. Consider a non-halting Turing machine execution. After every execution step, the state in the machine configuration is not in a halting state, h and the tape's range is in A. Further, recall that $v(h)=0$, $v(a_1)=1$, $v(a_{|A|})=|A|$ and $v(q_{|Q|})=B-1$. If the tape contents of every tape square is $a_1$, this corresponds to x and y coordinates whose fractional parts are $$\frac{\frac{1}{B}}{1-\frac{1}{B}} = \frac{1}{B-1}.$$

If the tape contents of every tape square is $a_{|A|}$, which is the tape symbol with the largest value with respect to v, then this corresponds to x and y coordinates whose fractional parts are $$\frac{\frac{|A|}{B}}{1-\frac{1}{B}} = \frac{|A|}{B-1}.$$

Thus, the point p in the immortal orbit corresponding to each configuration has the property that $$|x(p) - \lfloor x(p) \rfloor| \geq \frac{1}{B-1}, \ |y(p) - \lfloor y(p) \rfloor| \geq \frac{1}{B-1}$$

$$|\lceil x(p) \rceil - x(p)| \geq \frac{(B-1)}{B-1} - \frac{|A|}{B-1} = \frac{|Q|}{B-1}$$

and $$|\lceil y(p) \rceil - y(p)| \geq \frac{(B-1)}{B-1} - \frac{|A|}{B-1} = \frac{|Q|}{B-1}.$$

Thus, any cluster point of the immortal orbit must be at least $$\frac{1}{B-1}$$

from the boundary of each $W_k$.

Before the main result is reached, it is helpful to do some elementary counting of finite tape patterns (strings) based on the finite alphabet A and the finite state set Q regardless of the particular Turing machine program $\eta$.

Example 6.9
The Alphabet A={1, 2, 3}
$s_1 s_2 = 12$ is a particular 2-string where $s_1=1$ and $s_2=2$

| ... | 3 | 3 | 1 | 2 | 3 | 1 | 2 | 1 | 2 | 1 | 2 | 3 | 3 | ... |
|---|---|---|---|---|---|---|---|---|---|---|---|---|---|---|

The 2-string 12 occurs four times on the above tape. The 2-string 12 is non-overlapping. The 3-string $s_1 s_2 s_3 = 123$ occurs two times on the above tape.

Definition 6.10 Alphabet Strings
Suppose alphabet $A=\{a_1, a_2, a_3 \ldots, a_n\}$. A k-string is a string of k symbols denoted as $s_1 s_2 s_3 \ldots s_k$ where each $s_j$ lies in A.

Definition 6.11 Overlapping and Disjoint Tape Strings
Let $T_k$ denote the alphabet symbol on the kth square of the Turing tape. Then $T_k T_{k+1} \ldots T_n$, where k is an n-k+1 string of alphabet symbols. The two strings $T_j T_{j+1} \ldots T_m$ and $T_k T_{k+1} \ldots T_n$ are disjoint if m<k OR n<j. Otherwise, they are called overlapping strings.

Furthermore, overlapping strings are distinct if j≠k OR m≠n.

Definition 6.12 Identical Tape Strings
The two tape strings $T_j T_{j+1} \ldots T_m$ and $T_k T_{k+1} \ldots T_n$ are identical if they are the same length (i.e. n−k=m−j) and $T_{k+i} = T_{j+i}$ for each i satisfying $1 \leq i \leq n-k$.

Definition 6.13 Identical Program Execution up to B''

Two Turing machines $M_1(Q_1, A_1, \eta_1)$ and $M_2(Q_2, A_2, \eta_2)$ have identical program execution up to B'' if there is an isomorphism $\Psi: M_1 \to M_2$ such that the following conditions hold.

(1) Both $\phi: Q_1 \to Q_2$ and $\gamma: A_1 \to A_2$ are bijective functions.
(2) $\Psi(\eta_1) = \eta_2$ such that $\Psi\eta_1(q, a) = \eta_2(\phi(q), \gamma(a))$
(3) Machine $M_1$ has tape head location j and machine $M_2$ has tape head location k.
(4) $\Psi(T_{j+m}) = \Gamma_{k+m}$ for every m such that $-n \leq m \leq n$ where T is the tape for $M_1$ and $\Gamma$ is the tape for $M_2$.
(5) $M_1$ program execution is in state r and $M_2$ program execution is in state q.
(6) $\phi(r) = q$.

The same machine can be identical to itself up to B'' at two different steps in its program execution.

Example 6.14
Overlapping 3-Strings

Consider $A = \{0, 1\}$ and string 000 001 010 011 100 101 110 111 $a_1 a_2 a_3$. The substring at the end, $a_1 a_2 a_3$, repeats one of the previous 3-strings. In a string of length $|A|^3 + 3$ at least one 3-string is repeated. For example, in the following string of length 11 where $a_1 a_2 a_3 \ldots a_{11} = 0101\ 0011\ 101$, observe that $a_2 a_3 a_4 = a_9 a_{10} a_{11} = 101$.

Example 6.15
Distinct Overlapping 2-Strings
In any string of length $|A|^2 + 2$, two distinct overlapping 2-strings are repeated.

$A = \{0, 1\}$    0000
0001
00101
00100
001101
01000
01001
0101
011000
011001
0111
...

Duality of 0 and 1 for the remaining eight have corresponding repeats as the first eight.

Remark 6.16 Distinct overlapping n-strings that are substrings of any string of length $L = |A|^n + n$ implies that at least two substrings are identical.

PROOF. Let $a_1 a_2 a_3 \ldots a_L$ be any alphabet string constructed from A. Define the set of n-strings $S = \{a_{j+1} a_{j+2} \ldots a_{j+n}: 0 \leq j \leq |A|^n\}$. All elements of S are substrings of $a_1 a_2 a_3 \ldots a_L$. By the definition of S, there are $|A|^n + 1$ distinct overlapping substrings of $a_1 a_2 a_3 \ldots a_L$ but the maximum number of non-identical n-strings constructed from A is $|A|^n$. Thus, at least two n-strings must be identical.

Lemma 6.17 Distinct overlapping n-strings that are substrings of any string of length $L = |A|^n + n$ implies that at least m+1 substrings are identical.

PROOF. Define $S = \{a_{j+1} a_{j+2} \ldots a_{j+n}: 0 \leq j \leq m|A|^n\}$. The rest of the proof is similar to the proof in 6.16.

Corollary 6.18 Any Turing tape string of length $L = |Q||A|^n + n$ has at least one n-string that occurs $|Q|+1$ times. In other words, the tape string has $|Q|+1$ identical, distinct, overlapping substrings.

PROOF. This follows immediately from lemma 6.17 and definitions 6.10, 6.11 and 6.12.

Definition 6.19 Composition Sequence of Affine Maps

Consider Turing machine $(Q, A, \eta)$. Suppose that over the next n computational steps, the sequence of machine configurations is $(q_0, k_0, T_0), (q_1, k_n, T_1), \ldots, (q_n, k_n, T_n)$. Let $p = \phi(q_0, k_0, T_0)$.

According to Theorem 2.22, consider corresponding orbit, $[p, f_{S(1)}(p), f_{S(2)} \circ f_{S(1)}(p), \ldots, f_{S(n)} \circ f_{S(n-1)} \cdots f_{S(2)} f_{S(1)}](p), \ldots]$. Then for each $k \geq 1$ and for every $m \geq k$, the affine map $f_{S(m)} \circ f_{S(m-1)} \circ \cdots \circ f_{S(k)}$ is called a composition sequence of affine functions or a composition sequence.

Theorem 6.20 If machine $(Q, A, \eta)$ has an immortal configuration (q, k, T), then Theorem 6.4 implies the orbit of the point $p = \phi(q, k, T)$ with respect to the corresponding affine functions has at least one recurrent point. Moreover, there is at least one recurrent point z of this immortal orbit that is a fixed point of a composition sequence of the affine functions iterated according to the correspondence in 2.22

PROOF. Let $f_1, f_2, \ldots f_I$ denote I affine functions with corresponding unit square domains $W_1, W_2, W_3, \ldots, W_I$ induced by a Turing machine $(Q, A, \eta)$ where base $B = |Q| + |A| + 1$. Let $p = (x(q, k, T), y(q, k, T))$ for some immortal configuration (q, k, T) with respect to $(Q, A, \eta)$. Then the orbit of p, $[p, f_{S(1)}(p), f_{S(2)} f_{S(1)}(p), \ldots, f_{S(m)} f_{S(m-1)} \cdots f_{S(2)} f_{S(1)} p, \ldots]$, is an immortal orbit.

For convenience of notation, set $p_0 = p$, $p_1 = f_{S(1)}(p)$, $p_2 = f_{S(2)} f_{S(1)}(p), \ldots, p_m = f_{S(m)} f_{S(m-1)} \cdots f_{S(2)} f_{S(1)}(p), \ldots$ Define the set $\Omega = \{p_k: k \geq 0\}$ i.e. the immortal orbit considered as a set instead of a sequence. If the immortal orbit $[p_0, P_1, p_2, \ldots, p_m, \ldots]$ is periodic, then we are done as we have an immortal periodic point. Otherwise, set $\Omega$ contains an infinite number of distinct points. From 6.4 using induction, we can construct a subsequence $\{s_k\}$ of the immortal orbit such that $$d(s_k, s_{k+1}) \leq \frac{1}{k^2}$$

for every k. It follows that $$\lim_{n \to \infty} s_n = z.$$

Thus, z is a cluster point of subsequence $\{s_k\}$ which is a subset of $\Omega$. And theorem 6.7 implies that z is an immortal point.

By choosing appropriate elements from the subsequence $\{s_k\}$ that converges to z, there exists a subsequence of the immortal orbit $[p_0, p_1, p_2, \ldots, p_m, \ldots]$ with the following properties:

A.

$$\lim_{n \to \infty} z_n = z$$

B. For all n, $$z_n \in \text{interior} \bigcup_{k=1}^{l} W_k \text{ and } z \in \text{interior} \bigcup_{k=1}^{l} W_k.$$

C.

$$d(z_n, z) < \frac{1}{B^n}$$

D. $z_{n+1} = r_n(z_n)$ where $r_n$ is the affine function that is the composition of the finite sequence of functions mapping $z_n$ to $z_{n+1}$ in the immortal orbit.

Consider the sequence of squares $[a_n, b_n, c_n, d_n]$ with center $z_n$ and sides with length $$\frac{4}{B^{n-1}}$$

for n>1. See FIG. 30. From lemma 6.8, z is in the interior of $W_j$ for some j. Set $\delta = \text{infimum}\{d(p, z): p \in \partial W\}$. Since z is in the interior, then $\delta > 0$. Thus, there is a natural number N such that $$\frac{4\sqrt{2}}{B^{N-1}} < \frac{\delta}{2}.$$

Thus, for n≥N this geometrically means that if z is in the square $[a_n, b_n, c_n, d_n]$ then this whole square is a subset of $W_j$. Also, observe that $$d(z_n, z_{n+1}) \le d(z_n, z) + d(z, z_{n+1})$$
$$< \frac{1}{B^n} + \frac{1}{B^{n+1}}$$
$$< \frac{2}{B^n}$$
$$\le \frac{2}{N} \frac{1}{B^{n-1}}$$
$$\le \frac{1}{B^{n-1}}$$

because
$B \ge 2$.

See FIG. 31. The previous inequalities imply that $z_{n+1}$ and z are in the interior of square $[a_n, b_n, c_n, d_n]$ since $z_n$ is at the center. Thus, square $[a_n, b_n, c_n, d_n]$ is a subset of $W_j$ for n≥N.

Covering Condition.

CLAIM: If for some n≥N, the linear part of at least one $r_n$ is of the form $$\begin{pmatrix} B^m & 0 \\ 0 & \frac{1}{B^m} \end{pmatrix} \text{ or } \begin{pmatrix} \frac{1}{B^m} & 0 \\ 0 & B^m \end{pmatrix}$$

for some m≥1, then $r_n([a_n, b_n, c_n, d_n])$ horizontally or vertically covers the square $[a_n, b_n, c_n, d_n]$.

PROOF: In the case that $r_n$ is of the form $$\begin{pmatrix} \frac{1}{B^m} & 0 \\ 0 & B^m \end{pmatrix},$$

recall that y(p) denotes the y coordinate of point p and x(p) denotes the x coordinate of point p.

Condition A. in Definition 1.8
Thus, $$y(r_n(c_n)) - y(r_n(a_n)) = B^m \frac{4}{B^{n-1}} \ge \frac{4B}{B^{n-1}}$$

where B≥2 and m≥1.
Observe that $$y(z_{n+1}) = \frac{1}{2}\{y(r_n(a_n)) + y(r_n(c_n))\}.$$

Thus, $$y(r_n(c_n)) - y(z_{n+1}) = \frac{1}{2}\{y(r_n(c_n)) - y(r_n(a_n))\} \ge \frac{4}{B^{n-1}}$$

From above $$d(z_n, z_{n+1}) \le \frac{1}{B^{n-1}}$$

implies that $y(r_n(a_n)) < y(a_n)$ because $$y(c_n) - y(a_n) = \frac{4}{B^{n-1}}.$$

The inequality $y(r_n(a_n)) < y(a_n)$ satisfies condition A in definition 1.8.

Condition B. in Definition 1.8
Similarly, $$y(r_n(d_n)) - y(r_n(b_n)) \ge \frac{4B}{B^{n-1}}$$

where B≥2 and m≥1.
Observe that $$y(z_{n+1}) = \frac{1}{2}\{y(r_n(d_n)) + y(r_n(b_n))\}.$$

Thus, $$y(r_n(d_n)) - y(z_{n+1}) = \frac{1}{2}\{y(r_n(d_n)) - y(r_n(b_n))\} \ge \frac{4}{B^{n-1}}$$

From above $$d(z_n, z_{n+1}) \leq \frac{1}{B^{n-1}}$$

implies $y(r_n(d_n)) > y(d_n)$ because $$y(d_n) - y(b_n) = \frac{4}{B^{n-1}}.$$

The inequality $y(r_n(d_n)) > y(d_n)$ satisfies condition B in definition 1.8.

Condition C. in Definition 1.8
Observe that $$x(r_n(b_n)) - x(r_n(a_n)) = \frac{1}{B^m} \frac{4}{B^{n-1}} \leq \frac{2}{B^{n-1}}$$

where $B \geq 2$ and $m \geq 1$.
And since $$x(z_{n+1}) = \frac{1}{2}\{x(r_n(a_n)) + x(r_n(b_n))\} \text{ then } x(z_{n+1}) - x(r_n(a_n)) \leq \frac{1}{B^{n-1}}.$$

Thus, $$|x(r_n(a_n)) - x(z_n)| \leq |x(r_n(a_n)) - x(z_{n+1})| + |x(z_{n+1}) - x(z_n)|$$

$$\leq \frac{1}{B^{n-1}} + \frac{1}{B^{n-1}}$$

$$= \frac{2}{B^{n-1}}$$

Since $$x(z_n) - x(a_n) = \frac{2}{B^{n-1}}$$

then $x(r_n(a_n)) \geq x(a_n)$ which satisfies condition C in 1.8
Condition D. in Definition 1.8
Observe that $$x(r_n(b_n)) - x(r_n(a_n)) = \frac{1}{B^m} \frac{4}{B^{n-1}} \leq \frac{2}{B^{n-1}}$$

where $B \geq 2$ and $m \geq 1$.
And since $$x(z_{n+1}) = \frac{1}{2}\{x(r_n(a_n)) + x(r_n(b_n))\} \text{ then } x(r_n(b_n)) - x(z_{n+1}) \leq \frac{1}{B^{n-1}}.$$

Thus, $$|x(r_n(b_n)) - x(z_n)| \leq |x(r_n(b_n)) - x(z_{n+1})| + |x(z_{n+1}) - x(z_n)|$$

$$\leq \frac{1}{B^{n-1}} + \frac{1}{B^{n-1}}$$

$$= \frac{2}{B^{n-1}}.$$

Since $$x(b_n) - x(z_n) = \frac{2}{B^{n-1}}$$

then $x(r_n(b_n)) \leq x(b_n)$ which satisfies condition D in 1.8.
In the case where $r_n$ is of the form $$\begin{pmatrix} B^m & 0 \\ 0 & \frac{1}{B^m} \end{pmatrix},$$

then conditions A., B., C., and D. of definition 1.10 are verified in a similar manner. Thus, for this particular $n \geq N$, then $r_n$ has a fixed point in square $[a_n, b_n, c_n, d_n] \subset W_j$. By theorems 1.13 and 1.14, the vertical and horizontal covering fixed point theorems respectively, $r_n$ has a fixed point which is an immortal periodic point.

Otherwise, for some M, for all $n \geq M$, the linear part of $r_n$ is the identity $$\begin{pmatrix} 1 & 0 \\ 0 & 1 \end{pmatrix}.$$

Set U=maximum{M, N} where N was chosen above such that $$\frac{4\sqrt{2}}{B^{N-1}} < \frac{\delta}{2}.$$

Set $L = |Q||A|^{(2U+1)} + (2U+1)$. If there exists $n \geq L$ with $r_n(x, y) = (x, y)$, the proof is completed.

Otherwise, from 2.26 and 2.29, the program execution is unbounded on the left of the tape or the right of the tape or both. W.L.O.G. it is assumed that program execution is unbounded on the right. (The argument for unbounded on the left is similar.) Thus, when $n \geq L$, then $z_n$ corresponds to the tape head being located at some position k, the tape contents are fixed at least n symbols in both directions from the tape square k and the machine is in some state $q_1$. In other words, $z_n$ corresponds to

| | Tape Location | | | | | | | |
|---|---|---|---|---|---|---|---|---|
| | k−n | ... | k−3 | k−2 | k−1 | k | k+1 | k+2 | ... | k+n |
| Tape Contents | $b_n$ | ... | $b_3$ | $b_2$ | $b_1$ | $a_0$ | $a_1$ | $a_2$ | ... | $a_n$ | ... |
| State (Tape head) | | | | | | $q_1$ | | | | |

Since the program execution is unbounded on the right, for the next net L moves to the right on the tape, consider the state q when the tape head is located at tape square k+U+j for each j such that 0≤j≤L. By lemma 6.14, there are |Q|+1 distinct tape (2U+1)-strings that are identical where the tape head lies at a distinct tape location that is in the middle of this (2U+1)-string. Since there are |Q| states, this means there are at least two of these strings that are identical and are also in the same state. Thus, there is an affine map r from the one identical (2U+1)-string (point v) to the other identical (2U+1)-string (point w); in other words, r(v)=w where map r's linear part is hyperbolic $$\begin{pmatrix} B^m & 0 \\ 0 & \frac{1}{B^m} \end{pmatrix}$$

such that m≥1. Let $[a_v, b_v, c_v, d_v]$ be the square with center v and side length equal to $$\frac{4}{B^U}.$$

Thus, r(v)=w and $$d(v, w) < \frac{1}{B^U}$$

implies that $r([a_v, b_v, c_v, d_v])$ horizontally covers the square $[a_v, b_v, c_v, d_v]$. By 1.14, r has a fixed point in $[a_v, b_v, c_v, d_v]$ which is an immortal periodic point.

The work in the previous proof yields a sharper result. In particular, if m, n≥L, then $z_m$ and $z_n$ are identical up to $B^L$. Thus, the execution of the machine for the next net L tape head moves to the right are identical. Thus, the immortal orbit $[p, f_{S(1)}(p), \ldots, f_{S(m)} f_{S(m-1)} \cdots f_{S(2)} f_{S(1)}(p), \ldots]$ has a subsequence that converges to a fixed point in square $[a_v, b_v, c_v, d_v]$ with center v.

Remark 6.21 By making each of the (2U+1)-strings in theorem 6.20 at least m tape squares apart the horizontal covering rectangle or vertical covering rectangle can be made thinner than ϵ>0 where the fixed point lies inside the covering rectangle.

REFERENCES

[1] G. Agnew. Random Source for Cryptographic Systems. Advances in Cryptology—EUROCRYPT 1987 Proceedings. Springer Verlag, 77-81 (1988)

[2] P. Benioff. The computer as a physical system: A microscopic quantum mechanical Hamiltonian model of computers as represented by Turing machines. Journal of Statistical Physics. 22, 563-591 (1980)

[3] P. Benioff. Quantum mechanical Hamiltonian models of Turing machines that dissipate no energy. Physics Review Letter. 48, 1581-1585 (1980)

[4] Cristian S. Calude and Karl Svozil. Adv. Sci. Lett. 1, 165. (2008)

[5] Cristian S. Calude, Michael J. Dinneen, Monica Dumitrescu, Karl Svozil. Experimental Evidence of Quantum Randomness Incomputability. Phys. Rev. A 82, 022102, 1-8 (2010)

[6] Alonzo Church. An Unsolvable Problem of Elementary Number Theory. American Journal of Mathematics. 58, 345-363. (1936)

[7] Martin Davis. Computability and Unsolvability. Dover Publications, New York, (1982)

[8] David Deutsch. Quantum Theory, the Church-Turing Principle and the Universal Quantum Computer. Proc. London Math. Soc. Series A. 400, No. 1818, 97-117 (1985)

[9] Richard Feynman. Simulating physics with computers. International Journal of Theoretical Physics. 21, 467-488 (1982)

[10] Richard Feynman. Quantum mechanical computers. Foundations of Physics. 16, 507-531 (1986)

[11] Michael Stephen Fiske. Active Element Machine Computation. U.S. Pat. No. 8,010,467. (2007)

[12] Michael R. Garey and David S. Johnson. Computers and Intractability: A Guide to the Theory of NP-Completeness. W.H. Freeman, (1979)

[13] L. K. Grover. Quantum mechanics helps in searching for a needle in a haystack. Physics Review Letters. 79, 325-328. (1997)

[14] James M. Henle and Eugene M. Kleinberg. Infinitesimal Calculus. Mineola, N.Y. Dover Publications. (2003)

[15] John Hertz, Anders Krogh and Richard G. Palmer. Introduction To The Theory of Neural Computation. Addison-Wesley Publishing Company. Redwood City, Calif., (1991)

[16] John J. Hopfield. Neural networks and physical systems with emergent collective computational abilities. Proceedings of the National Academy of Sciences, USA. 79, 2554-2558. (1982)

[17] John J. Hopfield and D. W. Tank. Neural Computation of Decisions in Optimization Problems. Biological Cybernetics. 52, 141-152. Springer Verlag (1985)

[18] John J. Hopfield. Pattern recognition computation using action potential timing for stimulus representation. Nature. 376, 33-36. (1995)

[19] Paul Kocher, Joshua Jaffe and Benjamin Jun. Advances in Cryptology—Crypto 99 Proceedings. Lecture Notes in Computer Science Volume 1666, M. Weiner, edited, Springer-Verlag (1999)

[20] Harry R. Lewis and Christos H. Papadimitriou. Elements Of The Theory Of Computation. 222-223. Prentice-Hall (1981)

[21] Yuri Manin. A Course in Mathematical Logic. Springer Verlag (1977)

[22] Yuri Manin. Computable and Uncomputable (in Russian). Moscow, Sovetskoye Radio (1980)

[23] Warren S. McCulloch, Walter Pitts. A logical calculus immanent in nervous activity. Bulletin of Mathematical Biophysics. 5, 115-133. (1943)

[24] Marvin Minsky. Computation: Finite and Infinite Machines (1st edition). Englewood Cliffs, N.J. Prentice-Hall, Inc, (1967)

[25] Marvin L. Minsky and Seymour A. Papert. Perceptrons. Cambridge, Mass. MIT Press, (1969)

[26] Abraham Robinson. Non-standard Analysis. Revised Edition. Princeton, N.J. Princeton University Press, (1996)

[27] Frank Rosenblatt. Two theorems of statistical separability in the perceptron. Proceedings of a Symposium on the Mechanization of Thought Processes, Her Majesty's Stationary Office, London, 421-456 (1959)

[28] Claude Shannon. Communication Theory of Secrecy Systems. netlab.cs.edu/wiki/files/shannon1949.pdf. (1949)

[29] Peter W. Shor. Algorithms for quantum computation: discrete log and factoring. Proceedings of the 35th Annual IEEE Symposium on Foundations of Computer Science. 2-22 (1994)

[30] Andr'e Stefanov, Nicolas Gisin, Olivier Guinnard, Laurent Guinnard and Hugo Zbinden. Optical quantum random number generator. Journal of Modern Optics. 1362-3044, 47, 4, 595-598 (2000) http://arxiv.org/pdf/quant-ph/9907006

[31] H. E. Sturgis, and J. C. Shepherdson. Computability of Recursive Functions. J. Assoc. Comput. Mach. 10, 217-255 (1963)

[32] Alan M. Turing. On computable numbers, with an application to the Entscheidungsproblem. Proc. London Math. Soc. Series 2 42 (Parts 3 and 4), 230-265 (1936). A correction, ibid. 43, 544-546 (1937).

TABLE 1

Boolean Functions $f_k: \{0, 1\} \times \{0, 1\} \to \{0, 1\}$

| Function | AEM Separation Rule(s) |
|---|---|
| $f_1 = \top$ | $(0, 0, -1, X_k) \leftrightarrow \dfrac{\{(0, 0), (1, 0), (0, 1), (1, 1)\}}{\emptyset}$ |
| $f_2 = \bot$ | $(0, 0, 1, X_k) \leftrightarrow \dfrac{\emptyset}{\{(0, 0), (1, 0), (0, 1), (1, 1)\}}$ |
| $f_3 = A$ | $(2, 0, 1, X_k) \leftrightarrow \dfrac{\{(1, 1), (1, 0)\}}{\{(0, 1), (0, 0)\}}$ |
| $f_4 = B$ | $(0, 2, 1, X_k) \leftrightarrow \dfrac{\{(1, 1), (0, 1)\}}{\{(1, 0), (0, 0)\}}$ |
| $f_5 = \neg A$ | $(-2, 0, -1, X_k) \leftrightarrow \dfrac{\{(0, 1), (0, 0)\}}{\{(1, 1), (1, 0)\}}$ |
| $f_6 = \neg B$ | $(0, -2, -1, X_k) \leftrightarrow \dfrac{\{(1, 0), (0, 0)\}}{\{(1, 1), (0, 1)\}}$ |
| $f_7 = A \wedge B$ | $(2, 2, 3, X_k) \leftrightarrow \dfrac{\{(1, 1)\}}{\{(1, 0), (0, 1), (0, 0)\}}$ |
| $f_8 = A \vee B$ | $(2, 2, 1, X_k) \leftrightarrow \dfrac{\{(1, 0), (0, 1), (1, 1)\}}{\{(0, 0)\}}$ |
| $f_9 = A \to B$ | $(-4, 2, -3, X_k) \leftrightarrow \dfrac{\{(0, 0), (0, 1), (1, 1)\}}{\{(1, 0)\}}$ |
| $f_{10} = A \leftarrow B$ | $(2, -4, -3, X_k) \leftrightarrow \dfrac{\{(0, 0), (1, 0), (1, 1)\}}{\{(0, 1)\}}$ |
| $f_{11} = A \leftrightarrow B$ | $(2, -4, -3, X_k)$ and $(-4, 2, -3, X_j)$ with $j \neq k$ |
| $f_{12} = \neg(A \vee B)$ | $(-2, -2, -1, X_k) \leftrightarrow \dfrac{\{(0, 0)\}}{\{(1, 0), (0, 1), (1, 1)\}}$ |
| $f_{13} = \neg(A \wedge B)$ | $(-2, -2, -3, X_k) \leftrightarrow \dfrac{\{(1, 0), (0, 1), (0, 0)\}}{\{(1, 1)\}}$ |
| $f_{14} = A \oplus B$ | $(2, 2, 1, X_k)$ and $(-2, -2, -3, X_j)$ with $j \neq k$ |
| $f_{15} = A < B$ | $(-2, 4, 3, X_k) \leftrightarrow \dfrac{\{(0, 1)\}}{\{(0, 0), (1, 0), (1, 1)\}}$ |
| $f_{16} = A > B$ | $(4, -2, 3, X_k) \leftrightarrow \dfrac{\{(1, 0)\}}{\{(0, 0), (0, 1), (1, 1)\}}$ |

TABLE 2

Minsky Universal Turing Machine with Program η

| y | 0 | 1 | A |
|---|---|---|---|---|
| $q_1$ | $(q_1, 0, L)$ | $(q_1, 0, L)$ | $(q_2, 1, L)$ | $(q_1, 1, L)$ |
| $q_2$ | $(q_1, 0, L)$ | $(q_2, y, R)$ | $(q_2, A, R)$ | $(q_6, y, R)$ |
| $q_3$ | $(q_3, y, L)$ | $(h, 0, h)$ | $(q_3, A, L)$ | $(q_4, 1, L)$ |
| $q_4$ | $(q_4, y, L)$ | $(q_5, y, R)$ | $(q_7, 1, L)$ | $(q_4, 1, L)$ |
| $q_5$ | $(q_5, y, R)$ | $(q_3, y, L)$ | $(q_5, A, R)$ | $(q_5, 1, R)$ |
| $q_6$ | $(q_6, y, R)$ | $(q_3, A, L)$ | $(q_6, A, R)$ | $(q_6, 1, R)$ |
| $q_7$ | $(q_7, 0, R)$ | $(q_6, y, R)$ | $(q_7, 1, R)$ | $(q_2, 0, R)$ |

State set $Q = \{q_1, q_2, q_3, q_4, q_5, q_6, q_7\}$.
Alphabet $A = \{y, 0, 1, A\}$.

TABLE 3

Boolean Universal Turing Machine program $\overline{\eta} = (\overline{\eta}_0 \overline{\eta}_1 \overline{\eta}_2, \overline{\eta}_3 \overline{\eta}_4, \overline{\eta}_5)$

| | 10 | 00 | 01 | 11 |
|---|---|---|---|---|
| 001 | (001, 00, 0) | (001, 00, 0) | (010, 01, 0) | (001, 01, 0) |
| 010 | (001, 00, 0) | (010, 10, 1) | (010, 11, 1) | (110, 10, 1) |
| 011 | (011, 10, 0) | (000, 00, h) | (011, 11, 0) | (100, 01, 0) |
| 100 | (100, 10, 0) | (101, 10, 1) | (111, 01, 0) | (100, 01, 0) |
| 101 | (101, 10, 1) | (011, 10, 0) | (101, 11, 1) | (101, 01, 1) |
| 110 | (110, 10, 1) | (011, 11, 0) | (110, 11, 1) | (110, 01, 1) |
| 111 | (111, 00, 1) | (110, 10, 1) | (111, 01, 1) | (010, 00, 1) |

State set $Q = \{001, 010, 011, 100, 101, 110, 111\}$.
$A = \{10, 00, 01, 11\}$.

TABLE 4

AEM Separation Rules for Level Set $\overline{\eta}_0^{-1}\{1\}$

| Fire Pattern | Element | $(U, A_i)$ | $(W, A_i)$ | $(X, A_i)$ | $(Y, A_i)$ | $(Z, A_i)$ | $\theta_{A_i}$ |
|---|---|---|---|---|---|---|---|
| 111 10 | $A_0$ | 2 | 2 | 2 | 2 | -2 | 7 |
| 111 01 | $A_1$ | 2 | 2 | 2 | -2 | 2 | 7 |
| 111 00 | $A_2$ | 2 | 2 | 2 | -2 | -2 | 5 |
| 110 11 | $A_3$ | 2 | 2 | -2 | 2 | 2 | 7 |
| 110 10 | $A_4$ | 2 | 2 | -2 | 2 | -2 | 5 |
| 110 01 | $A_5$ | 2 | 2 | -2 | -2 | 2 | 5 |
| 101 11 | $A_6$ | 2 | -2 | 2 | 2 | 2 | 7 |
| 101 10 | $A_7$ | 2 | -2 | 2 | 2 | -2 | 5 |
| 101 01 | $A_8$ | 2 | -2 | 2 | -2 | 2 | 5 |
| 100 11 | $A_9$ | 2 | -2 | -2 | 2 | 2 | 5 |
| 100 10 | $A_{10}$ | 2 | -2 | -2 | 2 | -2 | 3 |
| 100 01 | $A_{11}$ | 2 | -2 | -2 | -2 | 2 | 3 |
| 100 00 | $A_{12}$ | 2 | -2 | -2 | -2 | -2 | 1 |
| 011 11 | $A_{13}$ | -2 | 2 | 2 | 2 | 2 | 7 |
| 010 11 | $A_{14}$ | -2 | 2 | -2 | 2 | 2 | 5 |

TABLE 5

AEM Separation Rules for Level Set $\overline{\eta}_1^{-1}\{1\}$

| Fire Pattern | Element | $(U, B_i)$ | $(W, B_i)$ | $(X, B_i)$ | $(Y, B_i)$ | $(Z, B_i)$ | $\theta_{B_i}$ |
|---|---|---|---|---|---|---|---|
| 111 11 | $B_0$ | 2 | 2 | 2 | 2 | 2 | 9 |
| 111 10 | $B_1$ | 2 | 2 | 2 | 2 | -2 | 7 |
| 111 01 | $B_2$ | 2 | 2 | 2 | -2 | 2 | 7 |
| 111 00 | $B_3$ | 2 | 2 | 2 | -2 | -2 | 5 |
| 110 11 | $B_4$ | 2 | 2 | -2 | 2 | 2 | 7 |
| 110 10 | $B_5$ | 2 | 2 | -2 | 2 | -2 | 5 |
| 110 01 | $B_6$ | 2 | 2 | -2 | -2 | 2 | 5 |
| 110 00 | $B_7$ | 2 | 2 | -2 | -2 | -2 | 3 |
| 101 00 | $B_8$ | 2 | -2 | 2 | -2 | -2 | 3 |
| 100 01 | $B_9$ | 2 | -2 | -2 | -2 | 2 | 3 |
| 011 10 | $B_{10}$ | -2 | 2 | 2 | 2 | -2 | 5 |
| 011 01 | $B_{11}$ | -2 | 2 | 2 | -2 | 2 | 5 |
| 010 01 | $B_{12}$ | -2 | 2 | -2 | -2 | 2 | 3 |
| 010 01 | $B_{13}$ | -2 | 2 | -2 | -2 | 2 | 3 |
| 010 00 | $B_{14}$ | -2 | 2 | -2 | -2 | -2 | 1 |
| 001 01 | $B_{15}$ | -2 | -2 | 2 | -2 | 2 | 3 |

TABLE 6

AEM Separation Rules for Level Set $\bar{\eta}_2^{-1}\{1\}$

| Fire Pattern | Element | (U, $C_i$) | (W, $C_i$) | (X, $C_i$) | (Y, $C_i$) | (Z, $C_i$) | $\theta_{C_i}$ |
|---|---|---|---|---|---|---|---|
| 111 10 | $C_0$ | 2 | 2 | 2 | 2 | −2 | 7 |
| 111 01 | $C_1$ | 2 | 2 | 2 | −2 | 2 | 7 |
| 110 00 | $C_2$ | 2 | 2 | −2 | −2 | −2 | 3 |
| 101 11 | $C_3$ | 2 | −2 | 2 | 2 | 2 | 7 |
| 101 10 | $C_4$ | 2 | −2 | 2 | 2 | −2 | 5 |
| 101 01 | $C_5$ | 2 | −2 | 2 | −2 | 2 | 5 |
| 101 00 | $C_6$ | 2 | −2 | 2 | −2 | −2 | 3 |
| 100 01 | $C_7$ | 2 | −2 | −2 | −2 | 2 | 3 |
| 100 00 | $C_8$ | 2 | −2 | −2 | −2 | −2 | 1 |
| 011 10 | $C_9$ | −2 | 2 | 2 | 2 | −2 | 5 |
| 011 01 | $C_{10}$ | −2 | 2 | 2 | −2 | 2 | 5 |
| 010 10 | $C_{11}$ | −2 | 2 | −2 | 2 | −2 | 3 |
| 001 11 | $C_{12}$ | −2 | −2 | 2 | 2 | 2 | 5 |
| 001 10 | $C_{13}$ | −2 | −2 | 2 | 2 | −2 | 3 |
| 001 00 | $C_{14}$ | −2 | −2 | 2 | −2 | −2 | 1 |

TABLE 7

AEM Separation Rules for Level Set $\bar{\eta}_3^{-1}\{1\}$

| Fire Pattern | Element | (U, $D_i$) | (W, $D_i$) | (X, $D_i$) | (Y, $D_i$) | (Z, $D_i$) | $\theta_{D_i}$ |
|---|---|---|---|---|---|---|---|
| 111 00 | $D_0$ | 2 | 2 | 2 | −2 | −2 | 5 |
| 110 00 | $D_1$ | 2 | 2 | −2 | −2 | −2 | 3 |
| 110 01 | $D_2$ | 2 | 2 | −2 | −2 | 2 | 5 |
| 110 10 | $D_3$ | 2 | 2 | −2 | 2 | −2 | 5 |
| 101 00 | $D_4$ | 2 | −2 | 2 | −2 | −2 | 3 |
| 101 01 | $D_5$ | 2 | −2 | 2 | −2 | 2 | 5 |
| 101 10 | $D_6$ | 2 | −2 | 2 | 2 | −2 | 5 |
| 100 00 | $D_7$ | 2 | −2 | −2 | −2 | −2 | 1 |
| 100 10 | $D_8$ | 2 | −2 | −2 | 2 | −2 | 3 |
| 011 01 | $D_9$ | −2 | 2 | 2 | −2 | 2 | 5 |
| 011 10 | $D_{10}$ | −2 | 2 | 2 | 2 | −2 | 5 |
| 010 00 | $D_{11}$ | −2 | 2 | −2 | −2 | −2 | 1 |
| 010 01 | $D_{12}$ | −2 | 2 | −2 | −2 | 2 | 3 |
| 010 11 | $D_{13}$ | −2 | 2 | −2 | 2 | 2 | 5 |

TABLE 8

AEM Separation Rules for Level Set $\bar{\eta}_4^{-1}\{1\}$

| Fire Pattern | Element | (U, $E_i$) | (W, $E_i$) | (X, $E_i$) | (Y, $E_i$) | (Z, $E_i$) | $\theta_{E_i}$ |
|---|---|---|---|---|---|---|---|
| 111 01 | $E_0$ | 2 | 2 | 2 | −2 | 2 | 7 |
| 110 11 | $E_1$ | 2 | 2 | −2 | 2 | 2 | 7 |
| 110 01 | $E_2$ | 2 | 2 | −2 | −2 | 2 | 5 |
| 110 00 | $E_3$ | 2 | 2 | −2 | −2 | −2 | 3 |
| 101 11 | $E_4$ | 2 | −2 | 2 | 2 | 2 | 7 |
| 101 01 | $E_5$ | 2 | −2 | 2 | −2 | 2 | 5 |
| 100 11 | $E_6$ | 2 | −2 | −2 | 2 | 2 | 5 |
| 100 01 | $E_7$ | 2 | −2 | −2 | −2 | 2 | 3 |
| 011 11 | $E_8$ | −2 | 2 | 2 | 2 | 2 | 7 |
| 011 01 | $E_9$ | −2 | 2 | 2 | −2 | 2 | 5 |
| 010 01 | $E_{10}$ | −2 | 2 | −2 | −2 | 2 | 3 |
| 001 11 | $E_{11}$ | −2 | −2 | 2 | 2 | 2 | 5 |
| 001 01 | $E_{12}$ | −2 | −2 | 2 | −2 | 2 | 3 |

TABLE 9

AEM Separation Rules for Level Set $\bar{\eta}_5^{-1}\{1\}$

| Fire Pattern | Element | (U, $F_i$) | (W, $F_i$) | (X, $F_i$) | (Y, $F_i$) | (Z, $F_i$) | $\theta_{F_i}$ |
|---|---|---|---|---|---|---|---|
| 111 11 | $F_0$ | 2 | 2 | 2 | 2 | 2 | 9 |
| 111 10 | $F_1$ | 2 | 2 | 2 | 2 | −2 | 7 |
| 111 01 | $F_2$ | 2 | 2 | 2 | −2 | 2 | 7 |
| 111 00 | $F_3$ | 2 | 2 | 2 | −2 | −2 | 5 |
| 110 11 | $F_4$ | 2 | 2 | −2 | 2 | 2 | 7 |
| 110 10 | $F_5$ | 2 | 2 | −2 | 2 | −2 | 5 |
| 110 01 | $F_6$ | 2 | 2 | −2 | −2 | 2 | 5 |
| 101 11 | $F_7$ | 2 | −2 | 2 | 2 | 2 | 7 |
| 101 10 | $F_8$ | 2 | −2 | 2 | 2 | −2 | 5 |
| 101 01 | $F_9$ | 2 | −2 | 2 | −2 | 2 | 5 |
| 100 00 | $F_{10}$ | 2 | −2 | −2 | −2 | −2 | 1 |
| 010 11 | $F_{11}$ | −2 | 2 | −2 | 2 | 2 | 5 |
| 010 01 | $F_{12}$ | −2 | 2 | −2 | −2 | 2 | 3 |
| 010 00 | $F_{13}$ | −2 | 2 | −2 | −2 | −2 | 1 |

TABLE 10

Adding Four Bits: $X_0, X_1, X_2, X_3$

| $X_0$ | $X_1$ | $X_2$ | $X_3$ | $C_0$ | $C_1$ | $C_2$ | $C_3$ | $P_0$ | $P_1$ | $P_2$ |
|---|---|---|---|---|---|---|---|---|---|---|
| 0 | 0 | 0 | 0 | 0 | 0 | 0 | 0 | 0 | 0 | 0 |
| 0 | 0 | 0 | 1 | 1 | 0 | 0 | 0 | 1 | 0 | 0 |
| 0 | 0 | 1 | 0 | 1 | 0 | 0 | 0 | 1 | 0 | 0 |
| 0 | 1 | 0 | 0 | 1 | 0 | 0 | 0 | 1 | 0 | 0 |
| 1 | 0 | 0 | 0 | 1 | 0 | 0 | 0 | 1 | 0 | 0 |
| 0 | 0 | 1 | 1 | 1 | 1 | 0 | 0 | 0 | 1 | 0 |
| 0 | 1 | 0 | 1 | 1 | 1 | 0 | 0 | 0 | 1 | 0 |
| 0 | 1 | 1 | 0 | 1 | 1 | 0 | 0 | 0 | 1 | 0 |
| 1 | 0 | 0 | 1 | 1 | 1 | 0 | 0 | 0 | 1 | 0 |
| 1 | 0 | 1 | 0 | 1 | 1 | 0 | 0 | 0 | 1 | 0 |
| 1 | 1 | 0 | 0 | 1 | 1 | 0 | 0 | 0 | 1 | 0 |
| 0 | 1 | 1 | 1 | 1 | 1 | 1 | 0 | 1 | 1 | 0 |
| 1 | 0 | 1 | 1 | 1 | 1 | 1 | 0 | 1 | 1 | 0 |
| 1 | 1 | 0 | 1 | 1 | 1 | 1 | 0 | 1 | 1 | 0 |
| 1 | 1 | 1 | 0 | 1 | 1 | 1 | 0 | 1 | 1 | 0 |
| 1 | 1 | 1 | 1 | 1 | 1 | 1 | 1 | 0 | 0 | 1 |

TABLE 11

Adding Four Bits: $X_k$ to $C_j$ Amplitudes and $C_j$ Thresholds

| Element | $(X_k, C_0)$ | $(X_k, C_1)$ | $(X_k, C_2)$ | $(X_k, C_3)$ | $\theta_{C_0}$ | $\theta_{C_1}$ | $\theta_{C_2}$ | $\theta_{C_3}$ |
|---|---|---|---|---|---|---|---|---|
| $X_k$ | 2 | 2 | 2 | 2 | 1 | 3 | 5 | 7 | k index refers to $X_0, X_1, X_2, X_3$

TABLE 12

Adding Four Bits: $C_j$ to $P_i$ Amplitudes

| Element | $(C_0, P_0)$ | $(C_1, P_0)$ | $(C_2, P_0)$ | $(C_3, P_0)$ | $\theta_{P_0}$ |
|---|---|---|---|---|---|
| $P_0$ | 2 | −2 | 2 | −2 | 1 |

| Element | $(C_0, P_1)$ | $(C_1, P_1)$ | $(C_2, P_1)$ | $(C_3, P_1)$ | $\theta_{P_1}$ |
|---|---|---|---|---|---|
| $P_1$ | 0 | 2 | 2 | −4 | 1 |

| Element | $(C_0, P_2)$ | $(C_1, P_2)$ | $(C_2, P_2)$ | $(C_3, P_2)$ | $\theta_{P_2}$ |
|---|---|---|---|---|---|
| $P_2$ | 2 | 2 | 2 | 2 | 7 |

TABLE 13

Four Bit Multiplication

|   |   |   |   |   | $y_3$ | $y_2$ | $y_1$ | $y_0$ |
|---|---|---|---|---|---|---|---|---|
|   |   |   |   | * | $z_3$ | $z_2$ | $z_1$ | $z_0$ |
|   |   |   |   |   | $y_3z_0$ | $y_2z_0$ | $y_1z_0$ | $y_0z_0$ |
|   |   |   |   | $y_3z_1$ | $y_2z_1$ | $y_1z_1$ | $y_0z_1$ |   |
|   |   |   | $y_3z_2$ | $y_2z_2$ | $y_1z_2$ | $y_0z_2$ |   |   |
|   |   | $y_3z_3$ | $y_2z_3$ | $y_1z_3$ | $y_0z_3$ |   |   |   |
| $e_7$ | $e_6$ | $e_5$ | $e_4$ | $e_3$ | $e_2$ | $e_1$ | $e_0$ |   |

TABLE 14

Element $E_0$ represents bit $e_0$. Amplitude and Threshold

| $(Y_0, E_0)$ | $(Z_0, E_0)$ | $\theta_{E_0}$ |
|---|---|---|
| 2 | 2 | 3 |

TABLE 15

$e_1$ Bit. $S_{10} \leftrightarrow y_1z_0$. $S_{01} \leftrightarrow y_0z_1$.

| $S_{10}$ | $S_{01}$ | $C_{01}$ | $C_{11}$ |
|---|---|---|---|
| 0 | 0 | 0 | 0 |
| 0 | 1 | 1 | 0 |
| 1 | 0 | 1 | 0 |
| 1 | 1 | 1 | 1 |

TABLE 16

$e_1$ Bit. $S_{jk}$ to $C_{i1}$ Amplitudes and $C_{i1}$ Thresholds

| $(S_{01}, C_{01})$ | $(S_{01}, C_{11})$ | $(S_{10}, C_{01})$ | $(S_{10}, C_{11})$ | $\theta_{C_{01}}$ | $\theta_{C_{11}}$ |
|---|---|---|---|---|---|
| 2 | 2 | 2 | 2 | 1 | 3 |

TABLE 17

Element $E_1$ represents bit $e_1$. Amplitude and Threshold

| $(C_{01}, E_1)$ | $(C_{11}, E_1)$ | $\theta_{E_1}$ |
|---|---|---|
| 2 | -2 | 1 |

TABLE 18

$e_2$ Bit. $S_{20} \leftrightarrow y_2z_0$. $S_{11} \leftrightarrow y_1z_1$. $S_{02} \leftrightarrow y_0z_2$.

| $S_{20}$ | $S_{11}$ | $S_{02}$ | $C_{11}$ | $C_{02}$ | $C_{12}$ | $C_{22}$ | $C_{32}$ | $P_{02}$ | $P_{12}$ | $P_{22}$ |
|---|---|---|---|---|---|---|---|---|---|---|
| 0 | 0 | 0 | 0 | 0 | 0 | 0 | 0 | 0 | 0 | 0 |
| 0 | 0 | 0 | 1 | 0 | 0 | 0 | 0 | 1 | 0 | 0 |
| 0 | 0 | 1 | 0 | 1 | 0 | 0 | 0 | 1 | 0 | 0 |
| 0 | 1 | 0 | 0 | 1 | 0 | 0 | 0 | 1 | 0 | 0 |
| 1 | 0 | 0 | 0 | 1 | 0 | 0 | 0 | 1 | 0 | 0 |
| 0 | 0 | 1 | 1 | 1 | 1 | 0 | 0 | 0 | 1 | 0 |
| 0 | 1 | 0 | 1 | 1 | 1 | 0 | 0 | 0 | 1 | 0 |
| 1 | 0 | 0 | 1 | 1 | 1 | 0 | 0 | 0 | 1 | 0 |
| 0 | 1 | 1 | 0 | 1 | 1 | 0 | 0 | 0 | 1 | 0 |
| 1 | 0 | 1 | 0 | 1 | 1 | 0 | 0 | 0 | 1 | 0 |
| 1 | 1 | 0 | 0 | 1 | 1 | 0 | 0 | 0 | 1 | 0 |
| 0 | 1 | 1 | 1 | 1 | 1 | 1 | 0 | 1 | 1 | 0 |
| 1 | 0 | 1 | 1 | 1 | 1 | 1 | 0 | 1 | 1 | 0 |
| 1 | 1 | 0 | 1 | 1 | 1 | 1 | 0 | 1 | 1 | 0 |
| 1 | 1 | 1 | 0 | 1 | 1 | 1 | 0 | 1 | 1 | 0 |
| 1 | 1 | 1 | 1 | 1 | 1 | 1 | 0 | 0 | 0 | 1 |

TABLE 19

$e_2$ Bit. $S_{jk}$, $C_{11}$ to $C_{i2}$ Amplitudes and $C_{i2}$ Thresholds

| $(S_{jk}, C_{02})$ | $(S_{jk}, C_{12})$ | $(S_{jk}, C_{22})$ | $(S_{jk}, C_{32})$ | $\theta_{C_{02}}$ | $\theta_{C_{12}}$ | $\theta_{C_{22}}$ | $\theta_{C_{32}}$ |
|---|---|---|---|---|---|---|---|
| 2 | 2 | 2 | 2 | 1 | 3 | 5 | 7 |

TABLE 20

$C_{j2}$ to $P_{i2}$ Amplitudes and $P_{i2}$ Thresholds

| Element | $(C_{02}, P_{02})$ | $(C_{12}, P_{02})$ | $(C_{22}, P_{02})$ | $(C_{32}, P_{02})$ | $\theta_{P_{02}}$ |
|---|---|---|---|---|---|
| $P_{02}$ | 2 | -2 | 2 | -2 | 1 |
| Element | $(C_{02}, P_{12})$ | $(C_{12}, P_{12})$ | $(C_{22}, P_{12})$ | $(C_{32}, P_{12})$ | $\theta_{P_{12}}$ |
| $P_{12}$ | 0 | 2 | 2 | -4 | 1 |
| Element | $(C_{02}, P_{22})$ | $(C_{12}, P_{22})$ | $(C_{22}, P_{22})$ | $(C_{32}, P_{22})$ | $\theta_{P_{22}}$ |
| $P_{22}$ | 2 | 2 | 2 | 2 | 7 |

TABLE 21

Element $E_2$ represents bit $e_2$. Amplitude and Threshold

| $(P_{02}, E_2)$ | $\theta_{E_2}$ |
|---|---|
| 2 | 1 |

TABLE 22

$e_3$ Bit. $S_{jk} \leftrightarrow y_jz_k$ where $j + k = 3$.

| $S_{30}$ | $S_{21}$ | $S_{12}$ | $S_{03}$ | $P_{12}$ | $C_{03}$ | $C_{13}$ | $C_{23}$ | $C_{33}$ | $C_{43}$ | $P_{03}$ | $P_{13}$ | $P_{23}$ |
|---|---|---|---|---|---|---|---|---|---|---|---|---|
| 0 | 0 | 0 | 0 | 0 | 0 | 0 | 0 | 0 | 0 | 0 | 0 | 0 |
| 0 | 0 | 0 | 0 | 1 | 1 | 0 | 0 | 0 | 0 | 1 | 0 | 0 |
| 0 | 0 | 0 | 1 | 0 | 1 | 0 | 0 | 0 | 0 | 1 | 0 | 0 |
| 0 | 0 | 1 | 0 | 0 | 1 | 0 | 0 | 0 | 0 | 1 | 0 | 0 |
| 0 | 1 | 0 | 0 | 0 | 1 | 0 | 0 | 0 | 0 | 1 | 0 | 0 |
| 1 | 0 | 0 | 0 | 0 | 1 | 0 | 0 | 0 | 0 | 1 | 0 | 0 |
| 0 | 0 | 0 | 1 | 1 | 1 | 1 | 0 | 0 | 0 | 0 | 1 | 0 |
| 0 | 0 | 1 | 0 | 1 | 1 | 1 | 0 | 0 | 0 | 0 | 1 | 0 |
| 0 | 1 | 0 | 0 | 1 | 1 | 1 | 0 | 0 | 0 | 0 | 1 | 0 |
| 1 | 0 | 0 | 0 | 1 | 1 | 1 | 0 | 0 | 0 | 0 | 1 | 0 |
| 0 | 0 | 1 | 1 | 0 | 1 | 1 | 0 | 0 | 0 | 0 | 1 | 0 |
| 0 | 1 | 0 | 1 | 0 | 1 | 1 | 0 | 0 | 0 | 0 | 1 | 0 |
| 1 | 0 | 0 | 1 | 0 | 1 | 1 | 0 | 0 | 0 | 0 | 1 | 0 |
| 0 | 1 | 1 | 0 | 0 | 1 | 1 | 0 | 0 | 0 | 0 | 1 | 0 |
| 1 | 0 | 1 | 0 | 0 | 1 | 1 | 0 | 0 | 0 | 0 | 1 | 0 |
| 1 | 1 | 0 | 0 | 0 | 1 | 1 | 0 | 0 | 0 | 0 | 1 | 0 |
| 0 | 0 | 1 | 1 | 1 | 1 | 1 | 1 | 0 | 0 | 1 | 1 | 0 |
| 0 | 1 | 0 | 1 | 1 | 1 | 1 | 1 | 0 | 0 | 1 | 1 | 0 |
| 1 | 0 | 0 | 1 | 1 | 1 | 1 | 1 | 0 | 0 | 1 | 1 | 0 |
| 0 | 1 | 1 | 0 | 1 | 1 | 1 | 1 | 0 | 0 | 1 | 1 | 0 |
| 1 | 0 | 1 | 0 | 1 | 1 | 1 | 1 | 0 | 0 | 1 | 1 | 0 |
| 1 | 1 | 0 | 0 | 1 | 1 | 1 | 1 | 0 | 0 | 1 | 1 | 0 |
| 0 | 1 | 1 | 1 | 0 | 1 | 1 | 1 | 0 | 0 | 1 | 1 | 0 |
| 1 | 0 | 1 | 1 | 0 | 1 | 1 | 1 | 0 | 0 | 1 | 1 | 0 |
| 1 | 1 | 0 | 1 | 0 | 1 | 1 | 1 | 0 | 0 | 1 | 1 | 0 |
| 1 | 1 | 1 | 0 | 0 | 1 | 1 | 1 | 0 | 0 | 1 | 1 | 0 |
| 0 | 1 | 1 | 1 | 1 | 1 | 1 | 1 | 1 | 0 | 0 | 0 | 1 |
| 1 | 0 | 1 | 1 | 1 | 1 | 1 | 1 | 1 | 0 | 0 | 0 | 1 |
| 1 | 1 | 0 | 1 | 1 | 1 | 1 | 1 | 1 | 0 | 0 | 0 | 1 |
| 1 | 1 | 1 | 0 | 1 | 1 | 1 | 1 | 1 | 0 | 0 | 0 | 1 |
| 1 | 1 | 1 | 1 | 0 | 1 | 1 | 1 | 1 | 0 | 0 | 0 | 1 |
| 1 | 1 | 1 | 1 | 1 | 1 | 1 | 1 | 1 | 0 | 1 | 0 | 1 |

TABLE 23

$S_{jk}$ ($j + k = 3$). $S_{jk}$ to $C_{i3}$ connections and $C_{i3}$ thresholds.

| $(S_{jk}, C_{i3})$ | $\theta_{C_{03}}$ | $\theta_{C_{13}}$ | $\theta_{C_{23}}$ | $\theta_{C_{33}}$ | $\theta_{C_{43}}$ |
|---|---|---|---|---|---|
| 2 | 1 | 3 | 5 | 7 | 9 |

TABLE 24

$C_{j3}$ to $P_{i3}$ Amplitudes and $P_{i3}$ Thresholds

| $(C_{03}, P_{03})$ | $(C_{13}, P_{03})$ | $(C_{23}, P_{03})$ | $(C_{33}, P_{03})$ | $(C_{43}, P_{03})$ | $\theta_{P_{03}}$ |
|---|---|---|---|---|---|
| 2 | −2 | 2 | −2 | 2 | 1 |
| $(C_{03}, P_{13})$ | $(C_{13}, P_{13})$ | $(C_{23}, P_{13})$ | $(C_{33}, P_{13})$ | $(C_{43}, P_{13})$ | $\theta_{P_{13}}$ |
| 0 | 2 | 2 | −4 | 0 | 1 |
| $(C_{03}, P_{23})$ | $(C_{13}, P_{23})$ | $(C_{23}, P_{23})$ | $(C_{33}, P_{23})$ | $(C_{43}, P_{23})$ | $\theta_{P_{23}}$ |
| 2 | 2 | 2 | 2 | 2 | 7 |

TABLE 25

Element $E_3$ represents bit $e_3$. $S_{jk}$ (j + k = 3).

| $(P_{03}, E_3)$ | $\theta_{E_3}$ |
|---|---|
| 2 | 1 |

TABLE 26

$e_4$ Bit. $S_{31} \leftrightarrow y_3 z_1$. $S_{22} \leftrightarrow y_2 z_2$. $S_{13} \leftrightarrow y_1 z_3$.

| $S_{31}$ | $S_{22}$ | $S_{13}$ | $P_{22}$ | $P_{13}$ | $C_{04}$ | $C_{14}$ | $C_{24}$ | $C_{34}$ | $C_{44}$ | $P_{04}$ | $P_{14}$ | $P_{24}$ |
|---|---|---|---|---|---|---|---|---|---|---|---|---|
| 0 | 0 | 0 | 0 | 0 | 0 | 0 | 0 | 0 | 0 | 0 | 0 | 0 |
| 0 | 0 | 0 | 0 | 1 | 1 | 0 | 0 | 0 | 0 | 1 | 0 | 0 |
| 0 | 0 | 0 | 1 | 0 | 1 | 0 | 0 | 0 | 0 | 1 | 0 | 0 |
| 0 | 0 | 1 | 0 | 0 | 1 | 0 | 0 | 0 | 0 | 1 | 0 | 0 |
| 0 | 1 | 0 | 0 | 0 | 1 | 0 | 0 | 0 | 0 | 1 | 0 | 0 |
| 1 | 0 | 0 | 0 | 0 | 1 | 0 | 0 | 0 | 0 | 1 | 0 | 0 |
| 0 | 0 | 0 | 1 | 1 | 0 | 1 | 0 | 0 | 0 | 0 | 1 | 0 |
| 0 | 0 | 1 | 0 | 1 | 1 | 1 | 0 | 0 | 0 | 0 | 1 | 0 |
| 0 | 1 | 0 | 0 | 1 | 1 | 1 | 0 | 0 | 0 | 0 | 1 | 0 |
| 0 | 0 | 1 | 1 | 0 | 1 | 1 | 0 | 0 | 0 | 0 | 1 | 0 |
| 0 | 1 | 0 | 1 | 0 | 1 | 1 | 0 | 0 | 0 | 0 | 1 | 0 |
| 0 | 1 | 1 | 0 | 0 | 1 | 1 | 0 | 0 | 0 | 0 | 1 | 0 |
| 1 | 0 | 0 | 0 | 1 | 1 | 1 | 0 | 0 | 0 | 0 | 1 | 0 |
| 1 | 0 | 0 | 1 | 0 | 1 | 1 | 0 | 0 | 0 | 0 | 1 | 0 |
| 1 | 0 | 1 | 0 | 0 | 1 | 1 | 0 | 0 | 0 | 0 | 1 | 0 |
| 1 | 1 | 0 | 0 | 0 | 1 | 1 | 0 | 0 | 0 | 0 | 1 | 0 |
| 0 | 0 | 1 | 1 | 1 | 1 | 1 | 1 | 0 | 0 | 1 | 1 | 0 |
| 0 | 1 | 0 | 1 | 1 | 1 | 1 | 1 | 0 | 0 | 1 | 1 | 0 |
| 1 | 0 | 0 | 1 | 1 | 1 | 1 | 1 | 0 | 0 | 1 | 1 | 0 |
| 0 | 1 | 1 | 0 | 1 | 1 | 1 | 1 | 0 | 0 | 1 | 1 | 0 |
| 1 | 0 | 1 | 0 | 1 | 1 | 1 | 1 | 0 | 0 | 1 | 1 | 0 |
| 1 | 1 | 0 | 0 | 1 | 1 | 1 | 1 | 0 | 0 | 1 | 1 | 0 |
| 0 | 1 | 1 | 1 | 0 | 1 | 1 | 1 | 0 | 0 | 1 | 1 | 0 |
| 1 | 0 | 1 | 1 | 0 | 1 | 1 | 1 | 0 | 0 | 1 | 1 | 0 |
| 1 | 1 | 0 | 1 | 0 | 1 | 1 | 1 | 0 | 0 | 1 | 1 | 0 |
| 1 | 1 | 1 | 0 | 0 | 1 | 1 | 1 | 0 | 0 | 1 | 1 | 0 |
| 0 | 1 | 1 | 1 | 1 | 1 | 1 | 1 | 1 | 0 | 0 | 0 | 1 |
| 1 | 0 | 1 | 1 | 1 | 1 | 1 | 1 | 1 | 0 | 0 | 0 | 1 |
| 1 | 1 | 0 | 1 | 1 | 1 | 1 | 1 | 1 | 0 | 0 | 0 | 1 |
| 1 | 1 | 1 | 0 | 1 | 1 | 1 | 1 | 1 | 0 | 0 | 0 | 1 |
| 1 | 1 | 1 | 1 | 0 | 1 | 1 | 1 | 1 | 0 | 0 | 0 | 1 |
| 1 | 1 | 1 | 1 | 1 | 1 | 1 | 1 | 1 | 1 | 1 | 0 | 1 |

TABLE 27

$e_4$ Bit. $S_{jk}$ to $C_{i4}$ Amplitudes and $C_{i4}$ Thresholds

| $(S_{jk}, C_{i4})$ | $(P_{22}, C_{i4})$ | $(P_{13}, C_{i4})$ | $\theta_{C_{04}}$ | $\theta_{C_{14}}$ | $\theta_{C_{24}}$ | $\theta_{C_{34}}$ | $\theta_{C_{44}}$ |
|---|---|---|---|---|---|---|---|
| 2 | 2 | 2 | 1 | 3 | 5 | 7 | 9 |

TABLE 28

$C_{j4}$ to $P_{i4}$ Amplitudes and $P_{i4}$ Thresholds

| $(C_{04}, P_{04})$ | $(C_{14}, P_{04})$ | $(C_{24}, P_{04})$ | $(C_{34}, P_{04})$ | $(C_{44}, P_{04})$ | $\theta_{P_{04}}$ |
|---|---|---|---|---|---|
| 2 | −2 | 2 | −2 | 2 | 1 |

TABLE 28-continued $C_{j4}$ to $P_{i4}$ Amplitudes and $P_{i4}$ Thresholds

| $(C_{04}, P_{14})$ | $(C_{14}, P_{14})$ | $(C_{24}, P_{14})$ | $(C_{34}, P_{14})$ | $(C_{44}, P_{14})$ | $\theta_{P_{14}}$ |
|---|---|---|---|---|---|
| 0 | 2 | 2 | −4 | 0 | 1 |
| $(C_{04}, P_{24})$ | $(C_{14}, P_{24})$ | $(C_{24}, P_{24})$ | $(C_{34}, P_{24})$ | $(C_{44}, P_{24})$ | $\theta_{P_{24}}$ |
| 2 | 2 | 2 | 2 | 2 | 7 |

TABLE 29

Element $E_4$ represents bit $e_4$. $S_{jk}$ (j + k = 4).

| $(P_{04}, E_4)$ | $\theta_{E_4}$ |
|---|---|
| 2 | 1 |

TABLE 30

$e_5$ Bit. $S_{32} \leftrightarrow y_3 z_2$. $S_{23} \leftrightarrow y_2 z_3$.

| $S_{32}$ | $S_{23}$ | $P_{14}$ | $P_{23}$ | $C_{05}$ | $C_{15}$ | $C_{25}$ | $C_{35}$ | $P_{05}$ | $P_{15}$ | $P_{25}$ |
|---|---|---|---|---|---|---|---|---|---|---|
| 0 | 0 | 0 | 0 | 0 | 0 | 0 | 0 | 0 | 0 | 0 |
| 0 | 0 | 0 | 1 | 0 | 0 | 0 | 0 | 1 | 0 | 0 |
| 0 | 0 | 1 | 0 | 1 | 0 | 0 | 0 | 1 | 0 | 0 |
| 0 | 1 | 0 | 0 | 1 | 0 | 0 | 0 | 1 | 0 | 0 |
| 1 | 0 | 0 | 0 | 1 | 0 | 0 | 0 | 1 | 0 | 0 |
| 0 | 0 | 1 | 1 | 1 | 1 | 0 | 0 | 0 | 1 | 0 |
| 0 | 1 | 0 | 1 | 1 | 1 | 0 | 0 | 0 | 1 | 0 |
| 1 | 0 | 0 | 1 | 1 | 1 | 0 | 0 | 0 | 1 | 0 |
| 0 | 1 | 1 | 0 | 1 | 1 | 0 | 0 | 0 | 1 | 0 |
| 1 | 0 | 1 | 0 | 1 | 1 | 0 | 0 | 0 | 1 | 0 |
| 1 | 1 | 0 | 0 | 1 | 1 | 0 | 0 | 0 | 1 | 0 |
| 0 | 1 | 1 | 1 | 1 | 1 | 1 | 0 | 1 | 1 | 0 |
| 1 | 0 | 1 | 1 | 1 | 1 | 1 | 0 | 1 | 1 | 0 |
| 1 | 1 | 0 | 1 | 1 | 1 | 1 | 0 | 1 | 1 | 0 |
| 1 | 1 | 1 | 0 | 1 | 1 | 1 | 0 | 1 | 1 | 0 |
| 1 | 1 | 1 | 1 | 1 | 1 | 1 | 1 | 0 | 0 | 1 |

TABLE 31

$e_5$ Bit. $S_{jk}$, $P_{14}$ and $P_{23}$ to $C_{i5}$ Amplitudes and $C_{i5}$ Thresholds

| $(S_{32}, C_{i5})$ | $(S_{23}, C_{i5})$ | $(P_{14}, C_{i5})$ | $(P_{23}, C_{i5})$ | $\theta_{C_{05}}$ | $\theta_{C_{15}}$ | $\theta_{C_{25}}$ | $\theta_{C_{35}}$ |
|---|---|---|---|---|---|---|---|
| 2 | 2 | 2 | 2 | 1 | 3 | 5 | 7 |

TABLE 32

$C_{j5}$ to $P_{i5}$ Amplitudes and $P_{i5}$ Thresholds

| $(C_{05}, P_{05})$ | $(C_{15}, P_{05})$ | $(C_{25}, P_{05})$ | $(C_{35}, P_{05})$ | $\theta_{P_{05}}$ |
|---|---|---|---|---|
| 2 | −2 | 2 | −2 | 1 |
| $(C_{05}, P_{15})$ | $(C_{15}, P_{15})$ | $(C_{25}, P_{15})$ | $(C_{35}, P_{15})$ | $\theta_{P_{15}}$ |
| 0 | 2 | 2 | −4 | 1 |
| $(C_{05}, P_{25})$ | $(C_{15}, P_{25})$ | $(C_{25}, P_{25})$ | $(C_{35}, P_{25})$ | $\theta_{P_{25}}$ |
| 2 | 2 | 2 | 2 | 7 |

TABLE 33

Element $E_5$ represents bit $e_5$. $S_{jk}$ (j + k = 5).

| $(P_{05}, E_5)$ | $\theta_{E_5}$ |
|---|---|
| 2 | 1 |

TABLE 34

$e_6$ Bit. $S_{33} \leftrightarrow y_3 z_3$

| $S_{33}$ | $P_{15}$ | $P_{24}$ | $C_{06}$ | $C_{16}$ | $C_{26}$ | $P_{06}$ | $P_{16}$ |
|---|---|---|---|---|---|---|---|
| 0 | 0 | 0 | 0 | 0 | 0 | 0 | 0 |
| 0 | 0 | 1 | 1 | 0 | 0 | 1 | 0 |
| 0 | 1 | 0 | 1 | 0 | 0 | 1 | 0 |
| 1 | 0 | 0 | 1 | 0 | 0 | 1 | 0 |
| 0 | 1 | 1 | 1 | 1 | 0 | 0 | 1 |
| 1 | 0 | 1 | 1 | 1 | 0 | 0 | 1 |
| 1 | 1 | 0 | 1 | 1 | 0 | 0 | 1 |
| 1 | 1 | 1 | 1 | 1 | 1 | 1 | 1 |

TABLE 35

$e_6$ Bit. $S_{jk}$ to $C_{i6}$ Amplitudes and $C_{i6}$ Thresholds

| $(S_{33}, C_{i6})$ | $(P_{15}, C_{i6})$ | $(P_{24}, C_{i6})$ | $\theta_{C_{06}}$ | $\theta_{C_{16}}$ | $\theta_{C_{26}}$ |
|---|---|---|---|---|---|
| 2 | 2 | 2 | 1 | 3 | 5 |

TABLE 36

$C_{j6}$ to $P_{i6}$ Amplitudes and $P_{i6}$ Thresholds

| $(C_{06}, P_{06})$ | $(C_{16}, P_{06})$ | $(C_{26}, P_{06})$ | $\theta_{P_{06}}$ |
|---|---|---|---|
| 2 | -2 | 2 | 1 |
| $(C_{06}, P_{16})$ | $(C_{16}, P_{16})$ | $(C_{26}, P_{16})$ | $\theta_{P_{16}}$ |
| 0 | 2 | 2 | 1 |

TABLE 37

Element $E_6$ represents bit $e_6$.
Amplitude and Threshold

| $(P_{06}, E_6)$ | $\theta_{E_6}$ |
|---|---|
| 2 | 1 |

TABLE 38

Four Bit Multiplication. 1110 * 0111

|   |   |   |   | 1 | 1 | 1 | 0 |
|---|---|---|---|---|---|---|---|
|   |   |   | * | 0 | 1 | 1 | 1 |
|   |   |   |   | 1 | 1 | 1 | 0 |
|   |   |   | 1 | 1 | 1 | 0 |   |
|   |   | 1 | 1 | 1 | 0 |   |   |
|   | 0 | 0 | 0 | 0 |   |   |   |
|   | 1 | 1 | 0 | 0 | 0 | 1 | 0 |
| $e_7$ | $e_6$ | $e_5$ | $e_4$ | $e_3$ | $e_2$ | $e_1$ | $e_0$ |

14 * 7 = 98 in Base 10.

TABLE 39

Four Bit Multiplication. 1011 * 1001

|   |   |   |   | 1 | 0 | 1 | 1 |
|---|---|---|---|---|---|---|---|
|   |   |   | * | 1 | 0 | 0 | 1 |
|   |   |   |   | 1 | 0 | 1 | 1 |
|   |   |   | 0 | 0 | 0 | 0 |   |
|   |   | 0 | 0 | 0 | 0 |   |   |
|   | 1 | 0 | 1 | 1 |   |   |   |
|   | 1 | 1 | 0 | 0 | 0 | 1 | 1 |
| $e_7$ | $e_6$ | $e_5$ | $e_4$ | $e_3$ | $e_2$ | $e_1$ | $e_0$ |

11 * 9 = 99 in Base 10.

TABLE 40

Four Bit Multiplication. 1111 * 1110

|   |   |   |   | 1 | 1 | 1 | 1 |
|---|---|---|---|---|---|---|---|
|   |   |   | * | 1 | 1 | 1 | 0 |
|   |   |   |   | 1 | 1 | 1 | 0 |
|   |   |   | 1 | 1 | 1 | 0 |   |
|   |   | 1 | 1 | 1 | 0 |   |   |
|   | 0 | 0 | 0 | 0 |   |   |   |
|   | 1 | 1 | 0 | 1 | 0 | 0 | 1 | 0 |
| $e_7$ | $e_6$ | $e_5$ | $e_4$ | $e_3$ | $e_2$ | $e_1$ | $e_0$ |

15 * 14 = 210 in Base 10.

TABLE 41

Four Bit Multiplication. 1111 * 1111

|   |   |   |   | 1 | 1 | 1 | 1 |
|---|---|---|---|---|---|---|---|
|   |   |   | * | 1 | 1 | 1 | 1 |
|   |   |   |   | 1 | 1 | 1 | 1 |
|   |   |   | 1 | 1 | 1 | 1 |   |
|   |   | 1 | 1 | 1 | 1 |   |   |
|   | 1 | 1 | 1 | 1 |   |   |   |
| 1 | 1 | 1 | 0 | 0 | 0 | 0 | 1 |
| $e_7$ | $e_6$ | $e_5$ | $e_4$ | $e_3$ | $e_2$ | $e_1$ | $e_0$ |

15 * 15 = 225 in Base 10.

The invention claimed is:

1. A machine implemented method of executing a computer program comprising:
   creating, by the machine, a representation for executing a program instruction on the machine, the machine including a plurality of communicatively coupled computing elements that communicate with one another;
   executing, by the machine, the program instruction, in the representation at the machine;
   modifying, by the plurality of computing elements, the representation for executing the program instruction on the machine; and
   executing, by the machine, the program instruction in the representation after representation has been modified;
   wherein one or more program instructions executed at distinct instances are executed without using fixed representations; and
   wherein said machine has an unbounded prime directed edge complexity.

2. The method of claim 1 wherein said distinct instances are different times.

3. A machine implemented method of executing a computer program comprising:
   creating, by the machine, a representation for executing a program instruction on the machine, the machine including a plurality of communicatively coupled computing elements that communicate with one another;
   executing, by the machine, the program instruction, in the representation at the machine;
   modifying, by the plurality of computing elements, the representation for executing the program instruction on the machine; and
   executing, by the machine, the program instruction in the representation after representation has been modified;
   wherein said distinct instances are at different parts of the machine executing said computer program.

4. The method of claim 3 wherein said one or more program instructions add numbers.

5. The method of claim 3 wherein said one or more program instructions help multiply numbers.

6. The method of claim 3 further comprising:
prior to the modifying, determining a new representation based on a random determination, the modifying of the representation creates the new representation, wherein randomness helps determine how said one or more program instructions are executed without using fixed representations.

7. The method of claim 6 wherein said randomness is quantum.

8. The method of claim 7 wherein said quantum randomness is produced with photons or by a semiconductor material.

9. A machine implemented method of executing a computer program comprising:
creating, by the machine, a representation for executing a program instruction on the machine, the machine including a plurality of communicatively coupled computing elements that communicate with one another;
executing, by the machine, the program instruction, in the representation at the machine;
modifying, by the plurality of computing elements, the representation for executing the program instruction on the machine; and
executing, by the machine, the program instruction in the representation after representation has been modified;
wherein one or more program instructions executed at distinct instances are executed without using fixed representations wherein dynamic interpretations help execute said one or more program instructions without using fixed representation, dynamic interpretations being multiple firing patterns that each perform the execution of the instruction.

10. The method of claim 9 wherein said computer program is a digital computer program.

11. The method of claim 9 wherein one or more said computer program instructions use time as a parameter.

12. The method of claim 10 wherein said computer program is expressed in one or more of the following languages: C, JAVA, C++, Fortran, assembly language, Ruby, Forth, LISP, Haskell, RISC machine instructions, javascript, java virtual machine, Python, Turing machine.

13. The method of claim 9 wherein said one or more program instructions are executed with a machine comprising a multiplicity of computing elements; and a multiplicity of couplings communicatively connecting the multiplicity of computing elements to one another, such that the couplings are capable of transmitting messages between the multiplicity of computing elements.

14. A machine implemented method of executing a computer program comprising:
creating, by the machine, a representation for executing a program instruction on the machine, the machine including a plurality of communicatively coupled computing elements that communicate with one another;
executing, by the machine, the program instruction, in the representation at the machine;
modifying, by the plurality of computing elements, the representation for executing the program instruction on the machine; and
executing, by the machine, the program instruction in the representation after representation has been modified;
wherein one or more program instructions executed at distinct instances are executed without using fixed representations;
wherein said one or more program instructions are executed with a machine including at least a multiplicity of computing elements; and a multiplicity of couplings communicatively connecting the multiplicity of computing elements to one another, such that the couplings are capable of transmitting messages between the multiplicity of computing elements; and
wherein said couplings are expressed by one or more connection commands.

15. The method of claim 14 wherein said one or more program instructions are executed with a system comprising a multiplicity of computing elements; and a multiplicity of couplings communicatively connecting the multiplicity of computing elements to one another, such that the couplings are capable of transmitting messages between the multiplicity of computing elements.

16. The method of claim 2 wherein said different times are indicated by one or more commands.

17. The method of claim 16 wherein said one or more commands include at least one meta command.

18. The method of claim 16 wherein said one or more commands include at least one connection or element command.

19. The method of claim 6 wherein said randomness is generated by a physical process.

20. The method of claim 19 wherein said physical process occurs inside a physical barrier that contains an active element machine or inside a chip that executes an active element machine.

21. The method of claim 19 wherein said physical process comes from the environment.

22. A machine comprising:
a plurality of computing elements communicatively coupled to one another that send messages to one another,
the machine storing machine one or more machine instructions, which when executed cause the machine to perform a method including at least
creating, by the machine, a representation for executing a program instruction on the machine;
executing, by the machine, the program instruction, in the representation at the machine;
modifying, by the plurality of computing elements, the representation for executing the program instruction on the machine; and
executing, by the machine, the program instruction in the representation after representation has been modified;
wherein one or more program instructions executed at distinct instances are executed without using fixed representations;
the plurality of computing elements forming a network; and each element sends a message to another computing element when inputs to the computing element meet a particular criteria, modifying the representation includes modifying when messages are sent between computing elements.

23. The machine of claim 22 wherein said computer program is expressed in one or more of the following languages: C, JAVA, C++, Fortran, assembly language, Ruby, Forth, LISP, Haskell, RISC machine instructions, javascript, java virtual machine, Python, Turing machine, which is translated into machine instructions for the plurality of computing elements, each machine instruction determining a configuration of a computing element or connection between computing elements.

24. The machine of claim 22 wherein said distinct instances are different times.

25. The machine of claim 22 wherein said distinct instances use different parts of the computing machine.

26. The machine of claim 22 wherein said computer program is an active element machine program.

27. The machine of claim 22 wherein randomness is used to help differently compute said program instruction(s).

28. The machine of claim 22 wherein said program instruction(s) can be expressed as one or more Boolean functions.

29. A machine comprising:
a plurality of computing elements communicatively coupled to one another that send messages to one another,
the machine storing machine one or more machine instructions, which when executed cause the machine to perform a method including at least
creating, by the machine, a representation for executing a program instruction on the machine;
executing, by the machine, the program instruction, in the representation at the machine;
modifying, by the plurality of computing elements, the representation for executing the program instruction on the machine; and
executing, by the machine, the program instruction in the representation after representation has been modified;
wherein one or more program instructions executed at distinct instances are executed without using fixed representations;
wherein said machine has an unbounded prime directed edge complexity.

30. The machine of claim 29 wherein said machine's execution has no recurrent configurations.

31. A machine comprising
a plurality of computing elements commutatively coupled to one another that send messages to one another, the machine storing instructions, which when executed cause the machine to perform the method including at least performing an edge pattern substitution by at least moving, by the machine, a virtual read head to a first virtual execution node;
reading by the machine, content of the virtual execution node;
determining, by the plurality of computing elements, whether a portion of content of a virtual tail node matches at least a portion of content in the execution node;
and
if the portion of content of the virtual tail node matches the portion of the content of the virtual execution node,
selecting, by the machine, content from a virtual head node; and
replacing, by the machine, the portion of virtual execution node with content from the virtual head node, the virtual head node and the virtual tail node having a pre-existing association with one another;
moving, by the machine, the virtual read head to a second virtual execution node, which execution node is the second execution node being determined based on edge pattern substitution;
wherein edge pattern substitution is used to execute a computer program.

32. The machine of claim 31 wherein said machine finds prime directed edges.

33. The machine of claim 32 wherein said prime directed edges are derived from a computer program.

34. The machine of claim 31 that compiles a computer program into a set of prime directed edges.

35. A machine implemented method of executing a computer program comprising:
performing an edge pattern substitution by at least
moving, by the machine, a virtual read head to a first virtual execution node, the machine including at least a plurality of computing elements commutatively coupled to one another that send messages to one another;
reading by the machine, content of the virtual execution node;
determining, by the plurality of computing elements, whether a portion of content of a virtual tail node matches at least a portion of content in the execution node;
and
if the portion of content of the virtual tail node matches the portion of the content of the virtual execution node,
selecting, by the machine, content from a virtual head node; and
replacing, by the machine, the portion of virtual execution node with content from the virtual head node, the virtual head node and the virtual tail node having a pre-existing association with one another; and
moving, by the machine, the virtual read head to a second virtual execution node, which execution node is the second execution node being determined based on edge patter substitution.

36. The method of claim 35 wherein said method finds prime directed edges.

37. A machine implemented method of computing a Boolean function using level sets comprising:
separating, by the machine, a domain of a Boolean function into four members, the machine including at least a plurality of computing elements commutatively coupled to one another that send messages to one another;
determining, by the plurality of computing elements, an active element tuple containing parameters for each active element;
creating, by the machine, one or more separation rules based on the domain of the Boolean function and an active element;
for each active element, based on one of the separation rules, mapping, by the machine, a level set of the Boolean function and tuple to a unique active element firing pattern; and
computing, by the machine, a Boolean function based on the level set mapping.

38. The method of claim 37 wherein an active element machine computes said Boolean function.

39. The method of claim 38 wherein parameter values of said active element machine are chosen to separate said level sets.

40. The method of claim 38 wherein said active element machine differently computes said Boolean function at distinct instances.

41. The method of claim 40 wherein different parameter values are used to differently compute said Boolean function at distinct instances.

42. A machine implemented method of computing a Boolean function with an active element machine comprising:
separating, by a machine, a domain of a Boolean function into four members, the machine including at least a network of computing elements commutatively coupled to one another that send messages to one another, a representation of instructions determining when the messages are sent;

determining, by the plurality of computing elements, an active element tuple containing parameters for each active element;

creating, by the machine, a separation rule based on the domain of the Boolean functions and an active element;

for each active element, based on one of the separation rules mapping a level set of the Boolean function and tuple to one of the unique active element firing patterns; and computing a Boolean function based on the level set mapping.

43. The method of claim 42 wherein said Boolean function multiplies two numbers.

44. The method of claim 42 wherein said Boolean function helps execute a program instruction in a computer program.

45. The method of claim 42 wherein one or more members in the same level set of the Boolean function are expressed with a pattern established during a window of time.

46. A machine implemented method of executing a computer program comprising:

creating, by the machine, a representation for executing a program instruction on the machine, the machine including a plurality of communicatively coupled computing elements that communicate with one another;

executing, by the machine, the program instruction, in the representation at the machine;

modifying, by the plurality of computing elements, the representation for executing the program instruction on the machine, the modification being determined based on a random event; and executing, by the machine, the program instruction in the representation after representation has been modified;

wherein randomness is used to help execute computer program instructions; and wherein said machine has an unbounded prime directed edge complexity.

47. The method of claim 46 wherein said randomness is quantum.

48. The method of claim 46 wherein said randomness helps determine how at least one said program instruction is computed differently at different instances.

49. The method of claim 48 wherein said distinct instances are different times.

50. The method of claim 48 wherein said distinct instances are at different parts of a machine executing said program instruction.

51. The method of claim 46 wherein said randomness is produced by a physical process.

52. The method of claim 48 wherein said program instruction is executed with an active element machine.

53. The method of claim 52 wherein said randomness helps determine element or connection parameter values in said machine.

54. The method of claim 48 wherein dynamic interpretations execute said one or more program instructions without using fixed representation, dynamic interpretations being multiple firing patterns that can be used to perform the same task.

55. The method of claim 48 wherein randomness helps determine a firing pattern during a window of time.

56. The method of claim 55 wherein one or more members in the same level set are expressed with said firing pattern.

* * * * *